(12) United States Patent
Felice-Steele et al.

(10) Patent No.: US 10,671,749 B2
(45) Date of Patent: Jun. 2, 2020

(54) AUTHENTICATED ACCESS AND AGGREGATION DATABASE PLATFORM

(71) Applicant: ConsumerInfo.com, Inc., Costa Mesa, CA (US)

(72) Inventors: Michelle Felice-Steele, Woodland Hills, CA (US); Michele Raneri, Orange, CA (US); Paul DeSaulniers, Ladera Ranch, CA (US); Joe Manna, Tustin, CA (US); Jeff Softley, Rancho Mission Viejo, CA (US); Srikumar Puthupadi Kanthadai, El Monte, CA (US); Aga Dzhafar Hady Ogiu Dzhafarov, Mission Viejo, CA (US); Pat Finneran, Queen Creek, AZ (US); Donna Meryl Smith, Irvine, CA (US); Gregory Lennox Wright, Newport Coast, CA (US); Marizette Galvez, Chino, CA (US); Ujjayan Banerjee, Irvine, CA (US); Ravi Devesetti, Fremont, CA (US); Shivakumar Ramanathan, Irvine, CA (US); Mukeshkumar G. Patel, Downey, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

(21) Appl. No.: 16/445,647

(22) Filed: Jun. 19, 2019

(65) Prior Publication Data

US 2020/0074099 A1 Mar. 5, 2020

Related U.S. Application Data

(60) Provisional application No. 62/727,479, filed on Sep. 5, 2018, provisional application No. 62/826,319, filed on Mar. 29, 2019.

(51) Int. Cl.
*G06F 21/00* (2013.01)
*G06F 21/62* (2013.01)
*G06F 9/54* (2006.01)

(52) U.S. Cl.
CPC ............ *G06F 21/6218* (2013.01); *G06F 9/54* (2013.01)

(58) Field of Classification Search
CPC .............................. G06F 21/6218; G06F 9/54
See application file for complete search history.

(56) References Cited

U.S. PATENT DOCUMENTS

| 1,372,397 A | 3/1921 | Nies et al. |
| 3,405,457 A | 10/1968 | Bitzer |

(Continued)

FOREIGN PATENT DOCUMENTS

| CA | 2 509 842 | 12/2005 |
| CA | 2 611 595 | 12/2006 |

(Continued)

OTHER PUBLICATIONS

International Committee on Credit Reporting (ICCR), Use of Alternative Data to Enhance Credit Reporting to Enable Access to Digital Financial Services by Individuals and SMEs operating in the Informal Economy, Jun. 28, 2018, 35 Pages (Year: 2018).*

(Continued)

*Primary Examiner* — Christopher C Harris
(74) *Attorney, Agent, or Firm* — Knobbe, Martens, Olson & Bear LLP

(57) ABSTRACT

A data processing system is disclosed for data processing, including database and file management, as well accessing one or more databases or other data structures, authenticating users, and categorizing data items for addition to the database system. In some embodiments, the system may be configured to coordinate access to user account information (Continued)

via user-provided authentication credentials; apply account identification rules to the accessed account information to identify a plurality of accounts of the user; and initiate updates to a database record associated with the user indicative of any accounts identified.

15 Claims, 44 Drawing Sheets

(56) References Cited

U.S. PATENT DOCUMENTS

| | | |
|---|---|---|
| 3,762,316 A | 10/1973 | Spradlin |
| 4,305,059 A | 12/1981 | Benton |
| 4,346,442 A | 8/1982 | Musmanno |
| 4,578,530 A | 3/1986 | Zeidler |
| 4,718,009 A | 1/1988 | Cuervo |
| 4,734,858 A | 3/1988 | Schlafly |
| 4,736,294 A | 4/1988 | Gill |
| 4,755,940 A | 7/1988 | Brachtl et al. |
| 4,774,664 A | 9/1988 | Campbell et al. |
| 4,827,508 A | 5/1989 | Shear |
| 4,869,500 A | 9/1989 | Williams |
| 4,876,592 A | 10/1989 | Von Kohorn |
| 4,891,503 A | 1/1990 | Jewell |
| 4,895,518 A | 1/1990 | Arnold |
| 4,900,903 A | 2/1990 | Wright et al. |
| 4,947,028 A | 8/1990 | Gorog |
| 4,977,595 A | 12/1990 | Ohta et al. |
| 4,989,141 A | 1/1991 | Lyons et al. |
| 5,013,038 A | 5/1991 | Luxenberg et al. |
| 5,025,138 A | 6/1991 | Cuervo |
| 5,025,373 A | 6/1991 | Keyser, Jr. et al. |
| 5,034,807 A | 7/1991 | Von Kohorn |
| 5,060,153 A | 10/1991 | Nakagawa |
| 5,077,582 A | 12/1991 | Kravette et al. |
| 5,126,936 A | 6/1992 | Champion et al. |
| 5,148,365 A | 9/1992 | Dembo |
| 5,173,935 A | 12/1992 | Meschi |
| 5,197,094 A | 3/1993 | Tillery et al. |
| 5,218,632 A | 6/1993 | Cool |
| 5,220,501 A | 6/1993 | Lawlor et al. |
| 5,239,462 A | 8/1993 | Jones et al. |
| 5,259,766 A | 11/1993 | Sack |
| 5,262,941 A | 11/1993 | Saladin |
| 5,274,547 A | 12/1993 | Zoffel et al. |
| 5,317,636 A | 5/1994 | Vizcaino |
| 5,317,733 A | 5/1994 | Murdock |
| 5,326,959 A | 7/1994 | Perazza |
| 5,336,870 A | 8/1994 | Hughes et al. |
| 5,351,186 A | 9/1994 | Bullock et al. |
| 5,361,201 A | 11/1994 | Jost et al. |
| 5,383,113 A | 1/1995 | Kight et al. |
| 5,404,518 A | 4/1995 | Gilbertson et al. |
| 5,420,405 A | 5/1995 | Chasek |
| 5,423,033 A | 6/1995 | Yuen |
| 5,457,305 A | 10/1995 | Akel et al. |
| 5,500,513 A | 3/1996 | Langhans et al. |
| 5,537,464 A | 7/1996 | Lewis et al. |
| 5,561,706 A | 10/1996 | Fenner |
| 5,563,783 A | 10/1996 | Stolfo et al. |
| 5,590,038 A | 12/1996 | Pitroda |
| 5,592,560 A | 1/1997 | Deaton et al. |
| 5,611,052 A | 3/1997 | Dykstra et al. |
| 5,615,408 A | 3/1997 | Johnson |
| 5,616,902 A | 4/1997 | Cooley et al. |
| 5,621,201 A | 4/1997 | Langhans et al. |
| 5,630,127 A | 5/1997 | Moore et al. |
| 5,640,577 A | 6/1997 | Scharmer |
| 5,649,115 A | 7/1997 | Schrader et al. |
| 5,655,008 A | 8/1997 | Futch et al. |
| 5,659,725 A | 8/1997 | Levy et al. |
| 5,659,731 A | 8/1997 | Gustafson |
| 5,684,965 A | 11/1997 | Pickering |
| 5,689,651 A | 11/1997 | Lozman |
| 5,696,907 A | 12/1997 | Tom |
| 5,699,527 A | 12/1997 | Davidson |
| 5,699,528 A | 12/1997 | Hogan |
| 5,704,029 A | 12/1997 | Wright, Jr. |
| 5,708,422 A | 1/1998 | Blonder et al. |
| 5,719,941 A | 2/1998 | Swift et al. |
| 5,729,735 A | 3/1998 | Meyering |
| 5,732,400 A | 3/1998 | Mandler |
| 5,739,512 A | 4/1998 | Tognazzini |
| 5,742,769 A | 4/1998 | Lee et al. |
| 5,745,654 A | 4/1998 | Titan |
| 5,745,706 A | 4/1998 | Wolfberg et al. |
| 5,748,098 A | 5/1998 | Grace |
| 5,754,632 A | 5/1998 | Smith |
| 5,774,533 A | 6/1998 | Patel |
| 5,774,870 A | 6/1998 | Storey |
| 5,774,883 A | 6/1998 | Andersen |
| 5,774,885 A | 6/1998 | Delfer, III |
| 5,793,972 A | 8/1998 | Shane |
| 5,794,221 A | 8/1998 | Egendorf |
| 5,802,142 A | 9/1998 | Browne |
| 5,802,498 A | 9/1998 | Comesanas |
| 5,809,143 A | 9/1998 | Hughes |
| 5,809,322 A | 9/1998 | Akerib |
| 5,813,006 A | 9/1998 | Polnerow et al. |
| 5,815,665 A | 9/1998 | Teper et al. |
| 5,819,234 A | 10/1998 | Slavin et al. |
| 5,832,068 A | 11/1998 | Smith |
| 5,832,460 A | 11/1998 | Bednar et al. |
| 5,838,314 A | 11/1998 | Neel et al. |
| 5,842,211 A | 11/1998 | Horadan et al. |
| 5,844,218 A | 12/1998 | Kawan et al. |
| 5,850,446 A | 12/1998 | Berger et al. |
| 5,857,174 A | 1/1999 | Dugan |
| 5,864,620 A | 1/1999 | Pettitt |
| 5,870,721 A | 2/1999 | Norris |
| 5,873,072 A | 2/1999 | Kight et al. |
| 5,875,236 A | 2/1999 | Jankowitz |
| 5,878,403 A | 3/1999 | DeFrancesco |
| 5,881,131 A | 3/1999 | Farris et al. |
| 5,884,287 A | 3/1999 | Edesess |
| 5,884,288 A | 3/1999 | Chang et al. |
| 5,884,302 A | 3/1999 | Ho |
| 5,893,077 A | 4/1999 | Griffin |
| 5,903,830 A | 5/1999 | Joao et al. |
| 5,903,881 A | 5/1999 | Schrader et al. |
| 5,914,472 A | 6/1999 | Foladare et al. |
| 5,918,217 A | 6/1999 | Maggioncalda et al. |
| 5,918,227 A | 6/1999 | Polnerow et al. |
| 5,920,848 A | 7/1999 | Schutzer et al. |
| 5,924,082 A | 7/1999 | Silverman et al. |
| 5,926,754 A | 7/1999 | Cirelli et al. |
| 5,930,764 A | 7/1999 | Melchione et al. |
| 5,930,776 A | 7/1999 | Dykstra et al. |
| 5,937,392 A | 8/1999 | Alberts |
| 5,940,812 A | 8/1999 | Tengel et al. |
| 5,950,172 A | 9/1999 | Klingman |
| 5,953,710 A | 9/1999 | Fleming |
| 5,956,690 A | 9/1999 | Haggerson et al. |
| 5,956,693 A | 9/1999 | Geerlings |
| 5,956,698 A | 9/1999 | Lacheze et al. |
| 5,963,939 A | 10/1999 | McCann et al. |
| 5,966,695 A | 10/1999 | Melchione et al. |
| 5,974,521 A | 10/1999 | Akerib |
| 5,978,780 A | 11/1999 | Watson |
| 5,991,411 A | 11/1999 | Kaufman et al. |
| 5,995,947 A | 11/1999 | Fraser et al. |
| 5,999,596 A | 12/1999 | Walker et al. |
| 6,006,333 A | 12/1999 | Nielsen |
| 6,009,412 A | 12/1999 | Storey |
| 6,009,415 A | 12/1999 | Shurling et al. |
| 6,012,044 A | 1/2000 | Maggioncalda et al. |
| 6,014,645 A | 1/2000 | Cunningham |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,029,178 A | 2/2000 | Martin et al. |
| 6,032,132 A | 2/2000 | Nelson |

(56) References Cited

U.S. PATENT DOCUMENTS

| | | |
|---|---|---|
| 6,035,288 A | 3/2000 | Solomon |
| 6,038,551 A | 3/2000 | Barlow et al. |
| 6,041,319 A | 3/2000 | Bass et al. |
| 6,044,362 A | 3/2000 | Neely |
| 6,049,786 A | 4/2000 | Smorodinsky |
| 6,052,671 A | 4/2000 | Crooks et al. |
| 6,055,570 A | 4/2000 | Nielsen |
| 6,061,668 A | 5/2000 | Sharrow |
| 6,064,987 A | 5/2000 | Walker |
| 6,064,990 A | 5/2000 | Goldsmith |
| 6,070,141 A | 5/2000 | Houvener |
| 6,070,147 A | 5/2000 | Harms et al. |
| 6,072,894 A | 6/2000 | Payne |
| 6,073,140 A | 6/2000 | Morgan et al. |
| 6,076,070 A | 6/2000 | Stack |
| 6,078,907 A | 6/2000 | Lamm |
| 6,078,922 A | 6/2000 | Johnson et al. |
| 6,085,242 A | 7/2000 | Chandra |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,108,691 A | 8/2000 | Lee et al. |
| 6,112,190 A | 8/2000 | Fletcher et al. |
| 6,115,690 A | 9/2000 | Wong |
| 6,115,694 A | 9/2000 | Cheetham et al. |
| 6,119,103 A | 9/2000 | Basch et al. |
| 6,128,599 A | 10/2000 | Walker |
| 6,128,602 A | 10/2000 | Northington et al. |
| 6,128,603 A | 10/2000 | Dent |
| 6,144,726 A | 11/2000 | Cross |
| 6,145,088 A | 11/2000 | Stevens |
| 6,149,441 A | 11/2000 | Pellegrino et al. |
| 6,154,729 A | 11/2000 | Cannon et al. |
| 6,157,707 A | 12/2000 | Baulier et al. |
| 6,161,139 A | 12/2000 | Win et al. |
| 6,173,272 B1 | 1/2001 | Thomas et al. |
| 6,178,420 B1 | 1/2001 | Sassano |
| 6,182,068 B1 | 1/2001 | Culliss |
| 6,182,229 B1 | 1/2001 | Nielsen |
| 6,185,543 B1 | 2/2001 | Galperin et al. |
| 6,195,660 B1 | 2/2001 | Polnerow et al. |
| 6,195,738 B1 | 2/2001 | Akerib |
| 6,199,077 B1 | 3/2001 | Inala et al. |
| 6,202,053 B1 | 3/2001 | Christiansen et al. |
| 6,202,067 B1 | 3/2001 | Blood et al. |
| 6,208,998 B1 | 3/2001 | Marcus |
| 6,230,188 B1 | 5/2001 | Marcus |
| 6,233,566 B1 | 5/2001 | Levine et al. |
| 6,233,588 B1 | 5/2001 | Marchoili et al. |
| 6,247,000 B1 | 6/2001 | Hawkins et al. |
| 6,249,770 B1 | 6/2001 | Erwin et al. |
| 6,253,203 B1 | 6/2001 | O'Flaherty et al. |
| 6,254,000 B1 | 7/2001 | Degen et al. |
| 6,263,447 B1 | 7/2001 | French et al. |
| 6,269,325 B1 | 7/2001 | Lee et al. |
| 6,275,824 B1 | 8/2001 | O'Flaherty et al. |
| 6,278,993 B1 | 8/2001 | Kumar et al. |
| 6,282,658 B2 | 8/2001 | French et al. |
| 6,285,987 B1 | 9/2001 | Roth et al. |
| 6,289,323 B1 | 9/2001 | Gordon et al. |
| 6,289,452 B1 | 9/2001 | Arnold et al. |
| 6,292,789 B1 | 9/2001 | Schutzer |
| 6,295,528 B1 | 9/2001 | Marcus et al. |
| 6,295,541 B1 | 9/2001 | Bodnar et al. |
| 6,298,348 B1 | 10/2001 | Eldering |
| 6,304,850 B1 | 10/2001 | Keller et al. |
| 6,304,860 B1 | 10/2001 | Martin et al. |
| 6,311,169 B2 | 10/2001 | Duhon |
| 6,317,783 B1 | 11/2001 | Freishtat et al. |
| 6,321,339 B1 | 11/2001 | French et al. |
| 6,324,516 B1 | 11/2001 | Shults et al. |
| 6,324,524 B1 | 11/2001 | Lent et al. |
| 6,327,578 B1 | 12/2001 | Linehan |
| 6,330,546 B1 | 12/2001 | Gopinathan et al. |
| 6,330,551 B1 | 12/2001 | Burchetta et al. |
| 6,330,575 B1 | 12/2001 | Moore et al. |
| 6,334,116 B1 | 12/2001 | Ganesan et al. |
| 6,337,901 B1 | 1/2002 | Rome et al. |
| 6,339,790 B1 | 1/2002 | Inoue |
| 6,341,272 B1 | 1/2002 | Randle |
| 6,343,279 B1 | 1/2002 | Bissonette et al. |
| 6,343,284 B1 | 1/2002 | Ishikawa et al. |
| 6,347,375 B1 | 2/2002 | Reinert et al. |
| 6,353,778 B1 | 3/2002 | Brown |
| 6,353,795 B1 | 3/2002 | Ranjan |
| 6,356,937 B1 | 3/2002 | Montville et al. |
| 6,374,262 B1 | 4/2002 | Kodama |
| 6,374,264 B1 | 4/2002 | Bohannon et al. |
| 6,384,844 B1 | 5/2002 | Stewart et al. |
| 6,385,594 B1 | 5/2002 | Lebda et al. |
| 6,385,595 B1 | 5/2002 | Kolling et al. |
| 6,386,444 B1 | 5/2002 | Sullivan |
| 6,397,197 B1 | 5/2002 | Gindlesperger |
| 6,397,212 B1 | 5/2002 | Biffar |
| 6,397,224 B1 | 5/2002 | Zubeldia et al. |
| 6,401,118 B1 | 6/2002 | Thomas |
| 6,405,173 B1 | 6/2002 | Honarvar |
| 6,405,181 B2 | 6/2002 | Lent et al. |
| 6,405,245 B1 | 6/2002 | Burson et al. |
| 6,408,282 B1 | 6/2002 | Buist |
| 6,412,073 B1 | 6/2002 | Rangan |
| 6,421,675 B1 | 7/2002 | Ryan et al. |
| 6,421,729 B1 | 7/2002 | Paltenghe et al. |
| 6,421,768 B1 | 7/2002 | Purpura |
| 6,422,462 B1 | 7/2002 | Cohen |
| 6,424,840 B1 | 7/2002 | Fitch et al. |
| 6,430,539 B1 | 8/2002 | Lazarus et al. |
| 6,431,439 B1 | 8/2002 | Suer et al. |
| 6,438,527 B1 | 8/2002 | Powar |
| 6,438,601 B1 | 8/2002 | Hardy |
| 6,442,590 B1 | 8/2002 | Inala et al. |
| 6,453,353 B1 | 9/2002 | Win et al. |
| 6,457,012 B1 | 9/2002 | Jatkowski |
| 6,460,127 B1 | 10/2002 | Akerib |
| 6,473,740 B2 | 10/2002 | Cockril et al. |
| 6,477,565 B1 | 11/2002 | Daswani et al. |
| 6,496,936 B1 | 12/2002 | French et al. |
| 5,870,721 C1 | 1/2003 | Norris |
| 6,505,168 B1 | 1/2003 | Rothman et al. |
| 6,510,451 B2 | 1/2003 | Wu et al. |
| 6,516,190 B1 | 2/2003 | Linkola |
| 6,517,587 B2 | 2/2003 | Satyavolu et al. |
| 6,523,021 B1 | 2/2003 | Monberg et al. |
| 6,523,041 B1 | 2/2003 | Morgan et al. |
| 6,529,880 B1 | 3/2003 | McKeen et al. |
| 6,532,450 B1 | 3/2003 | Brown et al. |
| 6,539,377 B1 | 3/2003 | Culliss |
| 6,539,392 B1 | 3/2003 | Rebane |
| 6,542,894 B1 | 4/2003 | Lee et al. |
| 6,543,683 B2 | 4/2003 | Hoffman |
| 6,546,413 B1 | 4/2003 | Northrup |
| 6,549,770 B1 | 4/2003 | Marran |
| 6,549,904 B1 | 4/2003 | Ortega et al. |
| 6,552,670 B2 | 4/2003 | Sundaravel et al. |
| 6,564,210 B1 | 5/2003 | Korda et al. |
| 6,567,791 B2 | 5/2003 | Lent et al. |
| 6,567,850 B1 | 5/2003 | Freishtat et al. |
| 6,571,236 B1 | 5/2003 | Ruppelt |
| 6,574,736 B1 | 6/2003 | Andrews |
| 6,574,798 B1 | 6/2003 | Bradley et al. |
| 6,578,012 B1 | 6/2003 | Storey |
| 6,581,025 B2 | 6/2003 | Lehman |
| 6,581,075 B1 | 6/2003 | Guturu et al. |
| 6,587,841 B1 | 7/2003 | DeFrancesco |
| 6,594,766 B2 | 7/2003 | Rangan et al. |
| 6,611,816 B2 | 8/2003 | Lebda et al. |
| 6,615,193 B1 | 9/2003 | Kingdon et al. |
| 6,622,131 B1 | 9/2003 | Brown et al. |
| 6,622,266 B1 | 9/2003 | Goddard et al. |
| 6,629,245 B1 | 9/2003 | Stone et al. |
| 6,633,910 B1 | 10/2003 | Rajan et al. |
| 6,636,803 B1 | 10/2003 | Hartz, Jr. et al. |
| 6,647,383 B1 | 11/2003 | August et al. |

(56) References Cited

U.S. PATENT DOCUMENTS

| | | |
|---|---|---|
| 6,655,583 B2 | 12/2003 | Walsh et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,684,197 B1 | 1/2004 | Kolls |
| 6,694,353 B2 | 2/2004 | Sommerer |
| 6,701,348 B2 | 3/2004 | Sommerer |
| 6,703,930 B2 | 3/2004 | Skinner |
| 6,704,039 B2 | 3/2004 | Pena |
| 6,711,665 B1 | 3/2004 | Akerib et al. |
| 6,714,944 B1 | 3/2004 | Shapiro et al. |
| 6,718,313 B1 | 4/2004 | Lent et al. |
| 6,721,716 B1 | 4/2004 | Gross |
| 6,725,381 B1 | 4/2004 | Smith et al. |
| 6,725,425 B1 | 4/2004 | Rajan et al. |
| 6,738,804 B1 | 5/2004 | Lo |
| 6,745,196 B1 | 6/2004 | Colyer et al. |
| 6,745,938 B2 | 6/2004 | Sullivan |
| 6,748,367 B1 | 6/2004 | Lee et al. |
| 6,748,426 B1 | 6/2004 | Shaffer et al. |
| 6,750,985 B2 | 6/2004 | Rhoads |
| 6,754,564 B2 | 6/2004 | Newport |
| 6,766,304 B2 | 7/2004 | Kemp et al. |
| 6,766,327 B2 | 7/2004 | Morgan, Jr. et al. |
| 6,772,132 B1 | 8/2004 | Kemp et al. |
| 6,775,519 B1 | 8/2004 | Wiedman et al. |
| 6,781,608 B1 | 8/2004 | Crawford |
| 6,782,370 B1 | 8/2004 | Stack |
| 6,782,379 B2 | 8/2004 | Lee |
| 6,782,390 B2 | 8/2004 | Lee et al. |
| 6,792,088 B2 | 9/2004 | Takeuchi |
| 6,792,263 B1 | 9/2004 | Kite |
| 6,795,812 B1 | 9/2004 | Lent et al. |
| 6,796,497 B2 | 9/2004 | Benkert et al. |
| 6,802,042 B2 | 10/2004 | Rangan et al. |
| 6,804,346 B1 | 10/2004 | Mewhinney |
| 6,804,720 B1 | 10/2004 | Vilander et al. |
| 6,805,287 B2 | 10/2004 | Bishop et al. |
| 6,807,533 B1 | 10/2004 | Land et al. |
| 6,810,323 B1 | 10/2004 | Bullock et al. |
| 6,816,850 B2 | 11/2004 | Culliss |
| 6,816,871 B2 | 11/2004 | Lee |
| 6,823,319 B1 | 11/2004 | Lynch et al. |
| 6,826,707 B1 | 11/2004 | Stevens |
| 6,829,639 B1 | 12/2004 | Lawson et al. |
| 6,832,212 B1 | 12/2004 | Zenner et al. |
| 6,832,229 B2 | 12/2004 | Reed |
| 6,839,690 B1 | 1/2005 | Foth et al. |
| 6,842,740 B1 | 1/2005 | Jeran et al. |
| 6,842,782 B1 | 1/2005 | Malik et al. |
| 6,845,448 B1 | 1/2005 | Chaganti et al. |
| 6,847,966 B1 | 1/2005 | Sommer et al. |
| 6,847,974 B2 | 1/2005 | Wachtel |
| 6,856,974 B2 | 2/2005 | Ganesan et al. |
| 6,857,073 B2 | 2/2005 | French et al. |
| 6,859,212 B2 | 2/2005 | Kumar et al. |
| 6,865,680 B1 | 3/2005 | Wu et al. |
| 6,871,220 B1 | 3/2005 | Rajan et al. |
| 6,871,287 B1 | 3/2005 | Ellingson |
| 6,871,789 B2 | 3/2005 | Hilton et al. |
| 6,873,972 B1 | 3/2005 | Marcial et al. |
| 6,880,751 B2 | 4/2005 | Okamura et al. |
| 6,882,986 B1 | 4/2005 | Heinemann et al. |
| 6,892,307 B1 | 5/2005 | Wood et al. |
| 6,898,279 B1 | 5/2005 | Baker et al. |
| 6,898,574 B1 | 5/2005 | Regan |
| 6,900,731 B2 | 5/2005 | Kreiner et al. |
| 6,901,406 B2 | 5/2005 | Nabe et al. |
| 6,910,624 B1 | 6/2005 | Natsuno |
| 6,912,483 B2 | 6/2005 | Frederick |
| 6,928,487 B2 | 8/2005 | Eggebraaten et al. |
| 6,932,268 B1 | 8/2005 | McCoy et al. |
| 6,934,691 B1 | 8/2005 | Simpson |
| 6,934,714 B2 | 8/2005 | Meinig |
| 6,938,011 B1 | 8/2005 | Kemp et al. |
| 6,938,821 B2 | 9/2005 | Gangi |
| 6,941,323 B1 | 9/2005 | Galperin |
| 6,947,989 B2 | 9/2005 | Gullotta et al. |
| 6,950,807 B2 | 9/2005 | Brock |
| 6,954,630 B2 | 10/2005 | Offer |
| 6,954,757 B2 | 10/2005 | Zargham et al. |
| 6,957,336 B2 | 10/2005 | Wheeler et al. |
| 6,962,336 B2 | 11/2005 | Glass |
| 6,963,857 B1 | 11/2005 | Johnson |
| 6,965,881 B1 | 11/2005 | Brickell et al. |
| 6,968,319 B1 | 11/2005 | Remington et al. |
| 6,970,864 B2 | 11/2005 | Marcus et al. |
| 6,973,462 B2 | 12/2005 | Dattero et al. |
| 6,983,320 B1 | 1/2006 | Thomas et al. |
| 6,985,183 B2 | 1/2006 | Jan et al. |
| 6,985,887 B1 | 1/2006 | Sunstein et al. |
| 6,988,082 B1 | 1/2006 | Williams et al. |
| 6,988,085 B2 | 1/2006 | Hedy |
| 6,990,591 B1 | 1/2006 | Pearson |
| 6,993,504 B1 | 1/2006 | Friesen et al. |
| 6,993,572 B2 | 1/2006 | Ross, Jr. et al. |
| 6,993,596 B2 | 1/2006 | Hinton et al. |
| 6,996,542 B1 | 2/2006 | Landry |
| 6,999,941 B1 | 2/2006 | Agarwal |
| 7,003,476 B1 | 2/2006 | Samra et al. |
| 7,013,310 B2 | 3/2006 | Messing et al. |
| 7,013,315 B1 | 3/2006 | Boothby |
| 7,013,323 B1 | 3/2006 | Thomas et al. |
| 7,016,870 B1 | 3/2006 | Jones et al. |
| 7,016,907 B2 | 3/2006 | Boreham et al. |
| 7,024,174 B2 | 4/2006 | Nagy et al. |
| 7,024,548 B1 | 4/2006 | O'Toole, Jr. |
| 7,024,689 B2 | 4/2006 | O'Donnell et al. |
| 7,028,013 B2 | 4/2006 | Saeki |
| 7,028,052 B2 | 4/2006 | Chapman et al. |
| 7,039,607 B2 | 5/2006 | Watarai et al. |
| 7,039,656 B1 | 5/2006 | Tsai et al. |
| 7,043,476 B2 | 5/2006 | Robson |
| 7,046,139 B2 | 5/2006 | Kuhn et al. |
| 7,050,989 B1 | 5/2006 | Hurt et al. |
| 7,058,386 B2 | 6/2006 | McGregor et al. |
| 7,058,817 B1 | 6/2006 | Ellmore |
| 7,062,458 B2 | 6/2006 | Maggioncalda et al. |
| 7,062,475 B1 | 6/2006 | Szabo et al. |
| 7,065,526 B2 | 6/2006 | Wissner et al. |
| 7,065,566 B2 | 6/2006 | Menard et al. |
| 7,069,240 B2 | 6/2006 | Spero et al. |
| 7,069,249 B2 | 6/2006 | Stolfo et al. |
| 7,072,856 B1 | 7/2006 | Nachom |
| 7,072,909 B2 | 7/2006 | Polk |
| 7,076,462 B1 | 7/2006 | Nelson et al. |
| 7,076,475 B2 | 7/2006 | Honarvar et al. |
| 7,083,087 B1 | 8/2006 | Gangi |
| 7,085,727 B2 | 8/2006 | VanOrman |
| 7,085,997 B1 | 8/2006 | Wu et al. |
| 7,089,594 B2 | 8/2006 | Lal et al. |
| 7,092,905 B2 | 8/2006 | Behrenbrinker et al. |
| 7,103,473 B2 | 9/2006 | Ranjan |
| 7,103,602 B2 | 9/2006 | Black et al. |
| 7,107,241 B1 | 9/2006 | Pinto |
| 7,107,243 B1 | 9/2006 | McDonald et al. |
| 7,107,244 B2 | 9/2006 | Kight et al. |
| 7,107,285 B2 | 9/2006 | Von Kaenel et al. |
| 7,110,978 B1 | 9/2006 | Chin |
| 7,117,172 B1 | 10/2006 | Black |
| 7,117,529 B1 | 10/2006 | O'Donnell et al. |
| 7,120,599 B2 | 10/2006 | Keyes |
| 7,124,144 B2 | 10/2006 | Christianson et al. |
| 7,127,068 B2 | 10/2006 | Sundaravel et al. |
| 7,127,424 B2 | 10/2006 | Kemp et al. |
| 7,131,144 B2 | 10/2006 | Rabin et al. |
| RE39,376 E | 11/2006 | Biggs, Jr. et al. |
| 7,133,852 B2 | 11/2006 | Kurokawa et al. |
| 7,139,734 B2 | 11/2006 | Nathans et al. |
| 7,143,063 B2 | 11/2006 | Lent |
| 7,149,782 B2 | 12/2006 | Sommerer |
| 7,155,203 B2 | 12/2006 | Brewer et al. |
| 7,155,508 B2 | 12/2006 | Sankuratripati et al. |
| 7,155,725 B1 | 12/2006 | Kister et al. |

(56) References Cited

U.S. PATENT DOCUMENTS

| | | |
|---|---|---|
| 7,155,739 B2 | 12/2006 | Bari et al. |
| 7,165,037 B2 | 1/2007 | Lazarus et al. |
| 7,174,455 B1 | 2/2007 | Arnold et al. |
| 7,177,830 B2 | 2/2007 | Shields et al. |
| 7,178,096 B2 | 2/2007 | Rangan et al. |
| 7,181,418 B1 | 2/2007 | Zucker et al. |
| 7,181,427 B1 | 2/2007 | DeFrancesco |
| 7,194,416 B1 | 3/2007 | Provost et al. |
| 7,200,551 B1 | 4/2007 | Senez |
| 7,200,602 B2 | 4/2007 | Jonas |
| 7,200,804 B1 | 4/2007 | Khavari et al. |
| 7,203,315 B1 | 4/2007 | Livesay |
| 7,206,768 B1 | 4/2007 | deGroeve et al. |
| 7,209,895 B2 | 4/2007 | Kundtz et al. |
| 7,209,911 B2 | 4/2007 | Boothby et al. |
| 7,212,995 B2 | 5/2007 | Schulkins |
| 7,212,999 B2 | 5/2007 | Friesen et al. |
| 7,213,003 B1 | 5/2007 | Kight et al. |
| 7,216,104 B2 | 5/2007 | Mason |
| 7,218,912 B2 | 5/2007 | Erskine et al. |
| 7,219,107 B2 | 5/2007 | Beringer |
| 7,222,085 B2 | 5/2007 | Stack |
| 7,222,369 B2 | 5/2007 | Vering et al. |
| 7,225,464 B2 | 5/2007 | Satyavolu et al. |
| 7,227,935 B2 | 6/2007 | Creamer et al. |
| 7,228,289 B2 | 6/2007 | Brumfield et al. |
| 7,228,335 B2 | 6/2007 | Caughey |
| 7,234,156 B2 | 6/2007 | French et al. |
| 7,236,950 B2 | 6/2007 | Savage et al. |
| 7,240,031 B1 | 7/2007 | Kight et al. |
| 7,243,075 B1 | 7/2007 | Shaffer et al. |
| 7,243,369 B2 | 7/2007 | Bhat et al. |
| 7,246,361 B1 | 7/2007 | Scalora et al. |
| 7,246,740 B2 | 7/2007 | Swift et al. |
| 7,249,076 B1 | 7/2007 | Pendleton et al. |
| 7,249,080 B1 | 7/2007 | Hoffman et al. |
| 7,249,113 B1 | 7/2007 | Continelli et al. |
| 7,254,558 B2 | 8/2007 | Hinkle et al. |
| 7,263,497 B1 | 8/2007 | Wiser et al. |
| 7,263,548 B2 | 8/2007 | Daswani et al. |
| 7,280,980 B1 | 10/2007 | Hoadley et al. |
| 7,280,983 B2 | 10/2007 | Kuroda et al. |
| 7,281,652 B2 | 10/2007 | Foss |
| 7,289,971 B1 | 10/2007 | O'Neil et al. |
| 7,292,840 B2 | 11/2007 | Kissner et al. |
| 7,296,004 B1 | 11/2007 | Garrison et al. |
| 7,296,734 B2 | 11/2007 | Pliha |
| 7,302,272 B2 | 11/2007 | Ackley |
| 7,302,411 B2 | 11/2007 | Ganesan et al. |
| 7,302,420 B2 | 11/2007 | Aggarwal et al. |
| 7,305,233 B2 | 12/2007 | Paul et al. |
| 7,308,417 B1 | 12/2007 | Nathan |
| 7,310,611 B2 | 12/2007 | Shibuya et al. |
| 7,310,617 B1 | 12/2007 | Cunningham |
| 7,310,618 B2 | 12/2007 | Libman |
| 7,313,813 B2 | 12/2007 | Rangan et al. |
| 7,314,166 B2 | 1/2008 | Anderson et al. |
| 7,314,167 B1 | 1/2008 | Kiliccote |
| 7,315,837 B2 | 1/2008 | Sloan et al. |
| 7,318,224 B2 | 1/2008 | Honarvar et al. |
| 7,328,233 B2 | 2/2008 | Salim et al. |
| 7,328,435 B2 | 2/2008 | Trifon |
| 7,330,717 B2 | 2/2008 | Gidron et al. |
| 7,330,831 B2 | 2/2008 | Biondi et al. |
| 7,330,835 B2 | 2/2008 | Deggendorf |
| 7,331,518 B2 | 2/2008 | Rable |
| 7,333,635 B2 | 2/2008 | Tsantes et al. |
| 7,333,937 B2 | 2/2008 | Baldwin, Jr. et al. |
| 7,334,020 B2 | 2/2008 | Caughey |
| 7,337,133 B1 | 2/2008 | Bezos et al. |
| 7,337,468 B2 | 2/2008 | Metzger |
| 7,340,042 B2 | 3/2008 | Cluff et al. |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,349,885 B2 | 3/2008 | Gangi |
| 7,353,203 B1 | 4/2008 | Kriplani et al. |
| 7,356,503 B1 | 4/2008 | Johnson et al. |
| 7,356,516 B2 | 4/2008 | Richey et al. |
| 7,357,305 B2 | 4/2008 | Ahn et al. |
| 7,363,257 B2 | 4/2008 | Kunz et al. |
| 7,366,694 B2 | 4/2008 | Lazerson |
| 7,366,696 B1 | 4/2008 | Ganesan et al. |
| 7,366,759 B2 | 4/2008 | Trevithick |
| 7,370,014 B1 | 5/2008 | Vasavada et al. |
| 7,370,044 B2 | 5/2008 | Mulhern et al. |
| 7,370,794 B2 | 5/2008 | Trane |
| 7,373,324 B1 | 5/2008 | Engin et al. |
| 7,376,603 B1 | 5/2008 | Mayr et al. |
| 7,379,978 B2 | 5/2008 | Anderson et al. |
| 7,383,215 B1 | 6/2008 | Navarro et al. |
| 7,383,225 B2 | 6/2008 | Hallihan |
| 7,383,226 B2 | 6/2008 | Kight et al. |
| 7,383,988 B2 | 6/2008 | Slonecker, Jr. |
| 7,386,466 B2 | 6/2008 | McLean et al. |
| 7,386,511 B2 | 6/2008 | Buchanan et al. |
| 7,386,597 B2 | 6/2008 | Takeuchi et al. |
| 7,386,786 B2 | 6/2008 | Davis et al. |
| 7,389,913 B2 | 6/2008 | Starrs |
| 7,392,223 B1 | 6/2008 | Ganesan et al. |
| 7,395,232 B1 | 7/2008 | Pilato |
| 7,395,241 B1 | 7/2008 | Cook et al. |
| 7,395,243 B1 | 7/2008 | Zielke et al. |
| 7,395,273 B2 | 7/2008 | Khan et al. |
| 7,401,050 B2 | 7/2008 | O'Neill |
| 7,403,602 B2 | 7/2008 | Khan |
| 7,403,919 B2 | 7/2008 | Chacko et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,412,487 B2 | 8/2008 | Caughey |
| 7,418,417 B2 | 8/2008 | Chacko et al. |
| 7,424,520 B2 | 9/2008 | Daswani et al. |
| 7,430,520 B1 | 9/2008 | Haugen et al. |
| 7,433,836 B1 | 10/2008 | August et al. |
| 7,433,864 B2 | 10/2008 | Malik |
| 7,437,324 B1 | 10/2008 | Goodwin, III et al. |
| 7,437,679 B2 | 10/2008 | Uemura et al. |
| 7,444,518 B1 | 10/2008 | Dharmarajan et al. |
| 7,447,663 B1 | 11/2008 | Barker et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,475,032 B1 | 1/2009 | Patnode et al. |
| 7,479,949 B2 | 1/2009 | Jobs et al. |
| 7,480,631 B1 | 1/2009 | Merced et al. |
| 7,483,892 B1 | 1/2009 | Sommer et al. |
| 7,486,784 B2 | 2/2009 | Creamer et al. |
| 7,490,356 B2 | 2/2009 | Lieblich et al. |
| RE40,692 E | 3/2009 | Rose, Jr. |
| 7,499,875 B1 | 3/2009 | May et al. |
| 7,503,489 B2 | 3/2009 | Heffez |
| 7,505,931 B2 | 3/2009 | Silva |
| 7,505,939 B2 | 3/2009 | Lent et al. |
| 7,509,117 B2 | 3/2009 | Yum |
| 7,509,278 B2 | 3/2009 | Jones |
| 7,512,221 B2 | 3/2009 | Toms |
| 7,516,101 B2 | 4/2009 | Remington et al. |
| 7,526,448 B2 | 4/2009 | Zielke et al. |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,348 B2 | 5/2009 | Shao et al. |
| 7,537,152 B2 | 5/2009 | Chakiris et al. |
| 7,537,153 B2 | 5/2009 | Hurwitz et al. |
| 7,542,468 B1 | 6/2009 | Begley et al. |
| 7,542,922 B2 | 6/2009 | Bennett et al. |
| 7,542,993 B2 | 6/2009 | Satterfield et al. |
| 7,543,739 B2 | 6/2009 | Brown et al. |
| 7,546,266 B2 | 6/2009 | Beirne et al. |
| 7,546,271 B1 | 6/2009 | Chmielewski et al. |

(56) References Cited

U.S. PATENT DOCUMENTS

| | | |
|---|---|---|
| 7,548,886 B2 | 6/2009 | Kirkland et al. |
| 7,552,080 B1 | 6/2009 | Willard et al. |
| 7,552,086 B1 | 6/2009 | Rajasekar et al. |
| 7,552,089 B2 | 6/2009 | Bruer et al. |
| 7,552,190 B1 | 6/2009 | Freishtat et al. |
| 7,552,467 B2 | 6/2009 | Lindsay |
| 7,555,459 B2 | 6/2009 | Dhar et al. |
| 7,556,192 B2 | 7/2009 | Wokaty, Jr. |
| 7,558,748 B2 | 7/2009 | Ehring et al. |
| 7,558,777 B1 | 7/2009 | Santos |
| 7,558,795 B2 | 7/2009 | Malik et al. |
| 7,559,217 B2 | 7/2009 | Bass |
| 7,562,184 B2 | 7/2009 | Henmi et al. |
| 7,562,382 B2 | 7/2009 | Hinton et al. |
| 7,562,814 B1 | 7/2009 | Shao et al. |
| 7,571,138 B2 | 8/2009 | Miri et al. |
| 7,571,143 B2 | 8/2009 | Circenis et al. |
| 7,571,322 B2 | 8/2009 | Karoubi |
| 7,571,473 B1 | 8/2009 | Boydstun et al. |
| 7,575,152 B2 | 8/2009 | Graves et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,583,682 B2 | 9/2009 | Hopkins |
| 7,584,126 B1 | 9/2009 | White |
| 7,584,127 B2 | 9/2009 | Byrne et al. |
| 7,584,146 B1 | 9/2009 | Duhon |
| 7,587,363 B2 | 9/2009 | Cataline et al. |
| 7,587,368 B2 | 9/2009 | Felsher |
| 7,593,891 B2 | 9/2009 | Kornegay et al. |
| 7,593,892 B2 | 9/2009 | Balk et al. |
| 7,594,019 B2 | 9/2009 | Clapper |
| 7,596,512 B1 | 9/2009 | Raines et al. |
| 7,596,716 B2 | 9/2009 | Frost et al. |
| 7,603,314 B2 | 10/2009 | Siksa |
| 7,603,317 B2 | 10/2009 | Adler et al. |
| 7,606,355 B2 | 10/2009 | Hutchison et al. |
| 7,606,752 B2 | 10/2009 | Hazlehurst et al. |
| 7,610,216 B1 | 10/2009 | May et al. |
| 7,610,229 B1 | 10/2009 | Kornegay |
| 7,613,600 B2 | 11/2009 | Krane |
| 7,613,656 B2 | 11/2009 | Stanley et al. |
| 7,620,383 B2 | 11/2009 | Taglienti et al. |
| 7,620,592 B2 | 11/2009 | O'Mara et al. |
| 7,620,596 B2 | 11/2009 | Knudson et al. |
| 7,620,602 B2 | 11/2009 | Jakstadt et al. |
| 7,620,653 B1 | 11/2009 | Swartz |
| 7,623,844 B2 | 11/2009 | Herrmann et al. |
| 7,624,068 B1 | 11/2009 | Heasley et al. |
| 7,624,433 B1 | 11/2009 | Clark et al. |
| 7,627,524 B2 | 12/2009 | Bennett et al. |
| 7,627,527 B1 | 12/2009 | Hildebrand |
| 7,630,903 B1 | 12/2009 | Vaidyanathan |
| 7,630,932 B2 | 12/2009 | Danaher et al. |
| 7,630,933 B2 | 12/2009 | Peterson et al. |
| 7,634,651 B1 | 12/2009 | Gerde et al. |
| 7,634,737 B2 | 12/2009 | Beringer et al. |
| 7,636,686 B2 | 12/2009 | Pierdinock et al. |
| 7,636,689 B2 | 12/2009 | Dent et al. |
| 7,640,200 B2 | 12/2009 | Gardner et al. |
| 7,640,209 B1 | 12/2009 | Brooks et al. |
| 7,644,023 B2 | 1/2010 | Kumar et al. |
| 7,644,035 B1 | 1/2010 | Biffle et al. |
| 7,644,036 B2 | 1/2010 | McCoy et al. |
| 7,644,285 B1 | 1/2010 | Murray et al. |
| 7,647,274 B2 | 1/2010 | Peterson et al. |
| 7,647,344 B2 | 1/2010 | Skurtovich, Jr. et al. |
| 7,653,187 B2 | 1/2010 | Clark et al. |
| 7,653,591 B1 | 1/2010 | Dabney |
| 7,653,592 B1 | 1/2010 | Flaxman et al. |
| 7,653,593 B2 | 1/2010 | Zarikian et al. |
| 7,653,600 B2 | 1/2010 | Gustin |
| 7,653,613 B1 | 1/2010 | DeGraaff et al. |
| 7,653,688 B2 | 1/2010 | Bittner |
| 7,657,484 B2 | 2/2010 | Ganesan et al. |
| 7,660,771 B2 | 2/2010 | Orcutt |
| 7,664,725 B2 | 2/2010 | Murray et al. |
| 7,665,657 B2 | 2/2010 | Huh |
| 7,668,738 B2 | 2/2010 | Wiggins |
| 7,668,766 B1 | 2/2010 | Goodwin, III et al. |
| 7,672,833 B2 | 3/2010 | Blume et al. |
| 7,672,865 B2 | 3/2010 | Kumar et al. |
| 7,672,879 B1 | 3/2010 | Kumar et al. |
| 7,672,944 B1 | 3/2010 | Holladay et al. |
| 7,676,410 B2 | 3/2010 | Petralia |
| 7,676,418 B1 | 3/2010 | Chung et al. |
| 7,676,463 B2 | 3/2010 | Thompson et al. |
| 7,680,772 B2 | 3/2010 | Kronberg |
| 7,685,209 B1 | 3/2010 | Norton et al. |
| 7,685,525 B2 | 3/2010 | Kumar et al. |
| 7,686,214 B1 | 3/2010 | Shao et al. |
| 7,688,813 B2 | 3/2010 | Shin et al. |
| 7,689,451 B2 | 3/2010 | Vives |
| 7,689,487 B1 | 3/2010 | Britto et al. |
| 7,689,505 B2 | 3/2010 | Kasower |
| 7,689,506 B2 | 3/2010 | Fei et al. |
| 7,689,563 B1 | 3/2010 | Jacobson |
| 7,689,716 B2 | 3/2010 | Short et al. |
| 7,690,032 B1 | 3/2010 | Peirce |
| 7,693,787 B2 | 4/2010 | Provinse |
| 7,693,790 B2 | 4/2010 | Lawlor et al. |
| 7,697,520 B2 | 4/2010 | Hopkins |
| 7,698,214 B1 | 4/2010 | Lindgren |
| 7,698,217 B1 | 4/2010 | Phillips et al. |
| 7,702,576 B2 | 4/2010 | Fahner et al. |
| 7,702,579 B2 | 4/2010 | Neely |
| 7,707,109 B2 | 4/2010 | Odijk et al. |
| 7,707,117 B1 | 4/2010 | Jimenez et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,708,191 B2 | 5/2010 | Vega |
| 7,711,626 B2 | 5/2010 | Nanjundamoorthy et al. |
| 7,711,635 B2 | 5/2010 | Steele et al. |
| 7,711,636 B2 | 5/2010 | Robida et al. |
| 7,711,645 B2 | 5/2010 | Morello |
| 7,711,690 B1 | 5/2010 | Garrison et al. |
| 7,711,707 B2 | 5/2010 | Kelley |
| 7,715,832 B2 | 5/2010 | Zhou |
| 7,716,132 B1 | 5/2010 | Spies et al. |
| 7,720,705 B2 | 5/2010 | Stein |
| 7,720,750 B2 | 5/2010 | Brody |
| 7,720,760 B1 | 5/2010 | Cook et al. |
| 7,720,846 B1 | 5/2010 | Bayliss |
| 7,725,330 B2 | 5/2010 | Rao et al. |
| 7,725,385 B2 | 5/2010 | Royer et al. |
| 7,729,283 B2 | 6/2010 | Ferguson et al. |
| 7,729,959 B1 | 6/2010 | Wells et al. |
| 7,729,969 B1 | 6/2010 | Smith, III et al. |
| 7,729,983 B1 | 6/2010 | Ellis |
| 7,730,078 B2 | 6/2010 | Schwabe et al. |
| 7,734,522 B2 | 6/2010 | Johnson et al. |
| 7,734,541 B2 | 6/2010 | Kumar et al. |
| 7,734,543 B2 | 6/2010 | Braco |
| 7,734,637 B2 | 6/2010 | Greifeneder et al. |
| 7,739,193 B2 | 6/2010 | Zimmer et al. |
| 7,739,707 B2 | 6/2010 | Sie et al. |
| 7,746,496 B2 | 6/2010 | Henry et al. |
| 7,747,520 B2 | 6/2010 | Livermore et al. |
| 7,747,521 B2 | 6/2010 | Serio |
| 7,752,095 B1 | 7/2010 | Laracey et al. |
| 7,752,130 B2 | 7/2010 | Byrd et al. |
| 7,752,132 B2 | 7/2010 | Stewart et al. |
| 7,752,179 B1 | 7/2010 | Brown |
| 7,752,286 B2 | 7/2010 | Anderson et al. |
| 7,756,787 B1 | 7/2010 | Hilton |
| 7,756,789 B2 | 7/2010 | Welker et al. |
| 7,761,373 B2 | 7/2010 | Metz |
| 7,761,384 B2 | 7/2010 | Madhogarhia |
| 7,761,569 B2 | 7/2010 | Hopkins |
| 7,765,148 B2 | 7/2010 | German et al. |
| 7,765,166 B2 | 7/2010 | Beringer et al. |

(56) References Cited

U.S. PATENT DOCUMENTS

| | | |
|---|---|---|
| 7,765,279 B1 | 7/2010 | Kaib et al. |
| 7,765,525 B1 | 7/2010 | Davidson et al. |
| 7,769,651 B2 | 8/2010 | Fine et al. |
| 7,769,657 B2 | 8/2010 | Chacko et al. |
| 7,769,697 B2 | 8/2010 | Fieschi et al. |
| 7,769,998 B2 | 8/2010 | Lynch et al. |
| 7,770,002 B2 | 8/2010 | Weber |
| 7,774,257 B2 | 8/2010 | Maggioncalda et al. |
| 7,774,270 B1 | 8/2010 | MacCloskey |
| 7,778,868 B2 | 8/2010 | Haugen et al. |
| 7,778,901 B2 | 8/2010 | Ganesan et al. |
| 7,780,075 B2 | 8/2010 | Cooper et al. |
| 7,783,515 B1 | 8/2010 | Kumar et al. |
| 7,783,749 B2 | 8/2010 | Hopkins |
| 7,787,869 B2 | 8/2010 | Rice et al. |
| 7,788,040 B2 | 8/2010 | Haskell et al. |
| 7,788,147 B2 | 8/2010 | Haggerty et al. |
| 7,788,152 B2 | 8/2010 | Haggerty et al. |
| 7,788,155 B2 | 8/2010 | Jones et al. |
| 7,788,172 B2 | 8/2010 | Kight et al. |
| 7,792,715 B1 | 9/2010 | Kasower |
| 7,792,716 B2 | 9/2010 | Gooding et al. |
| 7,792,725 B2 | 9/2010 | Booraem et al. |
| 7,792,732 B2 | 9/2010 | Haggerty et al. |
| 7,792,743 B2 | 9/2010 | Koningstein et al. |
| 7,792,747 B2 | 9/2010 | Chin |
| 7,792,749 B2 | 9/2010 | Ganesan |
| 7,792,903 B2 | 9/2010 | Fischer et al. |
| 7,793,835 B1 | 9/2010 | Coggeshall et al. |
| 7,797,224 B2 | 9/2010 | Barone et al. |
| 7,797,252 B2 | 9/2010 | Rosskamm et al. |
| 7,797,644 B1 | 9/2010 | Bhojan |
| 7,797,734 B2 | 9/2010 | Babi et al. |
| 7,801,807 B2 | 9/2010 | DeFrancesco et al. |
| 7,801,811 B1 | 9/2010 | Merrell et al. |
| 7,801,812 B2 | 9/2010 | Conlin et al. |
| 7,801,828 B2 | 9/2010 | Candella et al. |
| 7,801,896 B2 | 9/2010 | Szabo |
| 7,801,956 B1 | 9/2010 | Cumberbatch et al. |
| 7,802,104 B2 | 9/2010 | Dickinson |
| 7,805,348 B2 | 9/2010 | Nanjundamoorthy et al. |
| 7,805,362 B1 | 9/2010 | Merrell et al. |
| 7,805,439 B2 | 9/2010 | Elliott et al. |
| 7,809,398 B2 | 10/2010 | Pearson |
| 7,809,624 B1 | 10/2010 | Smith, III et al. |
| 7,809,797 B2 | 10/2010 | Cooley et al. |
| 7,810,036 B2 | 10/2010 | Bales et al. |
| 7,813,943 B1 | 10/2010 | Lefco et al. |
| 7,814,002 B2 | 10/2010 | DeFrancesco et al. |
| 7,814,004 B2 | 10/2010 | Haggerty et al. |
| 7,814,005 B2 * | 10/2010 | Imrey .................. G06Q 40/00 705/38 |
| 7,814,431 B1 | 10/2010 | Quinn et al. |
| 7,818,228 B1 | 10/2010 | Coulter |
| 7,818,229 B2 | 10/2010 | Imrey et al. |
| 7,818,382 B2 | 10/2010 | Sommerer |
| 7,822,624 B2 | 10/2010 | Erdmann et al. |
| 7,822,667 B1 | 10/2010 | Smith, III et al. |
| 7,827,108 B2 | 11/2010 | Perlman et al. |
| 7,827,115 B2 | 11/2010 | Weller et al. |
| 7,831,521 B1 | 11/2010 | Ball et al. |
| 7,831,609 B1 | 11/2010 | Alexander |
| 7,832,006 B2 | 11/2010 | Chen et al. |
| 7,835,983 B2 | 11/2010 | Lefner et al. |
| 7,835,990 B2 | 11/2010 | Coleman |
| 7,836,111 B1 | 11/2010 | Shan |
| 7,836,197 B2 | 11/2010 | Isaac et al. |
| 7,840,484 B2 | 11/2010 | Haggerty et al. |
| 7,840,597 B2 | 11/2010 | Showalter et al. |
| 7,840,674 B1 | 11/2010 | Sterling |
| 7,841,004 B1 | 11/2010 | Balducci et al. |
| 7,841,008 B1 | 11/2010 | Cole et al. |
| 7,844,520 B1 | 11/2010 | Franklin |
| 7,844,522 B2 | 11/2010 | Fong |
| 7,844,604 B2 | 11/2010 | Baio et al. |
| 7,848,972 B1 | 12/2010 | Sharma |
| 7,848,974 B1 | 12/2010 | Sheehan |
| 7,848,978 B2 | 12/2010 | Imrey et al. |
| 7,849,004 B2 | 12/2010 | Choudhuri et al. |
| 7,849,014 B2 | 12/2010 | Erikson |
| 7,849,397 B1 | 12/2010 | Ahmed |
| 7,853,436 B2 | 12/2010 | McConnell et al. |
| 7,853,493 B2 | 12/2010 | DeBie et al. |
| 7,853,522 B2 | 12/2010 | Chin |
| 7,853,998 B2 | 12/2010 | Blaisdell et al. |
| 7,856,203 B2 | 12/2010 | Lipovski |
| 7,856,376 B2 | 12/2010 | Storey |
| 7,856,386 B2 | 12/2010 | Hazlehurst et al. |
| 7,856,453 B2 | 12/2010 | Malik et al. |
| 7,860,769 B2 | 12/2010 | Benson |
| 7,860,782 B2 | 12/2010 | Cash et al. |
| 7,861,287 B2 | 12/2010 | Pomerantz |
| 7,865,412 B1 | 1/2011 | Weiss et al. |
| 7,866,548 B2 | 1/2011 | Reed et al. |
| 7,870,025 B2 | 1/2011 | English |
| 7,870,066 B2 | 1/2011 | Lin et al. |
| 7,870,068 B2 | 1/2011 | Chin |
| 7,870,077 B2 | 1/2011 | Woo et al. |
| 7,870,078 B2 | 1/2011 | Clark et al. |
| 7,870,485 B2 | 1/2011 | Seliutin et al. |
| 7,870,491 B1 | 1/2011 | Henderson et al. |
| 7,873,441 B2 | 1/2011 | Synesiou et al. |
| 7,873,563 B2 | 1/2011 | Barone et al. |
| 7,873,573 B2 | 1/2011 | Realini |
| 7,877,304 B1 | 1/2011 | Coulter |
| 7,877,402 B1 | 1/2011 | Weiss et al. |
| 7,877,784 B2 | 1/2011 | Chow et al. |
| RE42,154 E | 2/2011 | Walker et al. |
| 7,880,728 B2 | 2/2011 | de los Reyes et al. |
| 7,885,637 B2 | 2/2011 | Immonen et al. |
| 7,890,358 B2 | 2/2011 | Dutta et al. |
| 7,890,371 B2 | 2/2011 | Chao |
| 7,890,403 B1 | 2/2011 | Smith |
| 7,890,420 B2 | 2/2011 | Haggerty et al. |
| 7,895,107 B2 | 2/2011 | Lapstun et al. |
| 7,895,227 B1 | 2/2011 | Henderson |
| 7,899,750 B1 | 3/2011 | Klieman et al. |
| 7,899,757 B1 | 3/2011 | Talan et al. |
| 7,900,052 B2 | 3/2011 | Joans |
| 7,904,306 B2 | 3/2011 | Johnson et al. |
| 7,904,354 B2 | 3/2011 | Pepe et al. |
| 7,904,367 B2 | 3/2011 | Chung et al. |
| 7,904,447 B1 | 3/2011 | Russell et al. |
| 7,904,899 B2 | 3/2011 | Robalewski et al. |
| 7,908,242 B1 | 3/2011 | Achanta |
| 7,909,246 B2 | 3/2011 | Hogg et al. |
| 7,911,673 B1 | 3/2011 | Yap |
| 7,912,770 B2 | 3/2011 | Haggerty et al. |
| 7,912,778 B2 | 3/2011 | Nanjundamoorthy |
| 7,912,842 B1 | 3/2011 | Bayliss et al. |
| 7,912,865 B2 | 3/2011 | Akerman et al. |
| 7,913,173 B2 | 3/2011 | Hebard et al. |
| 7,917,410 B2 | 3/2011 | Morimoto |
| 7,917,412 B1 | 3/2011 | Wang et al. |
| 7,917,435 B2 | 3/2011 | Hall et al. |
| 7,917,754 B1 | 3/2011 | Harrison et al. |
| 7,925,578 B1 | 4/2011 | Hong et al. |
| 7,925,582 B1 | 4/2011 | Kornegay et al. |
| 7,925,982 B2 | 4/2011 | Parker |
| 7,930,239 B2 | 4/2011 | Pierdinock et al. |
| 7,930,252 B2 | 4/2011 | Bender et al. |
| 7,930,285 B2 | 4/2011 | Abraham et al. |
| 7,930,302 B2 | 4/2011 | Bandaru et al. |
| 7,930,411 B1 | 4/2011 | Hayward |
| 7,933,834 B2 | 4/2011 | Kumar et al. |
| 7,937,323 B2 | 5/2011 | Wagner et al. |
| 7,937,325 B2 | 5/2011 | Kumar et al. |
| 7,941,365 B1 | 5/2011 | Bradley et al. |
| 7,941,560 B1 | 5/2011 | Friesen et al. |
| 7,945,240 B1 | 5/2011 | Klock et al. |
| 7,945,491 B2 | 5/2011 | Sharma |
| 7,945,510 B1 | 5/2011 | Bradley et al. |
| 7,949,609 B2 | 5/2011 | Colella |
| 7,953,660 B2 | 5/2011 | Ganesan et al. |

(56) References Cited

U.S. PATENT DOCUMENTS

| | | |
|---|---|---|
| 7,954,698 B1 | 6/2011 | Pliha |
| 7,958,046 B2 | 6/2011 | Doerner et al. |
| 7,958,049 B2 | 6/2011 | Jamison et al. |
| 7,962,361 B2 | 6/2011 | Ramchandani et al. |
| 7,962,410 B2 | 6/2011 | Tosswill |
| 7,965,275 B1 | 6/2011 | Lew |
| 7,966,192 B2 | 6/2011 | Pagliari et al. |
| 7,966,255 B2 | 6/2011 | Wong et al. |
| 7,966,325 B2 | 6/2011 | Singh |
| 7,970,669 B1 | 6/2011 | Santos |
| 7,970,676 B2 | 6/2011 | Feinstein |
| 7,970,679 B2 | 6/2011 | Kasower |
| 7,970,698 B2 | 6/2011 | Gupta et al. |
| 7,970,701 B2 | 6/2011 | Lewis et al. |
| 7,970,796 B1 | 6/2011 | Narayanan |
| 7,971,141 B1 | 6/2011 | Quinn et al. |
| 7,974,919 B2 | 7/2011 | Conlin et al. |
| 7,975,299 B1 | 7/2011 | Balducci et al. |
| 7,979,908 B2 | 7/2011 | Millwee |
| 7,983,932 B2 | 7/2011 | Kane |
| 7,983,975 B2 | 7/2011 | Jones et al. |
| 7,983,979 B2 | 7/2011 | Holland, IV |
| 7,984,436 B1 | 7/2011 | Murray |
| 7,987,124 B1 | 7/2011 | Holden et al. |
| 7,987,173 B2 | 7/2011 | Alexander |
| 7,987,501 B2 | 7/2011 | Miller et al. |
| 7,990,895 B2 | 8/2011 | Ferguson et al. |
| 7,991,673 B2 | 8/2011 | Kumar et al. |
| 7,991,688 B2 | 8/2011 | Phelan et al. |
| 7,995,991 B2 | 8/2011 | Johnson et al. |
| 7,996,310 B1 | 8/2011 | Edwards et al. |
| 8,001,034 B2 | 8/2011 | Chung et al. |
| 8,001,041 B2 | 8/2011 | Hoadley et al. |
| 8,001,045 B1 | 8/2011 | McClinton |
| 8,001,153 B2 | 8/2011 | Skurtovich, Jr. et al. |
| 8,001,235 B2 | 8/2011 | Russ et al. |
| 8,001,582 B2 | 8/2011 | Hulten et al. |
| 8,005,738 B2 | 8/2011 | Chacko et al. |
| 8,005,754 B2 | 8/2011 | McCoy et al. |
| 8,005,755 B2 | 8/2011 | Freishtat et al. |
| 8,005,759 B2 | 8/2011 | Hirtenstein et al. |
| 8,005,795 B2 | 8/2011 | Galipeau et al. |
| 8,006,261 B1 | 8/2011 | Haberman et al. |
| 8,010,674 B2 | 8/2011 | Fong |
| 8,014,756 B1 | 9/2011 | Henderson |
| 8,015,083 B1 | 9/2011 | Sterling et al. |
| 8,015,107 B2 | 9/2011 | Kornegay et al. |
| 8,024,263 B2 | 9/2011 | Zarikian et al. |
| 8,024,660 B1 | 9/2011 | Quinn et al. |
| 8,024,778 B2 | 9/2011 | Cash et al. |
| 8,027,975 B2 | 9/2011 | Gabriel et al. |
| 8,032,822 B1 | 10/2011 | Artamonov et al. |
| 8,032,930 B2 | 10/2011 | Hicks |
| 8,032,932 B2 | 10/2011 | Speyer et al. |
| 8,036,941 B2 | 10/2011 | Bennett et al. |
| 8,036,961 B2 | 10/2011 | Ducolon et al. |
| 8,037,097 B2 | 10/2011 | Guo et al. |
| 8,037,115 B1 | 10/2011 | Scalora et al. |
| 8,037,176 B2 | 10/2011 | Hopkins |
| 8,037,506 B2 | 10/2011 | Cooper et al. |
| 8,041,127 B2 | 10/2011 | Whitelaw |
| 8,051,074 B2 | 11/2011 | Eom et al. |
| 8,055,579 B2 | 11/2011 | Davies et al. |
| 8,055,904 B1 | 11/2011 | Cato et al. |
| 8,060,404 B2 | 11/2011 | Storey |
| 8,060,424 B2 | 11/2011 | Kasower |
| 8,060,438 B2 | 11/2011 | Dhar et al. |
| 8,060,441 B2 | 11/2011 | Stewart et al. |
| 8,060,508 B2 | 11/2011 | Gabriel et al. |
| 8,060,532 B2 | 11/2011 | White et al. |
| 8,060,916 B2 | 11/2011 | Bajaj et al. |
| 8,065,175 B1 | 11/2011 | Lewis |
| 8,065,233 B2 | 11/2011 | Lee et al. |
| 8,065,367 B1 | 11/2011 | Stanley |
| 8,069,066 B2 | 11/2011 | Stevens et al. |
| 8,069,213 B2 | 11/2011 | Bloch et al. |
| 8,069,407 B1 | 11/2011 | Armandpour et al. |
| 8,073,768 B2 | 12/2011 | Haggerty et al. |
| 8,073,773 B2 | 12/2011 | Kozee et al. |
| 8,073,774 B2 | 12/2011 | Pousti |
| 8,073,777 B2 | 12/2011 | Barry et al. |
| 8,078,453 B2 | 12/2011 | Shaw |
| 8,078,516 B1 | 12/2011 | Weiss et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,078,986 B1 | 12/2011 | Rhyne et al. |
| 8,086,219 B2 | 12/2011 | O'Neil et al. |
| 8,086,508 B2 | 12/2011 | Dheer et al. |
| 8,086,523 B1 | 12/2011 | Palmer |
| 8,086,524 B1 | 12/2011 | Craig et al. |
| 8,086,525 B2 | 12/2011 | Atwood et al. |
| 8,090,794 B1 | 1/2012 | Kilat et al. |
| 8,095,443 B2 | 1/2012 | DeBie |
| 8,095,458 B2 | 1/2012 | Peterson et al. |
| 8,095,534 B1 | 1/2012 | Alexander |
| 8,095,614 B2 | 1/2012 | Hopkins |
| 8,098,239 B1 | 1/2012 | Moore |
| 8,099,298 B2 | 1/2012 | Coleman et al. |
| 8,099,309 B1 | 1/2012 | Bober |
| 8,099,341 B2 | 1/2012 | Varghese |
| 8,099,356 B2 | 1/2012 | Feinstein et al. |
| 8,099,376 B2 | 1/2012 | Serrano-Morales et al. |
| 8,103,587 B2 | 1/2012 | Kumar et al. |
| 8,104,671 B2 | 1/2012 | Besecker et al. |
| 8,104,679 B2 | 1/2012 | Brown |
| 8,108,272 B2 | 1/2012 | Sorbe et al. |
| 8,108,301 B2 | 1/2012 | Gupta et al. |
| 8,112,354 B2 | 2/2012 | Lalwani et al. |
| 8,117,077 B2 | 2/2012 | Lin |
| 8,117,100 B1 | 2/2012 | Hopkins |
| 8,117,648 B2 | 2/2012 | Slaton et al. |
| 8,121,894 B2 | 2/2012 | Mason |
| 8,121,945 B2 | 2/2012 | Rackley, III et al. |
| 8,121,947 B1 | 2/2012 | Barth et al. |
| 8,122,133 B2 | 2/2012 | Hopkins |
| 8,126,456 B2 | 2/2012 | Lotter et al. |
| 8,126,820 B1 | 2/2012 | Talan et al. |
| 8,127,982 B1 | 3/2012 | Casey et al. |
| 8,127,986 B1 | 3/2012 | Taylor et al. |
| 8,130,075 B1 | 3/2012 | Hingole |
| 8,131,598 B2 | 3/2012 | Goolkasian et al. |
| 8,131,614 B2 | 3/2012 | Haggerty et al. |
| 8,131,685 B1 | 3/2012 | Gedalius et al. |
| 8,131,777 B2 | 3/2012 | McCulloch |
| 8,131,846 B1 | 3/2012 | Hernacki et al. |
| 8,140,432 B2 | 3/2012 | Johnson |
| 8,140,649 B2 | 3/2012 | Durand et al. |
| 8,140,847 B1 | 3/2012 | Wu |
| 8,145,188 B2 | 3/2012 | Park et al. |
| 8,145,189 B2 | 3/2012 | Power et al. |
| 8,145,554 B2 | 3/2012 | Kumar et al. |
| 8,145,568 B2 | 3/2012 | Rackley, III et al. |
| 8,150,161 B2 | 4/2012 | Laaser et al. |
| 8,150,754 B2 | 4/2012 | Leggatt et al. |
| 8,151,343 B1 | 4/2012 | Wang et al. |
| 8,151,344 B1 | 4/2012 | Channakeshava |
| 8,152,061 B2 | 4/2012 | Wolfe et al. |
| 8,155,950 B1 | 4/2012 | Bickerstaff |
| 8,156,175 B2 | 4/2012 | Hopkins |
| 8,160,624 B2 | 4/2012 | Kumar et al. |
| 8,160,959 B2 | 4/2012 | Rackley, III et al. |
| 8,160,960 B1 | 4/2012 | Fei et al. |
| 8,165,940 B2 | 4/2012 | Meimes et al. |
| 8,170,931 B2 | 5/2012 | Ross et al. |
| 8,171,471 B1 | 5/2012 | Daly |
| 8,175,889 B1 | 5/2012 | Girulat et al. |
| 8,175,969 B2 | 5/2012 | Yang et al. |
| 8,180,686 B2 | 5/2012 | Ryu et al. |
| 8,180,691 B2 | 5/2012 | Cao et al. |
| 8,185,472 B1 | 5/2012 | Boyd et al. |
| 8,194,956 B2 | 6/2012 | Chandler |
| 8,195,549 B2 | 6/2012 | Kasower |

(56) References Cited

U.S. PATENT DOCUMENTS

| | | |
|---|---|---|
| 8,195,566 B2 | 6/2012 | Tsui et al. |
| 8,195,567 B2 | 6/2012 | Cinelli et al. |
| 8,196,113 B2 | 6/2012 | Miller et al. |
| 8,200,966 B2 | 6/2012 | Grinberg et al. |
| 8,201,257 B1 | 6/2012 | Andres et al. |
| 8,204,774 B2 | 6/2012 | Chwast et al. |
| 8,204,788 B1 | 6/2012 | Ivankovich et al. |
| 8,204,812 B2 | 6/2012 | Stewart et al. |
| 8,209,659 B2 | 6/2012 | Mathew |
| 8,219,473 B2 | 7/2012 | Gardner et al. |
| 8,219,771 B2 | 7/2012 | Le Neel |
| 8,224,723 B2 | 7/2012 | Bosch et al. |
| 8,224,747 B2 | 7/2012 | Kumar et al. |
| 8,224,974 B1 | 7/2012 | Flora et al. |
| 8,225,270 B2 | 7/2012 | Frasher et al. |
| 8,225,288 B2 | 7/2012 | Miller et al. |
| 8,225,383 B1 | 7/2012 | Channakeshava et al. |
| 8,225,395 B2 | 7/2012 | Atwood et al. |
| 8,229,762 B2 | 7/2012 | Romans |
| 8,229,850 B2 | 7/2012 | Dilip et al. |
| 8,229,911 B2 | 7/2012 | Bennett |
| 8,234,498 B2 | 7/2012 | Britti et al. |
| 8,244,609 B2 | 8/2012 | Prakash et al. |
| 8,244,635 B2 | 8/2012 | Freishtat et al. |
| 8,244,646 B2 | 8/2012 | Johnston et al. |
| 8,244,848 B1 | 8/2012 | Narayanan et al. |
| 8,249,961 B1 | 8/2012 | Hopkins |
| 8,249,965 B2 | 8/2012 | Tumminaro |
| 8,249,968 B1 | 8/2012 | Oldham et al. |
| 8,255,298 B1 | 8/2012 | Nesladek |
| 8,255,327 B2 | 8/2012 | Kemper et al. |
| 8,255,868 B1 | 8/2012 | Robalewski |
| 8,255,971 B1 | 8/2012 | Webb et al. |
| 8,255,978 B2 | 8/2012 | Dick |
| 8,256,013 B1 | 8/2012 | Hernacki et al. |
| 8,260,649 B2 | 9/2012 | Ramanujan et al. |
| 8,260,682 B2 | 9/2012 | Rigole |
| 8,260,694 B1 | 9/2012 | Lauer et al. |
| 8,260,805 B1 | 9/2012 | Venu et al. |
| 8,261,204 B1 | 9/2012 | Huynh et al. |
| 8,261,334 B2 | 9/2012 | Hazlehurst et al. |
| 8,261,970 B2 | 9/2012 | Suginaka |
| 8,261,974 B2 | 9/2012 | Hull |
| 8,265,591 B1 | 9/2012 | Abidogun et al. |
| 8,266,065 B2 | 9/2012 | Dilip et al. |
| 8,266,515 B2 | 9/2012 | Satyavolu |
| 8,271,362 B2 | 9/2012 | Fasching |
| 8,271,393 B2 | 9/2012 | Twining et al. |
| 8,271,650 B2 | 9/2012 | Alexander |
| 8,271,894 B1 | 9/2012 | Mayers |
| 8,271,899 B1 | 9/2012 | Blackburn et al. |
| 8,271,906 B1 | 9/2012 | Fong |
| 8,271,961 B1 | 9/2012 | Chithambaram |
| 8,275,636 B2 | 9/2012 | Berg et al. |
| 8,275,683 B2 | 9/2012 | Wolfson et al. |
| 8,275,710 B1 | 9/2012 | Hildebrand |
| 8,280,723 B1 | 10/2012 | Laaser |
| 8,280,789 B2 | 10/2012 | Menzel |
| 8,280,792 B2 | 10/2012 | Rajan et al. |
| 8,280,810 B2 | 10/2012 | Grandcolas et al. |
| 8,280,879 B2 | 10/2012 | Alexander |
| 8,281,372 B1 | 10/2012 | Vidal |
| 8,285,613 B1 | 10/2012 | Coulter |
| 8,285,640 B2 | 10/2012 | Scipioni |
| 8,285,641 B2 | 10/2012 | Cataline et al. |
| 8,285,656 B1 | 10/2012 | Chang et al. |
| 8,290,835 B2 | 10/2012 | Homer et al. |
| 8,290,840 B2 | 10/2012 | Kasower |
| 8,290,845 B2 | 10/2012 | Leibon et al. |
| 8,290,856 B1 | 10/2012 | Kasower |
| 8,290,865 B2 | 10/2012 | Lawrence et al. |
| 8,290,941 B2 | 10/2012 | Alexander |
| 8,296,229 B1 | 10/2012 | Yellin et al. |
| 8,306,255 B1 | 11/2012 | Degnan |
| 8,306,861 B2 | 11/2012 | Dunsmore et al. |
| 8,306,889 B2 | 11/2012 | Leibon et al. |
| 8,311,792 B1 | 11/2012 | Podgorny et al. |
| 8,311,936 B2 | 11/2012 | Haggerty et al. |
| 8,311,942 B1 | 11/2012 | Mason |
| 8,312,033 B1 | 11/2012 | McMillan |
| 8,315,942 B2 | 11/2012 | Haggerty et al. |
| 8,315,945 B2 | 11/2012 | Gupta |
| 8,320,944 B1 | 11/2012 | Gibson et al. |
| 8,321,334 B1 | 11/2012 | Kornegay et al. |
| 8,321,339 B2 | 11/2012 | Imrey et al. |
| 8,321,413 B2 | 11/2012 | Gabriel et al. |
| 8,326,725 B2 | 12/2012 | Elwell et al. |
| 8,326,747 B2 | 12/2012 | Ang et al. |
| 8,326,770 B1 | 12/2012 | Weisman |
| 8,327,429 B2 | 12/2012 | Speyer et al. |
| 8,332,241 B2 | 12/2012 | Harrell et al. |
| 8,335,739 B1 | 12/2012 | Bol et al. |
| 8,335,741 B2 | 12/2012 | Kornegay et al. |
| 8,341,545 B2 | 12/2012 | Hebard |
| 8,346,226 B2 | 1/2013 | Gibson et al. |
| 8,346,615 B2 | 1/2013 | Connors et al. |
| 8,352,365 B1 | 1/2013 | Goldberg et al. |
| 8,352,564 B1 | 1/2013 | Campise et al. |
| 8,353,027 B2 | 1/2013 | Dennis et al. |
| 8,353,029 B2 | 1/2013 | Morgan et al. |
| 8,353,448 B1 | 1/2013 | Miller et al. |
| 8,355,935 B2 | 1/2013 | Hellman et al. |
| 8,355,966 B1 | 1/2013 | Vu et al. |
| 8,355,967 B2 | 1/2013 | Debie et al. |
| 8,359,003 B1 | 1/2013 | Gailloux et al. |
| 8,359,266 B2 | 1/2013 | Seale, III et al. |
| 8,359,278 B2 | 1/2013 | Domenikos et al. |
| 8,364,662 B1 | 1/2013 | Moyer et al. |
| 8,364,711 B2 | 1/2013 | Wilkins et al. |
| 8,364,969 B2 | 1/2013 | King |
| 8,370,229 B2 | 2/2013 | Moduga et al. |
| 8,370,256 B1 | 2/2013 | Murphy |
| 8,370,340 B1 | 2/2013 | Yu et al. |
| 8,374,885 B2 | 2/2013 | Stibel et al. |
| 8,374,962 B2 | 2/2013 | Abelman et al. |
| 8,374,973 B2 | 2/2013 | Herbrich et al. |
| 8,375,331 B1 | 2/2013 | Mayers |
| 8,380,803 B1 | 2/2013 | Stibel et al. |
| 8,381,120 B2 | 2/2013 | Stibel et al. |
| 8,385,521 B2 | 2/2013 | Rustagi et al. |
| 8,386,341 B2 | 2/2013 | Bennett et al. |
| 8,386,377 B1 | 2/2013 | Xiong et al. |
| 8,386,966 B2 | 2/2013 | Attinasi et al. |
| 8,391,846 B1 | 3/2013 | Mankovich |
| 8,392,230 B2 | 3/2013 | Stibel et al. |
| 8,392,272 B2 | 3/2013 | Lin |
| 8,392,300 B1 | 3/2013 | Battula et al. |
| 8,392,334 B2 | 3/2013 | Hirtenstein et al. |
| 8,392,969 B1 | 3/2013 | Park et al. |
| 8,396,743 B2 | 3/2013 | Alvin |
| 8,396,747 B2 | 3/2013 | Bachenheimer |
| 8,400,970 B2 | 3/2013 | Bajar et al. |
| 8,401,875 B2 | 3/2013 | Fish et al. |
| 8,401,941 B1 | 3/2013 | Havemose |
| 8,401,965 B2 | 3/2013 | Johnson et al. |
| 8,401,966 B2 | 3/2013 | Stewart et al. |
| 8,402,526 B2 | 3/2013 | Ahn |
| 8,407,141 B2 | 3/2013 | Mullen et al. |
| 8,407,194 B1 | 3/2013 | Chaput et al. |
| 8,412,593 B1 | 4/2013 | Song et al. |
| 8,413,239 B2 | 4/2013 | Sutton et al. |
| 8,417,627 B2 | 4/2013 | Cerise et al. |
| 8,417,635 B2 | 4/2013 | Kalra et al. |
| 8,417,644 B2 | 4/2013 | Ferguson et al. |
| 8,423,285 B2 | 4/2013 | Paterson et al. |
| 8,423,387 B1 | 4/2013 | Mirza |
| 8,423,452 B1 | 4/2013 | Ley et al. |
| 8,423,461 B2 | 4/2013 | Mukherjee |
| 8,423,463 B1 | 4/2013 | Matthews et al. |
| 8,423,563 B2 | 4/2013 | Chang et al. |
| 8,423,653 B2 | 4/2013 | Chang et al. |
| 8,429,073 B2 | 4/2013 | Ferguson et al. |
| 8,432,275 B2 | 4/2013 | Patel et al. |
| 8,433,654 B2 | 4/2013 | Subbarao et al. |

(56) References Cited

U.S. PATENT DOCUMENTS

| | | |
|---|---|---|
| 8,438,063 B2 | 5/2013 | Albisu |
| 8,443,202 B2 | 5/2013 | White et al. |
| 8,447,667 B1 | 5/2013 | Dinamani |
| 8,452,704 B2 | 5/2013 | Barbara et al. |
| 8,452,708 B1 | 5/2013 | Birenbaum et al. |
| 8,453,068 B2 | 5/2013 | Stibel et al. |
| 8,453,218 B2 | 5/2013 | Lan et al. |
| 8,453,940 B2 | 6/2013 | Diamond |
| 8,456,293 B1 | 6/2013 | Trundle et al. |
| 8,458,062 B2 | 6/2013 | Dutt et al. |
| 8,463,595 B1 | 6/2013 | Rehling et al. |
| 8,463,831 B2 | 6/2013 | Harris et al. |
| 8,463,939 B1 | 6/2013 | Galvin |
| 8,464,939 B1 | 6/2013 | Taylor et al. |
| 8,468,028 B2 | 6/2013 | Stibel et al. |
| 8,473,318 B2 | 6/2013 | Nielson et al. |
| 8,473,353 B2 | 6/2013 | Matsuda et al. |
| 8,473,394 B2 | 6/2013 | Marshall |
| 8,467,766 B2 | 7/2013 | Rackley, III et al. |
| 8,478,674 B1 | 7/2013 | Kapczynski et al. |
| 8,478,686 B1 | 7/2013 | Giles |
| 8,483,473 B2 | 7/2013 | Roach et al. |
| 8,484,104 B1 | 7/2013 | Hurlbutt et al. |
| 8,484,131 B2 | 7/2013 | Kelly et al. |
| 8,484,186 B1 | 7/2013 | Kapczynski et al. |
| 8,489,067 B2 | 7/2013 | Rackley, III et al. |
| 8,489,502 B2 | 7/2013 | Morris et al. |
| 8,489,504 B1 | 7/2013 | Gupta |
| 8,489,513 B2 | 7/2013 | Bishop et al. |
| 8,489,720 B1 | 7/2013 | Morford et al. |
| 8,490,126 B2 | 7/2013 | Walter et al. |
| 8,490,871 B1 | 7/2013 | Miller et al. |
| 8,494,958 B2 | 7/2013 | Schoenberg et al. |
| 8,494,973 B1 | 7/2013 | Dignan et al. |
| 8,498,613 B2 | 7/2013 | Aebi |
| 8,498,900 B1 | 7/2013 | Spirin et al. |
| 8,498,914 B2 | 7/2013 | Hazelhurst |
| 8,498,932 B2 | 7/2013 | Matthews |
| 8,498,944 B2 | 7/2013 | Solomon |
| 8,499,348 B1 | 7/2013 | Rubin |
| 8,500,006 B2 | 8/2013 | Carlson et al. |
| 8,504,394 B2 | 8/2013 | Nutkiewicz et al. |
| 8,504,470 B1 | 8/2013 | Chirehdast |
| 8,504,474 B2 | 8/2013 | Armes et al. |
| 8,510,220 B2 | 8/2013 | Rackley, III et al. |
| 8,510,223 B2 | 8/2013 | Blair et al. |
| 8,515,825 B1 | 8/2013 | Ross, Jr. et al. |
| 8,515,828 B1 | 8/2013 | Wolf et al. |
| 8,515,842 B2 | 8/2013 | Papadimitriou |
| 8,515,844 B2 | 8/2013 | Kasower |
| 8,521,657 B2 | 8/2013 | Kuebert et al. |
| 8,527,357 B1 | 9/2013 | Ganesan |
| 8,527,377 B2 | 9/2013 | D'Englere |
| 8,527,410 B2 | 9/2013 | Markki et al. |
| 8,527,413 B2 | 9/2013 | Heller |
| 8,527,596 B2 | 9/2013 | Long et al. |
| 8,528,813 B1 | 9/2013 | Blossom |
| 8,533,118 B2 | 9/2013 | Weller et al. |
| 8,538,871 B2 | 9/2013 | Portillo et al. |
| 8,538,874 B2 | 9/2013 | Thomas |
| 8,538,878 B2 | 9/2013 | Meier et al. |
| 8,544,091 B2 | 9/2013 | Stibel |
| 8,458,907 B1 | 10/2013 | Campbell |
| 8,548,832 B2 | 10/2013 | Ika et al. |
| 8,548,903 B2 | 10/2013 | Becker |
| 8,548,907 B1 | 10/2013 | Campbell |
| 8,554,584 B2 | 10/2013 | Hargroder |
| 8,555,357 B2 | 10/2013 | Gauvin |
| 8,560,161 B1 | 10/2013 | Kator et al. |
| 8,560,410 B2 | 10/2013 | Narkar |
| 8,560,436 B2 | 10/2013 | Ingram et al. |
| 8,560,438 B2 | 10/2013 | Hankey et al. |
| 8,560,444 B2 | 10/2013 | Rosenblatt et al. |
| 8,560,447 B1 | 10/2013 | Hinghole et al. |
| 8,560,450 B2 | 10/2013 | Kumar et al. |
| 8,566,187 B2 | 10/2013 | Keld et al. |
| 8,571,971 B1 | 10/2013 | Brown et al. |
| 8,572,083 B1 | 10/2013 | Snell et al. |
| 8,578,036 B1 | 11/2013 | Holfelder et al. |
| 8,578,496 B1 | 11/2013 | Krishnappa |
| 8,589,286 B1 | 11/2013 | Kornegay et al. |
| 8,595,101 B1 | 11/2013 | Daukas et al. |
| 8,600,768 B2 | 12/2013 | Stibel et al. |
| 8,600,886 B2 | 12/2013 | Ramavarjula et al. |
| 8,601,602 B1 | 12/2013 | Zheng |
| 8,606,694 B2 | 12/2013 | Campbell et al. |
| 8,606,869 B2 | 12/2013 | Stibel et al. |
| 8,626,137 B1 | 1/2014 | Devitt et al. |
| 8,630,893 B2 | 1/2014 | Stibel et al. |
| 8,630,938 B2 | 1/2014 | Cheng et al. |
| 8,639,930 B2 | 1/2014 | Stibel et al. |
| 8,646,051 B2 | 2/2014 | Paden et al. |
| 8,650,189 B2 | 2/2014 | Fertik et al. |
| 8,660,541 B1 | 2/2014 | Beresniewicz et al. |
| 8,660,919 B2 | 2/2014 | Kasower |
| 8,671,115 B2 | 3/2014 | Skurtovich, Jr. et al. |
| 8,676,684 B2 | 3/2014 | Newman et al. |
| 8,688,543 B2 | 4/2014 | Dominguez |
| 8,689,001 B1 | 4/2014 | Satish |
| 8,694,420 B1 | 4/2014 | Oliai |
| 8,705,718 B2 | 4/2014 | Baniak et al. |
| 8,706,599 B1 | 4/2014 | Koenig et al. |
| 8,706,616 B1 | 4/2014 | Flynn |
| 8,725,613 B1 | 5/2014 | Celka et al. |
| 8,732,004 B1 | 5/2014 | Ramos et al. |
| 8,738,516 B1 | 5/2014 | Dean et al. |
| 8,744,956 B1 | 6/2014 | DiChiara et al. |
| 8,745,698 B1 | 6/2014 | Ashfield et al. |
| 8,751,378 B2 | 6/2014 | Dornhelm et al. |
| 8,760,417 B2 | 6/2014 | Haug |
| 8,762,243 B2 | 6/2014 | Jenkins et al. |
| 8,768,914 B2 | 7/2014 | Scriffignano et al. |
| 8,775,299 B2 | 7/2014 | Achanta et al. |
| 8,781,951 B2 | 7/2014 | Lewis et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,856,894 B1 | 10/2014 | Dean et al. |
| 8,856,945 B2 | 10/2014 | Carter et al. |
| 8,860,763 B2 | 10/2014 | Privault et al. |
| 8,868,914 B2 | 10/2014 | Teppler |
| 8,930,251 B2 | 1/2015 | DeBie |
| 8,930,263 B1 * | 1/2015 | Mahacek ............ G06Q 40/025 |
| | | 705/35 |
| 8,938,399 B1 | 1/2015 | Herman |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,002,753 B2 | 4/2015 | Anschutz et al. |
| 9,053,589 B1 | 6/2015 | Kator et al. |
| 9,053,590 B1 | 6/2015 | Kator et al. |
| 9,058,627 B1 | 6/2015 | Wasser et al. |
| 9,076,276 B1 | 7/2015 | Kator et al. |
| 9,106,691 B1 | 8/2015 | Burger et al. |
| 9,116,918 B1 | 8/2015 | Kim |
| 9,147,042 B1 | 9/2015 | Haller et al. |
| 9,218,481 B2 | 10/2015 | Belisario |
| 9,183,377 B1 | 11/2015 | Sobel et al. |
| 9,213,461 B2 | 12/2015 | Eraker et al. |
| 9,225,704 B1 | 12/2015 | Johansson et al. |
| 9,230,283 B1 | 1/2016 | Taylor et al. |
| 9,256,624 B2 | 2/2016 | Skurtovich, Jr. et al. |
| 9,256,904 B1 | 2/2016 | Haller et al. |
| 9,400,589 B1 | 7/2016 | Wasser et al. |
| 9,406,085 B1 | 8/2016 | Hunt, III et al. |
| 9,443,268 B1 | 9/2016 | Kapczynski et al. |
| 9,477,737 B1 | 10/2016 | Charyk et al. |
| 9,479,471 B2 | 10/2016 | Schoenrock |
| 9,483,606 B1 | 11/2016 | Dean et al. |
| 9,501,583 B2 | 11/2016 | Nordstrom et al. |
| 9,536,263 B1 | 1/2017 | Dean et al. |
| 9,542,553 B1 | 1/2017 | Burger et al. |
| 9,542,682 B1 | 1/2017 | Taylor et al. |
| 9,558,519 B1 | 1/2017 | Burger |

(56) References Cited

U.S. PATENT DOCUMENTS

| | | |
|---|---|---|
| 9,569,797 B1 | 2/2017 | Rohn et al. |
| 9,607,336 B1 | 3/2017 | Dean et al. |
| 9,619,751 B2 | 4/2017 | Woon et al. |
| 9,654,541 B1 | 5/2017 | Kapczynski et al. |
| 9,665,854 B1 | 5/2017 | Burger et al. |
| 9,690,820 B1 | 6/2017 | Girulat, Jr. |
| 9,697,568 B1 | 7/2017 | Hunt, III |
| 9,710,523 B2 | 7/2017 | Skurtovich, Jr. et al. |
| 9,710,852 B1 | 7/2017 | Olson et al. |
| 9,767,513 B1 | 9/2017 | Taylor et al. |
| 9,830,646 B1 | 11/2017 | Wasser et al. |
| 9,853,959 B1 | 12/2017 | Kapczynski et al. |
| 9,870,589 B1 | 1/2018 | Arnold et al. |
| 9,892,457 B1 | 2/2018 | Kapczynski |
| 9,916,621 B1 | 3/2018 | Wasser et al. |
| 9,972,048 B1 | 5/2018 | Dean et al. |
| 9,990,674 B1 | 6/2018 | Taylor et al. |
| 10,025,842 B1 | 7/2018 | Charyk et al. |
| 10,043,214 B1 | 8/2018 | Hunt, III |
| 10,061,936 B1 | 8/2018 | Burger et al. |
| 10,075,446 B2 | 9/2018 | McMillan et al. |
| 10,102,570 B1 | 10/2018 | Kapczynski et al. |
| 10,176,233 B1 | 1/2019 | Dean et al. |
| 10,187,341 B2 | 1/2019 | Schoenrock |
| 10,255,598 B1 | 4/2019 | Dean et al. |
| 10,262,364 B2 | 4/2019 | Taylor et al. |
| 10,269,065 B1 | 4/2019 | Kapczynski et al. |
| 10,277,659 B1 | 4/2019 | Kapczynski et al. |
| D847,840 S | 5/2019 | Poschel et al. |
| D851,126 S | 6/2019 | Tauban |
| D851,127 S | 6/2019 | Tauban |
| D851,128 S | 6/2019 | Tauban |
| 10,325,314 B1 | 6/2019 | Kapczynski et al. |
| 10,366,450 B1 | 7/2019 | Mahacek et al. |
| 10,380,654 B2 | 8/2019 | Hirtenstein et al. |
| 10,482,532 B1 | 11/2019 | Kapczynski |
| 10,528,545 B1 | 1/2020 | Girulat, Jr. |
| 2001/0005840 A1 | 6/2001 | Verkama |
| 2001/0011247 A1 | 8/2001 | O'Flaherty et al. |
| 2001/0014878 A1 | 8/2001 | Mitra et al. |
| 2001/0027413 A1 | 10/2001 | Bhutta |
| 2001/0029470 A1 | 10/2001 | Schultz et al. |
| 2001/0029482 A1 | 10/2001 | Tealdi et al. |
| 2001/0032181 A1 | 10/2001 | Jakstadt et al. |
| 2001/0034618 A1 | 10/2001 | Kessler et al. |
| 2001/0034631 A1 | 10/2001 | Kiselik |
| 2001/0037204 A1 | 11/2001 | Horn et al. |
| 2001/0037289 A1 | 11/2001 | Mayr et al. |
| 2001/0037295 A1 | 11/2001 | Olsen |
| 2001/0037297 A1 | 11/2001 | McNair |
| 2001/0039523 A1 | 11/2001 | Iwamoto |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0044764 A1 | 11/2001 | Arnold |
| 2001/0047332 A1 | 11/2001 | Gonen-Friedman et al. |
| 2001/0049274 A1 | 12/2001 | Degraeve |
| 2001/0053989 A1 | 12/2001 | Keller et al. |
| 2001/0056390 A1 | 12/2001 | Varadarajan et al. |
| 2002/0010616 A1 | 1/2002 | Itzhaki |
| 2002/0010635 A1 | 1/2002 | Tokiwa |
| 2002/0013827 A1 | 1/2002 | Edstrom et al. |
| 2002/0013899 A1 | 1/2002 | Faul |
| 2002/0016767 A1 | 2/2002 | Johnston |
| 2002/0016771 A1 | 2/2002 | Carothers et al. |
| 2002/0023108 A1 | 2/2002 | Daswani et al. |
| 2002/0026423 A1 | 2/2002 | Maritzen et al. |
| 2002/0029192 A1 | 3/2002 | Nakagawa et al. |
| 2002/0032611 A1 | 3/2002 | Khan |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0033846 A1 | 3/2002 | Balasubramanian et al. |
| 2002/0035480 A1 | 3/2002 | Gordon et al. |
| 2002/0035511 A1 | 3/2002 | Haji et al. |
| 2002/0035520 A1 | 3/2002 | Weiss |
| 2002/0040355 A1 | 4/2002 | Weiner |
| 2002/0042715 A1 | 4/2002 | Kelley |
| 2002/0045154 A1 | 4/2002 | Wood et al. |
| 2002/0046185 A1 | 4/2002 | Villart et al. |
| 2002/0049624 A1 | 4/2002 | Raveis, Jr. |
| 2002/0052836 A1 | 5/2002 | Galperin et al. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0062249 A1 | 5/2002 | Iannacci |
| 2002/0065772 A1 | 5/2002 | Saliba et al. |
| 2002/0069122 A1 | 6/2002 | Yun et al. |
| 2002/0069165 A1 | 6/2002 | O'Neil |
| 2002/0069168 A1 | 6/2002 | Lee et al. |
| 2002/0069182 A1 | 6/2002 | Dwyer |
| 2002/0073017 A1 | 6/2002 | Robertson |
| 2002/0077964 A1 | 6/2002 | Brody et al. |
| 2002/0077978 A1 | 6/2002 | O'Leary et al. |
| 2002/0087460 A1 | 7/2002 | Hornung |
| 2002/0087488 A1 | 7/2002 | Fordahl et al. |
| 2002/0091635 A1 | 7/2002 | Dilip et al. |
| 2002/0091650 A1 | 7/2002 | Ellis |
| 2002/0099612 A1 | 7/2002 | Seaman et al. |
| 2002/0099635 A1 | 7/2002 | Guiragosian |
| 2002/0099641 A1 | 7/2002 | Mills et al. |
| 2002/0099824 A1 | 7/2002 | Bender et al. |
| 2002/0103933 A1 | 8/2002 | Garon et al. |
| 2002/0107765 A1 | 8/2002 | Walker |
| 2002/0111816 A1 | 8/2002 | Lortscher et al. |
| 2002/0111890 A1 | 8/2002 | Sloan et al. |
| 2002/0116331 A1 | 8/2002 | Cataline et al. |
| 2002/0120537 A1 | 8/2002 | Morea et al. |
| 2002/0120581 A1 | 8/2002 | Schiavone et al. |
| 2002/0120757 A1 | 8/2002 | Sutherland et al. |
| 2002/0120846 A1 | 8/2002 | Stewart et al. |
| 2002/0126449 A1 | 9/2002 | Casebolt |
| 2002/0128917 A1 | 9/2002 | Grounds |
| 2002/0128962 A1 | 9/2002 | Kasower |
| 2002/0133365 A1 | 9/2002 | Grey et al. |
| 2002/0133462 A1 | 9/2002 | Shteyn |
| 2002/0133504 A1 | 9/2002 | Vlahos et al. |
| 2002/0138409 A1 | 9/2002 | Bass |
| 2002/0138470 A1 | 9/2002 | Zhou |
| 2002/0143674 A1 | 10/2002 | Beckman |
| 2002/0143943 A1 | 10/2002 | Lee et al. |
| 2002/0147669 A1 | 10/2002 | Taylor et al. |
| 2002/0147695 A1 | 10/2002 | Khedkar et al. |
| 2002/0147801 A1 | 10/2002 | Gullotta et al. |
| 2002/0149794 A1 | 10/2002 | Yoshioka et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0165757 A1 | 11/2002 | Lisser |
| 2002/0165839 A1 | 11/2002 | Taylor et al. |
| 2002/0169747 A1 | 11/2002 | Chapman et al. |
| 2002/0173994 A1 | 11/2002 | Ferguson, III |
| 2002/0174048 A1 | 11/2002 | Dheer et al. |
| 2002/0174061 A1 | 11/2002 | Srinivasan et al. |
| 2002/0174124 A1 | 11/2002 | Haas et al. |
| 2002/0188511 A1 | 12/2002 | Johnson et al. |
| 2002/0194117 A1 | 12/2002 | Nabe et al. |
| 2002/0194120 A1 | 12/2002 | Russell et al. |
| 2002/0194140 A1 | 12/2002 | Makuck |
| 2002/0198736 A1 | 12/2002 | Harrison |
| 2002/0198798 A1 | 12/2002 | Ludwig et al. |
| 2002/0198800 A1 | 12/2002 | Shamrakov |
| 2002/0198806 A1 | 12/2002 | Blagg et al. |
| 2002/0198822 A1 | 12/2002 | Munoz et al. |
| 2002/0198824 A1 | 12/2002 | Cook |
| 2002/0198828 A1 | 12/2002 | Ludwig et al. |
| 2002/0198829 A1 | 12/2002 | Ludwig et al. |
| 2002/0198830 A1 | 12/2002 | Randell et al. |
| 2002/0198835 A1 | 12/2002 | Watson et al. |
| 2003/0002671 A1 | 1/2003 | Inchalik et al. |
| 2003/0004853 A1 | 1/2003 | Ram et al. |

(56) References Cited

U.S. PATENT DOCUMENTS

| | | |
|---|---|---|
| 2003/0004855 A1 | 1/2003 | Dutta et al. |
| 2003/0004922 A1 | 1/2003 | Schmidt et al. |
| 2003/0007283 A1 | 1/2003 | Ostwald et al. |
| 2003/0009301 A1 | 1/2003 | Anand et al. |
| 2003/0009411 A1 | 1/2003 | Ram et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0018578 A1 | 1/2003 | Schultz |
| 2003/0023531 A1 | 1/2003 | Fergusson |
| 2003/0023555 A1 | 1/2003 | Rees |
| 2003/0028466 A1 | 2/2003 | Jenson et al. |
| 2003/0028477 A1 | 2/2003 | Stevenson et al. |
| 2003/0028529 A1 | 2/2003 | Cheung |
| 2003/0036952 A1 | 2/2003 | Panttaja et al. |
| 2003/0036995 A1 | 2/2003 | Lazerson |
| 2003/0041019 A1 | 2/2003 | Vagim et al. |
| 2003/0041031 A1 | 2/2003 | Hedy |
| 2003/0046222 A1 | 3/2003 | Bard et al. |
| 2003/0046311 A1 | 3/2003 | Baidya et al. |
| 2003/0048294 A1 | 3/2003 | Arnold |
| 2003/0050929 A1 | 3/2003 | Bookman et al. |
| 2003/0061104 A1 | 3/2003 | Thomson et al. |
| 2003/0061155 A1 | 3/2003 | Chin |
| 2003/0061163 A1 | 3/2003 | Durfield |
| 2003/0064705 A1 | 4/2003 | Desierio |
| 2003/0065563 A1 | 4/2003 | Elliott et al. |
| 2003/0069839 A1 | 4/2003 | Whittington et al. |
| 2003/0069943 A1 | 4/2003 | Bahrs et al. |
| 2003/0078897 A1 | 4/2003 | Florance et al. |
| 2003/0090586 A1 | 5/2003 | Jan et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105646 A1 | 6/2003 | Siepser |
| 2003/0105710 A1 | 6/2003 | Barbara et al. |
| 2003/0105733 A1 | 6/2003 | Boreham |
| 2003/0105742 A1 | 6/2003 | Boreham et al. |
| 2003/0115122 A1 | 6/2003 | Slater et al. |
| 2003/0115133 A1 | 6/2003 | Bian |
| 2003/0130892 A1 | 7/2003 | Taono et al. |
| 2003/0154122 A1 | 8/2003 | Jackson, Jr. et al. |
| 2003/0154162 A1 | 8/2003 | Danaher et al. |
| 2003/0158960 A1 | 8/2003 | Engberg |
| 2003/0163418 A1 | 8/2003 | Marks |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0167229 A1 | 9/2003 | Ludwig et al. |
| 2003/0171942 A1 | 9/2003 | Gaito |
| 2003/0172039 A1 | 9/2003 | Guy |
| 2003/0177090 A1 | 9/2003 | Eden |
| 2003/0177091 A1 | 9/2003 | Paglin |
| 2003/0186200 A1 | 10/2003 | Selix |
| 2003/0187768 A1 | 10/2003 | Ryan et al. |
| 2003/0187780 A1 | 10/2003 | Arthus et al. |
| 2003/0187837 A1 | 10/2003 | Culliss |
| 2003/0191701 A1 | 10/2003 | Haseltine et al. |
| 2003/0191711 A1 | 10/2003 | Jamison et al. |
| 2003/0191731 A1 | 10/2003 | Stewart et al. |
| 2003/0195805 A1 | 10/2003 | Storey |
| 2003/0195830 A1 | 10/2003 | Merkoulovitch et al. |
| 2003/0195859 A1 | 10/2003 | Lawrence |
| 2003/0196109 A1 | 10/2003 | Raley et al. |
| 2003/0200142 A1 | 10/2003 | Hicks et al. |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212618 A1 | 11/2003 | Keyes et al. |
| 2003/0212745 A1 | 11/2003 | Caughey |
| 2003/0212909 A1 | 11/2003 | Chandrashekhar |
| 2003/0214775 A1 | 11/2003 | Fukuta et al. |
| 2003/0217000 A1 | 11/2003 | Wichman |
| 2003/0219709 A1 | 11/2003 | Olenick et al. |
| 2003/0220858 A1 | 11/2003 | Lam et al. |
| 2003/0220871 A1 | 11/2003 | Clarke et al. |
| 2003/0225742 A1 | 12/2003 | Tenner et al. |
| 2003/0229504 A1 | 12/2003 | Hollister |
| 2003/0229580 A1 | 12/2003 | Gass et al. |
| 2003/0229589 A1 | 12/2003 | Rosenblatt et al. |
| 2003/0229590 A1 | 12/2003 | Byrne et al. |
| 2003/0236701 A1 | 12/2003 | Rowney et al. |
| 2003/0236738 A1 | 12/2003 | Lange et al. |
| 2004/0001565 A1 | 1/2004 | Jones et al. |
| 2004/0002907 A1 | 1/2004 | Tosswill |
| 2004/0002916 A1 | 1/2004 | Timmerman et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019549 A1 | 1/2004 | Gulbrandsen |
| 2004/0019799 A1 | 1/2004 | Vering et al. |
| 2004/0023637 A1 | 2/2004 | Johnson et al. |
| 2004/0024671 A1 | 2/2004 | Freund |
| 2004/0024702 A1 | 2/2004 | Angel et al. |
| 2004/0024709 A1 | 2/2004 | Yu et al. |
| 2004/0024717 A1 | 2/2004 | Angel et al. |
| 2004/0030574 A1 | 2/2004 | DiCostanzo et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0030667 A1 | 2/2004 | Xu et al. |
| 2004/0039586 A1 | 2/2004 | Garvey et al. |
| 2004/0039688 A1 | 2/2004 | Sulkowski et al. |
| 2004/0044563 A1 | 3/2004 | Stein |
| 2004/0044601 A1 | 3/2004 | Kim et al. |
| 2004/0044615 A1 | 3/2004 | Xue et al. |
| 2004/0044617 A1 | 3/2004 | Lu |
| 2004/0044628 A1 | 3/2004 | Mathew et al. |
| 2004/0044673 A1 | 3/2004 | Brady et al. |
| 2004/0046033 A1 | 3/2004 | Kolodziej et al. |
| 2004/0059786 A1 | 3/2004 | Caughey |
| 2004/0062213 A1 | 4/2004 | Koss |
| 2004/0078424 A1 | 4/2004 | Yairi et al. |
| 2004/0083159 A1 | 4/2004 | Crosby et al. |
| 2004/0083230 A1 | 4/2004 | Caughey |
| 2004/0088237 A1 | 5/2004 | Moenickheim et al. |
| 2004/0088255 A1 | 5/2004 | Zielke et al. |
| 2004/0093278 A1 | 5/2004 | Burchetta et al. |
| 2004/0098418 A1 | 5/2004 | Hein |
| 2004/0098546 A1 | 5/2004 | Bashant et al. |
| 2004/0102197 A1 | 5/2004 | Dietz |
| 2004/0107250 A1 | 6/2004 | Marciano |
| 2004/0110119 A1 | 6/2004 | Riconda et al. |
| 2004/0111292 A1 | 6/2004 | Hutchins |
| 2004/0111358 A1 | 6/2004 | Lange et al. |
| 2004/0111359 A1 | 6/2004 | Hudock |
| 2004/0111363 A1 | 6/2004 | Trench et al. |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0122766 A1 | 6/2004 | Brooks et al. |
| 2004/0128150 A1 | 7/2004 | Lundegren |
| 2004/0128156 A1 | 7/2004 | Beringer et al. |
| 2004/0128215 A1 | 7/2004 | Florance et al. |
| 2004/0133440 A1 | 7/2004 | Carolan et al. |
| 2004/0133493 A1 | 7/2004 | Ford et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138995 A1 | 7/2004 | Hershkowitz et al. |
| 2004/0138997 A1 | 7/2004 | DeFrancesco et al. |
| 2004/0139005 A1 | 7/2004 | Ganesan |
| 2004/0141005 A1 | 7/2004 | Banatwala et al. |
| 2004/0143546 A1 | 7/2004 | Wood et al. |
| 2004/0143547 A1 | 7/2004 | Mersky |
| 2004/0143596 A1 | 7/2004 | Sirkin |

(56) References Cited

U.S. PATENT DOCUMENTS

| | | |
|---|---|---|
| 2004/0148200 A1 | 7/2004 | Hodges |
| 2004/0153437 A1 | 8/2004 | Buchan |
| 2004/0158521 A1 | 8/2004 | Newton |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0167823 A1 | 8/2004 | Neely et al. |
| 2004/0172360 A1 | 9/2004 | Mabrey et al. |
| 2004/0177035 A1 | 9/2004 | Silva |
| 2004/0186807 A1 | 9/2004 | Nathans et al. |
| 2004/0190694 A1 | 9/2004 | Schelberg, Jr. et al. |
| 2004/0193535 A1 | 9/2004 | Barazesh |
| 2004/0193538 A1 | 9/2004 | Raines |
| 2004/0193891 A1 | 9/2004 | Ollila |
| 2004/0199456 A1 | 10/2004 | Flint et al. |
| 2004/0199789 A1 | 10/2004 | Shaw et al. |
| 2004/0210661 A1 | 10/2004 | Thompson |
| 2004/0215584 A1 | 10/2004 | Yao |
| 2004/0215673 A1 | 10/2004 | Furukawa et al. |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1 | 11/2004 | Greene |
| 2004/0225643 A1 | 11/2004 | Alpha et al. |
| 2004/0230499 A1 | 11/2004 | Stack |
| 2004/0230524 A1 | 11/2004 | Meiners |
| 2004/0230527 A1 | 11/2004 | Hansen et al. |
| 2004/0236678 A1 | 11/2004 | Johns et al. |
| 2004/0236688 A1 | 11/2004 | Bozeman |
| 2004/0243450 A1 | 12/2004 | Bernard, Jr. et al. |
| 2004/0243506 A1 | 12/2004 | Das |
| 2004/0243508 A1 | 12/2004 | Samson et al. |
| 2004/0243588 A1 | 12/2004 | Tanner et al. |
| 2004/0249532 A1 | 12/2004 | Kelly et al. |
| 2004/0249811 A1 | 12/2004 | Shostack |
| 2004/0250107 A1 | 12/2004 | Guo |
| 2004/0253988 A1 | 12/2004 | Goldman |
| 2004/0254935 A1 | 12/2004 | Chagoly et al. |
| 2004/0255127 A1 | 12/2004 | Arnouse |
| 2004/0267646 A1 | 12/2004 | Chandhok et al. |
| 2004/0267714 A1 | 12/2004 | Frid et al. |
| 2005/0004855 A1 | 1/2005 | Jenson et al. |
| 2005/0010474 A1 | 1/2005 | Desai et al. |
| 2005/0010513 A1 | 1/2005 | Duckworth et al. |
| 2005/0010523 A1 | 1/2005 | Myklebust et al. |
| 2005/0015273 A1 | 1/2005 | Iyer |
| 2005/0015338 A1 | 1/2005 | Lee |
| 2005/0021353 A1 | 1/2005 | Aviles et al. |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027633 A1 | 2/2005 | Fortuna et al. |
| 2005/0027666 A1 | 2/2005 | Beck |
| 2005/0027983 A1 | 2/2005 | Klawon |
| 2005/0033651 A1 | 2/2005 | Kogan et al. |
| 2005/0033660 A1 | 2/2005 | Solomon |
| 2005/0033690 A1 | 2/2005 | Antognini et al. |
| 2005/0042983 A1 | 2/2005 | Borgward |
| 2005/0050027 A1 | 3/2005 | Yeh et al. |
| 2005/0055231 A1 | 3/2005 | Lee |
| 2005/0055275 A1 | 3/2005 | Newman et al. |
| 2005/0055296 A1 | 3/2005 | Hattersley et al. |
| 2005/0058262 A1 | 3/2005 | Timmins et al. |
| 2005/0060244 A1 | 3/2005 | Goolkasian et al. |
| 2005/0060332 A1 | 3/2005 | Bernstein et al. |
| 2005/0065893 A1 | 3/2005 | Josephson |
| 2005/0071328 A1 | 3/2005 | Lawrence |
| 2005/0080697 A1 | 4/2005 | Foss et al. |
| 2005/0080723 A1 | 4/2005 | Burchetta et al. |
| 2005/0080796 A1 | 4/2005 | Midgley |
| 2005/0080821 A1 | 4/2005 | Breil et al. |
| 2005/0085931 A1 | 4/2005 | Willeby |
| 2005/0086126 A1 | 4/2005 | Patterson |
| 2005/0086176 A1 | 4/2005 | Dahlgren |
| 2005/0086261 A1 | 4/2005 | Mammone |
| 2005/0091159 A1 | 4/2005 | Ichikawa et al. |
| 2005/0091164 A1 | 4/2005 | Varble |
| 2005/0096950 A1 | 5/2005 | Caplan et al. |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102209 A1 | 5/2005 | Sagrillo et al. |
| 2005/0102226 A1 | 5/2005 | Oppenheimer et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125347 A1 | 6/2005 | Akialis et al. |
| 2005/0125350 A1 | 6/2005 | Tidwell et al. |
| 2005/0125397 A1 | 6/2005 | Gross et al. |
| 2005/0125686 A1 | 6/2005 | Brandt |
| 2005/0130704 A1 | 6/2005 | McParland et al. |
| 2005/0137899 A1 | 6/2005 | Davies et al. |
| 2005/0137948 A1 | 6/2005 | Kissner et al. |
| 2005/0137963 A1 | 6/2005 | Ricketts et al. |
| 2005/0137978 A1 | 6/2005 | Ganesan et al. |
| 2005/0144143 A1 | 6/2005 | Freiberg |
| 2005/0149354 A1 | 7/2005 | Cyr et al. |
| 2005/0149355 A1 | 7/2005 | Cyr et al. |
| 2005/0149356 A1 | 7/2005 | Cyr et al. |
| 2005/0149378 A1 | 7/2005 | Cyr et al. |
| 2005/0149379 A1 | 7/2005 | Cyr et al. |
| 2005/0154617 A1 | 7/2005 | Ruggieri et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0160051 A1 | 7/2005 | Johnson |
| 2005/0160280 A1 | 7/2005 | Caslin et al. |
| 2005/0165638 A1 | 7/2005 | Piller |
| 2005/0165681 A1 | 7/2005 | Heinemann et al. |
| 2005/0171850 A1 | 8/2005 | Yueh |
| 2005/0171884 A1 | 8/2005 | Arnott |
| 2005/0171900 A1 | 8/2005 | Onneken |
| 2005/0177480 A1 | 8/2005 | Huang |
| 2005/0177518 A1 | 8/2005 | Brown |
| 2005/0192839 A1 | 9/2005 | St. Jacques et al. |
| 2005/0198377 A1 | 9/2005 | Ferguson et al. |
| 2005/0203768 A1 | 9/2005 | Florance |
| 2005/0203844 A1 | 9/2005 | Ferguson et al. |
| 2005/0203864 A1 | 9/2005 | Schmidt et al. |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216955 A1 | 9/2005 | Wilkins et al. |
| 2005/0226224 A1 | 10/2005 | Lee et al. |
| 2005/0240526 A1 | 10/2005 | Hill |
| 2005/0240578 A1 | 10/2005 | Biederman et al. |
| 2005/0251474 A1 | 11/2005 | Shinn et al. |
| 2005/0256766 A1 | 11/2005 | Garcia et al. |
| 2005/0267840 A1 | 12/2005 | Holm-Blagg et al. |
| 2005/0273431 A1 | 12/2005 | Abel et al. |
| 2005/0278250 A1 | 12/2005 | Zair |
| 2005/0283414 A1 | 12/2005 | Fernandes et al. |
| 2005/0283415 A1 | 12/2005 | Studnitzer et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0014129 A1 | 1/2006 | Coleman et al. |
| 2006/0031158 A1 | 2/2006 | Orman |
| 2006/0031177 A1 | 2/2006 | Rule |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041464 A1 | 2/2006 | Powers et al. |
| 2006/0041670 A1 | 2/2006 | Musseleck et al. |
| 2006/0044599 A1 | 3/2006 | Lipowitz et al. |
| 2006/0047605 A1 | 3/2006 | Ahmad |
| 2006/0059073 A1 | 3/2006 | Walzak |
| 2006/0059083 A1 | 3/2006 | Friesen et al. |

(56) References Cited

U.S. PATENT DOCUMENTS

| | | |
|---|---|---|
| 2006/0059110 A1 | 3/2006 | Madhok et al. |
| 2006/0059362 A1 | 3/2006 | Paden et al. |
| 2006/0064377 A1 | 3/2006 | Ganesan et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080235 A1 | 4/2006 | Fukuda et al. |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0085337 A1 | 4/2006 | Conforti et al. |
| 2006/0085361 A1 | 4/2006 | Hoerle et al. |
| 2006/0095289 A1 | 5/2006 | Bunning |
| 2006/0095363 A1 | 5/2006 | May |
| 2006/0100954 A1 | 5/2006 | Schoen |
| 2006/0101508 A1 | 5/2006 | Taylor |
| 2006/0106670 A1 | 5/2006 | Cai et al. |
| 2006/0106685 A1 | 5/2006 | Cheng et al. |
| 2006/0116931 A1 | 6/2006 | Storey |
| 2006/0116932 A1 | 6/2006 | Storey |
| 2006/0121880 A1 | 6/2006 | Cowsar et al. |
| 2006/0122932 A1 | 6/2006 | Birtwell et al. |
| 2006/0123461 A1 | 6/2006 | Lunt et al. |
| 2006/0129419 A1 | 6/2006 | Flaxer et al. |
| 2006/0129472 A1 | 6/2006 | Harrington |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136180 A1 | 6/2006 | Hansen et al. |
| 2006/0136524 A1 | 6/2006 | Wohlers et al. |
| 2006/0136595 A1 | 6/2006 | Satyavolu |
| 2006/0149674 A1 | 7/2006 | Cook et al. |
| 2006/0155639 A1 | 7/2006 | Lynch et al. |
| 2006/0155780 A1 | 7/2006 | Sakairi et al. |
| 2006/0161435 A1 | 7/2006 | Atef et al. |
| 2006/0161478 A1 | 7/2006 | Turner et al. |
| 2006/0161554 A1 | 7/2006 | Lucovsky et al. |
| 2006/0163347 A1 | 7/2006 | Foss et al. |
| 2006/0169766 A1 | 8/2006 | Hoch |
| 2006/0173772 A1 | 8/2006 | Hayes et al. |
| 2006/0173775 A1 | 8/2006 | Cullen, III et al. |
| 2006/0173776 A1 | 8/2006 | Shalley et al. |
| 2006/0173778 A1 | 8/2006 | Lipsky et al. |
| 2006/0173792 A1 | 8/2006 | Glass |
| 2006/0178971 A1 | 8/2006 | Owen et al. |
| 2006/0178983 A1 | 8/2006 | Nice et al. |
| 2006/0179050 A1 | 8/2006 | Giang et al. |
| 2006/0184410 A1 | 8/2006 | Ramamurthy et al. |
| 2006/0184585 A1 | 8/2006 | Grear et al. |
| 2006/0190334 A1 | 8/2006 | Smith |
| 2006/0190394 A1 | 8/2006 | Fraser et al. |
| 2006/0195351 A1 | 8/2006 | Bayburtian |
| 2006/0195395 A1 | 8/2006 | Ganesan et al. |
| 2006/0195396 A1 | 8/2006 | Ganesan et al. |
| 2006/0195397 A1 | 8/2006 | Ganesan et al. |
| 2006/0195398 A1 | 8/2006 | Dheer et al. |
| 2006/0200583 A1 | 9/2006 | Le Lann et al. |
| 2006/0202012 A1 | 9/2006 | Grano et al. |
| 2006/0206425 A1 | 9/2006 | Sharma |
| 2006/0212386 A1 | 9/2006 | Willey et al. |
| 2006/0212407 A1 | 9/2006 | Lyon |
| 2006/0212486 A1 | 9/2006 | Kennis et al. |
| 2006/0213985 A1 | 9/2006 | Walker et al. |
| 2006/0218407 A1 | 9/2006 | Toms |
| 2006/0223043 A1 | 10/2006 | Dancy-Edwards et al. |
| 2006/0224469 A1 | 10/2006 | Kunz et al. |
| 2006/0224498 A1 | 10/2006 | Chin |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0229996 A1 | 10/2006 | Keithley et al. |
| 2006/0230343 A1 | 10/2006 | Armandpour et al. |
| 2006/0233332 A1 | 10/2006 | Toms |
| 2006/0235775 A1 | 10/2006 | Pollin |
| 2006/0235935 A1 | 10/2006 | Ng |
| 2006/0239512 A1 | 10/2006 | Petrillo |
| 2006/0241923 A1 | 10/2006 | Xu et al. |
| 2006/0245731 A1 | 11/2006 | Lai |
| 2006/0248021 A1 | 11/2006 | Jain et al. |
| 2006/0248048 A1 | 11/2006 | Jain et al. |
| 2006/0248106 A1 | 11/2006 | Milne |
| 2006/0248525 A1 | 11/2006 | Hopkins |
| 2006/0253358 A1 | 11/2006 | Delgrosso et al. |
| 2006/0253463 A1 | 11/2006 | Wu et al. |
| 2006/0259364 A1 | 11/2006 | Strock et al. |
| 2006/0259427 A1 | 11/2006 | Randell et al. |
| 2006/0262929 A1 | 11/2006 | Vatanen et al. |
| 2006/0265323 A1 | 11/2006 | Winter et al. |
| 2006/0267999 A1 | 11/2006 | Cash et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0277102 A1 | 12/2006 | Agliozzo |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0282886 A1 | 12/2006 | Gaug |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293979 A1 | 12/2006 | Cash et al. |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0011093 A1 | 1/2007 | Tree |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038563 A1 | 2/2007 | Ryzerski |
| 2007/0038568 A1 | 2/2007 | Greene et al. |
| 2007/0039049 A1 | 2/2007 | Kupferman et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0050777 A1 | 3/2007 | Hutchinson et al. |
| 2007/0055621 A1 | 3/2007 | Tischler et al. |
| 2007/0057947 A1 | 3/2007 | Yokoyama |
| 2007/0067239 A1 | 3/2007 | Dheer et al. |
| 2007/0067297 A1 | 3/2007 | Kublickis |
| 2007/0072190 A1 | 3/2007 | Aggarwal |
| 2007/0073577 A1 | 3/2007 | Krause |
| 2007/0073889 A1 | 3/2007 | Morris |
| 2007/0078741 A1 | 4/2007 | Haggerty et al. |
| 2007/0078908 A1 | 4/2007 | Rohatgi et al. |
| 2007/0078985 A1 | 4/2007 | Shao et al. |
| 2007/0078990 A1 | 4/2007 | Hopkins |
| 2007/0080826 A1 | 4/2007 | Chang |
| 2007/0083460 A1 | 4/2007 | Bachenheimer |
| 2007/0083463 A1 | 4/2007 | Kraft |
| 2007/0083465 A1 | 4/2007 | Ciurea et al. |
| 2007/0088821 A1 | 4/2007 | Sankuratripati et al. |
| 2007/0093234 A1 | 4/2007 | Willis et al. |
| 2007/0094230 A1 | 4/2007 | Subramaniam et al. |
| 2007/0094241 A1 | 4/2007 | Blackwell et al. |
| 2007/0100748 A1 | 5/2007 | Dheer et al. |
| 2007/0100749 A1 | 5/2007 | Bachu et al. |
| 2007/0100770 A1 | 5/2007 | Grinberg et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0130347 A1 | 6/2007 | Rangan et al. |

(56) References Cited

U.S. PATENT DOCUMENTS

| | | |
|---|---|---|
| 2007/0131755 A1 | 6/2007 | Chang |
| 2007/0136109 A1 | 6/2007 | Yager et al. |
| 2007/0143123 A1 | 6/2007 | Goldberg et al. |
| 2007/0149184 A1 | 6/2007 | Viegers et al. |
| 2007/0150321 A1 | 6/2007 | Zhao et al. |
| 2007/0153085 A1 | 7/2007 | Chang |
| 2007/0153710 A1 | 7/2007 | Hopkins |
| 2007/0156554 A1 | 7/2007 | Nikoley et al. |
| 2007/0156581 A1 | 7/2007 | Imrey et al. |
| 2007/0156692 A1 | 7/2007 | Rosewarne |
| 2007/0156718 A1 | 7/2007 | Hossfeld et al. |
| 2007/0157107 A1 | 7/2007 | Bishop |
| 2007/0160458 A1 | 7/2007 | Yen |
| 2007/0162458 A1 | 7/2007 | Fasciano |
| 2007/0168267 A1 | 7/2007 | Zimmerman et al. |
| 2007/0168279 A1 | 7/2007 | D'Angelo |
| 2007/0174186 A1 | 7/2007 | Hokland |
| 2007/0174448 A1 | 7/2007 | Ahuja et al. |
| 2007/0174903 A1 | 7/2007 | Greff |
| 2007/0179798 A1 | 8/2007 | Inbarajan |
| 2007/0180380 A1 | 8/2007 | Khavari et al. |
| 2007/0192167 A1 | 8/2007 | Lei et al. |
| 2007/0198336 A1 | 8/2007 | Thompson |
| 2007/0198432 A1 | 8/2007 | Pitroda et al. |
| 2007/0204033 A1 | 8/2007 | Bookbinder et al. |
| 2007/0204212 A1 | 8/2007 | Chamberlain et al. |
| 2007/0204338 A1 | 8/2007 | Aiello et al. |
| 2007/0205266 A1 | 9/2007 | Carr et al. |
| 2007/0208640 A1 | 9/2007 | Banasiak et al. |
| 2007/0214000 A1 | 9/2007 | Shahrabi et al. |
| 2007/0214078 A1 | 9/2007 | Coppinger |
| 2007/0219881 A1 | 9/2007 | Peterson et al. |
| 2007/0219966 A1 | 9/2007 | Baylis et al. |
| 2007/0220003 A1 | 9/2007 | Chern et al. |
| 2007/0220092 A1 | 9/2007 | Heitzeberg et al. |
| 2007/0220275 A1 | 9/2007 | Heitzeberg et al. |
| 2007/0220581 A1 | 9/2007 | Chang |
| 2007/0226047 A1 | 9/2007 | Ward |
| 2007/0226093 A1 | 9/2007 | Chan et al. |
| 2007/0226114 A1 | 9/2007 | Haggerty et al. |
| 2007/0226122 A1 | 9/2007 | Burrell et al. |
| 2007/0228148 A1 | 10/2007 | Rable |
| 2007/0233591 A1 | 10/2007 | Newton |
| 2007/0236562 A1 | 10/2007 | Chang |
| 2007/0239493 A1 | 10/2007 | Sweetland et al. |
| 2007/0240206 A1 | 10/2007 | Wu et al. |
| 2007/0244732 A1 | 10/2007 | Chatterji et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0260539 A1 | 11/2007 | Delinsky |
| 2007/0262140 A1 | 11/2007 | Long, Sr. |
| 2007/0265958 A1 | 11/2007 | Petralia |
| 2007/0266439 A1 | 11/2007 | Kraft |
| 2007/0273558 A1 | 11/2007 | Smith |
| 2007/0276750 A1 | 11/2007 | Stuart |
| 2007/0282736 A1 | 12/2007 | Conlin et al. |
| 2007/0282743 A1 | 12/2007 | Lovelett |
| 2007/0287415 A1 | 12/2007 | Yamada |
| 2007/0288338 A1 | 12/2007 | Hoadley |
| 2007/0288355 A1 | 12/2007 | Roland et al. |
| 2007/0288360 A1 | 12/2007 | Seeklus |
| 2007/0288490 A1 | 12/2007 | Longshaw |
| 2007/0294195 A1 | 12/2007 | Curry et al. |
| 2007/0295804 A1 | 12/2007 | Garvey et al. |
| 2007/0299770 A1 | 12/2007 | Delinsky |
| 2007/0299771 A1 | 12/2007 | Brody |
| 2008/0004957 A1 | 1/2008 | Hildreth et al. |
| 2008/0005760 A1 | 1/2008 | Kay et al. |
| 2008/0010191 A1 | 1/2008 | Rackley, III et al. |
| 2008/0010203 A1 | 1/2008 | Grant |
| 2008/0010204 A1 | 1/2008 | Rackley III et al. |
| 2008/0010206 A1 | 1/2008 | Coleman |
| 2008/0010687 A1 | 1/2008 | Gonen et al. |
| 2008/0015982 A1 | 1/2008 | Sokolic et al. |
| 2008/0015985 A1 | 1/2008 | Abhari et al. |
| 2008/0021761 A1 | 1/2008 | Rable |
| 2008/0021802 A1 | 1/2008 | Pendleton |
| 2008/0027841 A1 | 1/2008 | Eder |
| 2008/0027859 A1* | 1/2008 | Nathans ............... G06Q 10/00 705/38 |
| 2008/0028435 A1 | 1/2008 | Strickland et al. |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0040475 A1 | 2/2008 | Bosworth et al. |
| 2008/0040610 A1 | 2/2008 | Fergusson |
| 2008/0046363 A1 | 2/2008 | Ali et al. |
| 2008/0047017 A1 | 2/2008 | Renaud |
| 2008/0052170 A1 | 2/2008 | Storey |
| 2008/0052182 A1 | 2/2008 | Marshall |
| 2008/0052208 A1 | 2/2008 | Neece et al. |
| 2008/0052224 A1 | 2/2008 | Parker |
| 2008/0052244 A1 | 2/2008 | Tsuei et al. |
| 2008/0059317 A1 | 3/2008 | Chandran et al. |
| 2008/0059352 A1 | 3/2008 | Chandran |
| 2008/0059364 A1 | 3/2008 | Tidwell et al. |
| 2008/0059447 A1 | 3/2008 | Winner et al. |
| 2008/0060054 A1 | 3/2008 | Srivastava |
| 2008/0065530 A1 | 3/2008 | Talbert et al. |
| 2008/0065774 A1 | 3/2008 | Keeler |
| 2008/0066188 A1 | 3/2008 | Kwak |
| 2008/0072316 A1 | 3/2008 | Chang et al. |
| 2008/0077526 A1 | 3/2008 | Arumugam |
| 2008/0079809 A1 | 4/2008 | Chang |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0091530 A1 | 4/2008 | Egnatios et al. |
| 2008/0091818 A1 | 4/2008 | Bailey et al. |
| 2008/0097822 A1 | 4/2008 | Schigel et al. |
| 2008/0103798 A1 | 5/2008 | Domenikos et al. |
| 2008/0103799 A1 | 5/2008 | Domenikos et al. |
| 2008/0103800 A1 | 5/2008 | Domenikos et al. |
| 2008/0103836 A1 | 5/2008 | Park et al. |
| 2008/0103972 A1 | 5/2008 | Lanc |
| 2008/0109308 A1 | 5/2008 | Storey |
| 2008/0109355 A1 | 5/2008 | Dutta et al. |
| 2008/0109422 A1 | 5/2008 | Dedhia |
| 2008/0109740 A1 | 5/2008 | Prinsen et al. |
| 2008/0110973 A1 | 5/2008 | Nathans et al. |
| 2008/0114657 A1 | 5/2008 | Forzley |
| 2008/0114670 A1 | 5/2008 | Friesen |
| 2008/0114855 A1 | 5/2008 | Welingkar et al. |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120416 A1 | 5/2008 | Hopkins et al. |
| 2008/0120569 A1 | 5/2008 | Mann et al. |
| 2008/0120716 A1 | 5/2008 | Hall et al. |
| 2008/0122920 A1 | 5/2008 | Chang |
| 2008/0126136 A1 | 5/2008 | Nighan |
| 2008/0126233 A1 | 5/2008 | Hogan |
| 2008/0133273 A1 | 6/2008 | Marshall |
| 2008/0133278 A1 | 6/2008 | Stanfield |
| 2008/0133322 A1 | 6/2008 | Kalia et al. |
| 2008/0133657 A1 | 6/2008 | Pennington |
| 2008/0140476 A1 | 6/2008 | Anand et al. |
| 2008/0140507 A1 | 6/2008 | Hamlisch et al. |
| 2008/0140734 A1 | 6/2008 | Wagner |
| 2008/0140780 A1 | 6/2008 | Hopkins et al. |
| 2008/0141346 A1 | 6/2008 | Kay et al. |
| 2008/0147523 A1 | 6/2008 | Mulry et al. |
| 2008/0148368 A1 | 6/2008 | Zurko et al. |
| 2008/0148392 A1 | 6/2008 | Akens |
| 2008/0154758 A1 | 6/2008 | Schattmaier et al. |
| 2008/0162236 A1 | 7/2008 | Sommerer |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0172304 A1 | 7/2008 | Berkowitz |

(56) References Cited

U.S. PATENT DOCUMENTS

| | | |
|---|---|---|
| 2008/0172324 A1 | 7/2008 | Johnson |
| 2008/0175360 A1 | 7/2008 | Schwarz et al. |
| 2008/0177630 A1 | 7/2008 | Maghfourian et al. |
| 2008/0177655 A1 | 7/2008 | Zalik |
| 2008/0183480 A1 | 7/2008 | Carlson et al. |
| 2008/0183504 A1 | 7/2008 | Highley |
| 2008/0183585 A1 | 7/2008 | Vianello |
| 2008/0184351 A1 | 7/2008 | Gephart |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0205774 A1 | 8/2008 | Brinker et al. |
| 2008/0208548 A1 | 8/2008 | Metzger et al. |
| 2008/0208726 A1 | 8/2008 | Tsantes et al. |
| 2008/0208735 A1 | 8/2008 | Balet et al. |
| 2008/0210752 A1 | 9/2008 | March |
| 2008/0212845 A1 | 9/2008 | Lund |
| 2008/0216156 A1 | 9/2008 | Kosaka |
| 2008/0221972 A1 | 9/2008 | Megdal et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |
| 2008/0235091 A1 | 9/2008 | Holliday |
| 2008/0243650 A1 | 10/2008 | Yoon |
| 2008/0249869 A1 | 10/2008 | Angell et al. |
| 2008/0249925 A1 | 10/2008 | Nazari et al. |
| 2008/0249936 A1 | 10/2008 | Miller et al. |
| 2008/0255992 A1 | 10/2008 | Lin |
| 2008/0263013 A1 | 10/2008 | Hopkins |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0270304 A1 | 10/2008 | Brown |
| 2008/0275812 A1 | 11/2008 | Stone |
| 2008/0275816 A1 | 11/2008 | Hazlehurst |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0284586 A1 | 11/2008 | Chang |
| 2008/0288283 A1 | 11/2008 | Baldwin, Jr. et al. |
| 2008/0288299 A1 | 11/2008 | Schultz |
| 2008/0288400 A1 | 11/2008 | Panthaki et al. |
| 2008/0291932 A1 | 11/2008 | Mukherjee |
| 2008/0294501 A1 | 11/2008 | Rennich et al. |
| 2008/0294996 A1 | 11/2008 | Hunt et al. |
| 2008/0297602 A1 | 12/2008 | Chang |
| 2008/0301016 A1 | 12/2008 | Durvasula et al. |
| 2008/0306846 A1 | 12/2008 | Ferguson |
| 2008/0307063 A1 | 12/2008 | Caughey |
| 2008/0312969 A1 | 12/2008 | Raines et al. |
| 2008/0316010 A1 | 12/2008 | Chang |
| 2008/0319861 A1 | 12/2008 | Hopkins |
| 2008/0319889 A1 | 12/2008 | Hammad |
| 2008/0319896 A1 | 12/2008 | Carlson et al. |
| 2009/0006230 A1 | 1/2009 | Lyda et al. |
| 2009/0006582 A1 | 1/2009 | Daswani et al. |
| 2009/0007231 A1 | 1/2009 | Kaiser et al. |
| 2009/0012889 A1 | 1/2009 | Finch |
| 2009/0018986 A1 | 1/2009 | Alcorn et al. |
| 2009/0018996 A1 | 1/2009 | Hunt et al. |
| 2009/0024462 A1 | 1/2009 | Lin |
| 2009/0024484 A1 | 1/2009 | Walker et al. |
| 2009/0024485 A1 | 1/2009 | Haugen et al. |
| 2009/0030776 A1 | 1/2009 | Walker et al. |
| 2009/0037279 A1 | 2/2009 | Chockalingam et al. |
| 2009/0037332 A1 | 2/2009 | Cheung et al. |
| 2009/0043691 A1 | 2/2009 | Kasower |
| 2009/0043696 A1 | 2/2009 | Ornce et al. |
| 2009/0047992 A1 | 2/2009 | Ortiz et al. |
| 2009/0048957 A1 | 2/2009 | Celano |
| 2009/0048999 A1 | 2/2009 | Gupta et al. |
| 2009/0055287 A1 | 2/2009 | Chin |
| 2009/0055312 A1 | 2/2009 | Chin |
| 2009/0055322 A1 | 2/2009 | Bykov et al. |
| 2009/0055404 A1 | 2/2009 | Heiden et al. |
| 2009/0058676 A1 | 3/2009 | Orlosky |
| 2009/0063330 A1* | 3/2009 | Cerise ............... G06Q 20/102 705/38 |
| 2009/0064297 A1 | 3/2009 | Selgas et al. |
| 2009/0070148 A1 | 3/2009 | Skocic |
| 2009/0076950 A1 | 3/2009 | Chang et al. |
| 2009/0089190 A1 | 4/2009 | Girulat |
| 2009/0089193 A1 | 4/2009 | Palantin |
| 2009/0089205 A1 | 4/2009 | Bayne |
| 2009/0089869 A1 | 4/2009 | Varghese |
| 2009/0094156 A1 | 4/2009 | Wright et al. |
| 2009/0094237 A1 | 4/2009 | Churi et al. |
| 2009/0094675 A1 | 4/2009 | Powers |
| 2009/0098854 A1 | 4/2009 | Park et al. |
| 2009/0099941 A1 | 4/2009 | Berkowitz |
| 2009/0099960 A1 | 4/2009 | Robida et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112746 A1 | 4/2009 | Fong |
| 2009/0119116 A1 | 5/2009 | Steen |
| 2009/0119199 A1 | 5/2009 | Salahi |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0132312 A1 | 5/2009 | Reinheimer et al. |
| 2009/0132347 A1 | 5/2009 | Anderson et al. |
| 2009/0144160 A1 | 6/2009 | Haggerty et al. |
| 2009/0146879 A1 | 6/2009 | Chang |
| 2009/0147774 A1 | 6/2009 | Caughey |
| 2009/0157517 A1 | 6/2009 | Davis |
| 2009/0157564 A1 | 6/2009 | Cross |
| 2009/0157693 A1 | 6/2009 | Palahnuk |
| 2009/0158030 A1 | 6/2009 | Rasti |
| 2009/0164380 A1 | 6/2009 | Brown |
| 2009/0164582 A1 | 6/2009 | Dasgupta et al. |
| 2009/0164929 A1 | 6/2009 | Chen et al. |
| 2009/0171723 A1 | 7/2009 | Jenkins |
| 2009/0171817 A1 | 7/2009 | Cassis |
| 2009/0171838 A1 | 7/2009 | Liu et al. |
| 2009/0172788 A1 | 7/2009 | Veldula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0195377 A1 | 8/2009 | Chang |
| 2009/0198557 A1 | 8/2009 | Wang et al. |
| 2009/0198572 A1 | 8/2009 | Jurgens |
| 2009/0198602 A1 | 8/2009 | Wang et al. |
| 2009/0199094 A1 | 8/2009 | Jurgens et al. |
| 2009/0199294 A1 | 8/2009 | Schneider |
| 2009/0204435 A1 | 8/2009 | Gale |
| 2009/0204514 A1 | 8/2009 | Bhogal et al. |
| 2009/0204519 A1 | 8/2009 | Randell et al. |
| 2009/0204522 A1 | 8/2009 | Meyer et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0210886 A1 | 8/2009 | Bhojwani et al. |
| 2009/0216640 A1 | 8/2009 | Masi |
| 2009/0217342 A1 | 8/2009 | Nadler |
| 2009/0222375 A1 | 9/2009 | Choudhuri et al. |
| 2009/0222377 A1 | 9/2009 | Choudhuri et al. |
| 2009/0222379 A1 | 9/2009 | Choudhuri et al. |
| 2009/0222449 A1 | 9/2009 | Hom et al. |
| 2009/0222527 A1 | 9/2009 | Arconati et al. |
| 2009/0228295 A1 | 9/2009 | Lowy |
| 2009/0228392 A1 | 9/2009 | Pinson, III |
| 2009/0228918 A1 | 9/2009 | Rolff et al. |
| 2009/0228966 A1 | 9/2009 | Parfene et al. |
| 2009/0228990 A1 | 9/2009 | Chen et al. |

(56) References Cited

U.S. PATENT DOCUMENTS

| | | |
|---|---|---|
| 2009/0234665 A1 | 9/2009 | Conkel |
| 2009/0234775 A1 | 9/2009 | Whitney et al. |
| 2009/0234814 A1 | 9/2009 | Boerries et al. |
| 2009/0234876 A1 | 9/2009 | Schigel et al. |
| 2009/0240567 A1 | 9/2009 | Kinkead et al. |
| 2009/0240610 A1 | 9/2009 | Barsade |
| 2009/0240624 A1 | 9/2009 | James et al. |
| 2009/0244600 A1 | 10/2009 | Haycock et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0258334 A1 | 10/2009 | Pyne |
| 2009/0260064 A1 | 10/2009 | Mcdowell et al. |
| 2009/0271248 A1 | 10/2009 | Sherman et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0281816 A1 | 11/2009 | Houga et al. |
| 2009/0282479 A1 | 11/2009 | Smith et al. |
| 2009/0288012 A1 | 11/2009 | Hertel et al. |
| 2009/0289110 A1 | 11/2009 | Regen et al. |
| 2009/0292603 A1 | 11/2009 | Wallach |
| 2009/0292642 A1 | 11/2009 | Han |
| 2009/0299911 A1 | 12/2009 | Abrahams et al. |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0300668 A1 | 12/2009 | Campagna et al. |
| 2009/0307778 A1 | 12/2009 | Mardikar |
| 2009/0313562 A1 | 12/2009 | Appleyard et al. |
| 2009/0319294 A1 | 12/2009 | Phillips et al. |
| 2009/0319648 A1 | 12/2009 | Dutta et al. |
| 2009/0327054 A1 | 12/2009 | Yao et al. |
| 2009/0327108 A1 | 12/2009 | Swierz, III et al. |
| 2009/0327120 A1 | 12/2009 | Eze et al. |
| 2009/0327270 A1 | 12/2009 | Teevan et al. |
| 2009/0327487 A1 | 12/2009 | Olson et al. |
| 2010/0005024 A1 | 1/2010 | Schmitz et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0010993 A1 | 1/2010 | Hussey, Jr. et al. |
| 2010/0011428 A1 | 1/2010 | Atwood et al. |
| 2010/0023434 A1 | 1/2010 | Bond |
| 2010/0023440 A1 | 1/2010 | Fraser et al. |
| 2010/0023448 A1 | 1/2010 | Eze |
| 2010/0023506 A1 | 1/2010 | Sahni et al. |
| 2010/0025820 A1 | 2/2010 | Suekawa |
| 2010/0030578 A1 | 2/2010 | Siddique et al. |
| 2010/0030649 A1 | 2/2010 | Ubelhor |
| 2010/0030675 A1 | 2/2010 | Hanan et al. |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042537 A1 | 2/2010 | Smith et al. |
| 2010/0042539 A1 | 2/2010 | Dheer et al. |
| 2010/0042542 A1 | 2/2010 | Rose et al. |
| 2010/0042732 A1 | 2/2010 | Hopkins |
| 2010/0043055 A1 | 2/2010 | Baumgart |
| 2010/0049642 A1 | 2/2010 | Agisim et al. |
| 2010/0049643 A1 | 2/2010 | Mitchell et al. |
| 2010/0049803 A1 | 2/2010 | Ogilvie et al. |
| 2010/0063942 A1 | 3/2010 | Arnott et al. |
| 2010/0063993 A1 | 3/2010 | Higgins et al. |
| 2010/0076880 A1 | 3/2010 | Williams et al. |
| 2010/0076966 A1 | 3/2010 | Strutton et al. |
| 2010/0077483 A1 | 3/2010 | Stolfo et al. |
| 2010/0082445 A1 | 4/2010 | Hodge et al. |
| 2010/0082476 A1* | 4/2010 | Bowman ............... G06Q 10/10 705/38 |
| 2010/0083371 A1 | 4/2010 | Bennetts et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100480 A1 | 4/2010 | Altman et al. |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114766 A1 | 5/2010 | Gustin et al. |
| 2010/0114768 A1 | 5/2010 | Duke et al. |
| 2010/0114776 A1 | 5/2010 | Weller et al. |
| 2010/0122316 A1 | 5/2010 | Lyon |
| 2010/0122324 A1 | 5/2010 | Welingkar et al. |
| 2010/0122333 A1 | 5/2010 | Noe et al. |
| 2010/0125521 A1 | 5/2010 | Hanan et al. |
| 2010/0130172 A1 | 5/2010 | Vendrow et al. |
| 2010/0131396 A1 | 5/2010 | Roach |
| 2010/0136956 A1 | 6/2010 | Drachev et al. |
| 2010/0138314 A1 | 6/2010 | Li et al. |
| 2010/0145836 A1 | 6/2010 | Baker et al. |
| 2010/0153227 A1 | 6/2010 | Medvinsky et al. |
| 2010/0153278 A1 | 6/2010 | Farsedakis |
| 2010/0153290 A1 | 6/2010 | Duggan |
| 2010/0161466 A1 | 6/2010 | Gilder |
| 2010/0161486 A1 | 6/2010 | Liu et al. |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0214090 A1 | 8/2010 | Sartini et al. |
| 2010/0215270 A1 | 8/2010 | Manohar et al. |
| 2010/0217706 A1 | 8/2010 | Griffin et al. |
| 2010/0217837 A1 | 8/2010 | Ansari et al. |
| 2010/0223160 A1 | 9/2010 | Brown |
| 2010/0223168 A1 | 9/2010 | Haggerty et al. |
| 2010/0223184 A1 | 9/2010 | Perlman |
| 2010/0223192 A1 | 9/2010 | Levine et al. |
| 2010/0223211 A1 | 9/2010 | Johnson et al. |
| 2010/0228658 A1* | 9/2010 | Ketelsen ............ G06Q 30/0185 705/35 |
| 2010/0229245 A1 | 9/2010 | Singhal |
| 2010/0241535 A1 | 9/2010 | Nightengale et al. |
| 2010/0248681 A1 | 9/2010 | Phills |
| 2010/0250338 A1 | 9/2010 | Banerjee et al. |
| 2010/0250376 A1 | 9/2010 | Nandiraju |
| 2010/0250394 A1 | 9/2010 | Lin |
| 2010/0250410 A1 | 9/2010 | Song et al. |
| 2010/0250411 A1 | 9/2010 | Ogrodski |
| 2010/0250416 A1 | 9/2010 | Hazlehurst |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257234 A1 | 10/2010 | Caughey |
| 2010/0257577 A1 | 10/2010 | Grandison et al. |
| 2010/0258623 A1 | 10/2010 | Beemer et al. |
| 2010/0258625 A1 | 10/2010 | Stanfield et al. |
| 2010/0259373 A1 | 10/2010 | Chang |
| 2010/0262339 A1 | 10/2010 | Chang |
| 2010/0262606 A1 | 10/2010 | Bedolla et al. |
| 2010/0262932 A1 | 10/2010 | Pan |
| 2010/0268557 A1 | 10/2010 | Faith et al. |
| 2010/0268660 A1 | 10/2010 | Ekdahl |
| 2010/0274815 A1 | 10/2010 | Vanasco |
| 2010/0280914 A1 | 11/2010 | Carlson |
| 2010/0280944 A1 | 11/2010 | Low et al. |
| 2010/0281020 A1 | 11/2010 | Drubner |
| 2010/0293090 A1 | 11/2010 | Domenikos et al. |
| 2010/0299186 A1 | 11/2010 | Cameo et al. |
| 2010/0299251 A1 | 11/2010 | Thomas |
| 2010/0299252 A1 | 11/2010 | Thomas |
| 2010/0299260 A1 | 11/2010 | Thomas |
| 2010/0306103 A1 | 12/2010 | Hankins et al. |
| 2010/0306834 A1 | 12/2010 | Grandison et al. |

(56) References Cited

U.S. PATENT DOCUMENTS

| | | |
|---|---|---|
| 2010/0312691 A1 | 12/2010 | Johnson, Jr. |
| 2010/0318460 A1 | 12/2010 | Stewart et al. |
| 2010/0323446 A1 | 12/2010 | Barnett et al. |
| 2010/0324986 A1 | 12/2010 | Thomas |
| 2010/0324999 A1 | 12/2010 | Conway et al. |
| 2010/0325036 A1 | 12/2010 | Thomas |
| 2010/0325045 A1 | 12/2010 | Johnson |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0004514 A1 | 1/2011 | Thomas |
| 2011/0004546 A1 | 1/2011 | Thomas |
| 2011/0010283 A1 | 1/2011 | Williams |
| 2011/0022515 A1 | 1/2011 | Tallitsch et al. |
| 2011/0022516 A1 | 1/2011 | Gao et al. |
| 2011/0023115 A1 | 1/2011 | Wright |
| 2011/0029388 A1 | 2/2011 | Kendall et al. |
| 2011/0029427 A1 | 2/2011 | Haggerty et al. |
| 2011/0029566 A1 | 2/2011 | Grandison et al. |
| 2011/0029660 A1 | 2/2011 | Hopkins |
| 2011/0035305 A1 | 2/2011 | Imrey et al. |
| 2011/0035315 A1 | 2/2011 | Langley |
| 2011/0035452 A1 | 2/2011 | Gittleman |
| 2011/0040629 A1 | 2/2011 | Chiu et al. |
| 2011/0047606 A1 | 2/2011 | Blomquist |
| 2011/0060654 A1 | 3/2011 | Elliott et al. |
| 2011/0060673 A1 | 3/2011 | Delinsky et al. |
| 2011/0066495 A1 | 3/2011 | Ayloo et al. |
| 2011/0066618 A1 | 3/2011 | Sigurbjornsson et al. |
| 2011/0066695 A1 | 3/2011 | Hopkins |
| 2011/0071950 A1 | 3/2011 | Ivanovic |
| 2011/0078073 A1 | 3/2011 | Annappindi et al. |
| 2011/0082733 A1 | 4/2011 | Goldman et al. |
| 2011/0082736 A1 | 4/2011 | Goldman et al. |
| 2011/0082788 A1 | 4/2011 | Itwaru |
| 2011/0083181 A1 | 4/2011 | Nazarov |
| 2011/0093387 A1 | 4/2011 | Fuerstenberg et al. |
| 2011/0107400 A1 | 5/2011 | Shankaranarayanan et al. |
| 2011/0112851 A1 | 5/2011 | Poley |
| 2011/0112899 A1 | 5/2011 | Strutton et al. |
| 2011/0112919 A1 | 5/2011 | Gray |
| 2011/0113084 A1 | 5/2011 | Ramnani |
| 2011/0113086 A1 | 5/2011 | Long et al. |
| 2011/0119169 A1 | 5/2011 | Passero et al. |
| 2011/0119182 A1 | 5/2011 | Smolkin |
| 2011/0125632 A1 | 5/2011 | Neel |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0136468 A1 | 6/2011 | McNamara et al. |
| 2011/0137760 A1 | 6/2011 | Rudie et al. |
| 2011/0137765 A1 | 6/2011 | Nonaka |
| 2011/0137924 A1 | 6/2011 | Hunt et al. |
| 2011/0142213 A1 | 6/2011 | Baniak et al. |
| 2011/0143711 A1 | 6/2011 | Hirson et al. |
| 2011/0145049 A1 | 6/2011 | Hertel et al. |
| 2011/0145064 A1 | 6/2011 | Anderson et al. |
| 2011/0145899 A1 | 6/2011 | Cao et al. |
| 2011/0148625 A1 | 6/2011 | Velusamy |
| 2011/0161218 A1 | 6/2011 | Swift |
| 2011/0166889 A1 | 7/2011 | Bain |
| 2011/0166988 A1 | 7/2011 | Coulter |
| 2011/0167011 A1 | 7/2011 | Paltenghe et al. |
| 2011/0173116 A1 | 7/2011 | Yan et al. |
| 2011/0178841 A1 | 7/2011 | Rane et al. |
| 2011/0178860 A1 | 7/2011 | Imrey et al. |
| 2011/0178899 A1 | 7/2011 | Huszar |
| 2011/0179139 A1 | 7/2011 | Starkenburg et al. |
| 2011/0184780 A1 | 7/2011 | Alderson et al. |
| 2011/0184863 A1 | 7/2011 | Coleman et al. |
| 2011/0191196 A1 | 8/2011 | Orr et al. |
| 2011/0191209 A1 | 8/2011 | Gould et al. |
| 2011/0191241 A1 | 8/2011 | Blain et al. |
| 2011/0193704 A1 | 8/2011 | Harper et al. |
| 2011/0196791 A1 | 8/2011 | Dominguez |
| 2011/0196795 A1 | 8/2011 | Pointer |
| 2011/0208601 A1 | 8/2011 | Ferguson et al. |
| 2011/0208659 A1 | 8/2011 | Easterly et al. |
| 2011/0211445 A1 | 9/2011 | Chen |
| 2011/0213670 A1 | 9/2011 | Strutton et al. |
| 2011/0214187 A1 | 9/2011 | Wittenstein et al. |
| 2011/0218863 A1 | 9/2011 | Roh et al. |
| 2011/0243406 A1 | 10/2011 | Chandler |
| 2011/0246244 A1 | 10/2011 | O'Rourke |
| 2011/0246361 A1 | 10/2011 | Geering |
| 2011/0251953 A1 | 10/2011 | Trende et al. |
| 2011/0252071 A1 | 10/2011 | Cidon |
| 2011/0258001 A1 | 10/2011 | Green et al. |
| 2011/0264531 A1 | 10/2011 | Bhatia et al. |
| 2011/0264566 A1 | 10/2011 | Brown |
| 2011/0264581 A1 | 10/2011 | Clyne |
| 2011/0264582 A1 | 10/2011 | Kim et al. |
| 2011/0270618 A1 | 11/2011 | Banerjee et al. |
| 2011/0270749 A1 | 11/2011 | Bennett et al. |
| 2011/0270754 A1 | 11/2011 | Kelly et al. |
| 2011/0271329 A1 | 11/2011 | Hulten et al. |
| 2011/0276382 A1 | 11/2011 | Ramchandani et al. |
| 2011/0276396 A1 | 11/2011 | Rathod |
| 2011/0276604 A1 | 11/2011 | Hom et al. |
| 2011/0282711 A1 | 11/2011 | Freishtat et al. |
| 2011/0282779 A1 | 11/2011 | Megdal et al. |
| 2011/0282783 A1 | 11/2011 | Ferguson et al. |
| 2011/0282943 A1 | 11/2011 | Anderson et al. |
| 2011/0288973 A1 | 11/2011 | Pazdziora et al. |
| 2011/0289151 A1 | 11/2011 | Hopkins |
| 2011/0289209 A1 | 11/2011 | Hopkins |
| 2011/0295662 A1 | 12/2011 | Harris |
| 2011/0295733 A1 | 12/2011 | Megdal et al. |
| 2011/0295750 A1 | 12/2011 | Rammal |
| 2011/0296003 A1 | 12/2011 | McCann et al. |
| 2011/0302055 A1 | 12/2011 | Drake |
| 2011/0302067 A1 | 12/2011 | Washington |
| 2011/0302122 A1 | 12/2011 | Klein et al. |
| 2011/0302653 A1 | 12/2011 | Frantz et al. |
| 2011/0307397 A1 | 12/2011 | Benmbarek |
| 2011/0307434 A1 | 12/2011 | Rostampour et al. |
| 2011/0307474 A1 | 12/2011 | Hom et al. |
| 2011/0307494 A1 | 12/2011 | Snow |
| 2011/0307938 A1 | 12/2011 | Reeves, Jr. et al. |
| 2011/0307957 A1 | 12/2011 | Barcelo et al. |
| 2011/0313915 A1 | 12/2011 | Tang |
| 2011/0313921 A1 | 12/2011 | Dheer et al. |
| 2011/0314100 A1 | 12/2011 | Hopkins |
| 2011/0314383 A1 | 12/2011 | Abdo et al. |
| 2011/0320582 A1 | 12/2011 | Lewis |
| 2011/0321137 A1 | 12/2011 | Lida et al. |
| 2012/0005070 A1 | 1/2012 | McFall et al. |
| 2012/0005221 A1 | 1/2012 | Lckman et al. |
| 2012/0005542 A1 | 1/2012 | Petersen et al. |
| 2012/0010927 A1 | 1/2012 | Attenberg et al. |
| 2012/0011027 A1 | 1/2012 | Okuyama |
| 2012/0011063 A1 | 1/2012 | Killian et al. |
| 2012/0011158 A1 | 1/2012 | Avner et al. |
| 2012/0011432 A1 | 1/2012 | Strutton |
| 2012/0015717 A1 | 1/2012 | Mosites et al. |
| 2012/0016800 A1 | 1/2012 | Stewart et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0036065 A1 | 2/2012 | Orttung et al. |
| 2012/0036127 A1 | 2/2012 | Work et al. |
| 2012/0036565 A1 | 2/2012 | Gamez et al. |
| 2012/0041879 A1 | 2/2012 | Kim et al. |
| 2012/0042237 A1 | 2/2012 | Armandpour et al. |
| 2012/0046974 A1 | 2/2012 | Eshleman et al. |
| 2012/0047174 A1 | 2/2012 | Avner et al. |
| 2012/0047219 A1 | 2/2012 | Feng et al. |
| 2012/0054088 A1 | 3/2012 | Edrington et al. |
| 2012/0054224 A1 | 3/2012 | Eskin |
| 2012/0054592 A1 | 3/2012 | Jaffe et al. |
| 2012/0060105 A1 | 3/2012 | Brown et al. |
| 2012/0066044 A1 | 3/2012 | Honnef et al. |
| 2012/0066046 A1 | 3/2012 | Satyavolu et al. |

(56) References Cited

U.S. PATENT DOCUMENTS

| | | |
|---|---|---|
| 2012/0066050 A1 | 3/2012 | Satyavolu et al. |
| 2012/0066106 A1 | 3/2012 | Papadimitriou |
| 2012/0066119 A1 | 3/2012 | Carion |
| 2012/0072338 A1 | 3/2012 | Sorbe |
| 2012/0072382 A1 | 3/2012 | Pearson et al. |
| 2012/0078764 A1 | 3/2012 | Ross et al. |
| 2012/0078781 A1 | 3/2012 | Ross et al. |
| 2012/0084162 A1 | 4/2012 | Smith et al. |
| 2012/0084210 A1 | 4/2012 | Farahmand |
| 2012/0084866 A1 | 4/2012 | Stolfo |
| 2012/0089438 A1 | 4/2012 | Tavares et al. |
| 2012/0089521 A1 | 4/2012 | Abrevaya et al. |
| 2012/0101938 A1 | 4/2012 | Kasower |
| 2012/0101939 A1 | 4/2012 | Kasower |
| 2012/0109752 A1 | 5/2012 | Strutton et al. |
| 2012/0110467 A1 | 5/2012 | Blake et al. |
| 2012/0110677 A1 | 5/2012 | Abendroth et al. |
| 2012/0116913 A1 | 5/2012 | Goolkasian |
| 2012/0116951 A1 | 5/2012 | Chung et al. |
| 2012/0116963 A1 | 5/2012 | Klein et al. |
| 2012/0116969 A1 | 5/2012 | Kumar et al. |
| 2012/0123931 A1 | 5/2012 | Megdal et al. |
| 2012/0124033 A1 | 5/2012 | Gabriel et al. |
| 2012/0124498 A1 | 5/2012 | Santoro et al. |
| 2012/0130785 A1 | 5/2012 | Postrel |
| 2012/0131009 A1 | 5/2012 | Nath et al. |
| 2012/0131656 A1 | 5/2012 | Slaton et al. |
| 2012/0135705 A1 | 5/2012 | Thaker |
| 2012/0136699 A1 | 5/2012 | Martin et al. |
| 2012/0136763 A1 | 5/2012 | Megdal et al. |
| 2012/0136774 A1 | 5/2012 | Imrey et al. |
| 2012/0136780 A1 | 5/2012 | El-Awady et al. |
| 2012/0143767 A1 | 6/2012 | Abadir |
| 2012/0143772 A1 | 6/2012 | Abadir |
| 2012/0144461 A1 | 6/2012 | Rathbun |
| 2012/0150736 A1 | 6/2012 | Dickerson et al. |
| 2012/0151045 A1 | 6/2012 | Anakata et al. |
| 2012/0151046 A1 | 6/2012 | Weiss et al. |
| 2012/0158654 A1 | 6/2012 | Behren et al. |
| 2012/0166264 A1 | 6/2012 | Shum et al. |
| 2012/0173339 A1 | 7/2012 | Flynt et al. |
| 2012/0173396 A1 | 7/2012 | Melby et al. |
| 2012/0173417 A1 | 7/2012 | Lohman et al. |
| 2012/0179605 A1 | 7/2012 | Blain et al. |
| 2012/0185515 A1 | 7/2012 | Ferrel et al. |
| 2012/0191602 A1 | 7/2012 | Wright et al. |
| 2012/0191693 A1 | 7/2012 | Alexander |
| 2012/0195412 A1 | 8/2012 | Smith |
| 2012/0197788 A1 | 8/2012 | Sanghvi et al. |
| 2012/0198556 A1 | 8/2012 | Patel et al. |
| 2012/0203680 A1 | 8/2012 | Wehunt et al. |
| 2012/0203693 A1 | 8/2012 | Morgan et al. |
| 2012/0203696 A1 | 8/2012 | Morgan et al. |
| 2012/0203733 A1 | 8/2012 | Zhang |
| 2012/0208495 A1 | 8/2012 | Lawson et al. |
| 2012/0209766 A1 | 8/2012 | Kitchen et al. |
| 2012/0215682 A1 | 8/2012 | Lent et al. |
| 2012/0215690 A1 | 8/2012 | Grinberg et al. |
| 2012/0215719 A1 | 8/2012 | Verlander |
| 2012/0216125 A1 | 8/2012 | Pierce |
| 2012/0221467 A1 | 8/2012 | Hamzeh |
| 2012/0233066 A1 | 9/2012 | Vallabhaneni |
| 2012/0235897 A1 | 9/2012 | Hirota |
| 2012/0239417 A1 | 9/2012 | Pourfallah et al. |
| 2012/0239497 A1 | 9/2012 | Nuzzi |
| 2012/0239553 A1 | 9/2012 | Gonen et al. |
| 2012/0239560 A1 | 9/2012 | Pourfallah et al. |
| 2012/0240223 A1 | 9/2012 | Tu |
| 2012/0246048 A1 | 9/2012 | Cohen et al. |
| 2012/0246060 A1 | 9/2012 | Conyack, Jr. et al. |
| 2012/0253852 A1 | 10/2012 | Pourfallah et al. |
| 2012/0254018 A1 | 10/2012 | Davies et al. |
| 2012/0259763 A1 | 10/2012 | Pessin |
| 2012/0262472 A1 | 10/2012 | Garr et al. |
| 2012/0265661 A1 | 10/2012 | Megdal et al. |
| 2012/0271712 A1 | 10/2012 | Katzin et al. |
| 2012/0278217 A1 | 11/2012 | Sui et al. |
| 2012/0278226 A1 | 11/2012 | Kolo |
| 2012/0278767 A1 | 11/2012 | Stibel et al. |
| 2012/0290451 A1 | 11/2012 | Jones et al. |
| 2012/0290660 A1 | 11/2012 | Rao et al. |
| 2012/0290740 A1 | 11/2012 | Tewari et al. |
| 2012/0295583 A1 | 11/2012 | Kim et al. |
| 2012/0297484 A1 | 11/2012 | Srivastava |
| 2012/0310825 A1 | 12/2012 | Freishtat et al. |
| 2012/0311433 A1 | 12/2012 | Pasupulati et al. |
| 2012/0317005 A1 | 12/2012 | Hutson et al. |
| 2012/0317013 A1 | 12/2012 | Luk et al. |
| 2012/0317014 A1 | 12/2012 | Cerise et al. |
| 2012/0321202 A1 | 12/2012 | Fertik et al. |
| 2012/0323775 A1 | 12/2012 | Weinstein et al. |
| 2012/0324388 A1 | 12/2012 | Rao et al. |
| 2012/0330689 A1 | 12/2012 | McLaughlin et al. |
| 2013/0006782 A1 | 1/2013 | Schwarzkopf et al. |
| 2013/0006825 A1 | 1/2013 | Robida et al. |
| 2013/0006843 A1 | 1/2013 | Tralvex |
| 2013/0006844 A1 | 1/2013 | Kremen |
| 2013/0007012 A1 | 1/2013 | Selkowe Fertik et al. |
| 2013/0007014 A1 | 1/2013 | Fertik et al. |
| 2013/0013501 A1 | 1/2013 | Perlman |
| 2013/0013533 A1 | 1/2013 | Agarwal et al. |
| 2013/0018785 A1 | 1/2013 | Dolphin et al. |
| 2013/0018798 A1 | 1/2013 | Scipioni |
| 2013/0018811 A1 | 1/2013 | Britti et al. |
| 2013/0018838 A1 | 1/2013 | Parnaby et al. |
| 2013/0018877 A1 | 1/2013 | Gabriel et al. |
| 2013/0018892 A1 | 1/2013 | Castellanos et al. |
| 2013/0018957 A1 | 1/2013 | Parnaby et al. |
| 2013/0024520 A1 | 1/2013 | Siminoff |
| 2013/0024813 A1 | 1/2013 | Schnorr et al. |
| 2013/0030826 A1 | 1/2013 | Blom |
| 2013/0030994 A1 | 1/2013 | Calman et al. |
| 2013/0030996 A1 | 1/2013 | MacKouse |
| 2013/0031109 A1 | 1/2013 | Roulson et al. |
| 2013/0031624 A1 | 1/2013 | Britti et al. |
| 2013/0036000 A1 | 2/2013 | Giordano et al. |
| 2013/0036046 A1 | 2/2013 | Rom et al. |
| 2013/0036466 A1 | 2/2013 | Penta et al. |
| 2013/0040619 A1 | 2/2013 | Grube et al. |
| 2013/0041798 A1 | 2/2013 | Unger |
| 2013/0041810 A1 | 2/2013 | Murrell et al. |
| 2013/0041949 A1 | 2/2013 | Biesecker et al. |
| 2013/0043305 A1 | 2/2013 | Zhou et al. |
| 2013/0054345 A1 | 2/2013 | Ross et al. |
| 2013/0054357 A1 | 2/2013 | Mager et al. |
| 2013/0054393 A1 | 2/2013 | Francisco et al. |
| 2013/0054452 A1 | 2/2013 | Au et al. |
| 2013/0060694 A1 | 3/2013 | Oskolkov et al. |
| 2013/0066716 A1 | 3/2013 | Chen et al. |
| 2013/0066775 A1 | 3/2013 | Milam |
| 2013/0066884 A1 | 3/2013 | Kast et al. |
| 2013/0066922 A1 | 3/2013 | Jang et al. |
| 2013/0067582 A1 | 3/2013 | Donovan et al. |
| 2013/0073366 A1 | 3/2013 | Heath |
| 2013/0073445 A1 | 3/2013 | Meszaros |
| 2013/0073457 A1 | 3/2013 | Sander et al. |
| 2013/0080322 A1 | 3/2013 | Adolphe |
| 2013/0080467 A1 | 3/2013 | Carson et al. |
| 2013/0085804 A1 | 4/2013 | Leff et al. |
| 2013/0085894 A1 | 4/2013 | Chan et al. |
| 2013/0085936 A1 | 4/2013 | Law et al. |
| 2013/0085939 A1 | 4/2013 | Colak et al. |
| 2013/0086075 A1 | 4/2013 | Scott et al. |
| 2013/0090982 A1 | 4/2013 | Ross |
| 2013/0095810 A1 | 4/2013 | Moreton et al. |
| 2013/0103464 A1 | 4/2013 | Kuznetsov |
| 2013/0103571 A1 | 4/2013 | Chung et al. |
| 2013/0103580 A1 | 4/2013 | Ventura |
| 2013/0104216 A1 | 4/2013 | Dennis et al. |
| 2013/0110557 A1 | 5/2013 | Kasower |
| 2013/0110565 A1 | 5/2013 | Means et al. |
| 2013/0110668 A1 | 5/2013 | Hart et al. |
| 2013/0111436 A1 | 5/2013 | Phan et al. |
| 2013/0117072 A1 | 5/2013 | Nish |

(56) References Cited

U.S. PATENT DOCUMENTS

| | | |
|---|---|---|
| 2013/0117087 A1 | 5/2013 | Coppinger |
| 2013/0117177 A1 | 5/2013 | MacMillan et al. |
| 2013/0124406 A1 | 5/2013 | Poplawski et al. |
| 2013/0125010 A1 | 5/2013 | Strandell |
| 2013/0130778 A1 | 5/2013 | Anderson et al. |
| 2013/0132151 A1 | 5/2013 | Stibel et al. |
| 2013/0132181 A1 | 5/2013 | Fisher |
| 2013/0132219 A1 | 5/2013 | Liberty |
| 2013/0132235 A1 | 5/2013 | Gandhi |
| 2013/0132245 A1 | 5/2013 | Hsieh et al. |
| 2013/0138494 A1 | 5/2013 | Levine |
| 2013/0159411 A1 | 6/2013 | Bowen |
| 2013/0173447 A1 | 7/2013 | Rothschild |
| 2013/0173449 A1 | 7/2013 | Ng et al. |
| 2013/0173451 A1 | 7/2013 | Kornegay et al. |
| 2013/0173463 A1 | 7/2013 | Stewart et al. |
| 2013/0173465 A1 | 7/2013 | Talimaa et al. |
| 2013/0173468 A1 | 7/2013 | Ross |
| 2013/0173481 A1 | 7/2013 | Hirtenstein et al. |
| 2013/0179312 A1 | 7/2013 | Al-Hilali |
| 2013/0179332 A1 | 7/2013 | Allen et al. |
| 2013/0179337 A1 | 7/2013 | Ochynski |
| 2013/0179348 A1 | 7/2013 | Crofts et al. |
| 2013/0185205 A1 | 7/2013 | Boss et al. |
| 2013/0185210 A1 | 7/2013 | Dodson et al. |
| 2013/0185293 A1 | 7/2013 | Boback |
| 2013/0187923 A1 | 7/2013 | Yoshimoto et al. |
| 2013/0191231 A1 | 7/2013 | Gazdzinski |
| 2013/0191261 A1 | 7/2013 | Chandler et al. |
| 2013/0191270 A1 | 7/2013 | Carragher |
| 2013/0191272 A1 | 7/2013 | Cochran et al. |
| 2013/0191278 A1 | 7/2013 | O'Leary et al. |
| 2013/0198066 A1 | 8/2013 | Wall et al. |
| 2013/0198514 A1 | 8/2013 | Grinberg et al. |
| 2013/0204745 A1 | 8/2013 | Martin |
| 2013/0204753 A1 | 8/2013 | Wallace |
| 2013/0204762 A1 | 8/2013 | Harris et al. |
| 2013/0205135 A1 | 8/2013 | Lutz |
| 2013/0211986 A1 | 8/2013 | Debie et al. |
| 2013/0212016 A1 | 8/2013 | Davis et al. |
| 2013/0212187 A1 | 8/2013 | Mortazavi et al. |
| 2013/0226784 A1 | 8/2013 | He et al. |
| 2013/0246254 A1 | 9/2013 | Crooks |
| 2013/0254049 A1 | 9/2013 | Todd |
| 2013/0262226 A1 | 10/2013 | LaChapelle et al. |
| 2013/0262291 A1 | 10/2013 | Ricci |
| 2013/0267171 A1 | 10/2013 | Sarkar et al. |
| 2013/0268378 A1 | 10/2013 | Yovin |
| 2013/0268434 A1 | 10/2013 | Mohsenzadeh |
| 2013/0275294 A1 | 10/2013 | Liu et al. |
| 2013/0278515 A1 | 10/2013 | Kikuchi |
| 2013/0279676 A1 | 10/2013 | Baniak et al. |
| 2013/0282819 A1 | 10/2013 | Mehta et al. |
| 2013/0290164 A1 | 10/2013 | Salm |
| 2013/0293363 A1 | 11/2013 | Plymouth |
| 2013/0297485 A1 | 11/2013 | Whitney |
| 2013/0297499 A1 | 11/2013 | Mukherjee |
| 2013/0298238 A1 | 11/2013 | Shah et al. |
| 2013/0304596 A1 | 11/2013 | Munif |
| 2013/0317954 A1 | 11/2013 | Psota et al. |
| 2013/0332338 A1 | 12/2013 | Yan et al. |
| 2013/0332341 A1 | 12/2013 | Papadimitriou |
| 2013/0332342 A1 | 12/2013 | Kasower |
| 2013/0332352 A1 | 12/2013 | Imrey et al. |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012734 A1 | 1/2014 | Megdal et al. |
| 2014/0012737 A1 | 1/2014 | Evans |
| 2014/0019333 A1 | 1/2014 | Morris et al. |
| 2014/0019348 A1 | 1/2014 | Daley |
| 2014/0032300 A1 | 1/2014 | Zhang et al. |
| 2014/0032723 A1 | 1/2014 | Nema |
| 2014/0046872 A1 | 2/2014 | Arnott et al. |
| 2014/0052732 A1 | 2/2014 | Softky |
| 2014/0061302 A1 | 3/2014 | Hammad |
| 2014/0074689 A1 | 3/2014 | Lund et al. |
| 2014/0081835 A1 | 3/2014 | Choudhuri et al. |
| 2014/0089166 A1 | 3/2014 | Padawer |
| 2014/0089167 A1 | 3/2014 | Kasower |
| 2014/0089191 A1 | 3/2014 | Brown |
| 2014/0096249 A1 | 4/2014 | Dupont et al. |
| 2014/0098142 A1 | 4/2014 | Lee et al. |
| 2014/0098229 A1 | 4/2014 | Lu et al. |
| 2014/0110477 A1 | 4/2014 | Hammad |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |
| 2014/0164398 A1 | 6/2014 | Smith et al. |
| 2014/0164519 A1 | 6/2014 | Shah |
| 2014/0180919 A1 | 6/2014 | Brown |
| 2014/0181285 A1 | 6/2014 | Stevens et al. |
| 2014/0237377 A1 | 8/2014 | Meissner |
| 2014/0258083 A1 | 9/2014 | Achanta et al. |
| 2014/0258084 A1 | 9/2014 | Padawer et al. |
| 2014/0258089 A1 | 9/2014 | Pearson et al. |
| 2014/0279329 A1 | 9/2014 | Dancel |
| 2014/0279382 A1 | 9/2014 | Drakeley et al. |
| 2014/0279391 A1 | 9/2014 | Gallo et al. |
| 2014/0298485 A1 | 10/2014 | Gardner |
| 2014/0310151 A1 | 10/2014 | Shishkov et al. |
| 2014/0317023 A1 | 10/2014 | Kim |
| 2014/0372367 A1* | 12/2014 | McLean ............... G06F 21/6218 707/603 |
| 2014/0379554 A1 | 12/2014 | Grossman et al. |
| 2015/0026014 A1 | 1/2015 | Kasower |
| 2015/0026060 A1 | 1/2015 | Krietzman et al. |
| 2015/0073929 A1 | 3/2015 | Psota et al. |
| 2015/0112874 A1 | 4/2015 | Serio et al. |
| 2015/0127490 A1 | 5/2015 | Puertas |
| 2015/0134506 A1 | 5/2015 | King et al. |
| 2015/0178829 A1 | 6/2015 | Weiss |
| 2015/0200948 A1* | 7/2015 | Cairns .................... G06F 21/44 726/4 |
| 2015/0228016 A1 | 8/2015 | Chandler |
| 2015/0302521 A1 | 10/2015 | Bartmann |
| 2015/0310543 A1 | 10/2015 | DeBie |
| 2015/0324920 A1 | 11/2015 | Wilson et al. |
| 2016/0125412 A1 | 5/2016 | Cannon |
| 2016/0224996 A1 | 8/2016 | Hunt et al. |
| 2017/0132700 A1 | 5/2017 | Kazerani et al. |
| 2017/0161486 A1* | 6/2017 | Jeon ...................... G06F 21/44 |
| 2017/0200223 A1 | 7/2017 | Kasower |
| 2017/0228820 A1 | 8/2017 | Rohn |
| 2017/0262758 A1 | 9/2017 | Boyapalle et al. |
| 2017/0262821 A1 | 9/2017 | Lmrey et al. |
| 2017/0323063 A1 | 11/2017 | Krause et al. |
| 2017/0323358 A1 | 11/2017 | Psota et al. |
| 2018/0040063 A1* | 2/2018 | Buechler ................ G06Q 20/10 |
| 2018/0082371 A1 | 3/2018 | Chandler |
| 2018/0218069 A1 | 8/2018 | Rege et al. |
| 2018/0225756 A1 | 8/2018 | Wasser et al. |
| 2018/0285886 A1 | 10/2018 | Yan et al. |
| 2018/0343265 A1 | 11/2018 | McMillan et al. |
| 2018/0349992 A1 | 12/2018 | Dean et al. |
| 2018/0365445 A1 | 12/2018 | Burger et al. |
| 2019/0102832 A1 | 4/2019 | Robida et al. |
| 2019/0156227 A1 | 5/2019 | Duke et al. |
| 2019/0197528 A1 | 6/2019 | Dean et al. |
| 2019/0197618 A1 | 6/2019 | Taylor et al. |
| 2019/0258818 A1 | 8/2019 | Yu et al. |
| 2019/0260843 A1 | 8/2019 | Dean et al. |
| 2019/0295165 A1 | 9/2019 | Kapczynski et al. |

FOREIGN PATENT DOCUMENTS

| | | |
|---|---|---|
| CN | 1290373 | 4/2001 |
| EP | 0 350 907 | 1/1990 |
| EP | 0 468 440 | 1/1992 |
| EP | 0 542 298 | 5/1993 |

(56) References Cited

FOREIGN PATENT DOCUMENTS

| | | |
|---|---|---|
| EP | 0 566 736 | 8/1993 |
| EP | 0 869 652 | 10/1998 |
| EP | 0 913 789 | 5/1999 |
| EP | 0 919 942 | 6/1999 |
| EP | 1 028 401 | 8/2000 |
| EP | 1 239 378 | 9/2002 |
| EP | 1 301 887 | 4/2003 |
| EP | 1 591 931 | 11/2005 |
| EP | 1 850 278 | 10/2007 |
| EP | 1 897 051 | 3/2008 |
| EP | 2 088 743 | 8/2009 |
| EP | 2 151 793 | 2/2010 |
| EP | 2 880 619 | 6/2015 |
| GB | 2 102 606 | 2/1983 |
| JP | 2001-282957 | 10/2001 |
| JP | 2002-163449 | 6/2002 |
| JP | 2003-016261 | 1/2003 |
| JP | 2003-316950 | 11/2003 |
| JP | 2005-208945 | 8/2005 |
| KR | 10-2000-0063313 | 11/2000 |
| KR | 10-2002-0039203 | 5/2002 |
| KR | 10-0638324 | 10/2006 |
| KR | 10-2007-0081504 | 8/2007 |
| MX | 2007-015510 | 4/2008 |
| TW | 256569 | 6/2006 |
| WO | WO 91/16691 | 10/1991 |
| WO | WO 99/046710 | 9/1999 |
| WO | WO 00/011574 | 3/2000 |
| WO | WO 00/051052 | 8/2000 |
| WO | WO 00/055778 | 9/2000 |
| WO | WO 01/009752 | 2/2001 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/057720 | 8/2001 |
| WO | WO 01/080053 | 10/2001 |
| WO | WO 01/084281 | 11/2001 |
| WO | WO 02/029636 | 4/2002 |
| WO | WO 2004/031986 | 4/2004 |
| WO | WO 2004/114160 | 12/2004 |
| WO | WO 2005/010683 | 2/2005 |
| WO | WO 2005/022348 | 3/2005 |
| WO | WO 2005/033979 | 4/2005 |
| WO | WO 2005/124619 | 12/2005 |
| WO | WO 2006/050278 | 5/2006 |
| WO | WO 2006/069199 | 6/2006 |
| WO | WO 2006/099492 | 9/2006 |
| WO | WO 2006/135451 | 12/2006 |
| WO | WO 2007/001394 | 1/2007 |
| WO | WO 2007/004158 | 1/2007 |
| WO | WO 2007/084555 | 7/2007 |
| WO | WO 2007/106393 | 9/2007 |
| WO | WO 2007/106786 | 9/2007 |
| WO | WO 2007/106787 | 9/2007 |
| WO | WO 2008/021104 | 2/2008 |
| WO | WO 2008/022289 | 2/2008 |
| WO | WO 2008/042614 | 4/2008 |
| WO | WO 2009/061342 | 5/2009 |
| WO | WO 2009/064694 | 5/2009 |
| WO | WO 2009/064840 | 5/2009 |
| WO | WO 2009/099448 | 8/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/129257 | 11/2010 |
| WO | WO 2010/150251 | 12/2010 |
| WO | WO 2011/005876 | 1/2011 |
| WO | WO 2014/022813 | 2/2014 |
| WO | WO 2018/144612 | 8/2018 |
| WO | WO 2019/103979 | 5/2019 |

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.
Abrahams, Steven W., "The New View in Mortgage Prepayments: Insight from Analysis at the Loan-By-Loan Level," The Journal of Fixed Income, Jun. 1997, vol. 7, No. 1, pp. 8-21.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
Apte, et al., "A Probabilistic Estimation Framework for Predictive Modeling Analytics," IBM Systems Journal, 2002, vol. 41, No. 3, pp. 438-448.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
ABC News Now:Money Matters, as broadcasted Nov. 15, 2005 with guest Todd Davis (CEO of Lifelock), pp. 6.
AISG's National Underwriting Database, A-PLUS, is Now the Largest in the Industry, Business Wire, Aug. 7, 1997.
Announcing TrueProfiler, http://web.archive.org/web/20021201123646/http://www.truecredit.com/index.asp, dated Dec. 1, 2002, 2 pages.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
"AT&T Expected to Turn Up Heat in Card Wars", American Banker, May 27, 1993, vol. 158, No. 101, pp. 3.
Avery et al., "Consumer Credit Scoring: Do Situational Circumstances Matter?", Journal of Banking & Finance, vol. 28, 2004, pp. 835-856.
Awoonor-Williams, Princess Josephine, Ph.D. "Gender and Credit: An Analysis of Women's Experience in the Credit Market", ProQuest Dissertations and Theses, 2004, pp. 148.
"Balance Transfers Offer Opportunities", Risk Credit Risk Management Report, Jan. 29, 1996, vol. 6, No. 2, pp. 2.
Bancroft, John, "Tools Help Managers with Risk Management," Real Estate Finance Today, May 26, 1997, pp. 11-12.
"Bank of America Direct Web-Based Network Adds Core Functionality to Meet Day-To-Day Treasury Needs", Business Wire, Oct. 25, 1999. pp. 2.
Barone, Robert P., "The Integrated Approach to Branch Service Delivery," American Banker, Aug. 6, 1991, http://www.highbeam.com/doc/1G1-11128400.html.
"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57, 60.
Bilotta, Caryn, "Understanding Credit Scores," Pittsburgh Post—Gazette, May 9, 2010.
BlueCava, "What We Do", http://www.bluecava.com/what-we-do/, printed Nov. 5, 2012 in 3 pages.
Brown et al., "ALCOD IDSS:Assisting the Australian Stock Market Surveillance Team's Review Process," Applied Artificial Intelligence Journal, Dec. 1, 1996, pp. 625-641.
Buxfer, http://www.buxfer.com/ printed Feb. 5, 2014 in 1 page.
Cantor, R. and Packer, F., "The Credit Rating Industry," FRBNY Quarterly Review, Summer-Fall, 1994, pp. 1-24.
"Chase Gets Positive," Bank Technology News, May 6, 2000, vol. 14, No. 5, p. 33.

(56) References Cited

OTHER PUBLICATIONS

Chatterjee et al., "Expenditure Patterns and Aggregate Consumer Behavior, Some Experiments with Australian and New Zealand Data", The Economic Record, vol. 70, No. 210, Sep. 1994, pp. 278-291.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
CISCO: What-If Simulator, http://www.ciscocredit.com/whatifsim.html printed Oct. 12, 2012 in 2 pages.
CISCO: Your Mortgage Credit Reporting Specialists, http://www.ciscocredit.com/cc_Services.html printed Oct. 12, 2012 in 4 pages.
"Cole Taylor Bank Chooses Integrated E-Banking/E-Payments/Reconciliation Solution From Fundtech", Business Wire, Oct. 21, 1999, pp. 2.
Comlounge.net, "plonesocial.auth.rpx" http://web.archive.org/web/20101026041841/http://comlounge.net/rpx as captured Oct. 26, 2010 in 9 pages.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.
CreditAnalyst, Digital Matrix Systems, as printed out Mar. 4, 2008, pp. 2.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
CreditToolkit, Digital Matrix Systems, as printed out Mar. 4, 2008, pp. 2.
CreditXpert, http://www.creditxpert.com/Products/individuals.asp printed Oct. 12, 2012 in 1 page.
"Credit Information Bureaus and 'CIBIL'", http://www.icicibank.com/cibil.html printed Aug. 22, 2012 in 3 pages.
CreditKarma: How Credit Karma Works, http://www.creditkarma.com/help/howitworks printed Oct. 12, 2012 in 2 pages.
Credit Source Online: The Secrets of Raising Your Credit Score, http://www.creditsourceonline.com/secrets-of-raising-your-credit-score.html printed Oct. 12, 2012 in 4 pages.
Collins, Michael J., "Exploring the Design of Financial Counseling for Mortgage Borrowers in Default," Journal of Family and Economic Issues, Springer Science+Business Media, Mar. 13, 2007, pp. 207-226.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
"Consumers Gain Immediate and Full Access to Credit Score Used by Majority of U.S. Lenders", PR Newswire, ProQuest Copy, Mar. 19, 2001, p. 1.
Credit Card Management, "Neural Nets Shoot for Jackpot," Dec. 1995, pp. 1-6.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Credit Risk Management Report, Potomac, Mar. 9, 1998, vol. 8, No. 4.
CreditXpert Inc., CreditXpert 3-Bureau Comparison™, 2002, pp. 5, http://web.archive.org/web/20030608171018/http://creditxpert.com/CreditXpert%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View-Experian on Jul. 7, 2003, http://www.creditxpert.com/cx_ess_app.pdf.
CreditXpert Inc., CreditXpert Essentials™, Advisor View—TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View—TransUnion on Oct. 10, 1999, pp. 6, http://www.creditxpert.com/cx_ess_app.pdf.
CreditXpert Inc., CreditXpert What-If Simulator™, 2002, pp. 8, http://web.archive.org/web/20030630132914/http://creditxpert.com/CreditXpert%20What-If%20Simulator(TM)%20sample.pdf.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
Dash, Julekha, "Java on the Street," Software Magazine, Oct. 1, 1997, vol. 17, No. 11, p. 2.
Dataman Group, "Summarized Credit Statistics," Aug. 22, 2001, http://web.archive.org/web/20010822113446/http://www.datamangroup.com/summarized_credit.asp.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
David, Alexander, "Controlling Information Premia by Repackaging Asset-Backed Securities," The Journal of Risk and Insurance, Dec. 1997, 26 pages.
Davis, Lisa, "Safety in Numbers," Business North Carolina, Sep. 1, 1995, vol. 15, No. 9, p. 24.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
Department of Real Estate, http://web.archive.org/web/20040619190012/http://www.dre.ca.gov/pubs_sub.htm, Jun. 19, 2004, in 5 pages.
Department of Real Estate, "Reference Book," http://web.archive.org/web/20041011063158/http://www.dre.ca.gov/pdf_docs/ref17.pdf, Jun. 18, 2004, Chapter 17, pp. 311-382.
Dillon et al., "Good Science", Marketing Research: A Magazine of Management & Applications TM, Winter 1997, vol. 9, No. 4; pp. 11.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumers%20in%20cross-border%20disputes..pdf.
Downing, Jr.; Richard, "Changes to the Credit Reporting Act," Mortgage Banking, Apr. 1, 1998, vol. 58, No. 7, pp. 82-85.
Ecredable: Discover your AMP Credit Rating™, http://www.ecredable.com/how-it-works/amp-credit-rating printed Oct. 12, 2012 in 2 pages.
eFunds Introduces QualiFileSM, Deluxe Corporation, eFunds Press Release and Product Launch, Sep. 23, 1999, Milwaukee, WI.
Elangovan, A.R., "Managerial Third-Party Dispute Intervention: A Prescriptive Model of Strategy Selection", Academy of Management, Oct. 1, 1995, vol. 20, No. 4, pp. 800-830.
Elliehausen et al., The Impact of Credit Counseling on Subsequent Borrower Behavior, The Journal of Consumer Affairs, Summer 2007, vol. 41, No. 1, pp. 1-28.
Equifax, "Business Status Alerts: User Guide", Jul. 2009, pp. 1-21.
Equifax: Consumer Bureau, http://www.equifax.co.in/financial-services/consumer_bureau/en_in#RiskScore printed Oct. 12, 2012 in 3 pages.
Equifax Consumer Credit Report http://www.equifax.com/home/, as retrieved on Sep. 17, 2008.

(56) References Cited

OTHER PUBLICATIONS

Equifax; "Equifax Credit Watch"; https://www.econsumer.equifax.co.uk/consumer/uk/sitepage.ehtml, dated Jun. 27, 2007 on www.archive.org.
"Equifax: Debt Wise™ Credit Monitoring Service," Product Review, http://www.mdmproofing.com/iym/reviews/equifax/debt-wise/, Jan. 2010, pp. 11.
Equifax; "Places", http://web.archive.org/web/20111111113930/http://www.equifax.com/places as archived Nov. 11, 2011 in 1 page.
Equifax; "Places", http://www.equifax.com/places/ as printed Nov. 16, 2015 in 1 page.
Equifax; "Welcome to Equifax Mobile", http://www.equifax.com/mobile/ as printed Mar. 18, 2011 in 2 pages.
Ettorre, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, p. 19.
Experian, http://www.experian.com/ printed Oct. 12, 2012 in 1 page.
Experian Announces PLUS Score; Experian Press Release dated Oct. 16, 2003; Experian Global Press Office.
Experian Consumer Credit Report http://www.experian.com/, as retrieved on Sep. 17, 2008.
"Experian Launches Portfolio Monitor—Owner NoticesSM", News Release, Feb. 2003, Costa Mesa, CA.
Experian-Scorex Announces New Credit Simulation Tool, PR Newswire, Costa Mesa, CA, Jun. 13, 2005.
Experian, Custom Strategist and Qualifile from Funds, 2000, in 2 pages.
Experian Information Solutions, Inc., Credit Trends: Access Credit Trending Information Instantly, http://kewaneecreditbureau.com/Credit.Trends.pdf, Aug. 2000, pp. 4.
Facebook, "Facebook helps you connect and share with the people in your life," www.facebook.com printed Nov. 16, 2010 in 1 page.
Fair Isaac Announces Integrated, End-to-End Collection and Recovery Solution, Business Wire, New York, Sep. 2, 2004, p. 1.
Fair Isaac Corporation, myFICO: Calculators: Credit Assessment, as printed Jun. 8, 2005 in 2 pages, http://www.myfico.com/CreditEducation/Calculators/CreditAssessment.aspx.
Fair Isaac Corporation, myFICO: Help: FICO Score Simulator, as printed Jun. 8, 2005 in 2 pages, http://www.myfico.com/Help/Simulator.aspx?fire=5.
Fair Isaac Corporation, myFICO: Products: Suze Orman's FICO Kit Platinum, as printed Jun. 8, 2005 in 4 pages, http://www.myfico.com/Products/FICOKit/Description.aspx.
Fair Isaac Corporation, myFICO: Products: Suze Orman's FICO® Kit Platinum: FICO Score Check, as printed Jun. 7, 2005 in 1 page, http://www.myfico.com/Products/FICOKit/Sample03.html.
Fair Isaac Corporation, myFICO: Products: Suze Orman's FICO®. Kit Platinum: Look for Errors, as printed Jun. 7, 2005 in 3 pages http://www.myfico.com/Products/FICOKit/Sample02.html.
Fair Isaac Corporation, myFICO: Products:Suze Orman's FICO® Kit Platinum: Your FICO Score, as printed Jun. 7, 2005 in 1 page, http://www.mvfico.com/Products/FICOKit/Sample01.html.
Fair Isaac Corporation, myFICO: Sample: FICO Score Simulator, as printed Jun. 8, 2005 in 5 pages, http://www.rnyfico.com/Content/Samples/Sample_ScoreSimulator.asp.
Fair Isaac Corporation, myFICO: Sample: FICO Score Simulator: Max Out All Your Credit Cards, as printed Jun. 8, 2005 in 2 pages, http://www.myfico.com/Content/Samples/Sample_ScoreSimulatorResults.asp?Simulation=4&ReportID=1&productID=&Execute.x=105&Execute.y=23.
Fair Isaac Corporation, myFICO: Sample: FICO Score Simulator: Miss Payments on All Accounts With a Payment Due, as printed Jun. 8, 2005 in 2 pages, http://www.myfico.com/Content/Samples/Sample_ScoreSimulatorResults.asp?miss_payment=radiobutton&Simulation=2&ReportID=1&ProductID=&Execute.x81&Execute.y=28>.
Fair Isaac Corporation, myFICO: Sample: FICO Score Simulator: Pay Down Delinquent Balances First, as printed Jun. 8, 2005 in 2 pages, http://www.myfico.com/Content/Samples/Sample_ScoreSimulatorResults.asp?textfieldCC=750&Simulation=7&ReportID=1&ProductID=&PayDelinquent.x=78&PayDelinquent.y=30.
Fair Isaac Corporation, myFICO: Sample: FICO Score Simulator: Pay Down the Balances on All Your Credit Cards, as printed Jun. 8, 2005 in 2 pages, http://www.myfico.com/Content/Samples/Sample_ScoreSimulatorResults.asp?textfieldCC1=750&SelectMonths=1&PayOption=radiobutton&textfieldCC=750&Simulation=3&ReportID=1&ProductID=&Execute.x=57&Execute.y=22.
Fair Isaac Corporation, myFICO: Sample: FICO Score Simulator: Pay Your Bills on Time, as printed Jun. 8, 2005 in 2 pages, http://www.myfico.com/Content/Samples/Sample_ScoreSimulatorResults.asp?select1=1&Simulation=1&ReportID=1&ProductID=&PayBillsOnTime.x=93&PayBillsOnTime.y=23.
Fair Isaac Corporation, myFICO: Sample: FICO Score Simulator: Seek New Credit, as printed Jun. 8, 2005 in 2 pages, http://www.myfico.com/Content/Samples/Sample_ScoreSimulatorResults.asp?new_credit=radiobutton&textfield5A=3000&tectfield5B=&textfield5C=&Simulation=5&ReportID=1&ProductID=&NewCredit.x=62&NewCredit.y=20.
Fair Isaac Corporation, myFICO: Sample: FICO Score Simulator: Suggested Best Action, as printed Jun. 8, 2005 in 2 pages, http://www.myfico.com/Content/Samples/Sample_ScoreSimulatorResults.asp?Simulation=111&ReportID=1&ProductID=&TopAction.x=66&TopAction.y=16.
Fair Isaac Corporation, myFICO: Sample: FICO Score Simulator: Transfer Credit Card Balances, as printed Jun. 8, 2005 in 2 pages, http://www.myfico.com/Content/Samples/Sample_ScoreSimulatorResults.asp?textfield222=5000&Simulation=6&ReportID=1&ProductID=&TransferBalance.x=86&TransferBalance.y=24.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
Fickenscher, Lisa, "Merchant American Express Seeks to Mine its Data on Cardholder Spending Patterns," American Banker, vol. 162, Issue 56, Mar. 24, 1997, pp. 1-2.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
Financial Engines, http://corp.financialengines.com/ printed Oct. 12, 2012 in 1 page.
Fisher, Joseph, "Access to Fair Credit Reports: Current Practices and Proposed Legislation," American Business Law Journal, Fall 1981, vol. 19, No. 3, p. 319.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
Forrest, David, "Achieving Perfect Credit—Lesson 3: Assessing Your Situation," http://www.fool.com/seminars/ev/index.htm?sid=0029&lid=300, 2002, copyright 1995-2002, in 7 pages.
Frank, John, "Scoring Takes on a New Meaning," Credit Card Management, Sep. 1996, vol. 9, No. 6, pp. 155-159.
"Fraud Alert | Learn How". Fight Identity Theft. http://www.fightidentitytheft.com/flag.html, accessed on Nov. 5, 2009.
"FTC Testifies: Identity Theft on the Rise", FTC News Release, Mar. 7, 2000, pp. 3.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
GAO-03-661, Best Practices: Improved Knowledge of DOD Service Contracts Could Reveal Significant Savings, GAO, Jun. 2003.
Gibbs, Adrienne; "Protecting Your Children from Identity Theft," Nov. 25, 2008, http://www.creditcards.com/credit-card-news/identity-ID-theft-and-kids-children-1282.php, pp. 4.

(56) References Cited

OTHER PUBLICATIONS

Gilje, Shelby, "Keeping Tabs on Businesses That Keep Tabs on Us", NewsRoom, The Seattle Times, Section: Scene, Apr. 19, 1995, pp. 4.
Giudici, Paolo, "Bayesian Data Mining, with Application to Benchmarking and Credit Scoring," Applied Stochastic Models in Business and Industry, 2001, vol. 17, pp. 69-81.
"GLBA Compliance and FFFIEC Compliance" http://www.trustwave.com/financial-services.php printed Apr. 8, 2013 in 1 page.
Gopalan, R., "Panning for Sales-Force Gold", Intelligent Enterprise, Dec. 21, 1999, vol. 2, No. 18, pp. 38-43.
Gordon et al., "Identity Fraud: A Critical National and Global Threat," LexisNexis, Oct. 28, 2003, pp. 1-48.
"Green Tree Investors May Go to Court," Mar. 4, 1998, http://web.archive.org/web/20001101080021/http://www.channel4000.com/news/stories/news-980304-120038.html.
"Groups Demand Government Action on Online Marketing to Children," American Marketplace, Apr. 4, 1996, vol. 17, No. 7, p. 53.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
"Guide to Benefits, MasterCard® Cardholder Smart Shopper Benefits", May 2005, pp. 10.
Healy, Thomas J., "The New Science of Borrower Behavior," Mortgage Banking, vol. 58, No. 5, pp. 26-35, Feb. 1, 1998.
Herzberg, Amir, "Payments and Banking with Mobile Personal Devices," Communications of the ACM, May 2003, vol. 46, No. 5, pp. 53-58.
Hill, Kerry, "Identity Theft Your Social Security Number Provides Avenue for Thieves", NewsRoom, Wisconsin State Journal, Sep. 13, 1998, pp. 4.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
IDEON, Credit-Card Registry that Bellyflopped this Year, Is Drawing some Bottom-Fishers, The Wall Street Journal, Aug. 21, 1995, pp. C2.
"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Instant Access to Credit Reports Now Available Online with DMS' CreditBrowser-based system also Simplifies Credit Decisioning and Offers a Central Point of Control, Business Wire, Dallas, May 23, 2000, p. 0264.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Internal Revenue Service Data Book 2000, Issued Aug. 2001, Revised May 2003.
Iovation, Device Identification & Device Fingerprinting, http://www.iovation.com/risk-management/device-identification printed Nov. 5, 2012 in 6 pages.
Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.
Jones, Yvonne, "Consumers Understood the Basics but Could Benefit from Targeted Educational Efforts," GAO U.S. Government Accountability Office, Mar. 16, 2005, pp. 128, http://www.gao.gov/products/GAO-05-223.
"JPMorgan Worldwide Securities Services to Acquire Paloma's Middle and Back Office Operations," Webpage printed from http://www.jpmorgan.com on Apr. 1, 2009.
"Judging Credit: Consumers Need Better Finance Tools", News Journal, Daytona Beach, FL, Dec. 28, 2002.
Kaushik, Nishant, "The Epic Hacking of Mat Honan and Our Identity Challenge," Aug. 7, 2012, http://blog.talkingidentity.com/2012/08/the-epic-hacking-of-mat-honan-and-our-identity-challenge.html.
Khan, Mickey Alam, "Equifax Recognizes Changing Customer Behavior with Four-Pronged Mobile Stategy", Mobile Marketer, http://web.archive.org/web/20151117005818/http://www.mobilemarketer.com/cms/news/strategy/9733.html, Apr. 19, 2011 in 10 pages.
Kulkosky, Edward, "Credit Scoring Appeal Transcends Underwriting," American Banker, vol. 161, No. 93, p. 8, May 15, 1996.
Kuykendall, Lavonne, "Divergent Paths in Early Pacts with Credit Bureaus", American Banker, May 30, 2002, vol. 167, No. 3, pp. 2.
Lan, Joe, "The Top Portfolio Management Software," http://www.aaii.com/computerizedinvesting/article/the-top-portfolio-management-sofware, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lauwers et al., "Five Hundred Years of Bookkeeping: A Portrait of Luca Pacioli", Tijdschrift voor Economie en Management, 1994, vol. 39. No. 3, pp. 289-304.
Lee, W.A., "Experian Eyes Payments, Mulls Deals" American Banker: The Financial Services Daily, 2pgs., New York, NY, May 30, 2003.
Lee, W.A.; "Experian, on Deal Hunt, Nets Identity Theft Insurer", American Banker: The Financial Services Daily, Jun. 4, 2003, New York, NY, 1 page.
Lee, W.A.; "Fair Isaac Taps Institutions for Credit Score Distribution", American Banker: The Financial Services Daily, New York, NY, Apr. 9, 2002, vol. 167, Issue 67, 1 Page.
Lee, W.A., "Money, Quicken, and the Value of Alliances", American Banker: The Financial Services Daily, 2pgs., New York, NY, Jul. 28, 2003.
LendingTree.com, "Lender Ratings & Reviews," http://web.archive.org/web/20091015043716/http://www.lendingtree.com/lender-reviews/, Oct. 15, 2009, in 21 pages.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.

(56) References Cited

OTHER PUBLICATIONS

Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, http://web.archive.org/web/20110724011010/http://www.lifelock.com/? as archived Jul. 24, 2011 in 1 page.
LifeLock, "How LifeLock Works," http://www.lifelock.com/lifelock-for-people printed Mar. 14, 2008 in 1 page.
LifeLock, "Identity Theft F.A.Q." http://web.archive.org/web/20080215093614/http://www.identitytheftkiller.com/promo/faq.php, Feb. 15, 2008, pp. 8.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, 2007.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Longo, Tracey, "Managing Money: Your Family Finances", Kiplinger's Personal Finance Magazine, Jun. 1, 1995, vol. 49, No. 6, pp. 4.
Lund, Graham, "Credit Bureau Data: Maximizing the Benefits," Credit Management, May 2004, ProQuest Central, pp. 44-45.
Magid, Lawrence, J., Business Tools: When Selecting an ASP Ensure Data Mobility, Los Angeles Times, Los Angeles, CA, Feb. 26, 2001, vol. C, Issue 4, pp. 3.
"Managing Debt?" Federal Trade Commission: Consumer Information, http://www.consumer.ftc.gov/articles/0158-managing-debt, printed Mar. 22, 2013 in 4 pages.
Manilla, http://www.manilla.com/how-it-works/ printed Feb. 5, 2014 in 1 page.
Mannan et al., "Mercury: Recovering Forgotten Passwords Using Personal Devices*", Dec. 17, 2011, Pre-Proceedings of Financial Cryptography and Data Security 2011, pp. 1-16.
Merriam Webster's Collegiate Dictionary, 10th Edition, 1999, p. 79.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
Mint.com, http://www.mint.com/ printed Sep. 18, 2008 in 2 pages.
Mint.com, http://www.mint.com/how-it-works/ printed Feb. 5, 2013 in 2 pages.
Montgomery County Housing Report, Residential Market Report, Jan. 2004 in 6 pages.
MS Money Software by Microsoft http://www.microsoft.com/Money/default.mspx as retrieved on Sep. 17, 2008.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
MyFico, http://www.myfico.com/products/ficoone/sample/sample_scoresimulator.aspx.printed Oct. 12, 2012 in 3 pages.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyRatePlan.com, "Cell Phone Buying Guide", http://web.archive.org/web/20061116103256/http://myrateplan.com/cell_phone_buying_guide/family_plans/, as archived Nov. 16, 2006 in 2 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directory.westlaw.com/scope/default.asp?db=NA-ALL&RS=W...&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New Privista Product Provides Early Warning System to Combat Identity Theft", PR Newswire, Oct. 24, 2000, PR Newswire Association, Inc., New York.
"NewsHound: NewsHound User Guide Internet E-Mail", of record as early as May 2, 1997, pp. 11.
"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu/~awatson/NextCardCase/NextCardAboutUs.htm printed Oct. 23, 2009 in 10 pages.
"Normalize," http://www.merriam-webster.com/dictionary/normalize printed Jun. 14, 2010.
Novack, Janet, "The Coming Fight over FICO," Forbes, Dec. 18, 1995, vol. 156, No. 14, p. 96.
Occasional CF Newsletter; http://www.halhelms.com/index.cfm?fuseaction=newsletters.oct1999; Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.

(56) References Cited

OTHER PUBLICATIONS

Peltier, Jon, "Conditional Formatting of Excel Charts", Peltier Tech Blog, as posted Feb. 13, 2012, http://peltiertech.com/conditional-formatting-of-excel-charts/, pp. 1-5.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Pinola, Melanie, "How Can I Protect Against Social Engineering Hacks?" Aug. 9, 2012, http://lifehacker.com/5933296/how-can-i-protect-against-hackers-who-use-sneaky-social-engineering-techniques-to-get-into-my-accounts.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
Powerforms: Declarative Client-Side for Field Validation, ISSN 1386-145x, Dec. 2000.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
PrivacyGuard, http://web.archive.org/web/20110728114049/http://www.privacyguard.com/ as archived Jul. 28, 2011 in 1 page.
Privacy Rights Clearinghouse, "Identity Theft: What to do if it Happens to You," http://web.archive.org/web/19990218180542/http://privacyrights.org/fs/fs17a.htm printed Feb. 18, 1999.
"ProClarity and Microsoft to Host Free Seminar Series on Retail Analytics with Independent Analyst Firm-ProClarity to Share Best Forrester Analysts to Discuss Trends and the Future of the Retail"; Business Wire; pp. 2; Aug. 13, 2003.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Ratner, Juliana, "GMAC to Sell Risk-Management Advice; Target is 150 Biggest Home Loan Servicers," American Banker, vol. 161, No. 53, p. 16, Mar. 19, 1996.
Rawe, Julie; "Identity Thieves", Time Bonus Section, Inside Business, Feb. 2002, pp. 2.
"Recognition and use by Appraisers of Energy-Performance Benchmarking Tools for Commercial Buildings," prepared by the Institute for Market Transformation, NYSERDA, Feb. 2003, pp. 6.
Repici et al., "The Comma Separated Value (CSV) File Format", http://creativyst.com/Doc/Articles/CSV/CSV01.htm, Creativyst, Inc., 2002, pp. 10.
Reppler.com, "Learn More: Basic Information about how TrustedID Reppler Works for You," www.reppler.com/learn/ printed Oct. 24, 2012 in 2 pages.
"Resolve Debt for Less: With Help from Freedom Financial" http://www.debtsettlementusa.com/ printed Jan. 9, 2013 in 6 pages.
"RF/Spectrum to Offer Score," National Mortgage News, Special Report; Credit Reporting & Scaring, Jun. 9, 1997, p. 40.
Risk Monitors, "New GMAC Unit Focuses on Portfolio Risk," PR Newswire, Mar. 13, 1996, pp. 2. http://www.thefreelibrary.com/New+GMAC+UNIT+FOCUSES+ON+PORTFOLIO+RISK-a018092212.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Saunders, A., "Data Goldmine," Management Today, London: Mar. 1, 2004, 6 pages.
Schmidt, David, "Environmental Impact: The Changing Credit Reporting Landscape," Business Credit, Apr. 2003, vol. 105, No. 4, pp. 14.
Schmidt et al., "A Set of Multi-Touch Graph Interaction Techniques", ITS '10, Nov. 7-10, 2010, Saarbrucken, Germany, pp. 1-4.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
Sealey, Geraldine, "Child ID Theft Can Go Unnoticed for Years", http://abcnews.go.com/US/story?id=90257, Sep. 12, 2003 in 9 pages.
"Settling Your Debts—Part 1 in Our Debt Settlement Series", http://www.creditinfocenter.com/debt/settle_debts.shtml printed Jan. 9, 2013 in 6 pages.
"Shareholders Sue Green Tree Financial," Dated Dec. 4, 1997, http://web.archive.org/web/20000419070107/http://www.wcco.com/news/stories/news-971204-092238.html.
Shin, Laura, "See an Error on Your Credit Report? Credit Karma Now Makes It Easy to Dispute", Nov. 12, 2015, http://www.forbes.com/sites/laurashin/2015/11/12/see-an-error-on-your-credit-report-credit-karma-now-makes-it-easy-to-dispute/, pp. 4.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Singletary, Michelle, "The Littlest Victims of ID Theft", The Washington Post, The Color of Money, Oct. 4, 2007.
Stanton, T.H., "Credit Scoring and Loan Scoring as Tools for Improved Management of Federal Credit Programs", Financier, Philadelphia, Summer 1999, vol. 6, 36 pages.
Stauffer et al., "Using HTML 3.2," Second Edition, 1996, Que Publishing, pp. 192-193.
Steele, Georgia, "Fair, Isaac Seeks Mortgage Tech Opportunities," National Mortgage News, Special Report; B& C Lending, Mar. 23, 1998, p. 34.
Stein, Benchmarking Default Prediction Models: Pitfalls and Remedies in Model Validation, Moody's KMV, Revised Jun. 13, 2002, Technical Report #020305; New York.
Sullivan, Deidre, "Scoring Borrower Risk," Mortgage Banking, Nov. 1994, vol. 55, No. 2, pp. 94-98.
Tajik, S., "Conditional Plotting, Changing Color of Line Based on Value", MathWorks®, MATLAB Answers™, Question Posted Feb. 10, 2011 to https://www.mathworks.com/matlabcentral/answers/1156-conditional-plotting-changing-color-of-line-based-on-value?requestedDomain=www.mathworks.com, pp. 8.
Taylor, Marshall, "Loan-Level Pricing Draws Interest From Investors," Real Estate Finance Today, Jul. 7, 1997, vol. 14, No. 14. p. 10.

(56) References Cited

OTHER PUBLICATIONS

"The Best of the Best," Mortgage Technology, Nov. 1, 2003, vol. 10, No. 8, pp. 34-53.
TheMorningCall.Com, "Cheap Ways to Foil Identity Theft," www.mcall.com/business/columnists/all-karp.5920748jul01,0 . . . , published Jul. 1, 2007.
Thompson, Herbert H., "How I Stole Someone's Identity", https://www.scientificamerican.com/article/anatomy-of-a-social-hack/#, Aug. 18, 2008, pp. 5.
Todorova, Aleksandra, "Protecting Your Child's Identity", Smart Money, Published Aug. 2, 2007, pp. 1-5.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
TransUnion: VantageScore®—Consistency in Credit Scoring, http://www.transunion.com/personal-credit/credit-reports/vantage-score.page printed Oct. 12, 2012 in 2 pages.
Trulia, "Trulia Estimates," http://www.trulia.com/trulia_estimates/, printed Feb. 18, 2014 in 2 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Tuman, Diane, "What is a Zestimate?" Mar. 2013, pp. 5, http://www.zillow.com/wikipages/What-is-a-Zestimate/.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Van Collie, Shimon, "The Road to Better Credit-Card Marketing," Bank Technology News, Sep. 1995, pp. 4.
Verstraeten, Geert, Ph.D.; Issues in predictive modeling of individual customer behavior: Applications in targeted marketing and consumer credit scoring; Universiteit Gent (Belgium) 2005.
Waggoner, Darren J., "Having a Global Identity Crisis," Collections & Credit Risk, Aug. 2001, vol. vol. 6, No. 8, pp. 6.
Wahl, Martin, "The Stampede to Subprime," Mortgage Banking, Oct. 1, 1997, vol. 58, No. 1, p. 26(7).
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
Wesabe.com http://www.wesabe.com/, as retrieved on Sep. 17, 2008.
West, David, "Neural Network Credit Scoring Models", Computers & Operations Research, vol. 27, 2000, pp. 1131-1152.
Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
Yang, et al., "An Analysis of the Ex Ante Probabilities of Mortgage Prepayment and Default", Real Estate Economics, Dec. 1998, vol. 26, No. 4, pp. 651-676.
Yahoo! Search, "People Search," http://people.yahoo/com printed Nov. 16, 2010 in 1 page.
YODLEE | Money Center, https://yodleemoneycenter.com/ printed Feb. 5, 2014 in 2 pages.
You Need a Budget, http://www.youneedabudget.com/features printed Feb. 5, 2014 in 3 pages.
Yücesan et al., "Distributed Web-Based Simulation Experiments for Optimization", Simulation Practice and Theory 9, 2001, pp. 73-90.
Zimmerman et al., "A Web-Based Platform for Experimental Investigation of Electric Power Auctions," Decision Support Systems, 1999, vol. 24, pp. 193-205.
Zoot—Instant Rules GUI, www.zootweb.com/instant_rules_GUI.html as printed Mar. 3, 2008.
Zoot—Rules Management GUI, www.zootweb.com/business_rules_GUI.html as printed Mar. 3, 2008.
Application as filed in U.S. Appl. No. 10/452,155, dated May 30, 2003.
Preliminary Amendment in U.S. Appl. No. 10/452,155, dated Sep. 15, 2003.
Office Action in U.S. Appl. No. 10/452,155, dated Jan. 25, 2008.
Examiner Interview Summary in U.S. Appl. No. 10/452,155, dated Jul. 23, 2008.
Office Action in U.S. Appl. No. 10/452,155, dated Oct. 2, 2008.
Examiner Interview Summary in U.S. Appl. No. 10/452,155, dated Jan. 14, 2009.
Examiner Interview Summary in U.S. Appl. No. 10/452,155, dated Jul. 21, 2009.
Notice of Allowance in U.S. Appl. No. 10/452,155, dated Aug. 19, 2009.
International Search Report for Application No. PCT/US2005/041814, dated Aug. 29, 2007.
International Preliminary Report on Patentability and Written Opinion for Application No. PCT/US2005/041814, dated Dec. 27, 2007.
International Search Report and Written Opinion for Application No. PCT/US2018/016258, dated May 16, 2018.
International Search Report and Written Opinion for Application No. PCT/US2018/061877, dated Mar. 8, 2019.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Application as filed in U.S. Appl. No. 09/411,683, dated Oct. 4, 1999.
Application as filed in U.S. Appl. No. 09/653,595, dated Aug. 31, 2000.
Application as filed in U.S. Appl. No. 09/790,453, dated Feb. 22, 2001.
Office Action in U.S. Appl. No. 09/790,453, dated Jan. 20, 2006.
Office Action in U.S. Appl. No. 09/790,453, dated Jul. 11, 2006.
Office Action in U.S. Appl. No. 09/790,453, dated Dec. 1, 2006.
Office Action in U.S. Appl. No. 09/790,453, dated May 10, 2007.
Office Action in U.S. Appl. No. 09/790,453, dated Mar. 21, 2008.
Application as filed in U.S. Appl. No. 10/183,135, filed Jun. 25, 2002.
Office Action in U.S. Appl. No. 10/183,135, dated Oct. 22, 2007.
Final Office Action in U.S. Appl. No. 10/183,135, dated Apr. 14, 2008.
Office Action in U.S. Appl. No. 10/183,135, dated Aug. 21, 2008.
Office Action in U.S. Appl. No. 10/183,135, dated Feb. 26, 2009.
Office Action in U.S. Appl. No. 10/183,135, dated Aug. 18, 2009.
Office Action in U.S. Appl. No. 10/183,135, dated Feb. 19, 2010.
Final Office Action in U.S. Appl. No. 10/183,135, dated Sep. 22, 2010.
Office Action in U.S. Appl. No. 10/183,135, dated Mar. 25, 2011.
Notice of Allowance in U.S. Appl. No. 10/183,135, dated Aug. 15, 2011.
Office Action in U.S. Appl. No. 11/169,769, dated Mar. 24, 2010.
Application as Filed in U.S. Appl. No. 11/363,984, dated Feb. 27, 2006.
Office Action in in U.S. Appl. No. 11/363,984, dated Dec. 26, 2008.
International Preliminary Report on Patentability in Application No. PCT/US2018/016258, dated Aug. 15, 2019.
Langer et al., "Creditor List Screening Practices: Certain Implications Under the Fair Credit Reporting Act and the Equal Credit Opportunity Act," The Business Lawyer, May 1988, vol. 43, pp. 1123-1141.

(56) References Cited

OTHER PUBLICATIONS

Menge, Falko, "Enterprise Service Bus", Free and Open Source Software Conference, 2007, pp. 6.
International Search Report and Written Opinion for Application No. PCT/US2019/049377, dated Dec. 20, 2019.

* cited by examiner

AUTHENTICATED ACCESS AND AGGREGATION DATABASE PLATFORM

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND

Electronic databases provide storage and retrieval of digital data records. Data records in such databases may be electronically updated. Certain data records have access restrictions, such as restrictions regarding entities that can view or make use of the records, as well as restrictions on entities that can provide updates or changes to such records.

SUMMARY OF EMBODIMENTS

The systems, methods, and devices described herein each have several aspects, no single one of which is solely responsible for its desirable attributes. Without limiting the scope of this disclosure, several non-limiting features will now be described briefly.

In some embodiments, an account discovery system interfaces between an end-user (for example, a consumer) and one or more external accounts of the user to identify accounts of the user based on data items accessed at the external accounts. Multiple data items, which may be accessed or received from one or more third-party entities, such as via a direct application programming interface (API) communication channel, are analyzed to determine whether any of the data items, or combinations of data items, meet rules for addition of the data items to a secure third-party risk item database.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions, such as those described below as computerized methods or simply methods, by virtue of including instructions that, when executed by data processing apparatus, cause the apparatus to perform the actions.

In one embodiment, a computerized method is performed by a computing system having one or more hardware computer processors and one or more non-transitory computer readable storage device storing software instructions executable by the computing system to perform the computerized method comprising receiving, via network communication with a user computing device, selection of a third-party entity from a plurality of third-party entities indicated in a user interface displayed on the user computing device, and credentials for directly accessing, by proxy on behalf of the user via an application programming interface (API), a plurality of data items associated with the user stored in one or more databases associated with the selected third-party entity. The method may further include transmitting at least an API token associated with the selected third-party and the credential to one or more databases associated with the selected third-party, accessing a plurality of data items associated with the user, via an API communication channel established with the one or more databases associated with the selected third-party entity. The method may further include selecting a first data item of the plurality of data items, determining a recipient identified in the first data item, identifying a subset of data items each indicating the determined recipient, wherein the subset of data items includes at least the first data item and one or more other data items. The method may further include determining, based at least on the identified subset of data items, account data associated with an account of the user associated with the recipient, the account data comprising at least one or more of: a number of data items each having time stamps within a predetermined time period, average number of days between time stamps of sequential data items, applying a first account identification rule, associated with a first account type, to the account data, determine, based on said application of the first account identification rule, a first confidence level indicating likelihood that the account is the first type of account. The method may further include, in response to determining that the first confidence level is about a first threshold, applying a first account scoring model to the account data, the first account scoring model configured to determine an expected change to a risk score associated with the user. The method may further include receiving, from the user computing device, confirmation that the account of the user is the first type of account, receiving, from the user computing device, a request to add the account with the recipient to risk data associated with the user at a secured third-party risk database. The method may further include generating, based on portions of the plurality of data items and the account data associated with the recipient, an account creation data package, the account creation data package formatted for ingestion at the secured third-party risk database to initiate addition of the account to risk data of the user, identifying a security key associated with the secured third-party risk database. The method may further include transmitting the security key and the account creation data package to the third-party risk database via a secure communication channel established with the third-party risk database, requesting execution of a risk scoring algorithm using risk data of the user at the secured third-party risk database, wherein the risk scoring algorithm is based at least partly on portions of the plurality of data items or the account data included in the risk data of the user. The method may further include providing risk score change information to the user computing device.

In one embodiment, the method further includes, prior to receiving credentials from the user computing device, transmit user interface data to the user computing device, the user interface data configured to depict a permissions interface element that is selectable to indicate authorization to access account information associated with the user, and receiving, from the user computing device, authorization to access account information associated with the user.

In one embodiment, the method further includes transmitting user interface data to the user computing device, the user interface data configured to depict a user interface including one or more interactive elements selectable to indicate authorized uses of the data items associated with the user by the computing system, receiving, from the user computing device, selection of authorized uses of the data items, and selectively sharing, based on the authorized uses of the data items, the data items with one or more third parties.

In one embodiment, determining a recipient identified in the first data items comprises: determining a recipient identifier in the first data item, accessing a recipient data structure storing indications of associations between recipient identifiers and corresponding recipients, wherein the recipient is associated with a plurality of recipient identifiers used by different third-party databases to identify the recipient, and determining that the recipient identifier is associated with the recipient in the recipient data structure. In one embodiment, associations between recipient identifiers and corresponding recipients are deterministic. In one embodiment, associations between recipient identifiers and corresponding recipients are probabilistic.

In one embodiment, the account creation data package includes at least: an identifier of the recipient, a data furnisher identifier associated with an entity that provides consumer data to the secured third-party risk database, and at least a portion of the account information formatted for ingestion by the secured third-party risk database to initiate addition of the account to risk data of the user. In one embodiment, the security key comprises an API token associated with the secured third-party risk database.

In one embodiment, the method further includes determining a first one or more items available to the user based on the current risk score, determining a second one or more items not available to the user based on the current risk score, determining an estimated risk score of the user based on potential addition of a new account of the user to risk data of the user, in response to determining that at least one of the second one or more items would be available to the user based on the estimated risk score, providing an option to the user in the interactive user interface to initiate updates to risk data of the user, in response to receiving an indication of selection of the option in the interactive user interface on the user device, initiating receiving via network communication with the user computing device, determining an updated risk score based at least on the risk score change information, determining at least one of the second one or more items eligible to the user based on the updated risk score, and updating the interactive user interface data to depict information regarding the at least one of the second one or more items in the user interface on the user device. In one embodiment, the first account scoring model is configured to determine an estimated risk score change if the first account of the first account type is added to the risk data of the user, wherein the first account scoring model is based at least on actual risk score changes of a plurality of other users in response to addition of accounts of the first account type to their respective risk data. In one embodiment, the method further includes, for each of a plurality of accounts included in the risk data of the user, determining an account type from a plurality of account types, identifying a second account type of the plurality of account types that impacts risk scores of users that is not included in the determined account types of the plurality accounts of the user, executing a score impact algorithm, based at least on the second account type and the risk data of the user, to determine a possible risk score change if an account of the second account type is added to the risk data of the user, and providing, to the user, an indication of the possible risk score change prior to receiving the request to add the account with the recipient to risk data of the user at the secured third-party risk database.

In one embodiment, a computing system comprising a hardware computer processor is configured to perform processor-executable instructions comprising receiving, via network communication with a user computing device, selection of a third-party entity from a plurality of third-party entities indicated in a user interface displayed on the user computing device, and credentials for directly accessing, by proxy on behalf of the user via an application programming interface (API), a plurality of data items associated with the user stored in one or more databases associated with the selected third-party entity, transmitting at least an API token associated with the selected third-party and the credential to one or more databases associated with the selected third-party, accessing a plurality of data items associated with the user, via an API communication channel established with the one or more databases associated with the selected third-party entity, selecting a first data item of the plurality of data items, determining a recipient identified in the first data item, identifying a subset of data items each indicating the determined recipient, wherein the subset of data items includes at least the first data item and one or more other data items, determining, based at least on the identified subset of data items, account data associated with an account of the user associated with the recipient, the account data comprising at least one or more of: a number of data items each having time stamps within a predetermined time period, and average number of days between time stamps of sequential data items. In one embodiment, the operations further comprise applying a first account identification rule, associated with a first account type, to the account data; determining, based on said application of the first account identification rule, a first confidence level indicating likelihood that the account is the first type of account, in response to determining that the first confidence level is about a first threshold, applying a first account scoring model to the account data, the first account scoring model configured to determine an expected change to a current risk score associated with the user, receiving, from the user computing device, confirmation that the account of the user is the first type of account, receiving, from the user computing device, a request to add the account with the recipient to risk data associated with the user at a secured third-party risk database, generating, based on portions of the plurality of data items and the account data associated with the recipient, an account creation data package, the account creation data package formatted for ingestion at the secured third-party risk database to initiate addition of the account to risk data of the user, identifying a security key associated with the secured third-party risk database, transmitting the security key and the account creation data package to the third-party risk database via a secure communication channel established with the third-party risk database, requesting execution of a risk scoring algorithm using risk data of the user at the secured third-party risk database, wherein the risk scoring algorithm is based at least partly on portions of the plurality of data items or the account data included in the risk data of the user, and providing risk score change information to the user computing device.

In one embodiment, the operations further comprise, prior to receiving credentials from the user computing device, transmit user interface data to the user computing device, the user interface data configured to depict a permissions interface element that is selectable to indicate authorization to access account information associated with the user, and receiving, from the user computing device, authorization to access account information associated with the user. In one embodiment, the operations further comprise transmitting user interface data to the user computing device, the user interface data configured to depict a user interface including one or more interactive elements selectable to indicate authorized uses of the data items associated with the user by the computing system, receiving, from the user computing device, selection of authorized uses of the data items, and selectively sharing, based on the authorized uses of the data items, the data items with one or more third parties.

In one embodiment, a non-transitory computer readable medium has processor-executable instructions stored thereon that are executable by a hardware computer processor to perform operations comprising receiving, via network communication with a user computing device, selection of a third-party entity from a plurality of third-party entities indicated in a user interface displayed on the user computing device, and credentials for directly accessing, by proxy on behalf of the user via an application programming interface (API), a plurality of data items associated with the user stored in one or more databases associated with the selected third-party entity, transmitting at least an API token associated with the selected third-party and the credential to one or more databases associated with the selected third-party, accessing a plurality of data items associated with the user, via an API communication channel established with the one or more databases associated with the selected third-party entity, selecting a first data item of the plurality of data items, determining a recipient identified in the first data item, identifying a subset of data items each indicating the determined recipient, wherein the subset of data items includes at least the first data item and one or more other data items, determining, based at least on the identified subset of data items, account data associated with an account of the user associated with the recipient, the account data comprising at least one or more of: a number of data items each having time stamps within a predetermined time period, and average number of days between time stamps of sequential data items. In one embodiment, the operations further comprise applying a first account identification rule, associated with a first account type, to the account data; determining, based on said application of the first account identification rule, a first confidence level indicating likelihood that the account is the first type of account, in response to determining that the first confidence level is about a first threshold, applying a first account scoring model to the account data, the first account scoring model configured to determine an expected change to a current risk score associated with the user, receiving, from the user computing device, confirmation that the account of the user is the first type of account, receiving, from the user computing device, a request to add the account with the recipient to risk data associated with the user at a secured third-party risk database, generating, based on portions of the plurality of data items and the account data associated with the recipient, an account creation data package, the account creation data package formatted for ingestion at the secured third-party risk database to initiate addition of the account to risk data of the user, identifying a security key associated with the secured third-party risk database, transmitting the security key and the account creation data package to the third-party risk database via a secure communication channel established with the third-party risk database, requesting execution of a risk scoring algorithm using risk data of the user at the secured third-party risk database, wherein the risk scoring algorithm is based at least partly on portions of the plurality of data items or the account data included in the risk data of the user, and providing risk score change information to the user computing device.

In one embodiment, a non-transitory computer readable medium has processor-executable instructions stored thereon that are executable by a hardware computer processor to perform operations comprising transmitting user interface data to a user computing device, the user interface data configured to depict a permissions interface element that is selectable to indicate authorization to access account information associated with the user, receiving, from the user computing device, authorization to access account information associated with the user, in response to receiving the authorization to access account information associated with the user, receiving, from the user computing device, selection of a third-party entity from a plurality of third-party entities indicated in a user interface on the user computing device, receiving credentials for accessing account information associated with the user at the selected third-party entity, identifying an API token associated with the selected third-party entity, transmitting to an online address associated with a system in electronic communication with the selected third-party entity, the API token and the credentials, receiving, via the system, indicators of one or more accounts of the user with the selected third-party entity, receiving, from the user computing device, selection of an account of the one or more financial accounts, accessing, via a secure communication session initiated with the API token, a plurality of data items of the selected account of the user at the third-party entity, transmitting user interface data to the user computing device, the user interface data configured to depict a user interface on a display of the user computing device, the user interface including one or more interactive elements selectable to indicate authorized uses of the data items by the computing system, receiving, from the user computing device, selection of authorized uses of the data items, and selectively sharing, based on the authorized uses of the data items, the data items with one or more third parties.

In one embodiment, a computerized method performed by a computing system having one or more hardware computer processors and one or more non-transitory computer readable storage device storing software instructions executable by the computing system comprises transmitting user interface data to a user computing device, the user interface data configured to depict a permissions interface element that is selectable to indicate authorization to access account information associated with the user, receiving, from the user computing device, authorization to access account information associated with the user. The method may further include, in response to receiving the authorization to access account information associated with the user, receiving, from the user computing device, selection of a third-party entity from a plurality of third-party entities indicated in a user interface on the user computing device, receiving credentials for accessing account information associated with the user at the selected third-party entity, identifying an API token associated with the selected third-party entity, transmitting to an online address associated with a system in electronic communication with the selected third-party entity, the API token and the credentials, receiving, via the system, indicators of one or more accounts of the user with the selected third-party entity, receiving, from the user computing device, selection of an account of the one or more financial accounts, accessing, via a secure communication session initiated with the API token, a plurality of data items of the selected account of the user at the third-party entity, transmitting user interface data to the user computing device, the user interface data configured to depict a user interface on a display of the user computing device, the user interface including one or more interactive elements selectable to indicate authorized uses of the data items by the computing system, receiving, from the user computing device, selection of authorized uses of the data items. The method may further include selectively sharing, based on the authorized uses of the data items, the data items with one or more third parties.

In one embodiment, transaction data items associated with a post date more than one year prior to a current date are disregarded. In one embodiment, transaction data items associated with a post date more than two years prior to a current date are disregarded. In one embodiment, the computing system comprises the system in electronic communication with the selected third-party. In one embodiment, the system in electronic communication with the selected third-party entity is operated by a third-party. In one embodiment, the user interface includes an iframe provided by the system in electronic communication with the selected third-party, wherein the credentials are provided directly to the system electronic communication with the selected third-party. In one embodiment, the credentials are not stored by the computing system. In one embodiment, the credentials comprises a username and password. In one embodiment, the credentials comprise biometric data of the user. In one embodiment, the system in electronic communication with the selected third-party entity communicates with the third-party entity via a secured API communication channel initiated via use of a second API token associated with the third-party entity. In one embodiment, the system in electronic communication with the selected third-party entity stores the credentials for use in a later request for information associated with the user from the selected third-party entity.

In one embodiment, a computerized method performed by a computing system having one or more hardware computer processors and one or more non-transitory computer readable storage device storing software instructions executable by the computing system comprises receiving, from a user computing device, a request to update risk data of the user with account information regarding an account identified in account data items associated with the user stored by a third-party entity, generating an account creation data package formatted for ingestion at a secured third-party risk database to initiate addition of the account to risk data of the user. The account creation data package may include an identifier of recipient indicated in each of the account data items, a data furnisher identifier associated with an entity that provides consumer data to the secured third-party risk database, and at least a portion of the account information formatted for ingestion by the secured third-party risk database to initiate addition of the account to risk data of the user, identifying an API token associated with the secured third-party risk database. The method may include transmitting the API token and the account creation data package to the secured third-party risk database via an secure communication channel established with the third-party risk database, wherein the account information is usable to update a risk score of the user.

In one embodiment, the account information includes a plurality of historical transaction data items indicating a corresponding plurality of historical transactions between the recipient and the user. In one embodiment, the method further includes requesting execution of a risk scoring algorithm using risk data of the user at the secured third-party risk database, including the plurality of historical transaction data items included in the risk data of the user. In one embodiment, the method further includes receiving, from the secured third-party risk database, a risk score of the user based on said execution of the risk scoring algorithm, and transmitting a notification to the user indicating the risk score. In one embodiment, the method further includes, in response to determining that the risk score is lower than a previous risk score of the user, initiating activation of a user interface on the user computing device that includes an option to remove the account information from the risk data of the user, in response to selection of the option to remove the account information from the risk data of the user, generating an account removal data package formatted for ingestion at the secured third-party risk database to initiate removal of the account from risk data of the user, the account removal data package including: the identifier of the recipient and the data furnisher identifier associated with the entity that provides consumer data to the secured third-party risk database, and transmitting the account removal data package to the secured third-party risk database via a secure communication channel.

In one embodiment, the method further includes receiving updated account information regarding the account associated with the user, the updated account information including a transaction data item not included in the plurality of historical transaction data items, generating an account update data package formatted for ingestion at the secured third-party risk database to initiate update of risk data of the user associated with the account, the account update data package including: an identifier of the recipient indicated in the transaction data item, the data furnisher identifier associated with the entity that provides consumer data to the secured third-party risk database, and at least a portion of the updated account information formatted for ingestion by the secured third-party risk database to initiate addition of the transaction data item to risk data of the user, and transmitting the API token associated with the secured third-party risk database and the account update data package to the secured third-party risk database. In one embodiment, the method further includes, requesting execution of a risk scoring algorithm using risk data of the user at the secured third-party risk database, wherein the risk scoring algorithm is based at least partly on portions of the plurality of historical transaction data items and the transaction data item. In one embodiment, the method further includes receiving, from the secured third-party risk database, a risk score of the user based on said execution of the risk scoring algorithm, and in response to determining that a risk score of the user is different than prior to transmitting the account update data package to the secured third-party risk database, transmitting a notification to the user. In one embodiment, the notification comprises a push notification to the user computing device, the push notification configured to automatically activate an application on the user computing device to cause display of information associated with the notification. In one embodiment, the notification is transmitted to the user in real-time from receiving the updated account information.

In one embodiment, the computerized method further comprises receiving, via network communication with the user computing device, selection of a third-party entity from a plurality of third-party entities indicated in a user interface displayed on the user computing device, credentials for directly accessing, by proxy on behalf of the user via an application programming interface (API), the account items associated with the user stored in one or more databases associated with the third-party entity, transmitting at least an API token associated with the selected third-party and the credential to one or more databases associated with the selected third-party entity, accessing the account data items associated with the user, via an API communication channel established with the one or more databases associated with the selected third-party entity, selecting a first data item of the plurality of account data items, determining a recipient identified in the first data item, identifying a subset of account data items each indicating the determined recipient, wherein the subset of account data items includes at least the first data item and one or more other account data items, determining, based at least on the identified subset of account data items, account data associated with an account of the user associated with the recipient, the account data comprising at least one or more of: a number of account data items each having time stamps within a predetermined time period, and average number of days between time stamps of sequential account data items, applying a first account identification rule, associated with a first account type, to the account data, determine, based on said application of the first account identification rule, a first confidence level indicating likelihood that the account is the first type of account. In some embodiments, the method further includes, in response to determining that the first confidence level is above a first threshold, applying a first account scoring model to the account data, the first account scoring model configured to determine an expected change to a current risk score associated with the user, requesting execution of a risk scoring algorithm using risk data of the user at the secured third-party risk database, wherein the risk scoring algorithm is based at least partly on portions of the plurality of account data items or the account data included in the risk data of the user, and providing risk score change information to the user computing device.

In one embodiment, a computing system comprising a hardware computer processor is configured to perform operations comprising receiving, from a user computing device, a request to update risk data of the user with account information regarding an account identified in account data items associated with the user stored by a third-party entity, generating an account creation data package formatted for ingestion at a secured third-party risk database to initiate addition of the account to risk data of the user, the account creation data package including: an identifier of recipient indicated in each of the account data items, a data furnisher identifier associated with an entity that provides consumer data to the secured third-party risk database, and at least a portion of the account information formatted for ingestion by the secured third-party risk database to initiate addition of the account to risk data of the user. In some embodiments, the operations further include identifying an API token associated with the secured third-party risk database and transmitting the API token and the account creation data package to the secured third-party risk database via a secure communication channel established with the third-party risk database, wherein the account information is usable to update a risk score of the user.

In one embodiment, the account information includes a plurality of historical transaction data items indicating a corresponding plurality of historical transactions between the recipient and the user. In one embodiment, the operations further comprise requesting execution of a risk scoring algorithm using risk data of the user at the secured third-party risk database, including the plurality of historical transaction data items included in the risk data of the user. In one embodiment, the operations further comprise receiving, from the secured third-party risk database, a risk score of the user based on said execution of the risk scoring algorithm and transmitting a notification to the user indicating the risk score.

In one embodiment, a non-transitory computer readable medium having processor-executable instructions stored thereon that are executable by a hardware computer processor to perform operations comprising receiving, from a user computing device, a request to update risk data of the user with account information regarding an account identified in account data items associated with the user stored by a third-party entity, generating an account creation data package formatted for ingestion at a secured third-party risk database to initiate addition of the account to risk data of the user, the account creation data package including: an identifier of recipient indicated in each of the account data items, a data furnisher identifier associated with an entity that provides consumer data to the secured third-party risk database, and at least a portion of the account information formatted for ingestion by the secured third-party risk database to initiate addition of the account to risk data of the user. In one embodiment, the operations further comprise identifying an API token associated with the secured third-party risk database, and transmitting the API token and the account creation data package to the secured third-party risk database via a secure communication channel established with the third-party risk database, wherein the account information is usable to update a risk score of the user.

In one embodiment, a computerized method performed by a computing system having one or more hardware computer processors and one or more non-transitory computer readable storage device storing software instructions executable by the computing system comprises receiving authentication information from a user computing device, the authentication information including at least a name and address of a user, transmitting, to a secured third-party risk system, a request for execution of a risk scoring algorithm to determine a current risk score of the user based at least on risk data of the user at the secured third-party risk system, receiving, from the secured third-party risk system, the current risk score of the user, accessing an item database including information associated with a plurality of items and, for each item, an associated criteria for matching the item with users, querying the item database with at least the current risk score of the user, receiving, in response to said querying the item database, information indicating: a first one or more items matched to the user based on the current risk score, and a second one or more items not matched to the user based on the current risk score. In one embodiment, the method further comprises generating interactive user interface data configured to display an interactive user interface on the user computing device, the user interface depicting information regarding at least one of the first one or more items, determining an estimated risk score of the user based on potential addition of a new account of the user to risk data of the user, in response to determining that at least one of the second one or more items would be matched to the user based on the estimated risk score, providing an option to the user in the interactive user interface to initiate updates to risk data of the user, in response to receiving an indication of selection of the option in the interactive user interface on the user computing device, initiating communication between the user computing device and an account discovery system, wherein the account discovery system is configured to identify a new account of the user through analysis of data items associated with the user stored by one or more third-party databases, transmitting, to the secured third-party risk system, a second request for execution of the risk scoring algorithm to determine an updated risk score of the user based at least on risk data of the user, including information regarding the new account of the user, at the secured third-party risk system, receiving, from the secured third-party risk system, the updated risk score of the user, querying the item database with at least the updated risk score of the user, receiving, in response to said querying the item database, information indicating that at least one of the second one or more data items matched to the user based on the updated risk score and updating the interactive user interface data to depict information regarding the at least one of the second one or more items in the user interface on the user computing device.

In one embodiment, the updated risk score equals the estimated risk score. In one embodiment, the user interface further depicts a first access link to a first enrollment entity associated with a first of the one or more items. In one embodiment, the first access link is configured to redirect communication of the user computing device to an enrollment website. In one embodiment, the access links comprise hyperlinks. In one embodiment, said determining the estimated risk score comprises determining a first account type of a plurality of account types that impacts risk scores of users that is not included in risk data of the user, determining a score impact associated with the determined first account type, and calculating the estimated risk score based at least on the current risk score and the score impact. In one embodiment, said determining the score impact associated with the determined first account type comprises identifying a plurality of other users associated with addition of accounts of the first account type to respective risk data, and, based on account data of the plurality of other users, generating a score impact algorithm configured to determine, for respective users, score impacts in response to addition of accounts of the first account type. In one embodiment, the plurality of other users are identified as users having accounts of the first account type with account attributes within a predetermined threshold of account attributes of the new account of the user.

In one embodiment, the method further comprises generating a first access link associated with a first item, the first access link including an online address of a first enrollment entity and personally identifiable information of the user, wherein the personally identifiable information is usable by the first enrollment entity to auto-populate an enrollment user interface with the personally identifiable information of the user. In one embodiment, the items are products or services. In one embodiment, first criteria for matching a first item with users is based on a risk score of the user being greater than a predetermined risk score threshold. In one embodiment, the user interface further includes a filter control configured for interaction with the user of the user computing device to receive a filter criteria, wherein application of the filter criteria generates a filtered set of the first one or more items.

In one embodiment, the account discovery system is configured to perform operations comprising receiving, via network communication with a user computing device, selection of a third-party entity from a plurality of third-party entities indicated in a user interface displayed on the user computing device, credentials for directly accessing, by proxy on behalf of the user via an application programming interface (API), a plurality of data items associated with the user stored in one or more databases associated with the selected third-party entity, transmitting at least an API token associated with the selected third-party and the credential to one or more databases associated with the selected third-party entity, accessing a plurality of data items associated with the user, via an API communication channel established with the one or more databases associated with the selected third-party entity, selecting a first data item of the plurality of data items, determining a recipient identified in the first data item, identifying a subset of data items each indicating the determined recipient, wherein the subset of data items includes at least the first data item and one or more other data items, determining, based at least on the identified subset of data items, account data associated with an account of the user associated with the recipient, the account data comprising at least one or more of: a number of data items each having time stamps within a predetermined time period, and an average number of days between time stamps of sequential data items, applying a first account identification rule, associated with a first account type, to the account data, determine, based on said application of the first account identification rule, a first confidence level indicating likelihood that the account is the first type of account. In one embodiment, the method further includes, in response to determining that the first confidence level is above a first threshold, applying a first account scoring model to the account data, the first account scoring model configured to determine an expected change to a current risk score associated with the user, receiving, from the user computing device, confirmation that the account of the user is the first type of account, receiving, from the user computing device, a request to add the account with the recipient to risk data associated with the user at a secured third-party risk database, generating, based on portions of the plurality of data items and the account data associated with the recipient, an account creation data package, the account creation data package formatted for ingestion at the secured third-party risk database to initiate addition of the account to risk data of the user, identifying a security key associated with the secured third-party risk database, and transmitting the security key and the account creation data package to the third-party risk database via a secure communication channel established with the third-party risk database.

In one embodiment, a computing system comprises a hardware computer processor configured to perform operations comprising receiving authentication information from a user computing device, the authentication information including at least a name and address of a user, transmitting, to a secured third-party risk system, a request for execution of a risk scoring algorithm to determine a current risk score of the user based at least on risk data of the user at the secured third-party risk system, receiving, from the secured third-party risk system, the current risk score of the user, accessing an item database including information associated with a plurality of items and, for each item, an associated criteria for matching the item with users, querying the item database with at least the current risk score of the user, receiving, in response to said querying the item database, information indicating: a first one or more items matched to the user based on the current risk score; and a second one or more items not matched to the user based on the current risk score, generating interactive user interface data configured to display an interactive user interface on the user computing device, the user interface depicting information regarding at least one of the first one or more items, determining an estimated risk score of the user based on potential addition of a new account of the user to risk data of the user, in response to determining that at least one of the second one or more items would be matched to the user based on the estimated risk score, providing an option to the user in the interactive user interface to initiate updates to risk data of the user, in response to receiving an indication of selection of the option in the interactive user interface on the user computing device, initiating communication between the user computing device and an account discovery system, wherein the account discovery system is configured to identify a new account of the user through analysis of data items associated with the user stored by one or more third-party databases, transmitting, to the secured third-party risk system, a second request for execution of the risk scoring algorithm to determine an updated risk score of the user based at least on risk data of the user, including information regarding the new account of the user, at the secured third-party risk system, receiving, from the secured third-party risk system, the updated risk score of the user, querying the item database with at least the updated risk score of the user, receiving, in response to said querying the item database, information indicating that at least one of the second one or more data items matched to the user based on the updated risk score, and updating the interactive user interface data to depict information regarding the at least one of the second one or more items in the user interface on the user computing device.

In one embodiment, the operations further include generating a first access link associated with a first item, the first access link including an online address of a first enrollment entity and personally identifiable information of the user, wherein the personally identifiable information is usable by the first enrollment entity to auto-populate an enrollment user interface with the personally identifiable information of the user.

In one embodiment, a computerized method performed by a computing system having one or more hardware computer processors and one or more non-transitory computer readable storage device storing software instructions executable by the computing system performs the computerized method comprising determining identification information of a user, obtaining a current risk score associated with the user, determining a first one or more items available to the user based on the current risk score, determining a second one or more items not available to the user based on the current risk score, generating interactive user interface data configured to display an interactive user interface on a user device, the user interface depicting information regarding at least one of the first one or more items, including an access link to an enrollment entity associated with the at least one of the first one or more items, determining an estimated risk score of the user based on potential addition of a new account of the user to risk data of the user, in response to determining that at least one of the second one or more items would be available to the user based on the estimated risk score, providing an option to the user in the interactive user interface to initiate updates to risk data of the user, in response to receiving an indication of selection of the option in the interactive user interface on the user device, initiating communication between the user device and an account discovery system, wherein the account discovery system is configured to identify a new account of the user through analysis of data items associated with the user stored by one or more third-party databases and to trigger generation of an updated risk score, receiving an indication of an updated risk score of the user, wherein the updated risk score is higher than the current risk score based on addition of the new account to risk data of the user by the account discovery system, determining at least one of the second one or more items eligible to the user based on the updated risk score, and updating the interactive user interface data to depict information regarding the at least one of the second one or more items in the user interface on the user device.

In one embodiment, a non-transitory computer readable medium having processor-executable instructions stored thereon are executable by a hardware computer processor to perform operations comprising receiving authentication information from a user computing device, the authentication information including at least a name and address of a user, transmitting, to a secured third-party risk system, a request for execution of a risk scoring algorithm to determine a current risk score of the user based at least on risk data of the user at the secured third-party risk system, receiving, from the secured third-party risk system, the current risk score of the user, accessing an item database including information associated with a plurality of items and, for each item, an associated criteria for matching the item with users, querying the item database with at least the current risk score of the user, receiving, in response to said querying the item database, information indicating: a first one or more items matched to the user based on the current risk score, and a second one or more items not matched to the user based on the current risk score, generating interactive user interface data configured to display an interactive user interface on the user computing device, the user interface depicting information regarding at least one of the first one or more items, determining an estimated risk score of the user based on potential addition of a new account of the user to risk data of the user, in response to determining that at least one of the second one or more items would be matched to the user based on the estimated risk score, providing an option to the user in the interactive user interface to initiate updates to risk data of the user, in response to receiving an indication of selection of the option in the interactive user interface on the user computing device, initiating communication between the user computing device and an account discovery system, wherein the account discovery system is configured to identify a new account of the user through analysis of data items associated with the user stored by one or more third-party databases, transmitting, to the secured third-party risk system, a second request for execution of the risk scoring algorithm to determine an updated risk score of the user based at least on risk data of the user, including information regarding the new account of the user, at the secured third-party risk system, receiving, from the secured third-party risk system, the updated risk score of the user, querying the item database with at least the updated risk score of the user, receiving, in response to said querying the item database, information indicating that at least one of the second one or more data items matched to the user based on the updated risk score, and updating the interactive user interface data to depict information regarding the at least one of the second one or more items in the user interface on the user computing device.

In one embodiment, a computerized method performed by a computing system having one or more hardware computer processors and one or more non-transitory computer readable storage device storing software instructions executable by the computing system comprises accessing a score impact rule indicating one or more account types that impacts risk scores of users, identifying an API token associated with a secured third-party risk database, transmitting the API token and a request for risk data of a user to the third-party risk database. The method may include accessing, via an secure communication channel established with the third-party risk database, risk data of the user, identifying a plurality of groupings of data items (which may also be referred to as subsets of data items) included in the risk data of the user, each of the groupings including a plurality of data items associated with an entity, determining an account type of a plurality of account types for each of the groupings of data items, identifying a first account type of the one or more account types that impacts credit scores of users that is not included in the determined account types of the plurality of groups of data items associated with the user, execute a score impact algorithm, based at least on the first account type and the risk data of the user, to determine a possible risk score change if an account of the first account type is added to the risk data of the user. The method may include providing, to the user, an indication of the possible risk score change.

In one embodiment, the possible risk score changes indicates an estimated risk score. In one embodiment, the possible risk score changes indicates an estimated risk score increase or decrease. In one embodiment, the method further comprises providing, to the user, an option to initiate addition of an account of the first account type to risk data of the user. In one embodiment, a first plurality of data items associated with a second entity indicate transactions of the user in a second account of the second account type. In one embodiment, the score impact algorithm is developed based at least on historical risk score changes of a plurality of other users in response to addition of respective accounts of the first account type to respective risk data of the users. In one embodiment, the method further comprises executing a second score impact algorithm configured to estimate a second possible risk score associated with addition of a second account of a second account type to the risk data of the user, and providing, to the user, a second indication of the second possible risk score change.

In one embodiment, the computerized method of further comprises receiving, via network communication with a user computing device, selection of a third-party entity from a plurality of third-party entities indicated in a user interface displayed on the user computing device, credentials for directly accessing, by proxy on behalf of the user via an application programming interface (API), a plurality of data items associated with the user stored in one or more databases associated with the selected third-party entity, transmitting at least an API token associated with the selected third-party and the credential to one or more databases associated with the selected third-party entity, accessing a plurality of data items associated with the user, via an API communication channel established with the one or more databases associated with the selected third-party entity, wherein said identifying a plurality of groupings of data items further comprises: selecting a first data item of the plurality of data items, determining a recipient identified in the first data item, identifying a subset grouping of data items each indicating the determined recipient, wherein the subset grouping of data items includes at least the first data item and one or more other data items, determining, based at least on the identified subset grouping of data items, account data associated with an account of the user associated with the recipient, the account data comprising at least one or more of: a number of data items each having time stamps within a predetermined time period, and an average number of days between time stamps of sequential data items. In one embodiment, the method further includes applying a first account identification rule, associated with the first account type, to the account data, determine, based on said application of the first account identification rule, a first confidence level indicating likelihood that the account is the first type of account, in response to determining that the first confidence level is above a first threshold, applying a first account scoring model to the account data, the first account scoring model configured to determine an expected change to a current risk score associated with the user, receiving, from the user computing device, confirmation that the account of the user is the first type of account type, receiving, from the user computing device, a request to add the account with the recipient to risk data associated with of the user at a the secured third-party risk database, generating, based on portions of the plurality of data items and the account data associated with the recipient, an account creation data package, the account creation data package formatted for ingestion at the secured third-party risk database to initiate addition of the account to risk data of the user, identifying a security key associated with the secured third-party risk database, transmitting the security key and the account creation data package to the third-party risk database via a secure communication channel established with the third-party risk database, requesting execution of a risk scoring algorithm using risk data of the user at the secured third-party risk database, wherein the risk scoring algorithm is based at least partly on portions of the plurality of data items or the account data included in the risk data of the user, and providing risk score change information to the user computing device.

In one embodiment, a computing system is configured to perform operations comprising accessing a score impact rule indicating one or more account types that impacts risk scores of users, identifying an API token associated with a secured third-party risk database, transmitting the API token and a request for risk data of a user to the third-party risk database, accessing, via a secure communication channel established with the third-party risk database, risk data of the user, identifying a plurality of groupings of data items included in the risk data of the user, each of the groupings including a plurality of data items associated with an entity, determining, for each of the groupings of data items, an account type of a plurality of account types, identifying a first account type of the plurality of account types that impacts risk scores when added to risk data of respective users and is not included in the determined account types associated with the user, executing a score impact algorithm, based at least on the first account type and the risk data of the user, to determine a possible risk score change if an account of the first account type is added to the risk data of the user, and providing, to the user, an indication of the possible risk score change.

In one embodiment, the possible risk score changes indicates an estimated risk score. In one embodiment, the possible risk score changes indicates an estimated risk score increase or decrease. In one embodiment, the operations further comprise providing, to the user, an option to initiate addition of an account of the first account type to risk data of the user. In one embodiment, a first plurality of data items associated with a second entity indicate transactions of the user in a second account of the second account type. In one embodiment, the score impact algorithm is developed based at least on historical risk score changes of a plurality of other users in response to addition of respective accounts of the first account type to respective risk data of the users. In one embodiment, the operations further comprise executing a second score impact algorithm configured to estimate a second possible risk score associated with addition of a second account of a second account type to the risk data of the user, and providing, to the user, a second indication of the second possible risk score change.

In one embodiment, a non-transitory computer readable medium having processor-executable instructions stored thereon that are executable by a hardware computer processor to perform operations comprising accessing a score impact rule indicating one or more account types that impacts risk scores of users, identifying an API token associated with a secured third-party risk database, transmitting the API token and a request for risk data of a user to the third-party risk database, accessing, via a secure communication channel established with the third-party risk database, risk data of the user, identifying a plurality of groupings of data items included in the risk data of the user, each of the groupings including a plurality of data items associated with an entity, determining, for each of the groupings of data items, an account type of a plurality of account types, identifying a first account type of the plurality of account types that impacts risk scores when added to risk data of respective users and is not included in the determined account types associated with the user, executing a score impact algorithm, based at least on the first account type and the risk data of the user, to determine a possible risk score change if an account of the first account type is added to the risk data of the user, and providing, to the user, an indication of the possible risk score change.

BRIEF DESCRIPTION OF THE FIGURES

FIG. 28D is an embodiment of another example user interface that may be provided to the user as part of an online credit report.

FIG. 37 is an embodiment of an example user interface that may be provided to the user that wishes to dispute information associated with a self-reported account, such as an account that is added as a trade line to credit data of the user by the account discovery system discussed herein.

DETAILED DESCRIPTION OF EMBODIMENTS

Although several embodiments, examples and illustrations are disclosed below, the systems and methods described herein extends beyond the specifically disclosed embodiments, examples and illustrations and includes other uses of the embodiments and modifications and equivalents thereof. Embodiments are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments. In addition, various embodiments can comprise several novel features and no single feature is solely responsible for its desirable attributes or is essential to practicing the embodiments herein described.

Figure 1:
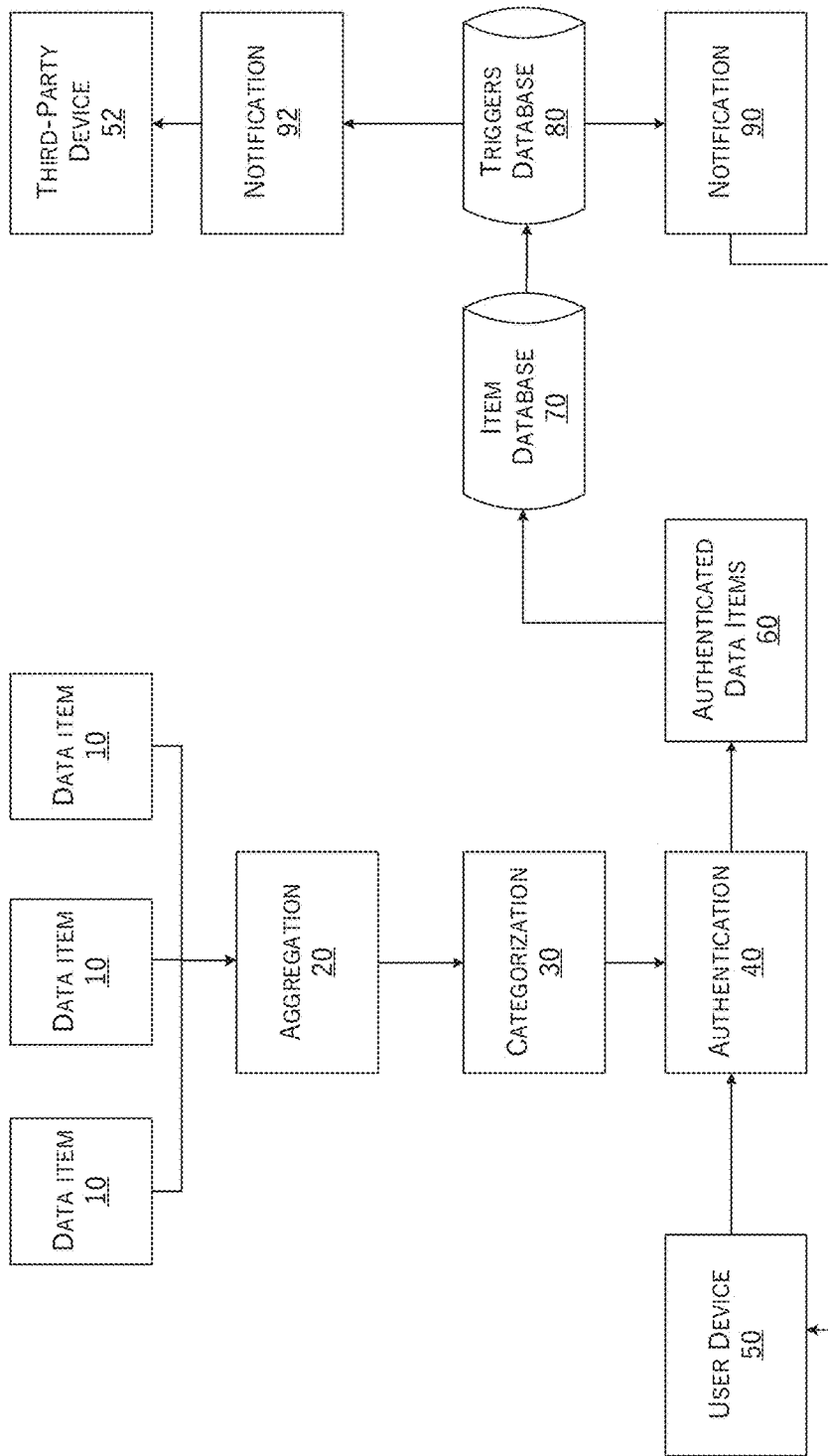
FIG. 1 is an embodiment of a flow diagram illustrating example components and example communications between the components of an embodiment of an authenticated access and aggregation database platform.

FIG. 1 is an embodiment of a flow diagram illustrating example components and example communications between the components of an embodiment of an authenticated access and aggregation database platform. In the example of FIG. 1, multiple data items 10, which may be accessed or received from one or more third-party entities, such as via a direct application programming interface (API) communication channel, are analyzed to determine whether any of the data items 10, or combinations of data items 10, meet rules for addition of the data items 10 to secure third-party risk item database 70. In general, the item database 70 stores and maintains database records for a plurality of users, each having one or more associated data items.

In this example, aggregation unit 20 accesses the multiple data items 10, and identifies groupings (also referred to as "subsets") of data items each associated with a common entity. For example, multiple data items of a user stored in a third-party database may be included in a grouping. A categorization unit 30 may then apply rules to the groupings of data items to identify groupings that match one or more patterns indicative of groupings of data items that should be added to the item database 70.

Authentication unit 40 allows a user of a user device 50 to provide authentication credentials that uniquely identify the user as associated with a set of data items in a particular data item database, such as a database operated by a particular third-party entity. In some embodiments, the authentication unit 40 also receives authentication credentials via the aggregation unit 20, for example. Thus, authentication of the user may occur at various levels. In some embodiments, the user is the owner of data items associated with the user and can control, set, change, and/or issue electronic permissions for use of varying sets, silos, individual data items, or even particular pieces of data within a data item, via the authentication unit 40.

The authentication unit 40 may then provide a set of authenticated data items 60 to item database 70, such as multiple data items 10 that were aggregated to a particular grouping of data items associated with the user, and matching a rule for addition to the items database 70. The user may then authenticate the grouping of data items, via input from the user device 50, to authenticate the grouping of data items for addition to the item database 70.

The item database 70, after receipt of authenticated data items 60, may determine that information of the corresponding database record, such as a record associated with the user, is to be updated. For example, the authenticated data items 60 may include a grouping of data items each associated with a particular entity (different than the entity from which the data items were accessed) that the user authenticated as begin associated with an account that the user would like to add to the item database 70, such as in a new database record associated with the user. Communication of the authenticated data items 60 to the item database 70 may occur via a secure communication channel established via an application programming interface (API).

In some embodiments, the item database 70 includes records associated with unique identifiers (for example, a key value and/or index value) for users. The system may determine that the received authenticated grouping of data items are associated with a particular database record because the authenticated data items include information that associates them with the particular database record. For example, the authenticated data items may include the unique user identifier, and/or the authenticated data items may include another identifier that may be used to map to the unique user identifier by reference to additional information. The system may then determine that the authenticated data items include additional information regarding the user that is not already in the database record for the user, and may therefore update the database record with the new information.

In some instances, the system may determine that the corresponding database record is not to be updated. For example, the authenticated data items may include one or more groupings of data items that are already included in the database record of the user. Accordingly, no update may be necessary, or in some instances the database record or associated database items may be updated to indicate that a duplicate of the authenticated data items was received.

The system may generate a log of each database record update performed by the system. In some implementations, the log includes one or more (which may include all) data items included in the corresponding database record, including any newly added grouping of data items. Further, the log may include an indication of the change or update that was performed in the item database 70.

Database record updates/changes may be continuously logged as the item database 70 is updated. Logging updates to the item database 70 may speeds up later evaluation of triggers. For example, as described below, triggers may be evaluated against the log of record changes, and may not need to be evaluated against the records database 70 as a whole. This aspect may significantly reduce processing power needed to generate event notifications. Further, because much information related to the updated record may be included in the log, the system may not need to re-query the database to generate notifications, further making the process of generating notification more efficient and less processor intensive. In some implementations, logs of database record updates may be stored in a historical database.

The triggers database 80 maintains rules indicating when alerts should be transmitted to entities responsive to changes in the item database 70. For example, the triggers database may maintain rules or criteria for transmitting a notification 90 to a user (such as via the user device 50) in response to certain changes in the database record of the user in the item database 70. For example, the user may establish such criteria based on various levels of granularity, so that the user is alerted of only those changes to their database record at the item database 70 of particular interest to the user. For example, a user may indicate that an alert should be sent to the user device 50 in response to addition of a new account data (associated with a grouping of data items) to the user's record in the item database 70. Thus, the trigger database 80 may monitor continuously or periodically, changes to the item database 70, apply trigger rules for each of a plurality of users, and transmit notifications accordingly.

The notification 90 may be in various forms, which may be selected by the user, by the system, and/or set as a system default. For example, notification 90 may be a push notification to a mobile application on the user device 50, which may cause an immediate display of the notification information on the user device screen, text message, email, and/or update to an online portal that the user may access to review additional information regarding the users database record with the item database.

In the example of FIG. 1, a notification 92 is also transmitted to third-party device 52. For example, a third-party may establish rules that periodically identify user records within the item database 70 that each have a predetermined set of characteristics. In this embodiment, the notification 92 may include a list of user information, and/or some or all of the corresponding user records from item database 70, that match the third-party established rules.

Aggregation unit 20 may aggregate account data from financial institutions, such as the data items 10. As an example, aggregation unit 20 may download transaction data items 10 associated with users from financial institutions, such that the users can review the transaction data from one or more financial institutions in one place. Aggregation unit 20 may also provide transaction data to the categorization unit 30, which is similar to the account discovery systems discussed below, such as after receiving authorization from users to provide such transaction data to the categorization unit.

Financial institutions may include, as examples, institutions maintaining demand deposit accounts (for example, checking and savings accounts) or other accounts (for example, credit card accounts, revolving card accounts, prepaid cash card accounts, reloadable card accounts, and so forth) on behalf of users, including accepting deposits into users' accounts and processing payments (including check and electronic payments) out of users' accounts to third parties such as utility or rent providers. Financial institutions may provide transaction data to account discovery system showing users' payments to utility and rent providers (for example, at the direction or authorization of said users).

Vendors or service providers may include various service providers such as landlords (for example, rental service providers), telecoms (for example, providers of telephone, internet, wireless accounts, cable, media such as television, movies, games, music, and other related services), and utilities (for example, providers of electricity, gas, water, trash, and related services). In general, service providers may include any entity which is regularly paid by users, such that those payments can be used as an indicator of credit risk associated with the user, and as discussed herein, added as a trade line in a users' credit data. For example, service provider accounts may include accounts for payment of child care, school tuition, gym memberships, after school programs, daycare service, medical care, home owners association dues, country club dues, insurance (such as, for example, automobile insurance, life insurance, medical insurance, dental insurance, vision insurance, disability insurance, and so forth), sports team dues, as well as other service provider account payments. While much of the disclosure references rental and utility providers, accounts with other service providers may also be added to users' credit data and used in credit scoring algorithms.

Terms

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide example descriptions.

The terms user, individual, consumer, and customer generally refer to single persons, as well as groups of users, such as, for example, married couples, households, or domestic partners, organizations, groups, and business entities. Additionally, the terms may be used interchangeably. In some embodiments, the terms refer to a computing device of a user rather than, or in addition to, an actual human operator of the computing device.

User Input (also referred to as Input) generally refers to any type of input provided by a user that is intended to be received and/or stored by one or more computing devices, to cause an update to data that is displayed, and/or to cause an update to the way that data is displayed. Non-limiting examples of such user input include keyboard inputs, mouse inputs, digital pen inputs, voice inputs, finger touch inputs (for example, via touch sensitive display), gesture inputs (for example, hand movements, finger movements, arm movements, movements of any other appendage, and/or body movements), and/or the like.

Credit data generally refers to user data that is collected and maintained by one or more credit bureaus (for example, Experian, TransUnion, and Equifax) and is subject to regulatory requirements that limit, for example, sharing of credit data to requesting entities based on the Fair Credit Reporting Act (FCRA) regulations in the United States and/or other similar federal regulations. Regulated data, as used herein, often refers to credit data as an example of such regulated data. However, regulated data may include other types of data, such as HIPPA regulated medical data. Credit data can describe each user data item associated with a user, for example, an account balance, or any combination of the user's data items. Credit file and credit report generally refer to a collection of credit data associated with a user, such as may be provided to the user, to a requesting entity that the user has authorized to access the user's credit data, or to a requesting entity that has a permissible purpose (for example, under the FCRA) to access the users credit data without the user's authorization.

Credit Event (also referred to as an event) generally refers to information associated with an event that is reported by a financial institution to one or more credit bureaus and/or the credit data system discussed herein. The credit events may include, for example, information associated with a payment, purchase, bill payment due date, bank transaction, credit inquiries, and/or any other event that may be reported to a credit bureau. Typically one credit event is associated with one single user. For example, a credit event may be a specific transaction, such as details regarding purchase of a particular product (for example, Target, $12.53, grocery, and so forth) or a credit event may be information associated with a credit line (for example, Citi credit card, $458 balance, $29 minimum payment, $1000 credit limit, and so forth, such as a periodic (for example, monthly) provision of summary information regarding the credit line of the consumer that is provided by the credit issuer.

Non-traditional Credit Data generally refers to data that is not generally included in FCRA regulated credit data of consumers, such as consumer data stored by one or more bureaus. Types of nontraditional credit data may change over time, such as if the FCRA revises regulations to allow or require credit bureaus to store additional types of consumer data as credit data. Depending on the jurisdiction, nontraditional credit data types may include rental, utility, and/or telecom data, for example.

Self-Reported Account generally refers to a consumer account with a vendor or service provider, such as a utility, telecom, or rental company, that is added to credit data of the consumer at the request of the user. The account discovery system discussed herein provides an example of a computing system that may interact with a user to identify and update credit data of the user to include accounts that are Self-Reported Accounts. In general, self-reported accounts are associated with non-traditional credit data, such as utility, rental, and/or telecom payment data.

DDA Account generally refers to a checking, savings, or money market account of a user, but could be any other type of account. DDA accounts typically allow the user to deposit to and withdraw from the account substantially immediately, such as on demand, for example, through use of a credit card, debit card, paper check, online check, electronic transfer, and so forth.

While DDA accounts are discussed herein as sources for transaction data from which transactions of a user may be accessed, in some implementations additional types of accounts, such as credit card, PayPal, Venmo, and/or other currently existing or later developed payment platforms, may be used in identifying new consumer trade lines. Thus, any reference herein to a DDA account, or any specific type of DDA account, should be interpreted to include other embodiments where other types of accounts, such as credit card accounts, are accessed in place of (or in addition to) the referenced DDA account.

Financial institution generally refers to a bank or lender with which a user may have a DDA account, such as a bank with which a user may have a checking or savings account.

Trade line generally refers to credit data associated with a financial account of a user. For example, a checking account at a particular financial institution may be a first trade line of a user, while a savings account at the same, or another, financial institution may be a second trade line of a user. Trade lines may be summarized in credit data of users, such as by providing information regarding the financial institution, account balance, last account payment amount, payment status over prior months, and so forth.

Transaction and transaction data item generally refer to a particular payment from one entity to another entity. For example, a transaction may include Bob purchasing coffee on Friday morning. A transaction data item associated with that transaction may include data about the transaction, such as that it occurred on Aug. 10, 2018 and $7.18 was paid to Coffee123 from Bob's checking account 123 at Bank XYZ. Transaction data items may indicate transactions using various user accounts, such as checking account, savings account, or credit card account. While discussions herein of transaction data items is primarily with reference to transaction identified in DDA account data of a user, transaction data items may also include transaction in a credit card account, or other credit-based account, of the user. Thus, the groupings and analysis of transaction data items that is discussed herein is not limited to only DDA account data, but also may include credit card transaction (and other payment account) data. As another example, cash, cashier check, money order, wire transfers, and other similar forms of payment may be included in transaction data items that are analyzed by the account discovery system. Such forms of payment may require additional validation procedures, such as a photograph of a receipt from the payee.

Application Programming Interface (API) generally refers to a defined communication channel, protocol, settings, and so forth that allows two devices to exchange information between one another in a more direct manner than might otherwise be possible. In some embodiments, an API registration module may be configured to register individual devices (for example, computing devices, Internet of things devices, sensors, and so forth) for communication with a particular computing device (for example, a central server that receives, processes, stores, provides, information to the individual devices) by issuing a security token (for example, such as an API token or an API key) to the individual devices that authorizes such direct communications. Thus, a computing system may establish secure and direct communication channels with multiple devices via APIs.

EXAMPLE EMBODIMENTS

The credit score is an important indicator of a user's financial health. A user's credit score may impact availability and/or terms (for example, interest rate) of such things as loan applications, rental applications, and real estate mortgages, as well as impacting the user's ability to find employment. Therefore, users have a substantial interest in monitoring and improving their credit scores.

Making timely payments and having those payments reported to national credit bureaus may improve a user's credit score. However, the types of financial accounts for which data is reported to the credit reporting agencies (CRAs), otherwise referred to as credit bureaus, is limited. For example, certain types of consumer accounts that could be used as indicators of risk associated with a lender extending credit to the consumer have not been historically included in credit data that is reported to the credit bureaus. In particular, telecommunications, utilities, real estate rentals, and other types of accounts associated with recurring statements, are not included in most credit score algorithms used by the credit bureaus. Thus, consumers that have good payment history with a home rental are not able to use that payment history in improving its the consumer's credit score. Accordingly, it may be desirable for a user to add telecommunications, utility, rental, and/or other recurring accounts (for example, records of payments to utility and rental providers) to users' credit data in order to improve the users' credit scores and related risk scores. Various systems and methods discussed herein provide a networking device architecture, as well as software usable on the various computing devices, to address this need for additional types of payment information being reportable to the credit bureaus. Other examples of recurring accounts that may be identified and added as trade lines to credit data of users may include accounts for payment of child care, school tuition, gym memberships, after school programs, daycare service, medical care, home owners association dues, country club dues, insurance (such as, for example, automobile insurance, life insurance, medical insurance, dental insurance, vision insurance, disability insurance, and so forth), sports team dues, as well as any other service provider account payments.

Some users, particularly those with poor credit scores or limited credit data, may benefit from adding non-traditional credit data to their credit reports. As an example, a user with limited credit data may see a significant boost in their credit score by adding, to their credit data, a utility account, showing recurring on-time payments to a utility provider, and a rental account, showing recurring on-time rent payments to a landlord. The present disclosure describes systems and methods that provide a technology platform for identifying and adding non-traditional credit data, such as rent and utility trade lines, to users' credit reports. Such accounts may then be referred to as self-reported accounts of the consumer. Additionally, the present disclosure describes issues that arise when attempting to add rent and utility accounts, such as issues with obtaining transaction data and assessing the reliability of transaction and account data.

Figure 2A:
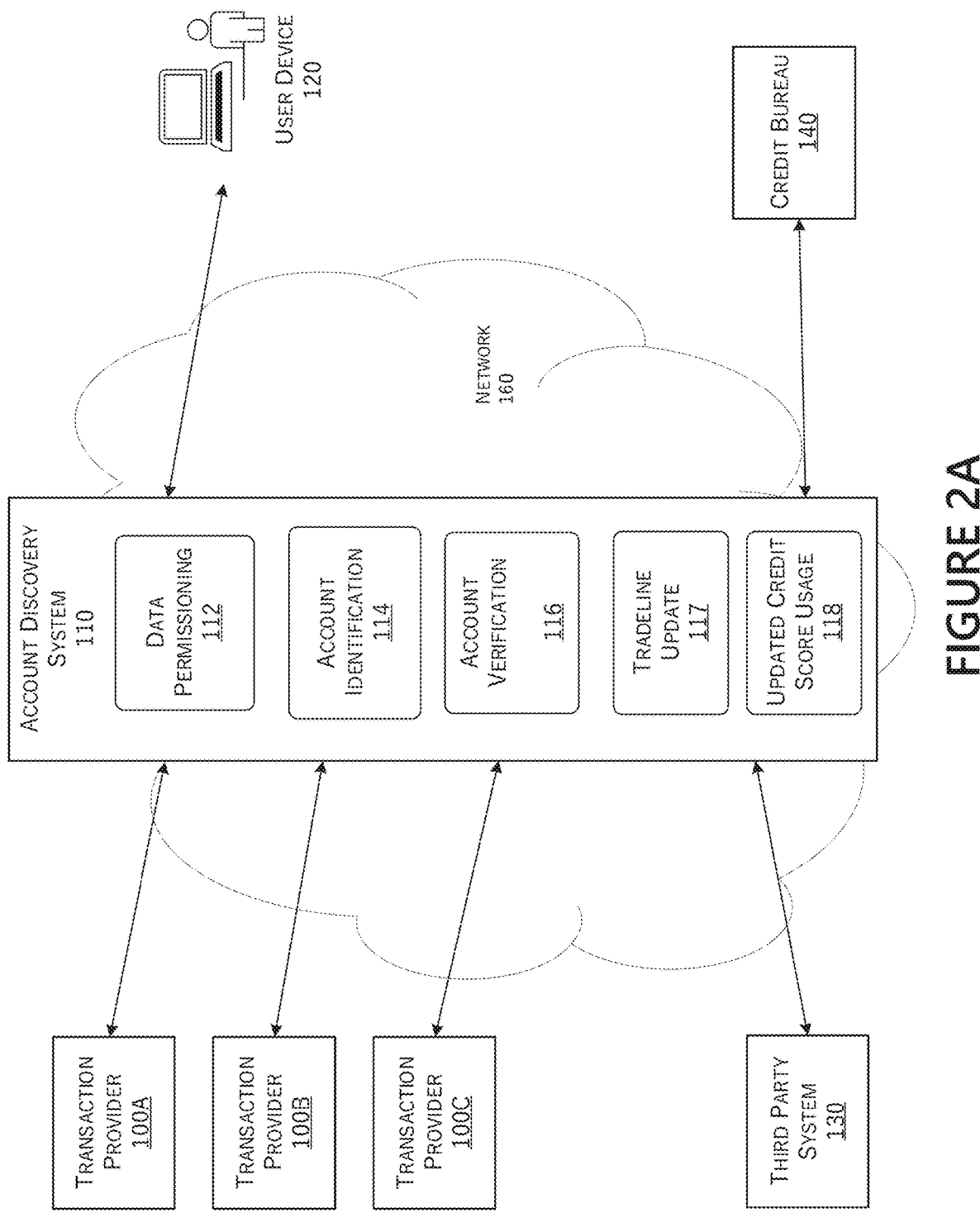
FIG. 2A is an embodiment of a block diagram illustrating an account discovery system in communication with various external devices and systems via a network.

FIG. 2A is an embodiment of a block diagram illustrating an account discovery system 110 (also referred to herein simply as the "system 110") in communication with various external devices and systems via a network 160. In this example, the system 110 is an indication with multiple transaction providers 100 (generally including one or multiple transaction providers 100A, 100B, 100C, or any other number of transaction providers). Transaction providers may financial institutions that provide DDA accounts to users, such as to consumers or businesses. As discussed further below, transaction providers store transaction data, in the form of transaction data items corresponding to individual transactions of the account holder, in secure databases that limit access to the consumer data. As described below, the account discovery system 110 advantageously provides a technical solution to allowing the system 110 to access transaction data of consumers have one or more transaction providers 100 using authorization credentials provided by the DDA account holder.

In the embodiment of FIG. 2A, the account discovery system 110 is also in communication with a user device 120 (which may refer to the user alone, the user computing device alone, or the combination of the user and the user computing device), a third-party system 130, and a credit bureau 140. The account discovery system 110 includes data permissioning component 112, account identification component 114, account verification component 116, trade line update component 117, and updated credit score usage component 118. In some embodiments, these components are distributed amongst multiple computer systems, servers, devices, and so forth, and/or among different entities, such as with one or more third-party entity that performs some of the functionality discussed with reference to the component. In some embodiments, the transaction providers 100 facilitate transactions between the user device 120 and the third-party system 130. For example, the transaction provider 100A may be a first financial institution with which the user has a checking account. Thus, the transaction provider 100A may facilitate payment of a monthly goods or services fee to the third-party system 130 via an electronic or printed check sent to the third-party system 130.

In one embodiment, the data permissioning component 112 provides a communication channel with the transaction providers 100, such as via application programming interfaces (API's) of the particular transaction providers. Thus, the data permissioning component 112 advantageously allows the account discovery system 110 to access transaction data items of the user. With access to the transaction data items of the user, the account discovery system 110 may analyze the transaction data items to potentially identify one or more recurring payment accounts that are not already included in the consumer's credit data. As an example, the data permissioning component 112 may store users' usernames and passwords or security tokens in order to download transaction data from the financial institutions. As another example, the data permissioning component 112 may store records, certificates, or other material enabling the user account discovery system to download transaction data directly from financial institutions or via account aggregation services.

In the embodiment of FIG. 2A, the account identification component 114 analyzes transaction data from one or more transaction provider 100 (for example, from one or more financial institutions) in search of sets of transaction data items indicative of a particular type of account, such as, for example, a recurring payment rental, utility, or telecom account. In some embodiments, the rules for identification of a particular type of account based on a set of transaction data items varies based on the particular type of account. For example, a rental account may have different identification criteria than a cellular telephone account. In some embodiments, the account identification component 114 may calculate a confidence level indicating likelihood that an identified account (for example, an identified rental, utility, or telecom account) is actually an account of the identified type. For example, the confidence level may indicate likelihood that a set of transaction data items really are indicative of a rental account of the consumer, rather than related to other transactions (for example, monthly payments to an ailing relative).

In one embodiment, the account verification component 116 performs account verification, such as by interacting with the user and/or one or more third-party system 130 to verify that the appropriate account type has been associated with the set of transaction data items and/or that the account is truly associated with the particular user.

In one embodiment, the trade line update component 117 provides information to one or more credit bureaus requesting addition of an identified and verified user account (for example, a "self-reported account" of the user) to credit data of the user. For example, the trade line update component 117 may format and compile information regarding a new account to be added to credit data of the user in different formats for each of multiple different credit bureaus and generate a secure data packet storing such information to be transmitted to a remote system. Additionally, the trade line update component 117 may coordinate periodic updates to trade line data stored at the credit bureau 140, such as monthly updates to a rental account that was added to the credit data of the user previously by the trade line update component 117.

In one embodiment, the updated credit score usage component 118 provides updated credit information regarding the user (for example, an updated credit score of the user that considers a newly added rental account) to credit requesters. For example, a new account (or trade line in the credit data of the user) may be considered by various credit scoring algorithms in calculating risk scores of the user. Thus, if a new rental account of the consumer is added to the consumer's credit data, and the consumer has a history of on time rental payments, the consumer's credit score may increase immediately, or very soon, after addition of the new rental account information at the one or more credit bureaus. In some embodiments, the updated credit score usage component 118 provides alerts, such as in real time as credit data of a user is changed.

In some embodiments, the account discovery system 110 includes a user interface module (not shown) that interfaces with users. As an example, the user interface module may generate user-facing user interfaces, such as the user interfaces shown in the figures discussed below. Additionally, the user interface module may receive inputs and commands from the users, such as via interface with the user interfaces. As examples, the user interface module may receive a user's agreement with terms and conditions, may receive a user's identification of which financial institution to connect to, may receive credentials for connecting to an identified financial institution, may receive confirmations of and/or revisions to transaction data, may receive additional verification information such as copies of a lease agreement, and so forth.

Figure 2B:
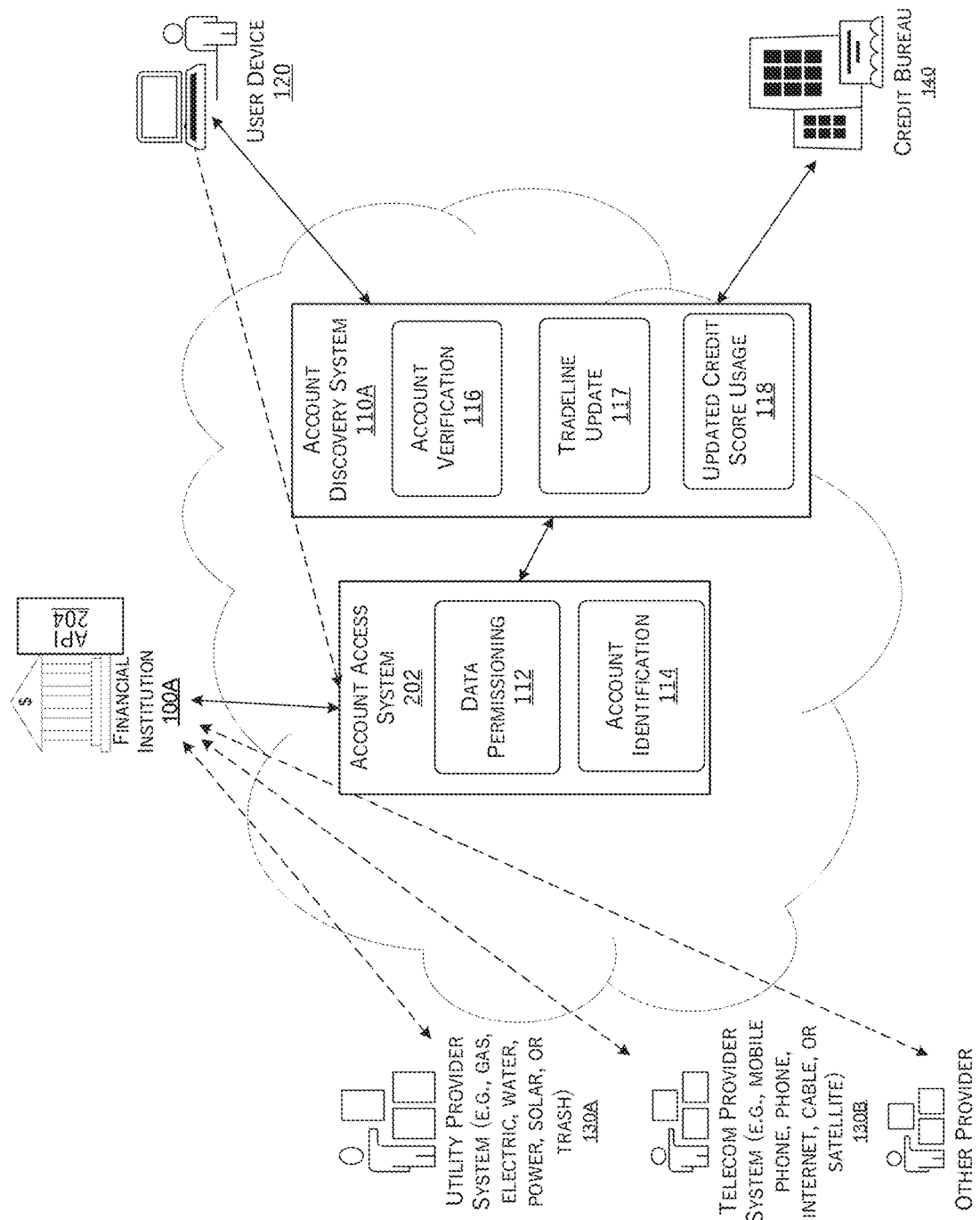
FIG. 2B a one embodiment of a block diagram illustrating another example embodiment of an account discovery system in communication with various external computing systems and devices.

FIG. 2B a one embodiment of a block diagram illustrating another example embodiment of an account discovery system in communication with various external computing systems and devices. In this embodiment, the account discovery system 110A includes the account verification component 116 and the updated credit score usage component 118. However, a separate account access system 202 includes the data permissioning component 112 and the account identification component 114. In one embodiment, the account access system 202 is operated and controlled by a third-party to the owner of the account discovery system 110A. For example, the account access system 202 may have relationships or be configured to electronically communicate with multiple transaction providers 100, such as the illustrated transaction provider 100A in FIG. 2B that allow the account access system 202 to access transaction data of the user via user device 120. The transaction providers 100 may be financial institutions, such as banks, lenders, creditors, and/or other facilitators of transactions. For example, the account access system 202 may communicate with the user device 120 to obtain credentials for accessing the users DDA account information at the transaction provider 100A (such as a financial institution), and then make use of an API 204 to access DDA account information from the transaction provider 100A immediately and/or periodically in the future. The DDA account information, for example, including multiple transaction data items, may then be analyzed by the account identification component 114 to identify potential accounts of the desired account type (for example, rental, utility, telecom, etc.). For example, the transaction provider 100A may have previously provided payment(s) to one or more of the utility provider system 130A (such as gas, electric, water, power, solar, or other utility provider), telecom provider system 130B (such as mobile phone provider, phone service provider, internet service provider, cable or satellite television provider, or the like), or other provider 130C, and so forth), and stores transaction data items for each of those payments. These transaction data items stored at the transaction provider 100A may be accessed by the account access system 202 to identify self-reported accounts that may be added to credit data of the user. Information regarding the identified accounts may then be provided to the account discovery system 110A to verify with the user and/or third-party (for example, the utility provider system 130A, telecom provider system 130B, or other provider 130C) and to provide verified accounts to the credit bureau 140.

In this way, the account access system 202 maintains a layer of security between the account discovery system and the consumers financial data held by the financial institution (or other transaction provider 100). In other embodiments, the various components 112, 114, 116, 117, and 118 may be combined or separated, various computing systems and/or entities. For example, in one embodiment each of the components 112, 114, 116, 117, and 118 are operated by different entities.

Figure 3:
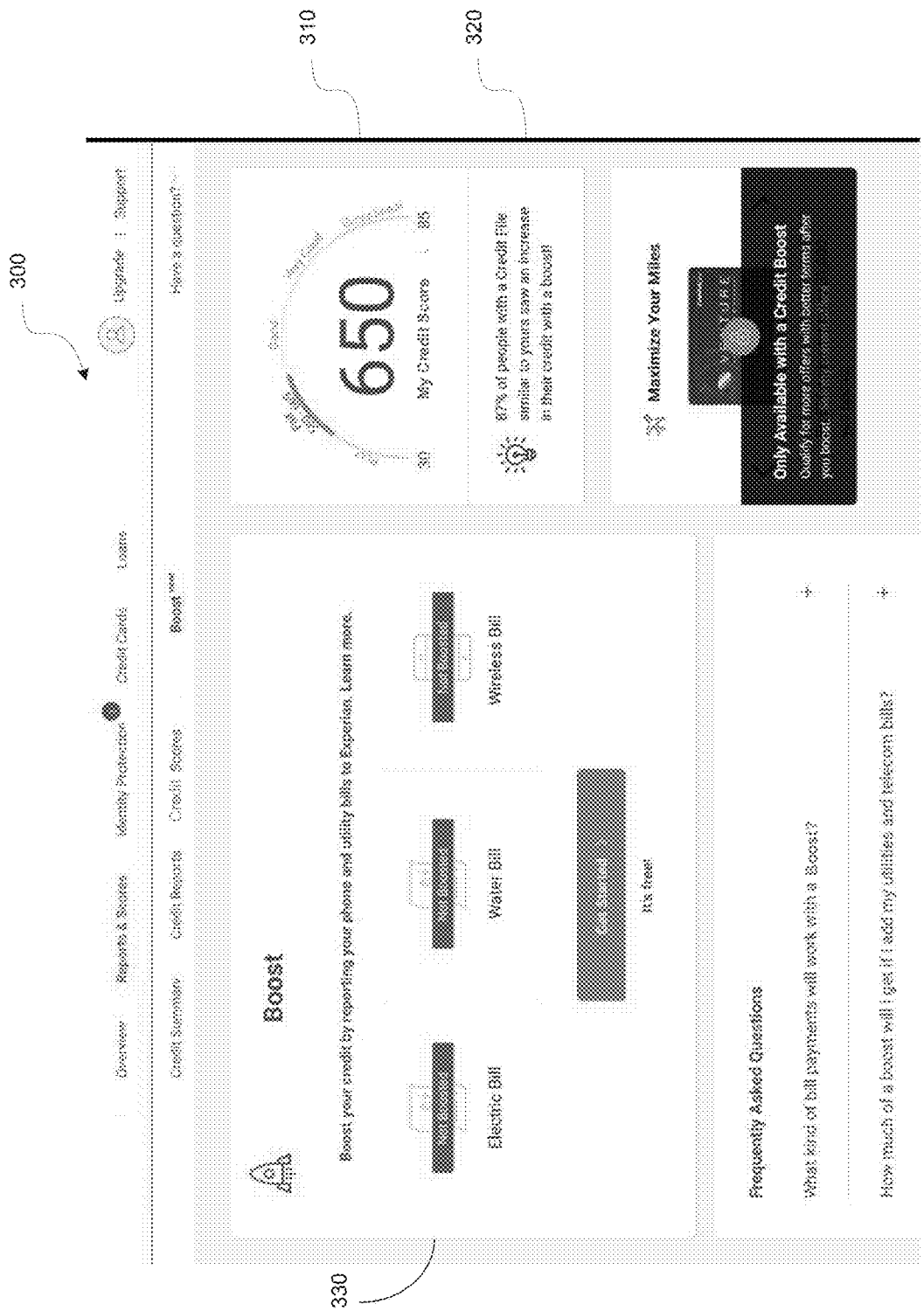
FIG. 3 is one embodiment of an example user interface that may be provided to a user to initiate an account discovery process.

FIG. 3 is one embodiment of an example user interface that may be provided to a user to initiate an account discovery process. In this particular example, the user interface 300 includes credit score information 310, which includes a current credit score of the user in this example. The example user interface 300 also includes a potential score improvement interface 320, which illustrates estimated likelihood of improvement in the consumer's credit score in response to adding additional non-traditional trade lines to the consumer's credit data. In this particular example, the estimated likelihood of improvement is based on improvements realized by a similar group of consumers, such as consumers that have reticular overlapping attributes as the current user. The example user interface 300 further includes information regarding account types that may be identified by the system and added to the credit data of the user to potentially improve the credit score of the user. In particular, the credit improvement interface 330 illustrates that an electric account, water account, and wireless account could be added to the credit data of the user to potentially increase the user's credit score. In this example, the system has identified that these three account types are not currently in the crediting of the user and, thus, are good candidates for potentially improving the credit score of the user. Any of the user interfaces discussed herein may be provided in part or in whole by a server system (such as, for example, via a web browser access a secure web portal) or may be provided by an application that runs locally on the user device. Additional user interfaces, as well as systems and methods for providing features similar to those discussed herein, may be found in U.S. Provisional Applications No. 62/727,479, titled "System for authenticated access, aggregation, and categorization of database records," filed on Sep. 5, 2018, and No. 62/826,319, titled "Authenticated access and aggregation database platform," filed Mar. 29, 2019, each of which are hereby incorporated by reference in their entireties and for all purposes.

In one embodiment, the systems and methods discussed herein provide an authenticated access and aggregation database platform. For example, in one embodiment a data processing system is disclosed for data processing, including database and file management, as well accessing one or more databases or other data structures, authenticating users, and categorizing data items for addition to the database system. In some embodiments, the system may be configured to coordinate access to user account information via user-provided authentication credentials; apply account identification rules to the accessed account information to identify a plurality of accounts of the user; and initiate updates to a database record associated with the user indicative of any accounts identified.

In one embodiment, a computerized method of obtaining information regarding user accounts is performed by a computing system having one or more hardware computer processors and one or more non-transitory computer readable storage device storing software instructions executable by the computing system to perform operations comprising receiving, from a user computing device, a request to access financial account information associated with a user, selection of a financial institution indicator from a plurality of financial institution indicators indicated in a user interface on the user computing device. The method may further include receiving, from an account access system, account data associated with a financial account of the user with a payee, the account data indicating an account type and an associated payee, wherein the financial account is a rental account, a utility account, or a telecommunication account. The method may further include receiving, from the user computing device, confirmation that identified account type for the payee is accurate, a request to add the financial account with the payee to credit data of the user. The method may further include generating, based on portions of the plurality of transaction data items and the account data associated with the payee, a trade line creation data package, the trade line creation data package formatted for ingestion by a credit bureau to initiate addition of the trade line to credit data of the user, transmitting the trade line creation data package to the credit bureau, requesting a credit score of the user from the credit bureau, wherein a credit scoring algorithm executed by the credit bureau to generate the credit score is based at least partly on portions of the plurality of transaction data items or the account data included in the credit data of the user. The method may further include providing credit score change information to the user computing device.

In one embodiment, the method may further include receiving, from the user computing device credentials for accessing financial account information associated with the user at the selected financial institution, the credentials including a username and a password, selection of a financial account of the user at the financial institution via the user interface on the user computing device, the user interface displaying one or more of a checking account, a savings account, or a credit card account of the user at the financial institution. The method may further include accessing a plurality of transaction data items of the selected financial account of the user at the financial institution. The method may further include selecting a first transaction data item of the plurality of transaction data items, determining a payee identified in the first transaction data item, identifying a subset of transaction data items each indicating the determined payee, wherein the subset of transaction data items includes at least the first transaction data item and one or more other transactions data items. The method may further include, for individual payees, determining, based at least on the identified subset of transaction data items, account data associated with a financial account of the user with the payee, the account data comprising at least one or more of a number of payments, an annual payment amount, average payment amount, or average number of days between payments. The method may further include applying a first account identification rule, associated with a first account type, to the account data, the first account identification rule based on one or more of the number of payments, the annual payment amount, the average payment amount, or the average number of days between payments, determine, based on said application of the first account identification rule, a first confidence level indicating likelihood that the financial account is the first type of account. The method may further include applying a second account identification rule, associated with a second account type, to the account data, the second account identification rule based on one or more of the number of payments, the annual payment amount, the average payment amount, or the average number of days between payments, determine, based on said application of the second account identification rule, a second confidence level indicating likelihood that the financial account is the second type of account. The method may further include, if the first confidence level is higher than the second confidence level, identifying the financial account as of the first type of account, if the first confidence level is lower than the second confidence level, identifying the financial account as of the second type of account.

In one embodiment, the systems and methods discussed herein provide user permissions for access to secure data at third-party. For example, in one embodiment a user permission system manages and regulates access to secure data at one or more third-party data sites. The system may provide access to one or more databases or other data structures based on user authentication and access rules that have been established, such as by a user associated with the data being accessed at the third party data store. Access may be provided via an API to the third-party data site, along with access credentials of a user with data stored with the third-party data site, allowing the system to access data on behalf of the user.

In one embodiment, a computerized method of obtaining information regarding user accounts is performed by a computing system having one or more hardware computer processors and one or more non-transitory computer readable storage device storing software instructions executable by the computing system to perform operations comprising transmitting user interface data to a user computing device, the user interface data configured to depict a permissions interface element that is selectable to indicate authorization to access financial account information associated with the user, receiving, from the user computing device, authorization to access financial account information associated with the user. The method may further include, in response to receiving the authorization to access financial account information associated with the user, receiving, from the user computing device, selection of a financial institution from a plurality of financial institutions indicated in a user interface on the user computing device, receiving credentials for accessing financial account information associated with the user at the selected financial institution, identifying an API key associated with the selected financial institution, transmitting, to an online address of a system in electronic communication with the selected financial institution, the API token and the credentials, receiving, via the system, indicators of one or more financial accounts of the user with the selected financial institution, receiving, from the user computing device, selection of a financial account of the one or more financial accounts, accessing, via a secure communication session initiated with the API token, a plurality of transaction data items of the selected financial account of the user at the financial institution. The method may further include transmitting user interface data to the user computing device, the user interface data configured to depict a user interface on a display of the user computing device, the user interface including one or more interactive elements selectable to indicate authorized uses of the transaction data items by the computing system, receiving, from the user computing device, selection of authorized uses of the transaction data items, selectively sharing, based on the authorized uses of the transaction data items, the transaction data items with one or more third parties.

In some embodiments, the authorized uses of the transaction data items include one or more of use in: identifying recurring payments, updating credit data of the user, calculating derived attributes, or calculating a risk score. In some embodiments, transaction data items associated with a post date more than one year prior to a current date are disregarded. In some embodiments, transaction data items associated with a post date more than two years prior to a current date are disregarded. In some embodiments, the access component is operated by the computing system. In some embodiments, the access component is operated by a third-party.

In one embodiment, a computerized method performed by a computing system having one or more hardware computer processors and one or more non-transitory computer readable storage device storing software instructions executable by the computing system to perform the computerized method comprises accessing a plurality of data items associated with a user via an application programming interface (API) communication channel established with a third-party database, selecting a first data item of the plurality of data items, determining a recipient identifier in the first data item, accessing a recipient data structure storing indications of associations between recipient identifiers and corresponding recipients, wherein a first recipient is associated with a plurality of recipient identifiers used by different third-party databases to identify the first recipient, determining that the recipient identifier is associated with the first recipient in the recipient data structure, scanning the plurality of data items to identify a subset of the data items each associated with the recipient identifier, wherein the subset of data items includes at least the first data item and one or more other data items, determining, based at least on the identified subset of data items, account data associated with an account of the user with the first recipient, the account data comprising at least one or more of a number of data items each having time stamps within a predetermined time period; or an average number of days between time stamps of sequential data items, applying a first account identification rule, associated with a first account type, to the account data, determining, based on said application of the first account identification rule, a first confidence level indicating likelihood that the account is the first type of account. The method may further include, in response to determining that the first confidence level exceeds a threshold confidence level, initiating addition of the account to the secured third-party risk database.

In one embodiment, a computerized method of identifying accounts of a user each associated with a plurality of transaction data items is performed by a computing system having one or more hardware computer processors and one or more non-transitory computer readable storage device storing software instructions executable by the computing system to perform the computerized method comprising accessing a plurality of transaction data items indicative of transactions of a user with one or more financial institution, selecting a first transaction data item of the plurality of transaction data items, determining a payee identifier in the first transaction data item, accessing a payee data structure storing indications of associations between payee identifiers and corresponding payees, wherein a first payee is associated with a plurality of payee identifiers used by different financial institutions to identify the first payee, determining that the payee identifier is associated with the first payee in the payee data structure, scanning the plurality of transaction data items to identify a subset of the transaction data items each associated with the payee identifier, wherein the subset of transaction data items includes at least the first transaction data item and one or more other transactions data items, determining, based at least on the identified subset of transaction data items, account data associated with a financial account of the user with the payee, the account data comprising at least one or more of: a number of payments, an annual payment amount, an average payment amount, or an average number of days between payments, applying a first account identification rule, associated with a first account type, to one or more of the number of payments, the annual payment amount, the average payment amount, or the average number of days between payments of the account data, determining, based on said application of the first account identification rule, a first confidence level indicating likelihood that the financial account is the first type of account, in response to the first confidence level exceeding a threshold confidence level, determining an expected risk score impact of including the account data a risk data set associated with the user, in response to the expected risk score exceeding a threshold, initiating addition of the account data to the risk data set associated with the user.

The method may further include selecting, based on the account data, the first account type from a plurality of account types including at least a rental account type, a utility account type, and a telecommunication account type. The method may further include selecting, based on the account data, the first account type from a plurality of account types that each require recurring payments from account holders. The method may further include applying a second account identification rule, associated with a second account type, to the account data, the second account identification rule based on one or more of the number of payments, the annual payment amount, the average payment amount, or the average number of days between payments, and determining, based on said application of the second account identification rule, a second confidence level indicating likelihood that the financial account is the second type of account. In one embodiment, the plurality of transaction data items are indicative of transactions of the user with a first financial institution and a second financial institution, a second transaction data item from the second financial institution includes a second payee indicator that is different from the first payee indicator, and the first payee indicator and the second payee indicator are each associated the first payee in the payee data structure.

In one embodiment, the systems and methods discussed herein provide generation of data structures based on categories of matched data. For example, in one embodiment a data processing system communicates with a secure third-party database to provide updated user data that is then usable by a plurality of other entities. In some embodiments, the system may be configured to coordinate access to user account information via user-provided authentication credentials, apply account identification rules to the accessed account information to identify a plurality of accounts of the user, and initiate updates to a database record of the user at the secure third-party database associated indicative of any accounts identified.

In one embodiment, a computerized method of updating user risk data, the computerized method performed by a computing system having one or more hardware computer processors and one or more non-transitory computer readable storage device storing software instructions executable by the computing system to perform the computerized method comprises receiving, from a user computing device, a request to update credit data of the user with account information regarding an account identified in direct deposit account data of a financial payment account of the user, generating a trade line creation data package including an identifier of an issuer of the account identified in the direct deposit account data, a data furnisher identifier associated with an entity that provides consumer data to a credit bureau; and at least a portion of the account information formatted for ingestion by a credit bureau to initiate addition of the account to credit data of the user. The method may include identifying an API key associated with the credit bureau, and transmitting the API key and the trade line creation data package to the credit bureau, wherein the account information is usable by the credit bureau to update a risk score of the user.

The method may further include periodically receiving payment information associated with the account from the direct deposit account data of the financial payment account; and transmitting the periodically received payment information to the credit bureau.

The method may further include executing a credit scoring algorithm to generate the credit score of the user based at least on the account information stored by the credit bureau.

In one embodiment, the systems and methods discussed herein provide a database platform for realtime updating of user data from third party sources. For example, in one embodiment a data processing system communicates with a secure third-party database to obtain information about a user that is usable to determine one or more items associated with the user. The system then coordinates gathering and identification of additional data relevant to the user from other third-party data sources, to potentially update the user's information stored with the secure third-party database. The updated information may then be accessed at the secure third-party database to determine items associated with the user, which may include additional items in view of the additional data.

In one embodiment, a computerized method, performed by a computing system having one or more hardware computer processors and one or more non-transitory computer readable storage device storing software instructions executable by the computing system to perform the computerized method comprises determining identification information of a user, obtaining a current risk score associated with the user, determining a first one or more product offers available to the user based on the current risk score, determining a second one or more product offers not available to the user based on the current risk score, determining an estimated risk score of the user based on hypothetical addition a new trade line of the user to risk data of the user, in response to determining that at least one of the second one or more product offers would be available to the user based on the estimated risk score, providing an option to the user to initiate updates to risk data of user, in response to the user selecting the option to initiate updates to risk data, initiating communication of the user with an account discovery system, receiving, from the account discovery system, an indication of an updated risk score of the user, wherein the updated risk score is higher than the current risk score based on addition of the new trade line to risk data of the user by the account discovery system, determining at least one of the second one or more product offers that are now available to the user based on the updated risk score, and providing the at least one of the second one or more product offers to the user. The method may include providing credit score change information to the user computing device.

In one embodiment, the systems and methods discussed herein are usable in estimating changes to user risk indicators based on modeling of similarly categorized users. For example, in one embodiment a data processing system communicates with a secure third-party database to obtain information about a plurality of users and generates a model usable to identify other users with similar characteristics. A scoring algorithm may be selected for use on user data based on the associated users identified with the model. The scoring algorithm determines an estimated score change for the user, and may provide the user information regarding how the user can achieve the estimated score change.

In one embodiment, a computerized method, performed by a computing system having one or more hardware computer processors and one or more non-transitory computer readable storage device storing software instructions executable by the computing system to perform the computerized method comprises accessing a score impact rule indicating one or more account types that impacts credit scores of users, accessing credit data of a user, identifying a plurality of accounts included in the credit data, determining account types of the plurality of accounts in the credit data, identifying a first account type of the one or more account types that impacts credit scores of users that is not included in the determined account types of the plurality of accounts of the user, execute a score impact algorithm, based at least on the first account type and credit data of the user, to determine a possible credit score change if an account of the first account type is added to the credit data of the user. The method may include providing, to the user, an indication of the possible credit score change.

The method may include identifying a plurality of other users associated with addition of accounts of the first account type, analyzing account data of the plurality of other users, based on the aggregated account data, generating the score impact algorithm configured to determine, for respective users, possible credit score changes based on addition of accounts of the first account type.

In some embodiments, other users are identified as users having accounts of the first account type with account attributes within predetermined threshold of the account attributes of the account of the user.

In some embodiments, the predetermined threshold is of payment history, payment amount, or account subtype of the accounts.

Example System and Process

Figure 4:
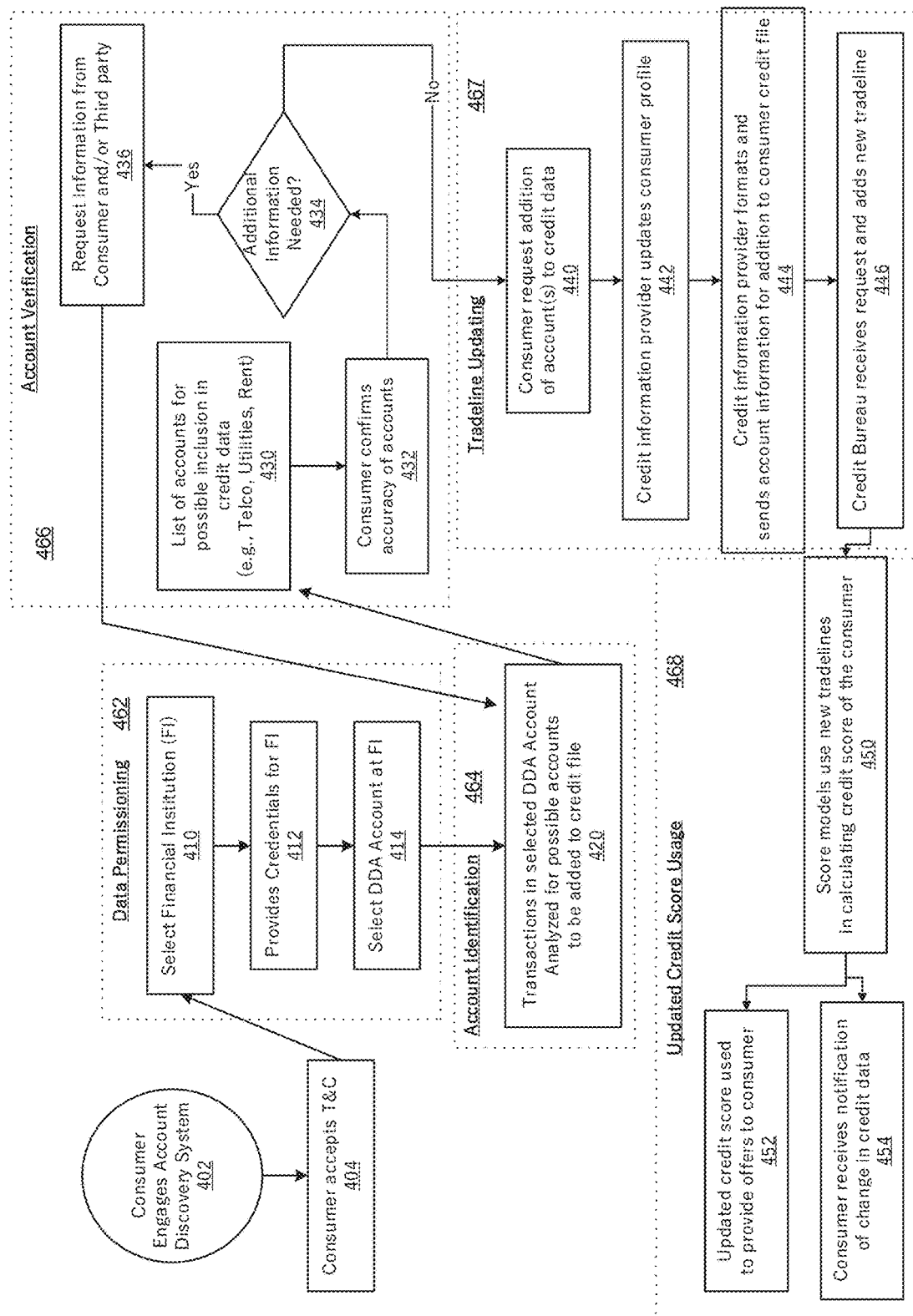
FIG. 4 is one embodiment of a block diagram illustrating various components and processes that may be performed according to various embodiments discussed herein.

FIG. 4 is one embodiment of a block diagram illustrating various components and processes that may be performed according to various embodiments discussed herein. Depending on the embodiment, certain implementations may include fewer or additional blocks than illustrated in FIG. 4, and/or the blocks may be performed in an order different than illustrated. Additionally, while the blocks are illustrated in functional groups, each of these functional groups may be performed by multiple computing systems and/or entities, and conversely, multiple functional groups may be combined for performance by a single computing system and/or entity.

The illustration of FIG. 4 includes functional modules for data permissioning, account identification, account verification, trade line updating, and updated credit score usage. However, the functional modules could be partitioned differently in certain embodiments. In the example of FIG. 4, the functional blocks 462, 464, 466, 467, and 468 are generally associated with components 112, 114, 116, 117, and 118, respectively. In other embodiments, functionality in a particular block of FIG. 4 may be divided among different components and/or functionality in multiple blocks of FIG. 4 may be combined into a single component.

Beginning with block 402, the user engages an account discovery system, such as a system that may be controlled and/or operated by a credit bureau. Account discovery systems may include credit bureaus, such as Experian, TransUnion, and Equifax, as well as agents of credit bureaus, such as entities that provide credit data to users that is accessed from one or more credit bureaus, but is made available to the user via a third-party user interface (for example, via a website or mobile application). In some embodiments, the user provides login credentials, or establishes a credit monitoring account with a credit bureau, in order to access credit information via the account discovery system 110.

In some embodiments, the user accepts terms and conditions 404 agreeing to the account discovery system's rights and responsibilities, authorizing performance of the functional modules of FIG. 4, and agreeing to the accessing, storing, maintaining, sharing, and so forth, of the user's personal information, such as information that may be obtained from financial institutions doing business with the user. In some embodiments, the user has previously accepted terms and conditions 404 that include authorization for performance of the remaining functional modules of FIG. 4.

Data Permission

In the embodiment of FIG. 4, a data permission module 462 performs functions that allow the user to select a financial institution 410, provide credentials for the financial institution 412, and select a direct deposit account (DDA) or other account at the financial institution 414 from which transaction data of the user should be accessed. In one embodiment, the functions of the data permissioning module 462 are performed by the data permissioning component 112.

At block 410, the user may be provided with a user interface that lists, or allows the user to search for, a financial institution (or other transaction provider 100) with which the user has a DDA account. In other embodiments, the user may indicate a financial institution in other manners. Next, in block 412, the user provides credentials that allow the account discovery system 110 (FIG. 1), the account access system 202 (FIG. 2), or another system, to access the user's financial information held with the selected financial institution. For example, a user with a checking account with XYZ bank may select XYZ bank at block 410 and then at block 412 provide a login and password that is usable to access the user's XYZ bank transactional data via XYZbank.com, or via an application programming interface (API) that communicates with XYZ bank. In some embodiments, transactional data includes a plurality of transaction data items that each correspond with a transaction between a payee (or other entity) and a user (for example, a consumer looking to identify accounts for addition to the consumer's credit file). Depending on the embodiment, the credentials provided at block 412 may be secured through use of a third-party account access and/or aggregation service, such as the account access system 202, so that the user is not required to provide their financial institution credentials (for example, their login and password for that financial institution) to the account discovery system 110. In such embodiments, the user may authorize the account discovery system 102 to access DDA account data via the third-party service, which may itself have access to the user's records at the financial institution.

Moving to block 414, the user selects a particular DDA account held at the financial institution, such as from a list of DDA accounts that is retrieved directly from the financial institution by the data permissioning component 112 (whether performed by account discovery system 102 or another system/entity). For example, the user may be provided with an option to select one or both of a XYZ bank checking account or a XYZ savings account after providing credentials for XYZ bank in block 412. In some embodiments, the user may be allowed to connect a credit card account also, so that transaction data items include payments made through the credit card account. While FIG. 4 references a DDA account at a financial institution, other accounts with other entities may be used in various implementations.

Depending on the embodiment, user authentication may be performed using various methods and based on various information. For example, authentication information may comprise a user-selected personal identifier, a username/password combination, biometric data (for example, faces, fingerprints or eye scans), and/or other information that can be used to authenticate a user. Similarly, various authentication protocols may be implemented to authenticate the user and/or any entities that are requesting information regarding the user's credit information, such as the service providers discussed herein. For example, a requesting user may send an electronic request to a token gateway environment (of the account discovery system 110 or account access system 202) with credentials, and then the token gateway environment may validate the credentials with a security and access management environment using a standard open protocol such as OAuth (for example, OAuth 2.0, which is generally an authorization framework that enables applications to obtain limited access to user accounts).

Account Identification

In the example of FIG. 4, an account identification component 464, at block 420, identifies accounts based on transaction data items within the selected DDA account (for example, the account selected in block 414) that may be added as trade lines to a user's credit data. In one embodiment, the account identification component 114 (for example, FIGS. 1 and 2) identifies accounts by finding patterns of transactions that indicate a high likelihood those transactions are associated with an account that can be added as a trade line to a user's credit data. In some embodiments, the account identification component (or other component) also determines whether an account that can be added to the user's credit data should be added to the user's credit data. For example, transaction data items associated with an electrical utility account (for example, Southern California Edison) of a user may meet criteria for adding the account to credit data of the user (for example, the monthly payment amounts, timing of the payments, payee information, and so forth, indicate that the transaction data items are for an electrical utility), in some situations addition of the account as a trade line to the user's credit data actually decreases the credit score of the user, for example, if the user paid less than the full amount due each month. Thus, rules or criteria for identifying accounts could include those identifying accounts that are likely qualified for addition to the user's credit data and further identify which of those accounts would have a positive impact on the credit score (and/or long term credibility of the user).

As another example of an account identification process that may be performed by the account identification module, transaction data items in Bob's checking account with XYZ bank may indicate that Bob has paid a regular amount to Al's Landlord Service on the last day of each month over the last two years. Thus, the account identification module may identify these regular transactions as being part of a rental account that may qualify for inclusion as a trade line in Bob's credit data (at one or more credit bureaus). Other types of accounts that may be identified include utility accounts (electrical, gas, water, and so forth), mobile phone accounts, and other accounts that are associated with payments indicative of credit worthiness of the account holder.

In some embodiments, the transaction processing of block 420 may be performed by the account discovery system 110, while in other embodiments a third-party that accesses and/or aggregates financial account information, such as account access system 202 (for example, as illustrated in FIG. 2B) may perform the transaction processing. In some embodiments, transaction data items from multiple accounts of the user, such as from both a checking account and a savings account of Bob (which may be at a common financial institution or at different financial institutions), are analyzed to identify potential accounts for addition as trade lines to the user's credit file. Thus, in such an embodiment, even if Bob alternates his monthly rental payments between his different accounts (even accounts at different financial institutions), the account identification component 114 may associate the payments with a common rental account. In some embodiments, transaction data items (or, more generally data items) may be accessed from other data sources, such as non-financial data sources. For example, data items indicating rental payments may be obtained from the landlord (or rental/leasing company) for analysis in identifying data items indicative of a rental account of the user and/or for verifying a rental account of the user.

In some embodiments, the account identification component 114 applies or executes one or more models that are configured to categorize transactions across multiple months or years of transactional data of the user. For example, in some embodiments, the account identification component 114 may search transaction data items of a user for transactions that occur with a certain periodicity, within a certain monetary range of one another, with certain keywords or characters in the payee's name (or other information, such as a memo or "for:" information field provided by the user), and/or any other attributes that may be associated with transaction data for the user. Data item groupings may then be created to indicate sets of data items that are believed to be associated with a particular account of the user. In some embodiments, each data item groupings is associated with a different payee.

In some embodiments the account identification component 114 may calculate a confidence level or score indicating likelihoods that the particular transaction data item should be included in a grouping of data items. Thus, for a particular transaction data item (for example, $4.58 purchase at Starbucks #417325 on Mar. 21, 2018 at 6:38 AM), multiple confidence levels may be calculated to indicate strength of correlation with multiple transaction groupings. In this implementation, the transaction data items may be associated with a transaction grouping for with a highest confidence level for the transaction data item was calculated. In some embodiments, a transaction data item confidence level may additionally need to exceed a threshold confidence level for the transaction data item to be associated with a grouping.

The account identification component 114 may associate an account type with each identified account (for example, each grouping of data items for particular payees) in the user's transactional data. For example, a first identified account (for example, associated with 24 separate monthly payments identified in Bob's checking account data) may be indicated as a rental type account. Account types may include a general account type (for example, telecom, utility) and/or a specific account type, or may have additional levels of categorization. For example, telecom account types may be further categorized as mobile phone, phone, internet, cable, or satellite accounts, while utilities account types may be further categorized as gas, electric, water, power, solar, or trash account.

In some embodiments, characteristics of transaction data items that are analyzed to help identify potential accounts of a given user may include payee identifier (or normalized payee identifier), description or memo associated with the transactions, transaction amount, transaction periodicity, and/or other related transaction characteristics. For example, in one embodiment information regarding the payee on each transaction (for example, in the transaction data item for the transaction) is normalized for matching with other transactions, such as from the same payee. For example, extraneous characters in the payee information, such as characters that are associated with a payment account or number of the transactions (for example, an electronic check number), may be removed or disregarded. Additionally, payee information may be standardized, such as by identifying a standardized identifier for a particular payee that may be associated with various adaptations of payee information for that particular payee. For example, a standardized identifier for a payee (for example, "Southern California Edison") may be associated with multiple variations of payee information that could be used by different financial institutions in identifying transactions with that payee (for example, "SCE", "So Calif Edison", and so forth). Thus, through standardizing payee information of transaction data items, matching of transaction, even from multiple DDA accounts of the user, may be associated as payments to a particular account.

In some embodiments, additional data of a transaction data item may be normalized, standardized, or otherwise cleansed for use in matching the corresponding transaction with other related transactions (for example, other transactions to the same payee). For example, the description or memo associated with transactions may be analyzed and used in matching. For example, memo information that is handwritten on a paper check may be recognized using optical character recognition to determine the memo. A handwritten "rent" in the memo of rental payment checks each month may be used by the account identification component 114 to match the monthly rental payment checks as each being related to a rental payment of the user. Further, text input into a memo field may be parsed to be used in the matching. Additionally, in some embodiments the transaction amount of transactions is used in matching to other related transactions. For example, transactions of an identical amount (for example, to transactions for exactly $29.99) may have a higher likelihood of each being grouped together as associated with a common payee and user account than transactions of different amounts. In some embodiments, a range or percentage variation in payment amounts may be determined as within a tolerance zone such that transaction data items that vary within the tolerance zone (for example, payment amounts within 5% of the average payment amount for the grouping) are not disqualified from being in the grouping associated with a particular payee. For example, an electrical account may vary from month to month depending on usage by the user that month. Thus, a transaction amount rule may indicate that transaction amounts within a range of 20% of an average transaction amount for a group of transactions does not disqualify the transaction as being associated with the electrical account of the user. In some embodiments, third-party data may be access to determine and/or adjust tolerance zones for grouping transaction data items with one another. For example, for an electrical account, whether information may be accessed for the month corresponding to a particular transaction data item to determine an expected change in electrical power usage based on weather conditions that might cause additional (or less) power use.

In some embodiments, the account identification component 464 identifies a transaction periodicity for transactions that are preliminarily identified as being associated with a common payee. For example, the account identification component 464 may calculate an average time between payments to Electric Company as 31 days, with the shortest time between payments as 26 days and the longest time between payments as 34 days. Other statistical values associated with timing of the transaction data items, such as median, mean, standard deviation, and so forth, may also be calculated in certain embodiments. This transaction periodicity may then be used as a factor in determining whether the transactions should be grouped as being associated with a common payee and, thus, with a particular account of the user.

In some embodiments, the account identification component 114 determines one or more confidence levels or scores for each identified grouping of transaction data items. For example, a confidence score may indicate a likelihood that the identified grouping of transaction data items is associated with an account of the indicated type. For example, the confidence level may be based on factors such as periodicity of transactions, amount of transactions, payee information, and so forth that may indicate likelihood that each of the associated transactions are properly correlated with a particular payee and account of the indicated type. Thus, a lower confidence score may indicate that the identified transactions are only somewhat likely to be associated with a particular account type or trade line of the user, while higher confidence scores would indicate that the identified transactions are more likely associated with a particular trade line of the user.

Depending on the implementation, the account identification component 114 may determine an overall confidence level or score (for example, a single common score that indicates the overall likelihood that a grouping of transaction data items are associated with a particular type of account and/or with a particular payee) and/or may determine transaction-level confidence scores (for example, a score for each individual transaction, or for groups of transactions, each of which indicates the likelihood that that particular transaction, or group of transactions, is associated with a particular grouping of transaction data items and/or with a particular payee). In some embodiments, the confidence levels or scores may further consider a minimum frequency and/or recency requirement for addition of a self-report account as a tradeline in the user's credit data. For example, some or all types of self-reported accounts may be required to have at least three payments within six months to even be considered for addition as a trade line. Thus, for an account with three payments within seven months, even if there is a high confidence level in the account type being appropriate for addition as a trade line (for example, the transaction data items are associated with a wireless account), the account will not be transmitted to the credit bureau for addition as a tradeline. In some embodiments, the frequency and recency requirements for addition of trade lines may vary based on account type.

In some embodiments, the account identification component (and/or the account verification component) validate ownership of a DDA account by the user to ensure that the appropriate user is provided the potential credit score boost from payments included in the DDA account. For example, an account ownership validation component may receive information regarding an account, such as name, address, email address, phone number, etc, from the financial institution. This account ownership information may then be compared to user information associated with the user's account with the account identification system, such as a credit monitoring account. The account ownership information could be provided by the account access system, such as via an API communication to the account discovery system, so that the account discovery system may perform the account ownership validation matching and validation. Such account ownership validation may increase the likelihood that a user only gets credit for the accounts that they pay (and belong to them).

Account Verification

The account verification module generally processes the account information provided by the account identification component 464, attempts to verify the account information as being accurate, and/or determines if additional information may be needed to confirm accuracy of the account information. For example, an account of a user should not be added to the user's credit data unless the account accurately indicates payment activity of the user and, correspondingly, can be used as a factor in determining creditworthiness of the user. In the discussion below, an "account" is generally associated with a single payee (for example, a particular electric company, cellular provider, and so forth) as well as a grouping of transaction data items that have each been determined to be associated with the single payee by the account identification component 464. The accounts identified by the account identification component 464 may not include an account number provided by the payee since the account was identified based on transaction data items of the user that may not include the account number. As discussed below, in some embodiments additional information regarding an account, which may include an account number that is verifiable with the payee, for example, may be automatically collected and/or provided to the account discovery system.

At block 430, a list of accounts for possible inclusion in credit data of the user is provided to the account verification module (whether provided by the same or different entity as the account identification component 464). For example, the list of accounts may include, for each account, an account type, transactions associated with the account (for example, the transaction data items that were each categorized as associated with the account), a confidence score or scores, and/or other related information.

At block 432, the user confirms accuracy of each of the identified accounts, or indicates that one or more of the accounts is not accurately reflected (for example, transactions indicated as associated with a cell phone account may not actually be associated with a cell phone account). In some embodiments, a user interface indicating the identified accounts, or potentially just those identified accounts having confidence scores below a threshold or minimum confidence score for positive identification of the account type, may be provided to the user. The user may then select, or deselect, identified accounts to indicate those that are accurate. In some embodiments, transaction data associated with an indicated account may be displayed for review by the user. Additionally, the user may indicate that an identified account is legitimate, but that one or more of the particular associated transactions are not associated with the identified account. For example, an identified utility account may be associated with 14 transaction data items (for example, payments) over the prior 12 month period, and the user may indicate that two of the indicated transactions are not associated with that particular utility account. In such embodiments, the account verification module (and/or other modules discussed herein) may update the transaction data items associated with the identified account, which may in turn update the confidence level that the account is of the determine type (for example, a utility type).

In some embodiments, the user can indicate missing transaction data items to be added to an account. For example, if a cellular service provider account is missing three monthly payments over a 12 month period, the user may indicate that the payments were made during those three months with information regarding the payments. For example, the user may indicate that the payments were made from another DDA account with another financial institution and provide credentials allowing the account discovery system to access transaction data items of the user at that other financial institution. The transaction data items may then be identified in the other DDA account data and combined with the grouping for the cellular service provider.

Moving to block 434, for those accounts that the user has verified (for example, indicated are actual accounts of the user of the identified type at block 432), a determination is made as to whether additional information may be needed from the user and/or a third-party before providing the account to one or more credit bureaus for addition as a trade line to the user's credit. Thus, in some embodiments one or more criteria or rules may be applied to the identified account information to determine whether the account is sufficiently accurate and reliable for inclusion in the user's credit data. For example, a rule may indicate that for any identified rental accounts, additional account verification information is required before providing the new rental account to a credit bureau. As another example, a rule may indicate that a minimum number of transactions and/or minimum number of payments must be associated with an account for the account to qualify for addition to the user's credit data. In some embodiments, such a rule may vary based on the identified account type (and/or subtype), such that for a first account type (for example, rental) a minimum of eight payments are required, while for a second account type (for example, electricity), a minimum of 12 payments are required.

If additional information is needed (for example, the result of block 434 is a determination that additional information is needed), the process moves to block 436, where additional information is requested from the user and/or a third-party. For example, a user may be asked to provide additional information, such as a typical monthly payment amount and/or payment date for a particular identified account. This additional information may then be provided back to the account identification module (and block 420 repeated) to better categorize transactions that may be associated with the account. For example, with the typical payment amount and payment date provided by the user, the account identification module may identify additional payments that were not initially identified (and, similarly, may exclude certain payments that were initially identified). Thus, the additional information may increase likelihood of the identified accounts being eligible for addition to the user's credit data. In some embodiments, the user may provide information regarding an account that was not identified in the initial account identification block 420, so that the account identification module may potentially identify a new account only after the user provides additional information.

In some embodiments, a third-party is contacted for further information to verify a (potential) account of the user. For example, a mobile phone account may be verified with a request to the mobile carrier identified in the transaction data for the account. Such verification may be performed via an API call to the mobile carrier, which may return simply a binary (for example, yes or no) verification indication, or detailed transaction information regarding the account (such as payment history, payment timing, bill due dates, and so forth).

In some embodiments, the user and/or a third-party may provide documentation confirming authenticity of the identified account. For example, for an identified (potential) rental account of a user, the user may be asked to upload a scanned or photographed copy of a lease agreement that may be analyzed to confirm the rental account. In this example, the lease agreement may be automatically parsed (for example, after optical character recognition) and information, such as monthly payment amount, payment due date, landlord, and so forth, may be extracted and compared to account information included with that particular account (such as the grouping of transaction data items associated with the payee from the account identification module 464).

In some embodiments, other information and/or data sources may be accessed to verify accuracy of financial accounts. In some embodiments, one or more of the processes of scanning the user's DDA account (block 420), transmitting identified accounts (block 430), providing the user an opportunity to confirm accuracy (block 432), determining if additional information is needed (block 434) and requesting such additional information (block 436), may be repeated multiple times to enhance the accuracy of the identified account information and/or confidence level in categorization of transaction data. Additionally, in some embodiments the data permissioning process (beginning at block 410) may be performed as part of the account verification process to access additional transaction data items of the user from additional DDA accounts.

Trade Line Updating

In the embodiment of FIG. 4, if an account is verified by the user, and no additional information is needed (block 434), the account is provided to one or more credit bureaus for addition to the user's credit data. In some embodiments, at block 440, the user is provided an opportunity to decide whether or not the account is added to the user's credit data. In some embodiments, an estimate of impact on the user's credit score may be provided to the user, such as an expected credit score increase (or decrease) before the user decides whether or not to add the account as a trade line to the user's credit data. Depending on the embodiment, this expected (or "simulated") credit score may be generated using the same scoring model or algorithm as is used to provide the user with their actual credit score (for example, that would appear in the user's credit report). In some embodiments, the expected credit score, or credit score change (for example, a plus or minus amount), may be determined based on a different model or algorithm, such as a scoring algorithm that is developed by the account discovery system 102 based on previous changes in credit scores of other users due to addition of particular types of accounts and/or accounts with particular ranges of attributes (for example, payment history, payment amount, account subtype, and so forth). Thus, in some embodiments, a scoring model may be developed and improved over time, such as by a machine learning algorithm that analyzes credit information of users before and after addition of new trade lines for patterns in how credit scores are affected by such additions of trade lines. In some embodiments, such a scoring model may also consider user demographics and credit history in developing an algorithm for predicting credit score impact by the addition of new trade lines. For example, a user with a thin credit file (for example, less than two trade lines) may benefit greatly by addition of a cellular service account, while a user with a thick credit file (for example, eight or more trade lines) may not see a credit score impact by addition of the same cellular service account. In some embodiments, the system generates an improvement metric that is reflective of other users that match one or more characteristics of the user. In some embodiments, an estimated credit score is not provided to the user prior to adding the account to the user's credit data (for example, a newly generated credit score may only be provided after the new account is added as a trade line at block 440).

If the user indicates a desire not to add the account to the user's credit data at block 440, the process may end, or may return to a prior block, such as block 410 where the user is asked to connect to one or more additional financial institutions, to block 430 where a list of accounts already identified is provided to the user, or to another block.

At block 442, the account discovery system updates profile information of the user to indicate the added trade line. In some embodiments, the account discovery system may generate or estimate the user's credit score based on account information (for example, trade line information) maintained by the account discovery system (or by a credit bureau or other entity that controls the account discovery system), such as without requesting credit data from a credit bureau. Additionally, the user profile information may be provided to the user in various formats and levels of detail, such as in user interfaces that are displayed to the user via a mobile application, web browser, text messages, and so forth, and which allow the user to interact with the provided information.

If the user requests the addition of the account to credit data of the user (at block 440), at block 444 the account discovery system generates a new trade line request for transmission to a credit bureau (or multiple credit bureaus in some embodiments). For example, the account information may be formatted in the same manner as account information provided by a typical credit data furnisher, such as a credit card lender that regularly provides account information to credit bureaus for addition (or updating) of trade lines associated with its credit card holders. In some embodiments, the format is the Metro 2 format. In other embodiments, other formatting may be used to prepare account information for transmission to the credit bureau. In some embodiments, the format of the trade line request is customized for the particular credit bureau. For example, a first format may be used for transmission to the first credit bureau while a second format is used for transmission to a second credit bureau. In some embodiments, communication with credit bureaus may be accomplished via API calls.

At block 446, the credit bureau receives the formatted trade line information (generated at block 444) and processes the information to add the trade line to the user's credit data. In some embodiments, the credit bureau applies the same requirements for adding new trade line information to a user's credit file as would be applied to other trade line information (for example, from other data furnishers). Thus, if the trade line information is not usable to uniquely identify a user in the credit bureau's data, the trade line information may not be added to the requesting user's credit data or, depending on the circumstances, may be added with reference to a newly added credit record for the user indicated in the trade line information.

In some instances where trade line information is transmitted to the credit bureau, a trade line for the payee may already exist in the user's credit data. Thus, the transmitted trade line information may be used to supplement the account information (for example, to include additional transactions that are not already reflected in the user's credit file).

Updated Credit Score Usage

In the embodiment of FIG. 4, with the user's credit data updated with the newly added trade line, the user's credit score may be impacted. For example, the user's credit score may increase, and such increase may make the user eligible for financial or other products for which the user was not eligible minutes before with the lower credit score.

At block 450, one or more scoring models may be applied to the user's credit data (including the newly added trade line) to generate updated credit scores for the user. For example, a scoring algorithm that includes utility account data as an input variable may be evaluated after addition of a utility trade line to the user's credit data to produce an updated (for example, higher) credit score for the user.

Various entities may apply scoring algorithms and/or otherwise access credit data of users. For example, in some embodiments the credit bureau may apply a credit scoring algorithm periodically to each users' credit data, such as nightly, so a credit score that is no more than 24 hours old is always quickly available to requesters. In some embodiments, the credit bureau may apply a credit scoring algorithm in response to requests for credit data of a particular user, such as in real-time in response to receiving an inquiry for credit data of a user. In some embodiments, the credit bureau may apply a scoring algorithm provided by another user risk assessment entity, such as by providing credit data of the user to a scoring server configured to analyze the credit data using a proprietary credit scoring algorithm and output to the credit bureau the resultant credit score for the user. Thus, in some embodiments, the account discovery system 110 may not know how particular credit data of users' impacts credit scores generated using the proprietary credit scoring algorithm. In other embodiments, other entities, such as financial institutions, marketing companies, and so forth, may generate risk scores based on credit data, and possibly other data, of the user.

At block 452, the updated credit score of the user may be used in identifying offers to provide to the user. For example, the account discovery system 110 may receive an indication of the user's new credit score (after addition of a new rental, utility, or telecom trade line, for example) and determine whether the user is prequalified for one or more financial products, such as credit cards, personal loans, refinance loans, car loans, and so forth Such financial products may not have been available to the user or may only have been available on less desirable terms (such as a higher interest rate) prior to addition of the new rental, utility, or telecom trade line to the user's credit data (for example, Alice's credit score may have increased from 600 to 625 after adding a rental trade line indicating she has regularly paid her rent over a two-year period, and Bank XYZ Bronze Credit Card may only be offered to users with a credit score above 620). Depending on the embodiment, the updated credit score (and/or additional user credit data) may be compared to offer criteria by the account discovery system 102 and/or another entity, such as directly by a financial institution.

At block 454, the user receives a notification of a change in credit data, such as an indication that the user's credit score has changed. The notification of block 454 may be one example of notification 90 sent to user device 50 of FIG. 1. In some embodiments, the notification is provided to the user via the user interface through which the user initially engaged the account discovery system 102, for example, within seconds of the user requesting that a newly identified and verified account be added to the user's credit file. In other embodiments, an alert or notification may be provided to the user in other manners, such as a SMS message delivered to a telephone number associated with the user (for example, a telephone number stored in the credit bureau's data of the user or in the user profile stored by the account discovery system 102) or a push notification to a mobile application, such as a credit management application provided by the account discovery system 102. In any case, the alert may advantageously be delivered to the user's mobile (and/or other) device in substantially real-time to when the change to the user's credit file occurred so that the user can immediately make use of the updated credit score (for example, by applying for a new credit line) or, if the change to the user's credit file is not correct or even fraudulent (for example, added by someone other than the user), the user can take action to dispute the updated credit information as soon as possible. In some embodiments, a software module monitors credit bureau data for changes to credit data of users, or changes to credit data that impacts a credit score of the user in some embodiments, and initiates delivery of an alert to the user as the change is detected. For example, when a new rental trade line is added to a user's credit data, such a module may detect addition of the trade line and initiate an alert to the user. Such alerts may be transmitted directly from the credit bureau or via another entity, such as the account discovery system 102. In some embodiments, the user alert (block 452) is transmitted in response to detection of a change to the user's credit data that has been transmitted from the credit bureau, such as when an updated credit score of the user is received at the account discovery system 102. Depending on the embodiment, alerts may be associated with rules that specify which types of changes to the user's credit data should be provided in real-time alerts.

In some embodiments, the account discovery system 102 requests an updated credit score of the user after providing the new trade line information to the credit bureau. Account discovery system 102 may request the updated credit score immediately after providing the new trade line information or after some amount of elapsed time (for example, one second, five seconds, and so forth after transmitting the trade line data to the credit bureau). Thus, in this embodiment the account discovery system 102 may receive the newly calculated credit score of the user within seconds of addition of the trade line to the user's credit file. After the new calculated credit score is received, the account discovery system 102 may optionally display to the user a change in the user's credit score (for example, a plus or minus amount) attributable to the newly added account.

In some embodiment, after the user has been shown an updated credit score, an option to remove a trade line from the user's credit file is provided via the user interface. For example, if the user adds a new utility account to the user's credit data, such as via the method discussed above, a newly calculated credit score may be displayed to the user via the account discovery system website, mobile application, text message, and so forth If the newly calculated score is lower than a previous score of the user, for example, the new utility account trade line actually decreased the user's credit score, the user interface may provide an option for the user to remove the new trade line credit data. For example, a button, check-box, link, or other user interface feature associated with removal of an account from credit data may be selected by the user to initiate a removal process. In response to a request for removal of a trade line, the account discovery system 102 may transmit a properly formatted request to one or more credit bureaus requesting removal of the trade line.

In various embodiments discussed herein, alerts and/or notifications (which may be used interchangeably) are automatically transmitted to a device operated by the user whose credit data has been updated and/or requested (for example, such as notification 90 sent to user device 50 of FIG. 1). The alert and/or notification can be transmitted at the time that the alert and/or notification is generated or at some determined time after generation of the alert and/or notification. When received by the user's device, the alert and/or notification can cause the device to display the alert and/or notification via the activation of an application on the device (for example, a browser, a mobile application, and so forth). For example, receipt of the alert and/or notification may automatically activate an application on the device, such as a messaging application (for example, SMS or MMS messaging application), a standalone application (for example, a credit monitoring application provided to the user by the credit report access control system), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (for example, a mobile device) receives the alert, a browser (or other application) is automatically activated and the URL included in the alert and/or notification is accessed via the Internet. The alert and/or notification may be determined based on preferences stored in a data store. For example, a user may sign up for a publish/subscribe service or a credit monitoring service that may be configured to identify changes to credit data. After enrollment, the individual may additionally select an option to be notified of credit data inquiries and a selection of preferences for receiving alerts/notifications.

Calculation of Expected Score Boost

In some embodiments, an estimate of impact on the user's credit score may be provided to the user, such as an expected credit score increase (or decrease) even before the user provides permission to the account discovery system to identify new trade line's (for example, at block 402). For example, an expected credit score impact may be calculated for users based on an expected impact of adding an account type (for example, an electrical account) that is currently missing from the user's credit data, and perhaps that is typically included in credit data, to the user's credit data. The account discovery system and/or an affiliated system may provide the expected credit score increase associated with the addition of an electrical account to the user as an incentive for the user to engage the account discovery system.

Depending on the embodiment, this expected (or "simulated") credit score may be generated using the same scoring model or algorithm as is used to provide the user with their actual credit score (for example, that would appear in the user's credit report). In some embodiments, the expected credit score, or credit score change (for example, a plus or minus amount), may be determined based on a different model or algorithm, such as a scoring algorithm that is developed by the account discovery system 102 based on previous changes in credit scores of other users due to addition of particular types of accounts and/or accounts with particular ranges of attributes (for example, payment history, payment amount, account subtype, and so forth).

In one implementation, a score impact rule indicating one or more account types that impact risk scores of users are accessed. Next, an API key associated with the financial institution is identified and transmitted to the financial institution with a request for transaction data of the user. Via secure communication channel established with the financial institution, transaction data items of the user are obtained. Next, a plurality of groupings of the accessed data items are identified, such as groupings of data items associated with an entity. An account type for each of the groupings of data items may be determined, and then a first account type that impacts credit scores of users that is not included in the determined account types of the user may be identified. This account type represents a type of account that could be added to the credit data of the user to potentially impact credit score of the user. A score impact algorithm may be executed to determine a possible risk score change if an account of the first account type is added to the risk data of the user. The score impact algorithm may be based on the first account type and the existing credit data of the user.

Thus, in some embodiments a scoring model may be developed and improved over time, such as by a machine learning algorithm that analyzes credit information of users before and after addition of new trade lines for patterns in how credit scores are affected by such additions of trade lines. In some embodiments, such a scoring model may also consider user demographics and credit history in developing an algorithm for predicting credit score impact by the addition of new trade lines. For example, a user with a thin credit file (for example, less than two trade lines) may benefit greatly by addition of a cellular service account, while a user with a thick credit file (for example, three or more trade lines) may not see a credit score impact by addition of the same cellular service account. In some embodiments, an estimated credit score is not provided to the user prior to adding the account to the user's credit data (for example, a newly generated credit score may only be provided after the new account is added as a trade line at block 440).

Example Methods

Figure 5:
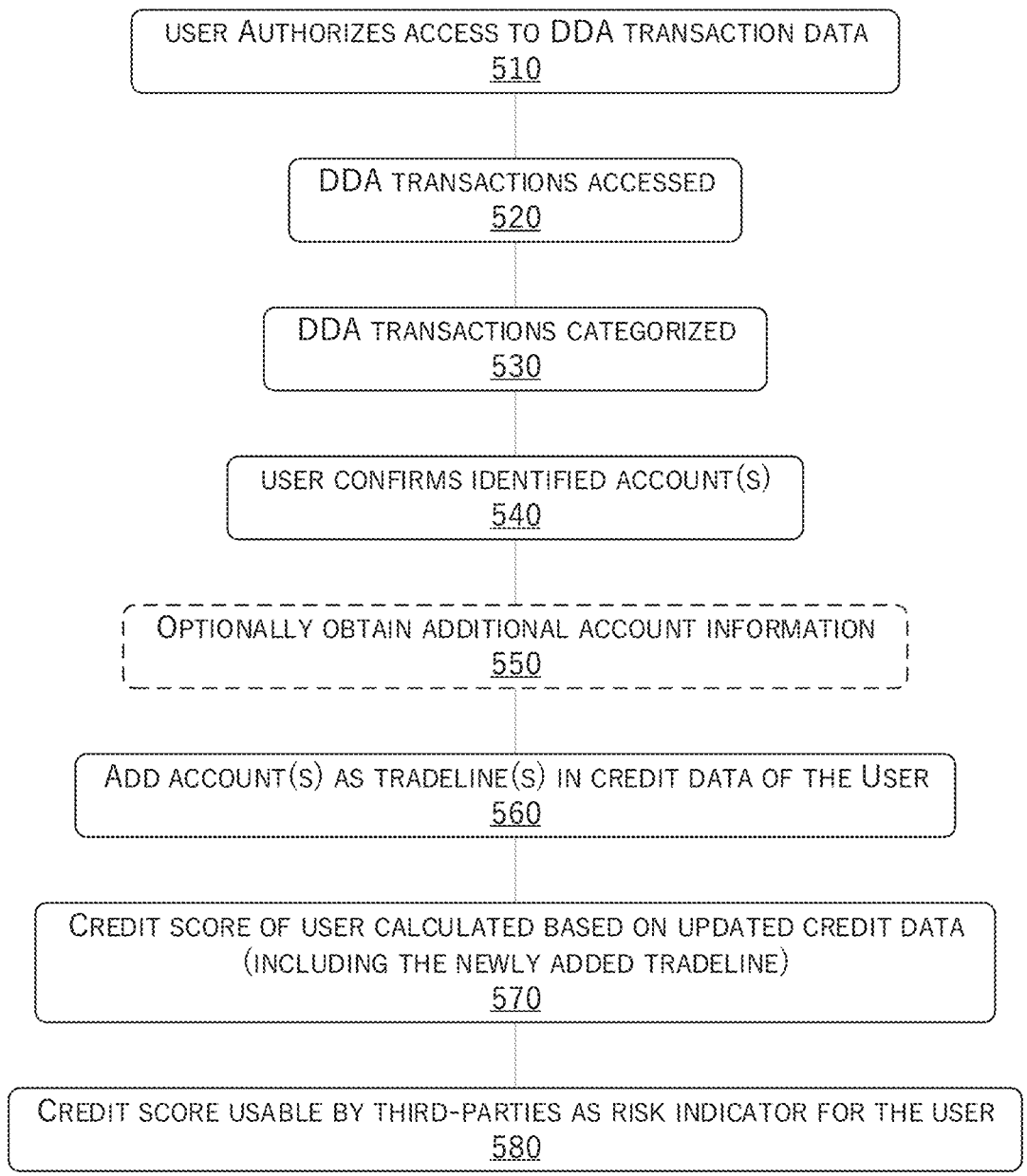
FIG. 5 is an embodiment of a flowchart illustrating one example of a process of interacting with a consumer, accessing DDA account data of the consumer, identifying non-traditional account(s) of the consumer in the DDA account data, and updating credit data of the consumer at a credit bureau.

FIG. 5 is an embodiment of a flowchart illustrating one example of a process of interacting with a consumer, accessing DDA account data of the consumer, identifying non-traditional account(s) of the consumer in the DDA account data, and updating credit data of the consumer at a credit bureau. In one embodiment, the method of FIG. 5 is performed by the account discovery system. Depending on the embodiment, the method of FIG. 5 may include fewer or additional blocks and the blocks may be performed in an order that is different than illustrated.

Beginning at block 510, an account discovery system may be accessed by a user. For example, the user may visit a website of a credit monitoring service, such as may be provided by a credit bureau. The user may contact the account discovery system in response to an advertisement or other communication offering to help the user increase the user's credit score and/or qualify for a financial account. The user may then provide the account discovery system authorization to access DDA transaction data of the user at one or more identified financial institutions. As an example, the account discovery system may receive a user's authorization together with the user's username and password for a particular financial institution, such that the user account discovery system can prove to the financial institution it is authorized to retrieve the user's transaction data. In some embodiments, other forms of authentication of the user are requested for decreasing likelihood that a fraudster is attempting to access the user's financial account data. Further details of receiving the user's authorization to access DDA transaction data are discussed below.

Moving to block 520, the account discovery system accesses DDA transactions at the identified financial institution(s). Block 520 may involve downloading records of some or all of the DDA transactions made available to the user by the identified financial institution(s). In some embodiments, the access to DDA transactions is via an API communication channel that is established between the account discovery system and the financial institution. In other embodiments, the DDA transactions are accessed via a front end interface, such as the same or similar user interface that may be displayed to the user.

Continuing to block 530, the account discovery system categorizes the DDA transactions. For example, the user account discovery system identifies, from a plurality of transaction data items accessed at the indicated financial institution, a group of transactions associated with a particular payee. As an example, the system may identify monthly recurring transactions made to the same payee as being categorized together and associated with a single account (for example, an electric, water, or wireless account). Additionally, the system may identify a second set of transaction data items made to another payee and, based on account identification rules, determines that the second set of transaction data items are associated with a rental account of the user.

At block 540, the account discovery system receives a user's confirmation of the identified accounts. For example, the user account discovery system may identify, in block 530, a particular set of transaction data items as being associated with a particular utility account, may identify that the utility account is believed to be of a certain type (such as an electricity bill from a given utility), and may identify various attributes of the account such as the average payment, the maximum payment, the minimum payment, and so forth. Then, in block 540, the user account discovery system may provide at least some of this identified information to the user and receive the user's verification that the information is correct. The user may verify that individual transactions are properly categorized, that the identified account is correctly identified, and so forth.

At block 550, the user account discovery system may assess the reliability of the identified account and may, optionally, obtain additional information to verify that the account is of the type indicated. For example, the user may be asked to take a driver license photo, use an app to scan in a document (for example, associated with the account), provide electronic authorization to request automatic sending of electronic verification from a third-party (such as the account issuer), and so forth. Further details of account verification processes are discussed below.

At block 560, the account discovery system initiates addition of the account(s) as trade line(s) in the user's credit data. For example, the system may generate a data package formatted for ingestion by a particular credit bureau to allow the credit bureau to add the account as a new trade line of the user.

At block 570, the account discovery system recalculates the credit score of the user, based on the newly updated credit data (for example, including any newly added trade lines).

At block 580, the user account discovery system provides the updated credit score to the user and/or to third-parties. The updated credit score can be used by such third parties in determining whether to offer credit, and at what terms to offer said credit, to the user. By including additional trade lines such as rent and utility accounts, the updated credit score may more accurately reflect the credit worthiness of the user. In some embodiments, the updated credit score may be provided to, and usable, by the user and/or authorized third parties substantially immediately after the account is added as a new trade line to credit data of the user. For example, the credit score of the user may be recalculated in substantially real-time in response to addition of a new trade line to credit data of the user, and the recalculated credit score may similarly be provided to the user and/or authorized third parties substantially real-time in response to calculation of the updated credit score.

Example System, Method, and User Interfaces for Accessing DDA Data of Users

Figure 6:
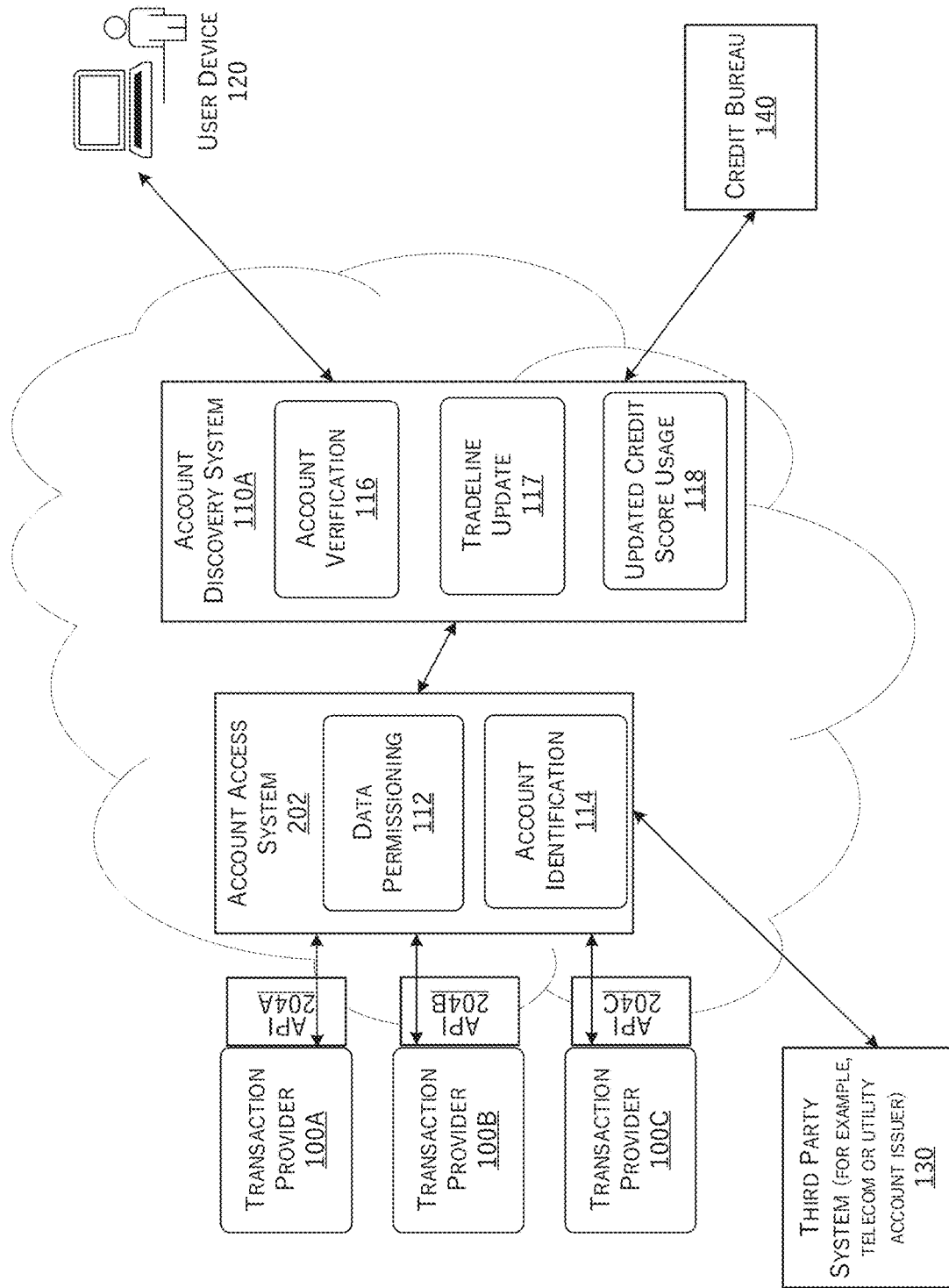
FIG. 6 is an embodiment of a block diagram illustrating another example of an account access system and an account discovery system in communication with one another (whether operated by a single and the or by separate entities).

FIG. 6 is an embodiment of a block diagram illustrating another example of an account access system 202 and an account discovery system 110A in communication with one another (whether operated by a single and the or by separate entities). In this embodiment, three transaction providers 100 A, 100 B, and 100C are in communication with the account access system 202 via respective APIs 204A, 204B, and 204C. Thus, in this embodiment, data permissioning process, such as performed by the data permissioning component 112, may be performed via communications with transaction providers 100 that is initiated and authenticated using API tokens, keys, and/or other similar secure communication credentials. For example, the transaction provider 100 a may be a first financial institution that allows direct access to transactions of its customers (for example, consumers with DDA accounts at the financial institution) via a secure communication channel that is initiated through use of an API token that has been issued to the account access system 202 by the financial institution. In this way, the transaction provider 100 a maintain security of consumer information by limiting access to the consumer DDA account information to only those with a pre-issued API token. Similarly, communications with transaction providers 100 B and 100 C may be performed with unique API keys or tokens issues from those transaction providers. In some embodiments, the transaction providers may include, or may use third-party, API token service, which interfaces with external entities (for example, the data permissioning component 112), receives authorizations from the external entities indicating that the account access system 202 has sufficient rights to access transaction data items of consumers held by the transaction provider, and issues a API token to the account access system 202 usable to initiate a "back-end" communication channel with the transaction provider to efficiently and quickly access data to which the account access system 202 is authorized. Thus, in some embodiments the account access system 202 provides the API token issued to the account access system 202 in conjunction with a request for transaction data items of a particular consumer.

The data permissioning component 112 may further communicate with the user device 120 to obtain credentials that allow the data permissioning component 112 to access transaction data items of the user at a transaction provider. These user credentials may include a login ID and password for a particular transaction provider, or any other credentials that the user may have been issued that allow the user and/or the account access system 202 to access transaction data items in the user's secure account with the transaction provider. The data permissioning component 112, with a valid API token issued from a transaction provider and access credentials from the user device 124 that transaction provider, may initiate communication with the particular transaction provider and access transaction data items of the user with that transaction provider.

In the embodiment of FIG. 6, the account access system 202, which includes the data permissioning component 112 and the account identification component 114, may be operated and/or controlled by an entity separate from the account discovery system 110A. For example, the account discovery system 110A may be operated by a credit reporting agency, while the account access system 202 is operated by a financial account aggregator. Through separation of the functionality performed by these two entities, consumer privacy of information may be maintained. For example, in some embodiments the account access system 202 accesses individual transaction data items of the consumer at the one or more transaction providers 100. However, those individual transaction data items may not be shared with the account discovery system 110A (for example, a credit bureau). Rather, the account access system 202 may analyze the transaction data items to identify accounts that may be added to the consumer's credit data and provide only the minimum information needed to the account discovery system 110A for addition of the new account to credit data of the consumer. In other embodiments, the account discovery system 110A receives and stores the transaction data items.

Figure 7:
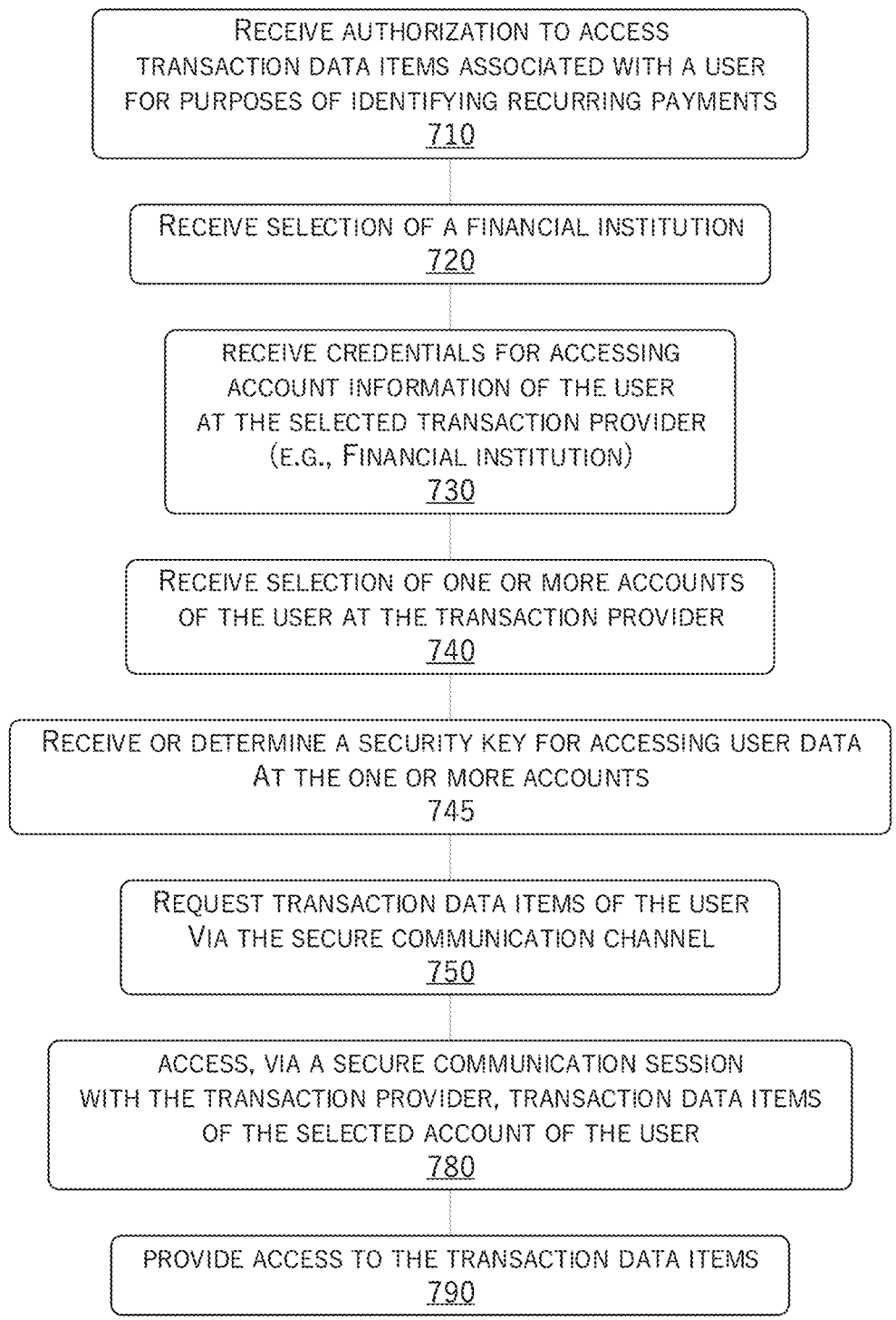
FIG. 7 is one embodiment of a flowchart illustrating one example of a method that may be performed to authorize and initiate access to a user's DDA account information at a financial institution.

FIG. 7 is one embodiment of a flowchart illustrating one example of a method that may be performed to authorize and initiate access to a user's DDA account information at a financial institution. For purposes of illustration, the method of FIG. 7 will be discussed in conjunction with several example user interfaces in FIGS. 8-10. In some embodiments, the method may be performed by the data permissioning component 112, such as may be controlled by an account access system 202 (for example, FIG. 2B). In other embodiments, the data permissioning component 112 may be operated by the account discovery system 110A (for example, FIG. 2A). Depending on the embodiment, the process of FIG. 7 may include fewer or additional blocks and or the blocks may be performed in order different than is illustrated.

Beginning at block 710, a user provides authorization to the data permissioning component 112 to access DDA account information of the user at one or more transaction providers. For example, a consumer may authorize a credit bureau to initiate communication with a financial institution at which the consumer has a checking account for purposes of analyzing transactions in that checking account. For example, user interface 810 illustrates an example user interface that may be presented to a consumer on a mobile device, such as a cell phone or tablet. A similar user interface may be provided on a desktop computing device of a user or any other consumer electronic device. Any references herein to a mobile device or mobile user interface are provided for illustration purposes and should not be construed to limit implementations of the systems and methods herein to only those specifically mentioned mobile device or mobile user interfaces. Conversely, any mobile device or mobile user interface could also be implemented with a desktop, laptop, or other computing device and associated user interfaces.

Figure 8:
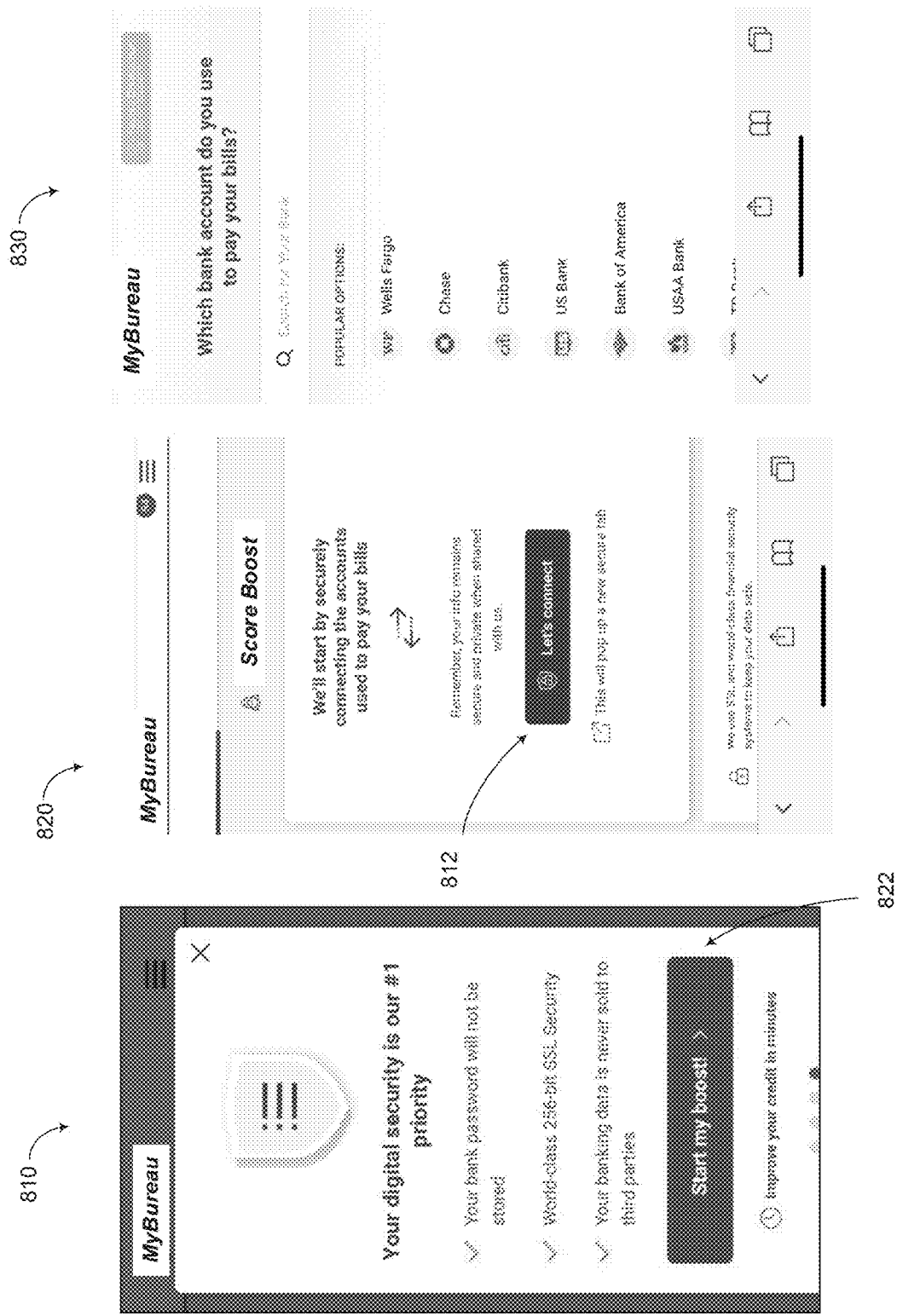
FIG. 8 illustrates embodiments of three example user interfaces that may be displayed on a user device.

FIG. 8 illustrates embodiments of three example user interfaces that may be displayed on a user device. User interface 810 illustrates security measures associated with the proposed access to the user's financial account data. The user can select button 822 to continue on to the data permissioning process. User interface 820 illustrates an introductory screen from an example credit reporting agency, "MyBureau", which could represent any credit bureau. Additionally, similar user interfaces may be provided by other entities, such as an aggregation entity. In the example user interface 820, information regarding an example "Score Boost" process is provided to the user and the user is asked to select an interface element, such as button 812, to initiate the process. In this example, after the user selects button 812, a user interface 830 may then be displayed to the user, which request information from the user on a financial institution at which the user maintains a DDA account, such as a checking account, savings account, money market account, or the like. The example user interface 830 provides a listing of several "popular options," which may be stored as a predetermined listing based on one or more factors such as geographic location, and also allows the user to search for financial institutions that may not be listed already.

Returning to FIG. 7, at block 720 a selection of a financial institution from the user is received, with reference to user interface 830 of FIG. 8, the user may select one of the popular options of financial institutions or search for another financial institution. After the user selects a financial institution at block 720, credentials for accessing the user's financial information at the selected financial institution are received at block 730. For example, a username and password that allow access to the users checking account information at the selected financial institution may be provided to the data permissioning component 112. In an embodiment where the data permissioning component 112 is operated by a third-party entity (different than the account discovery system 110 A, such as in FIG. 2B), communication with the user may be directly between the data permissioning component 112 (for example, of the account access system 202 of FIG. 2B) and the user device 120. In this way, credentials to the users financial account at the financial institution are only disclosed to the account access system 202 and not also to the account discovery system 110 A, providing increased security to the user by limiting dissemination of the user's login credentials. In some embodiments, the communication with the user device 120 is provided via a pass-through functionality (for example, using an iFrame or similar functionality) of the account discovery system 110 A, such that the user is unaware that they are communicating directly with the account access system 202 (or other entity that provides the data permissioning component 112) and the communication with the user are seamless as they proceed through the blocks of FIG. 7. In such an embodiment, the user may be unaware that a separate data permissioning component 112, possibly operated by a third-party to the account discovery system 110A, is coordinating communication with the selected financial institution. In some embodiments, the user is alerted to the shift in communication from the account discovery system 110A to the account access system 202 (or other entity it provides the data permissioning component 112).

In one example implementation, the account discovery system may create a user record in an API from the account access system 202 (or more particularly, with the data permissioning component 112). The account discovery system 110 A may then generate a redirect URL and iFrame URL that are delivered to the user device (for example, user interface 910). The user within interacts with the iFrame URL, such as to provide login credentials and two factor authentication information, directly with the data permissioning component 112. After the user is authenticated with the financial institution, the account identification component 114 and/or other components of the account discovery system 110 A may access financial account information of the user has the financial institution via an API connection established by the data permissioning component 112. In one embodiment, after authorization to access a particular user's financial account information at a particular financial institution has been established, the data permissioning component 112 (and/or other related components) may request financial account information (for example, transaction data items) of the using a user-specific token, such as may be issued by the data permissioning component 112 and/or an API token generator/manager of the financial institution. Thus, the account identification component 114, for example, may immediately and/or periodically in the future, access transaction data items of the user at the financial institution using an API call that includes the user specific token. In some embodiments, an entity token may also be required, such as a token issued to the data permissioning component 112 that authorizes the account access system 202 to access user data at the financial institution (for example, with a user specific token).

Figure 9:
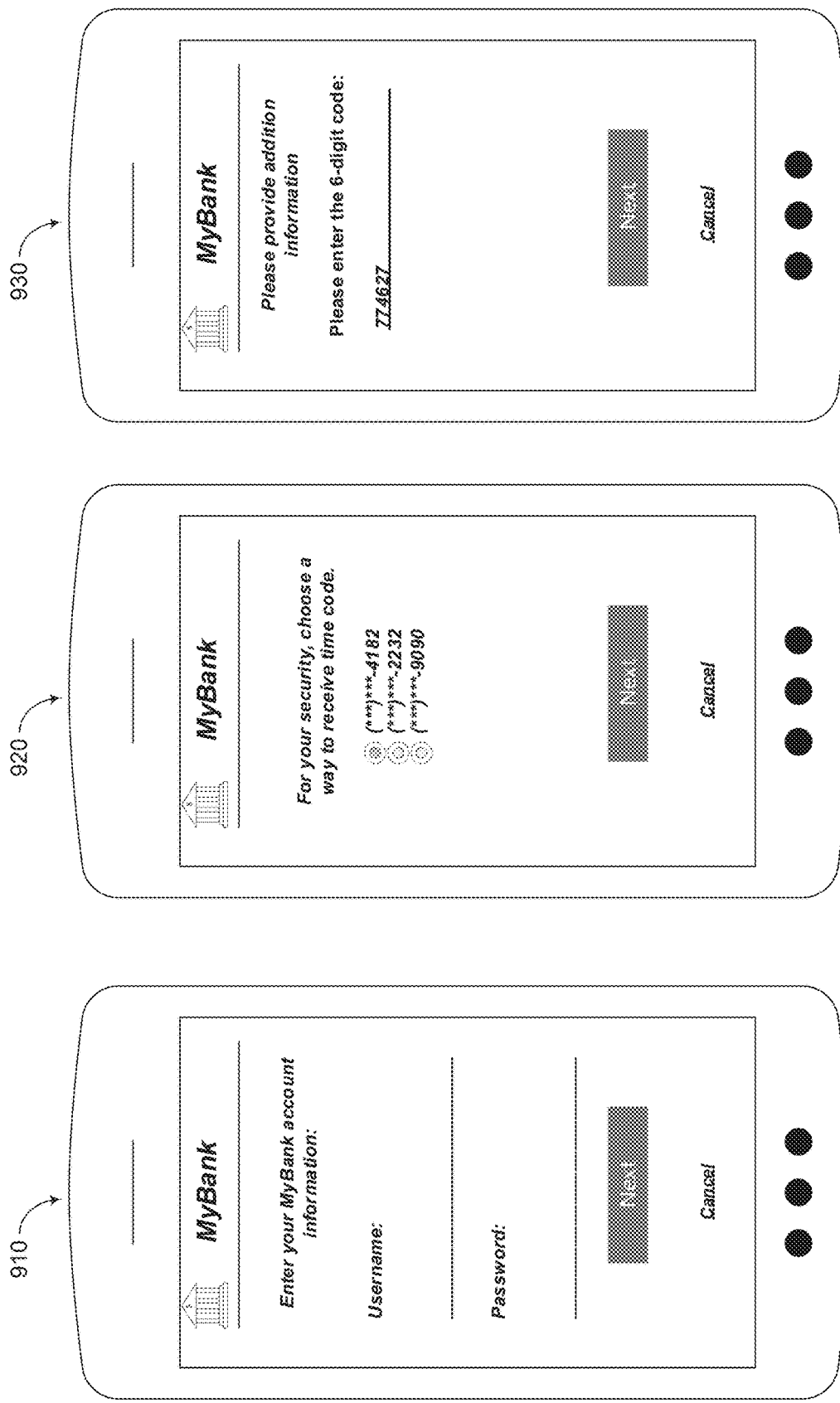
FIG. 9 illustrates embodiments of example user interfaces that may be provided by the data permissioning component, whether operated by a third-party account access system or the account discovery system, to obtain access credentials from the user.

FIG. 9 illustrates embodiments of example user interfaces that may be provided by the data permissioning component 112, whether operated by a third-party account access system 202 or the account discovery system 110A, to obtain access credentials from the user. In other embodiments, other user interfaces, such as requesting other credential information from a user and/or providing different two-step authentication procedures, may alternatively be used. Example user interface 910 displays the name of the selected financial institution, "MyBank" in this example, with a request for the user to provide a User Name and Password for the MyBank account. After the user provides that information, user interface 920 initiates a two-step authentication procedure using a cell phone number associated with the user's account at the selected financial institution. The telephone numbers associated with the user account may be provided by the selected financial institution, for example, MyBank, after the username and password have been excepted. An example of FIG. 9, the user is able to select one of multiple telephone numbers associated with the user's financial account with a request that a security code be transmitted to the selected number. After one of the telephone numbers is selected by the user in interface 920, a security code is transmitted to the selected telephone number and user interface 930 is displayed, requesting entry of the security code received at the selected telephone number by the user. If the user cannot provide the security code, access to the users financial information at the financial institution is not allowed and, additionally, the user may be provided with a fraud risk alert. If the two-step authentication is completed successfully by the user providing the transmitted security code, access to the financial account of the user is allowed. In other embodiments, additional forms of two-step authentication procedures, such as use of an Authenticator application, and/or other authentication procedures may be implemented.

Figure 10:
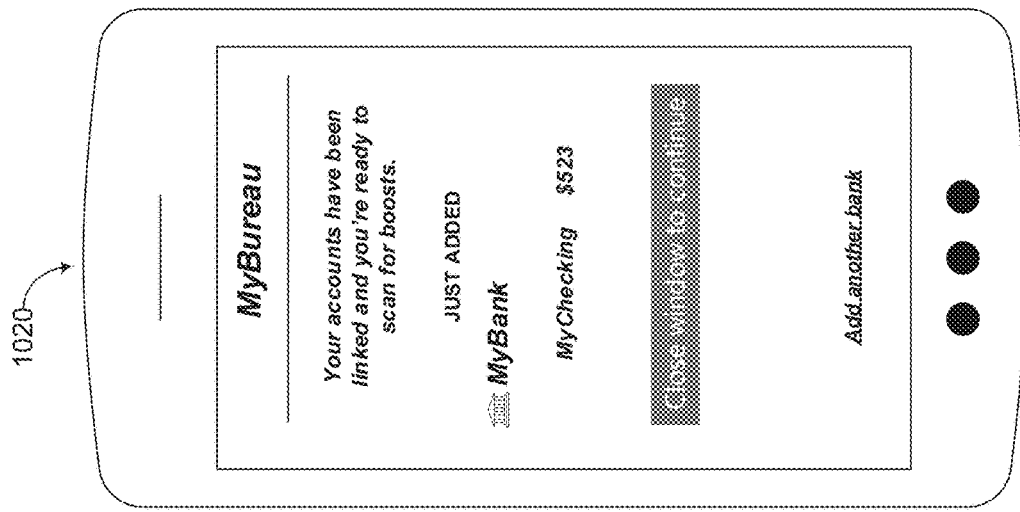
FIG. 10 illustrates an embodiment of an example user interface that may be presented to the user indicating multiple accounts identified at the financial institution, and providing the user an option to select one or more of the accounts from which the account access system will be authorized to access specific transaction data items.
Figure 10:
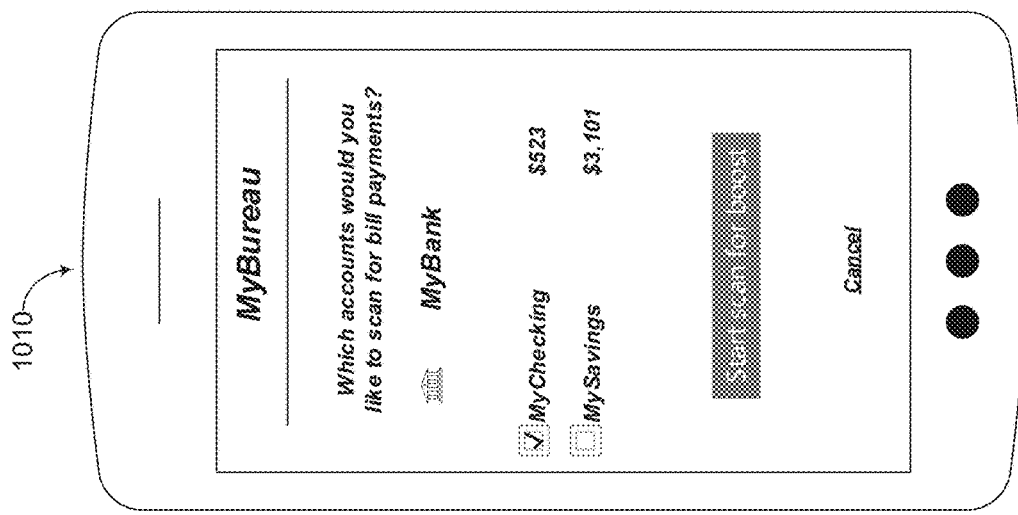

Next, at block 730, with the user authenticated at the financial institution (via the data permissioning component 112), the account identification component 114 and/or other components of the account discovery system 110A, may access the users financial account information. In the example of FIG. 7, at block 740 the user is presented with a list of accounts at the financial institution (for example, associated with the login credentials provided by the user), and an option to select one or more of the accounts. User interface 1010 in FIG. 10 illustrates an example user interface that may be presented to the user indicating multiple accounts identified at the financial institution, and providing the user an option to select one or more of the accounts from which the account access system 202 will be authorized to access specific transaction data items. In the example of user interface 1010, a checking account (for example, "MyChecking" with a balance of $523) and a savings account (for example, "MySavings" with a balance of $3,101) were identified in the user's account data at the financial institution (for example, "MyBank"). In this example, the user selects the checking account, indicating that transaction data items in the user's checking account may be accessed by the account discovery system. In this example, because the user did not also select the MySavings account, the users savings account information will not be made available to the account discovery system. User interface 1020 confirms that the user has granted access to "1 account" of the user with MyBank.

At block 745, a security token, such as an API token or key, is associated with the user account at the financial institution, so that the account identification component 114 and/or account access system 202 can use the security token to securely access transaction data items of the user at the financial institution. In one embodiment, a security token is an encrypted way of storing a username and password. It ensures that when the account discovery system is connecting to the financial institution of the user to get account information, it is safe and secure. For example, the security token may be provided to an API interface of the financial institution to authorize access to financial account data of the user at the financial institution. The security token may have a limited life (for example, two hours, two days, two weeks, and so forth) and may be associated with additional restrictions on use of the security token.

Moving to block 750, the account identification component 114 may use the established communication channel with the financial institution to access transaction data items of the user. For example, the account access system 202 may provide the user specific token (for example, as discussed above with reference to block 745) to the financial institution to obtain access to transaction data items in the one or more DDA accounts of the user associated with the user specific token (which the user previously authorized the account access system 202 to access).

At block 780, transaction data items of the user are accessed via a secure communication session with the financial institution. In some embodiments, transaction data items are copied to the account access system 202 for further analysis. In some embodiments, a subset of transaction data items, such as those within a predetermined time or meeting other filter criteria, are provided to the account access system 202.

At block 790, the transaction data items are accessible to the account identification component 114, for example, to analyze for indications of financial accounts (for example, utility, rental, telecom, and so forth) that may not already be in the credit data of the user, and which could be added to credit data of the user to potentially increase the credit score of the user.

Example System, Method, and User Interfaces for Categorizing Data Items

Figure 11:
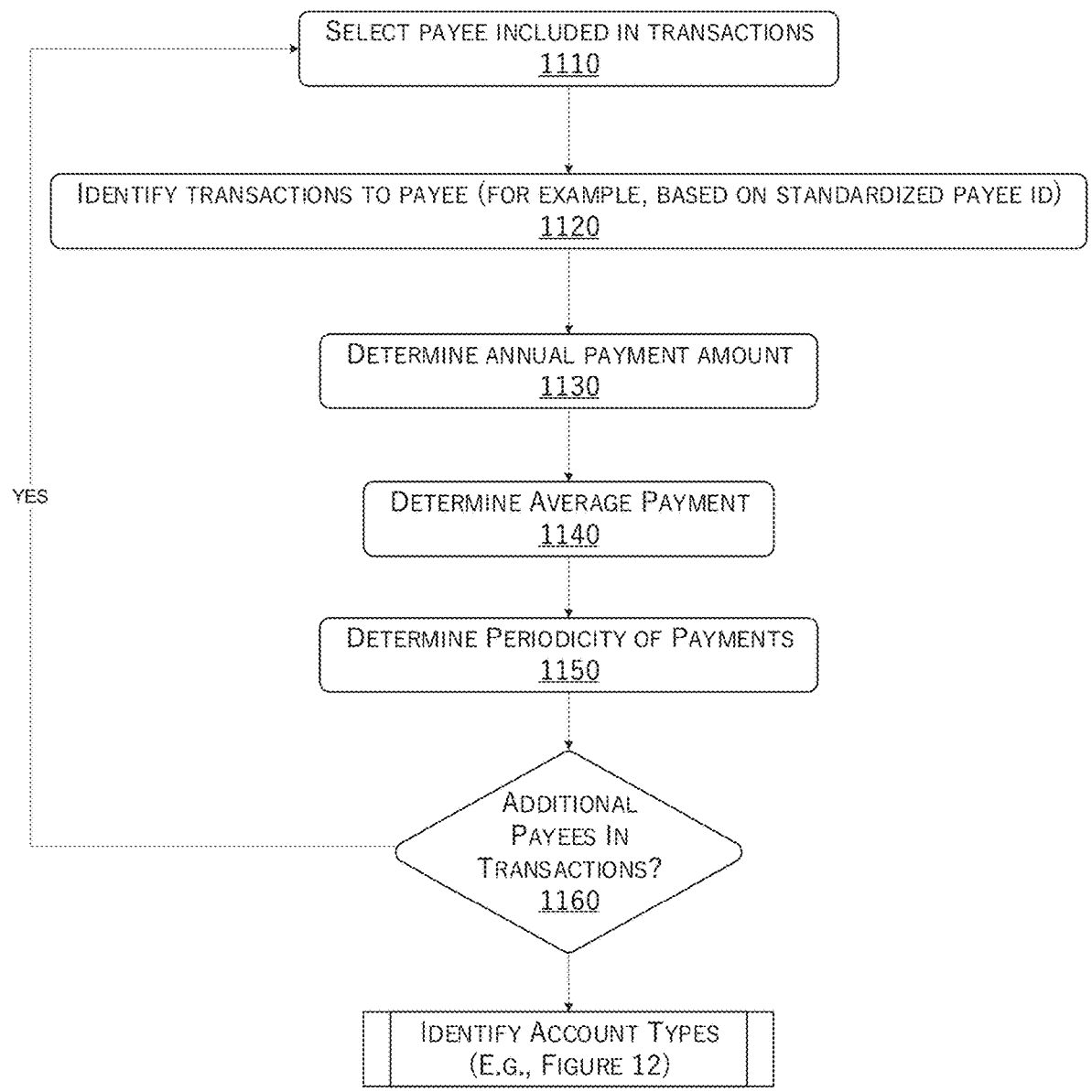
FIG. 11 is an embodiment of a flowchart illustrating one example of a method that may be performed to categorize data items (for example, transaction data items) from the transaction provider (for example, a financial institution).

FIG. 11 is an embodiment of a flowchart illustrating one example of a method that may be performed to categorize data items (for example, transaction data items) from the transaction provider (for example, a financial institution). In some embodiments, the transactions data items are categorized or grouped according to a payee or recipient of a transaction. For example, multiple monthly payment transactions from a checking account to Power Company 123 may all be grouped as payments that are likely associated with an ongoing account of the user with Power Company 123. In other embodiments, data items may be categorized in groups in other manners. For example, transactions with multiple payees or recipients may be grouped, such as those that are each associated with a particular type of account. For example, multiple wireless provider accounts may be grouped together via a process similar to FIG. 11. For purposes of illustration, the method of FIG. 11 will be discussed in conjunction with several example user interfaces in FIGS. 14-15 and 18, as well as conceptual diagrams in FIGS. 16-17 of data items that may be grouped and account identification rules that may be applied to such grouped data items.

In some embodiments, the method of FIG. 11 may be performed by the data permission account identification component 114, such as may be controlled by an account access system 202 (for example, FIG. 2B). In other embodiments, the account identification component 114 may be operated by the account discovery system 110A (for example, FIG. 2A). Depending on the embodiment, the process of FIG. 11 may include fewer or additional blocks and or the blocks may be performed in order different than is illustrated.

Beginning at block 1110, a payee included in the transaction data items is selected. A user transaction data items, even with a single financial institution, may include dozens, hundreds, thousands or more transaction data items. Thus, categorization or grouping of the transaction data items may be initiated in various manners. For purposes of illustration, at block 1110, a particular transaction data items included in the set of access transaction data items is selected for analysis. In some embodiments, multiple transaction data items may be concurrently selected and analyzed, such as via a process similar to that illustrated in FIG. 11.

For the selected transaction data items, at block 1120 a payee identified in the transaction data item is determined. For some transaction data items, the payee is included in a separate payee field as digital information, for example, a payee may be indicated as "ABC Rentals" in a "PAYEE" field of a transaction data item. For some transaction data items, the payee may not be as easily identifiable. For example, a paper check may include a handwritten payee. The account identification component 114 may analyze the handwritten payee information, such as by using a handwriting analysis algorithm and/or other optical character recognition algorithm, to identify digital characters included in the payee field. For the example payee ABC Rentals, character recognition of a handwritten version of ABC Rentals may result in something that is not precise such as "ABC Reatils". Thus, correlation of transaction data items by payee may be technically challenging in such circumstances. In some embodiments, categorization of transaction data items associated with a recurring account of the user may be based on other parameters of the transaction data items, rather than or in addition to the payee identifier.

In some embodiments, the account identification component 114 performs a normalization and/or standardization process on data values of the transaction data items. For example, standardization may include removal of certain special characters (for example, symbols), correction of typographical errors (for example, which could catch the typo "Reatils" and correct to "Rentals") and/or perform other standardization processes. A normalization process may involve accessing a payee data structure associating a normalized payee identifier with one or multiple possible payee identifiers that could be located in transaction data items. Example, the payee data structure could include a standard payee identifier of "ABC Rentals" that is associated with multiple variations of that payee identifier, such as "ABC Rental", "ABC-Rentals", "ABC Rentals Inc.", and so forth. In this way, the account identification component 114 can more accurately associate transaction data items that are each involve a common payee.

In some embodiments, other data values of transaction data items are normalized, standardized, and used in generating groupings of similar transaction data items. For example, information provided in a memorandum or other informational field of a transaction data item may be analyzed.

After performance of block 1120 on a selected payee (block 1110), a grouping of transaction data items, each associated with the selected payee, are identified. Thus, if the transaction data items are associated with monthly payments to the selected payee, and two years of transaction data items are processed, the grouping of transaction data items identified at block 1120 may include 24 transaction data items.

Moving to blocks 1130-1150, information summarizing, characterizing, or aggregating information in the grouping of transaction data items located at block 1120, is performed. The information derived in blocks 1130-1150 is provided as examples of information that may be determined to help evaluate whether the grouping of transaction data items indicate an account of the user that potentially could be added to the credit data of the user. In other embodiments, other information may be derived from the grouping of transaction data items.

At block 1130, an annual payment amount for the transaction data items is calculated. For example, transaction amounts for each transaction data item dated within a prior 12 month period may be summed to determine the annual payment amount. A similar process may be performed for a prior yearly period, such as transaction data items dated from 24 months prior to 12 months prior. Similarly, total payment amounts for other time periods may be developed, such as quarterly or semiannually.

At block 1140, an average payment amount is determined. For example, an average payment amount over the prior one year period may be determined by averaging payments received over the last 12 month period.

At block 1150, periodicity of payments is determined. For example, an average number of days between payments over the prior one year period may be determined by averaging the number of days between each pair of sequential transaction data items.

At block 1160, the account identification component 114 determines whether there are additional payees in the transaction data items that have not yet been analyzed for categorization. In some embodiments, those transaction data items grouped with the transaction data item selected at block 1110 are not the selected for grouping. In other embodiments, each transaction data item, whether already associated with a grouping of transaction data items or not, is analyze with the method of blocks 1110-1150. If additional payees have not yet been analyzed for categorization, the method returns to block 1110 where another payee is selected. If no additional payees need categorization, the method continues to process for identifying the type of account each grouping of transaction data items is most associated with and identifying any accounts that may be added to credit data of the user.

Figure 12:
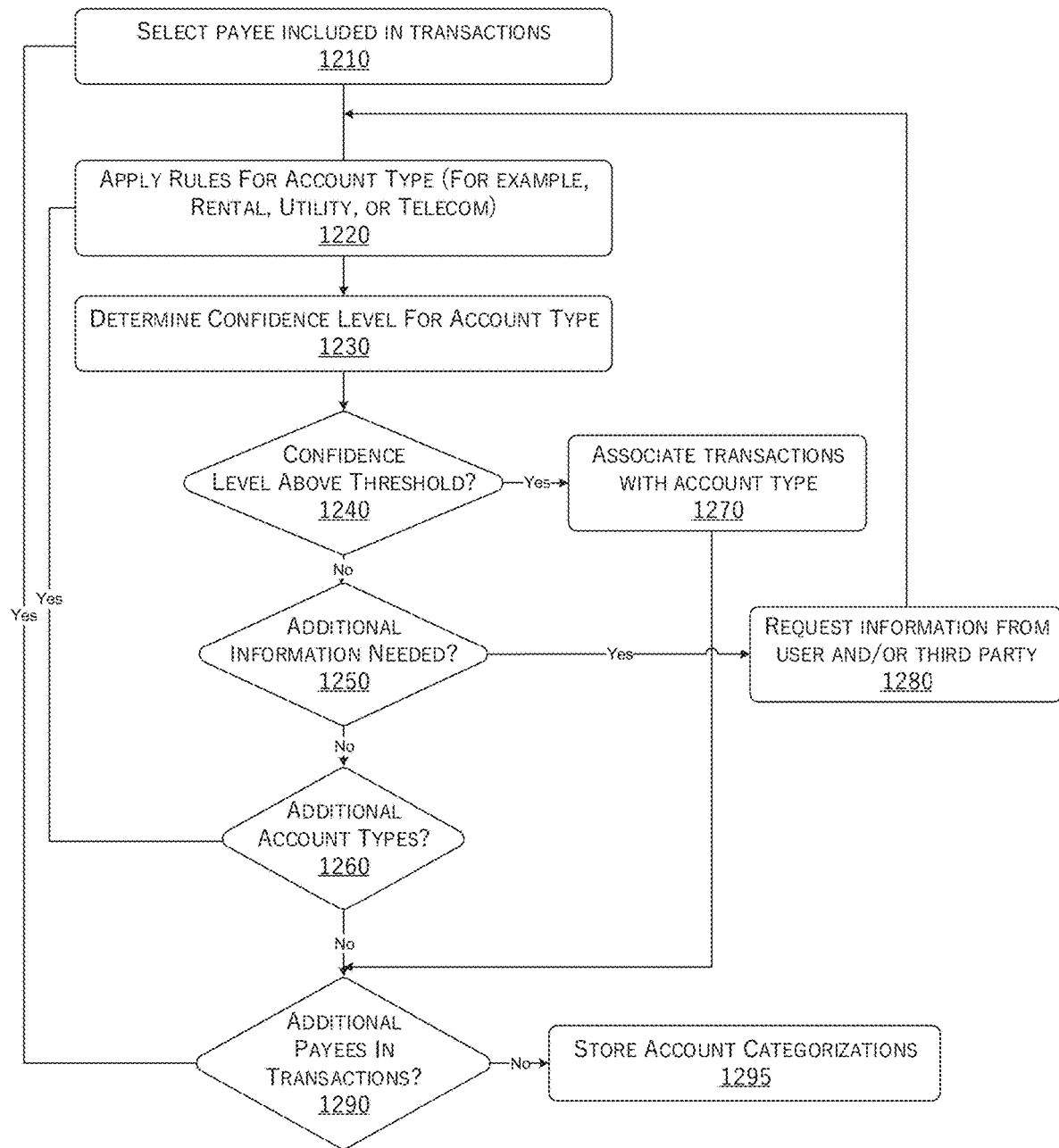
FIG. 12 is one embodiment of a flowchart illustrating one embodiment of a method for identifying account types of interest from groupings of transaction data items (for example, from the process of FIG. 11).

FIG. 12 is one embodiment of a flowchart illustrating one embodiment of a method for identifying account types of interest from groupings of transaction data items (for example, from the process of FIG. 11). In some embodiments, the method of FIG. 12 may be performed by the account identification component 114, whether operated by a account access system 202 or the account discovery system 110 A. Depending on the embodiment, the method of FIG. 12 may include fewer or additional blocks and/or the blocks may be performed in order different than is illustrated.

Beginning at block 1210, a payee included in the transaction data items is selected. For example, a payee that is associated with a grouping of multiple transaction data items (for example, 24 transaction data items spanning a period of 24 months of transaction data items) is selected.

Next, at block 1220, rules for identifying a probable account type associated with the grouping of transaction data items are executed. Such rules may be stored in a datastore and/or in a rules engine. In some embodiments, the payee identifier (for example, the normalized payee identifier) may be a significant factor in determining account type associated with the transaction data items. For example, is the normalized payee identifier is associated with a well-known wireless provider, designation of those transaction data items grouped with the wireless provider ID may be categorized as a wireless account without further application of account determination rules. In some implementations, even where a payee of multiple groups transaction data items is well-known, additional rules may be applied to the transaction data items, as well as the overall information derived at blocks 1130-1150, for example, to validate that the grouping of transaction data items really is for the believed account type. For payee identifiers that are not well-known (for example, an account types is not readily known for a grouping of transaction data items associated with a particular payee), account identification rules may be applied.

Next, at block 1230, a confidence level that a grouping of transaction data items is of a particular account type is determined. For example, at block 1220 a rule set for a rental account may be applied to the grouping of transaction data items and at block 1230 the confidence level that the grouping of transaction data items really is a rental account is determined. In some embodiments, the rules applied at block 1220 automatically output the confidence level of block 1230, thus, these blocks may be combined in certain implementations.

At block 1240, the account identification component 114 determines whether the confidence level calculated at block 1230 is above a threshold that indicates sufficient confidence that the selected account type accurately reflects the grouping of transaction data items. For example, if a rental account rule set is applied to the grouping of transaction data items at block 1220, a confidence level that the grouping of transaction data items are associated with a rental account is determined at block 430, and at block 1240 a confidence level threshold is compared to the confidence level calculated at block 1230 to determine if the transaction data items are associated with a rental account. In some embodiments, the threshold levels vary based on the account type. For example, a confidence level may be higher for rental account then for a wireless account.

If the confidence level is above the threshold at block 1240, the method continues to block 1270 where the grouping of transaction data items are associated with the selected account type.

Depending on the embodiment, the confidence level associate with a grouping of transaction data items may be based on various information regarding the transaction data items, the financial account of the user, the financial institution from which the account information was obtained, the user (and/or related users, such as those in the same household), and/or other related characteristics. As an example, the account identification component 114 may determine if there are a sufficient number of transactions for the account to be reliable, may determine if the transactions were reported by a sufficiently reliable financial institution, and/or may determine if the transactions are consistent enough with patterns expected for such accounts (for example, rent transactions with amounts that vary each month may indicate a lower reliability that the transactions accurately reflect a rental account of the user, utility transactions with a payee name that doesn't match a known utility provider may indicate a lower reliability, and so forth). In some embodiments, the account identification component 114 may assign individual reliability scores to each of multiple factors, such as number of transactions, reliability of the associated financial institution, consistency with typical patterns for such accounts, and so forth, and may combine the individual reliability scores to determine an overall reliability score. In some embodiments, a threshold confidence level may include both individual reliability scores for each of one or more individual factors and a an overall reliability score for all of the factors that are determinative of reliability.

If the confidence level is not above the threshold at block 1240, the method continues to block 1250 where the account identification component 114 determines if additional information may be helpful in increasing the confidence level associated with the grouping of transaction data items. As an example, the account identification component 114 may determine that the account is a rental account and that obtaining a copy of the lease agreement would significantly improve the confidence of the system that the rental transactions are accurate, reliable, and properly associated with a rental agreement. As another example, the user account discovery system may determine that the account is a utility account and that confirming one or more details of the user's account directly with the utility provider would significantly improve the system's confidence in the utility account (for example, the account's reliability).

If additional information may be useful at block 1250, at block 1280 additional information is requested from the user and/or a third-party. In some embodiments, information regarding transactions that may be missing in a grouping of transaction data items may be requested from the user and/or third-party to supplement the transaction data items acquired directly from the transaction provider and increase the confidence level. In some embodiments, the types of additional information and/or sources of additional mission may vary based on the account type being analyzed. In some embodiments, additional information may only be requested if the confidence level is already near the threshold, such as within 10% of the required confidence level.

As other examples, the user may be asked to provide the date and amount of a monthly rent (or other utility, wireless, or other) payment; the user may be asked to provide a copy of a lease agreement, a utility bill, or other such confirming information, the financial institution may be asked to provide additional details of the transactions, utilities may be asked to confirm account and/or transaction details, rental providers may be asked to confirm rental agreement details, and so forth.

If additional information is not needed at block 1250, the account identification component 114 determines at block 1260 whether the grouping of transaction data items should be analyzed against other account types. For example, if the transaction data items are initially tested against rental account rules, at block 1260 the account identification component 114 may determine that utility account type rules should now be applied to determine whether those transaction data items are an utility account. If no additional account types are to be tested, the method continues to block 1290 where additional payees, or groupings of transaction data items associated with an additional payee, remain to be tested against the account type rules. If additional groupings of transaction data items do remain, the method continues to block 1210 where another grouping of transaction data items, associated with a particular payee, is selected and analyzed. At block 1295, associations of transaction data item groupings with account types, as well as potentially the confidence levels associated with the identified account types, are stored for later access.

Figure 13:
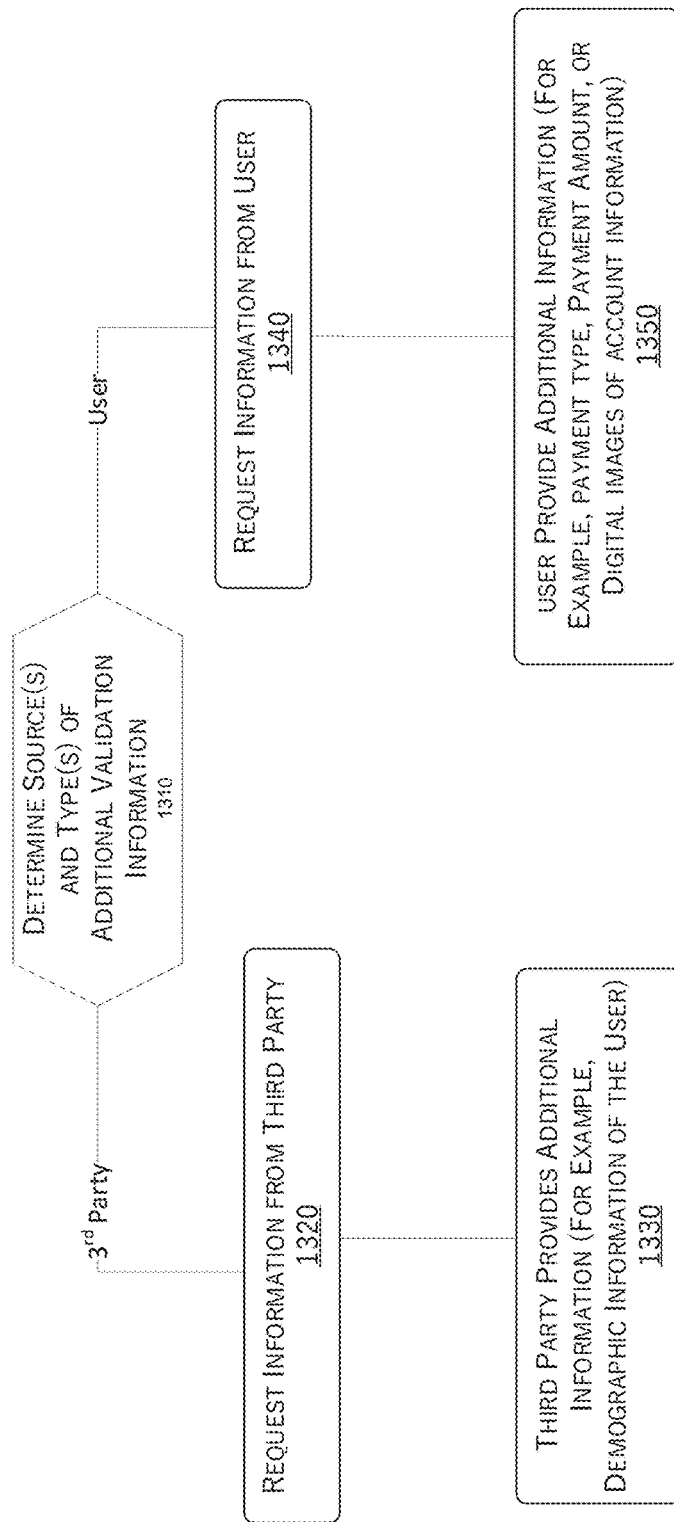
FIG. 13 is one embodiment of a flowchart illustrating an example of a method that may be performed to request additional information from third-party and/or from a user.

FIG. 13 is one embodiment of a flowchart illustrating an example of a method that may be performed to request additional information from third-party and/or from a user, such as may be performed at block 1250 and 1280 of FIG. 12. In the example of FIG. 13, at block 1310 the account identification component 114 determines sources and/or types of additional information that may be used to improve identification of accounts within categorized transaction data items. In some embodiments, the types of information that are helpful may be based primarily on the type of account being identified. For example, if a rental account is being identified (for example, a confidence level that a group of transaction data items are associated with a rental account of the user is met or almost met), a rental agreement between the user and the rental payee (for example, a landlord) may be the default data item requested of the user and/or third-party.

If a determination is made that additional information is requested from a third-party, at block 1320 a request for the additional information is transmitted to the third-party and at block 1330 the third-party provides additional information. Such additional information may include, for example, demographic information of the user that may be compared to information associated with a payee on the groups transaction data items to confirm that the user lives within a service district of the payee. If a determination is made that additional information is to be requested from the user, at block 1340 the information is requested from the user, such as via the mobile application or website with which the user is already interacting with the account discovery system, and the user provides requested additional information at block 1350. Examples of additional information that may be provided by a user could include a payment type (for example, cash, handwritten check, cashier check, and so forth), payment amount, digital images of payments, digital images of account specific information (for example, monthly invoices or statements from the payee), and so forth. In one example embodiment, the user is requested to provide a digital copy of at least a portion of a rental agreement to validate terms and existence of a rental account. Information from the rental agreement may be extracted, such as through an optical character recognition processing, to identify key terms of the rental agreement and compare such terms to information included in (or derived from) the grouping of transaction data items.

FIGS. 14-18 are example user interfaces that illustrate a user experience as the account discovery system accesses transaction data items of the user and attempts to identify accounts within the transaction data that can be added to the user's credit data. For example, the user interfaces may present dialogue blocks sequentially as the user interfaces with an artificial intelligence system (for example, provided by a credit bureau) that helps the user understand their credit situation better. For example, a user may click on certain of the dialogue blocks 1410 to cause additional dialogue blocks to be presented.

Figure 14:
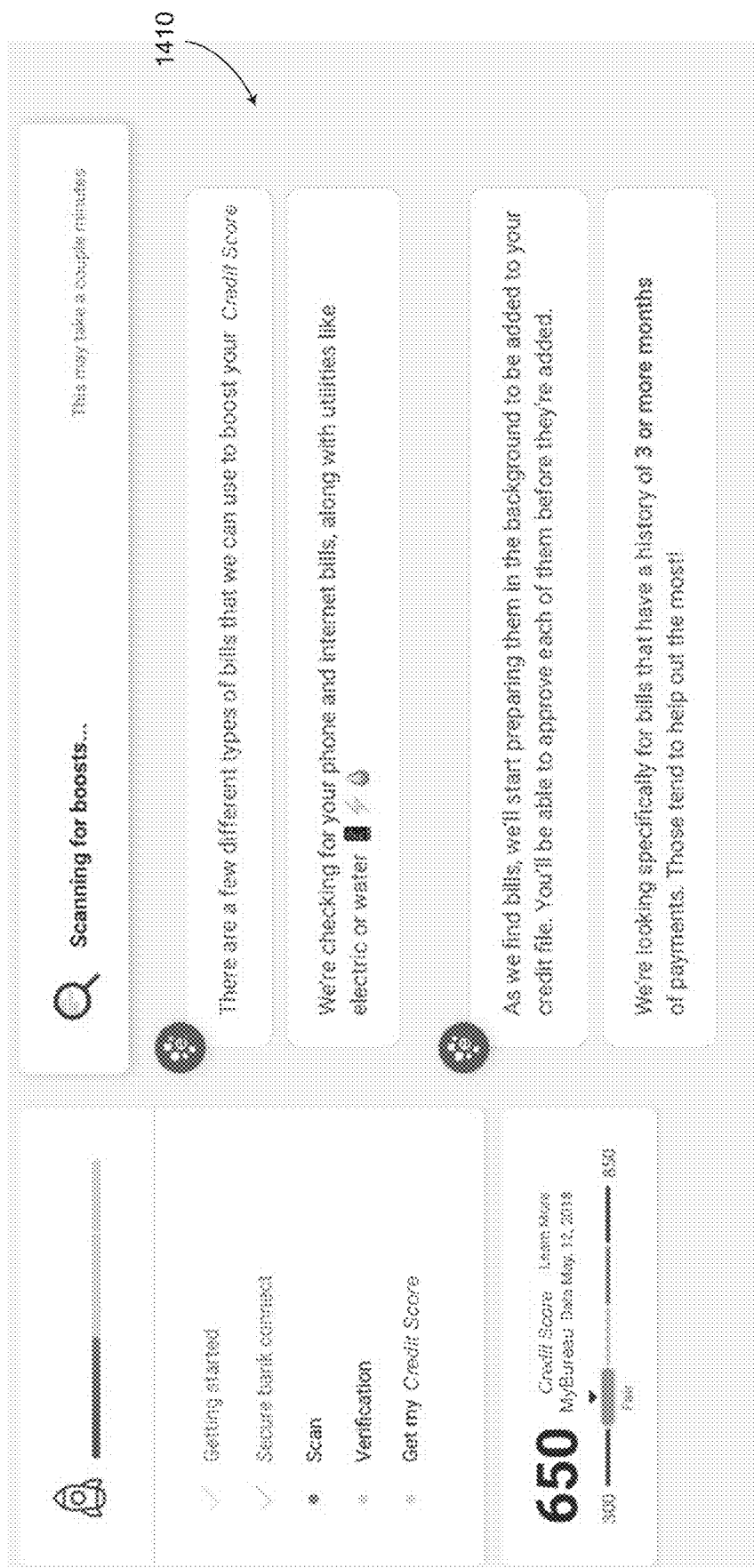
FIGS. 14-18 are example user interfaces that illustrate a user experience as the account discovery system accesses transaction data items of the user and attempts to identify accounts within the transaction data that can be added to the user's credit data.

Beginning at FIG. 14, the dialogue blocks 1410 provide information to the user on types of accounts that may be used to increase the consumer's credit score, such as, for example, phone, Internet, a utility (for example, electrical, water, gas, and so forth) bills. The dialogue then continues to provide educational information regarding a payment history that may be needed to impact credit score the user. Depending on the embodiment, the payment history threshold for impacting a credit score of user may depend on the type of account. For example, a wireless account may be considered by a credit scoring algorithm with only three months of consistent payment history, while a rental account may require six months. Different credit scoring algorithms may have different requirements, weightings, and factors, for example, for the required payment history for an account to be considered by the scoring algorithm.

Figure 15:
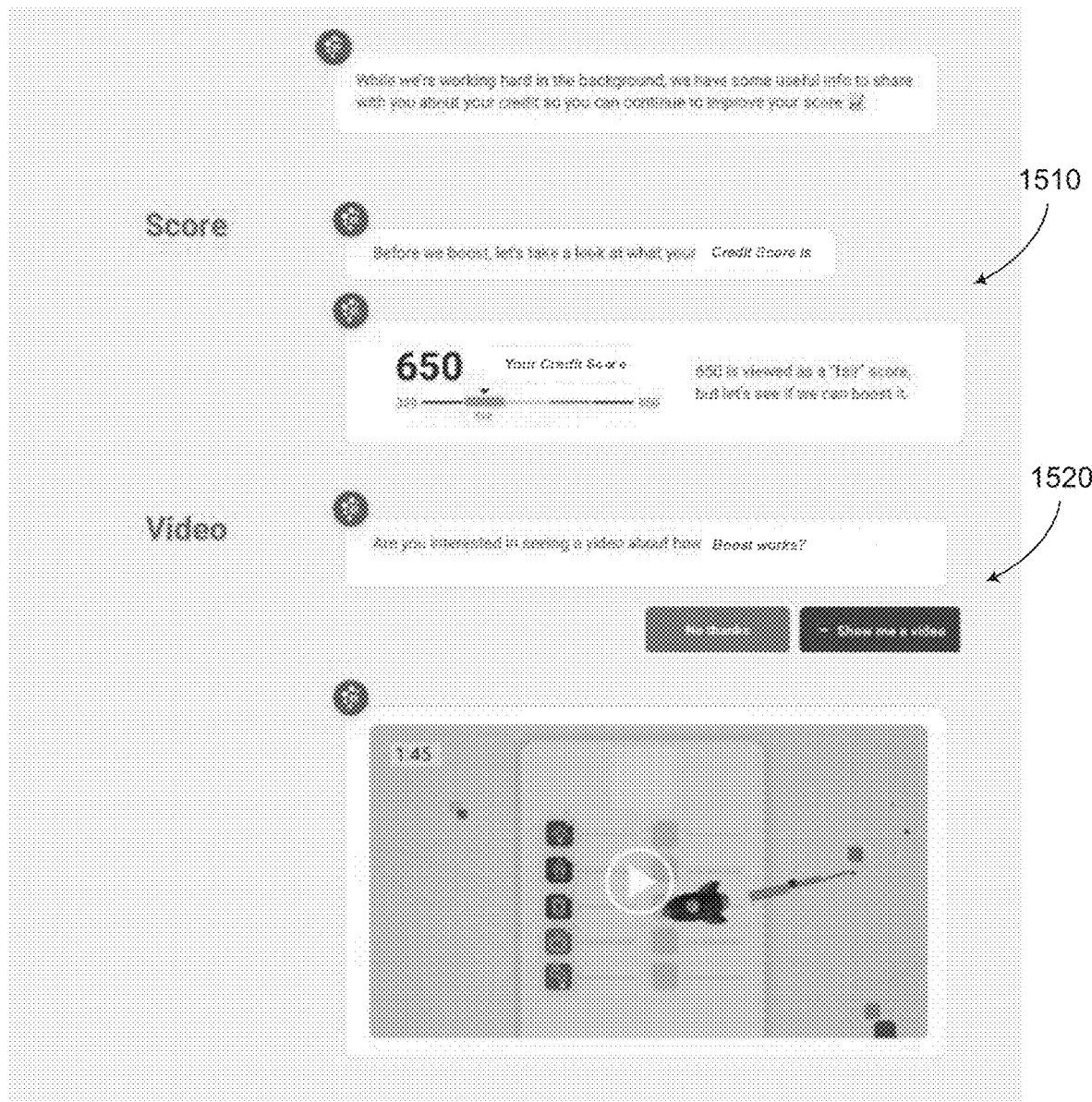

FIG. 15 illustrates embodiments of additional dialogue blocks 1510 that provide current credit score information to the user, such as to provide a baseline to the user for comparison to a later calculated credit score, for example, after one or more new accounts are added to the credit data of the consumer. In this example, the dialogue blocks 1520 allow the user an option to watch a educational video describing how the user's DDA account information is accessed and analyzed to locate accounts of the user that can be added to the credit file of the user. Additionally, other educational videos or interactive media can be provided to the user.

Figure 16:
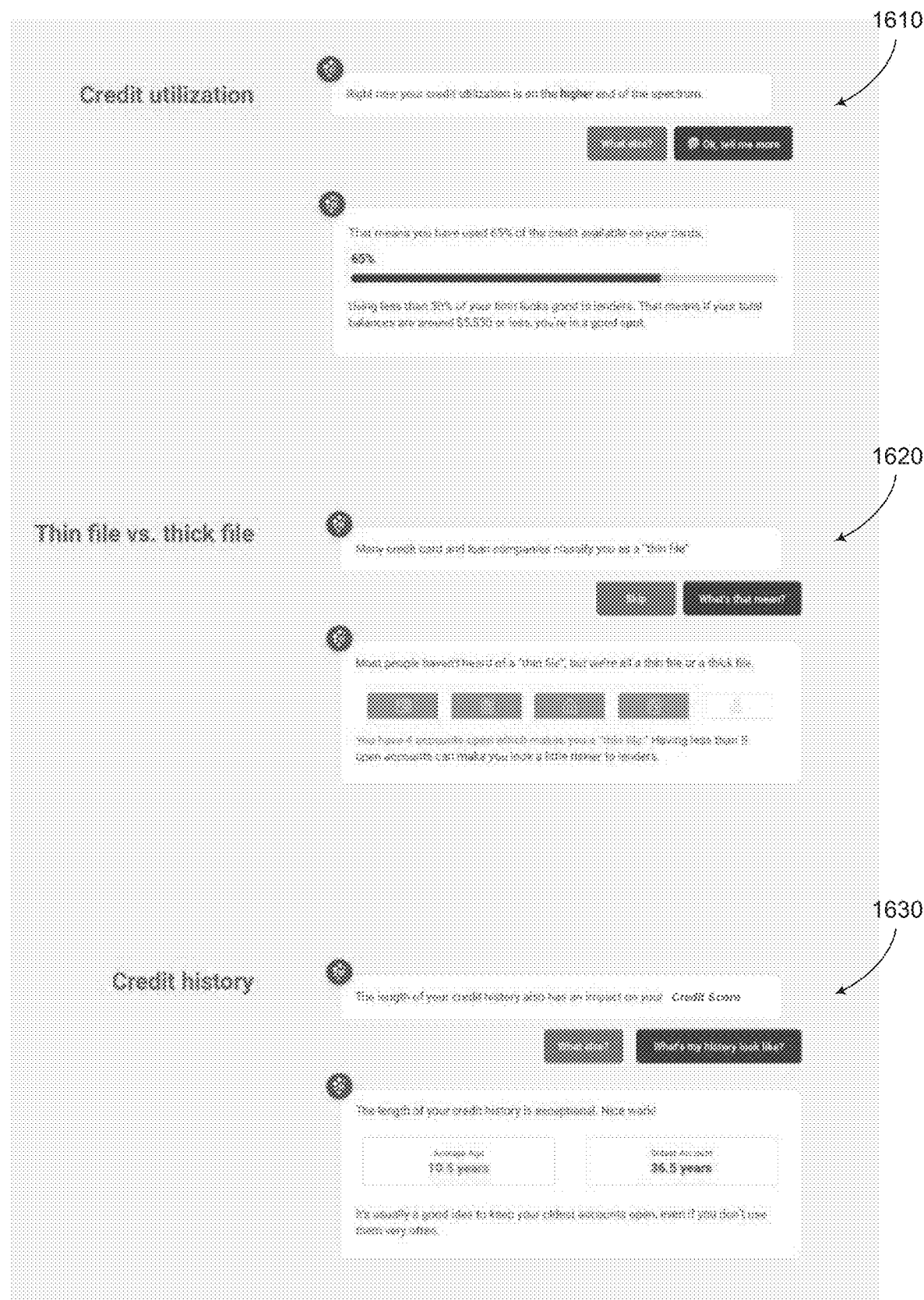
Figure 17:
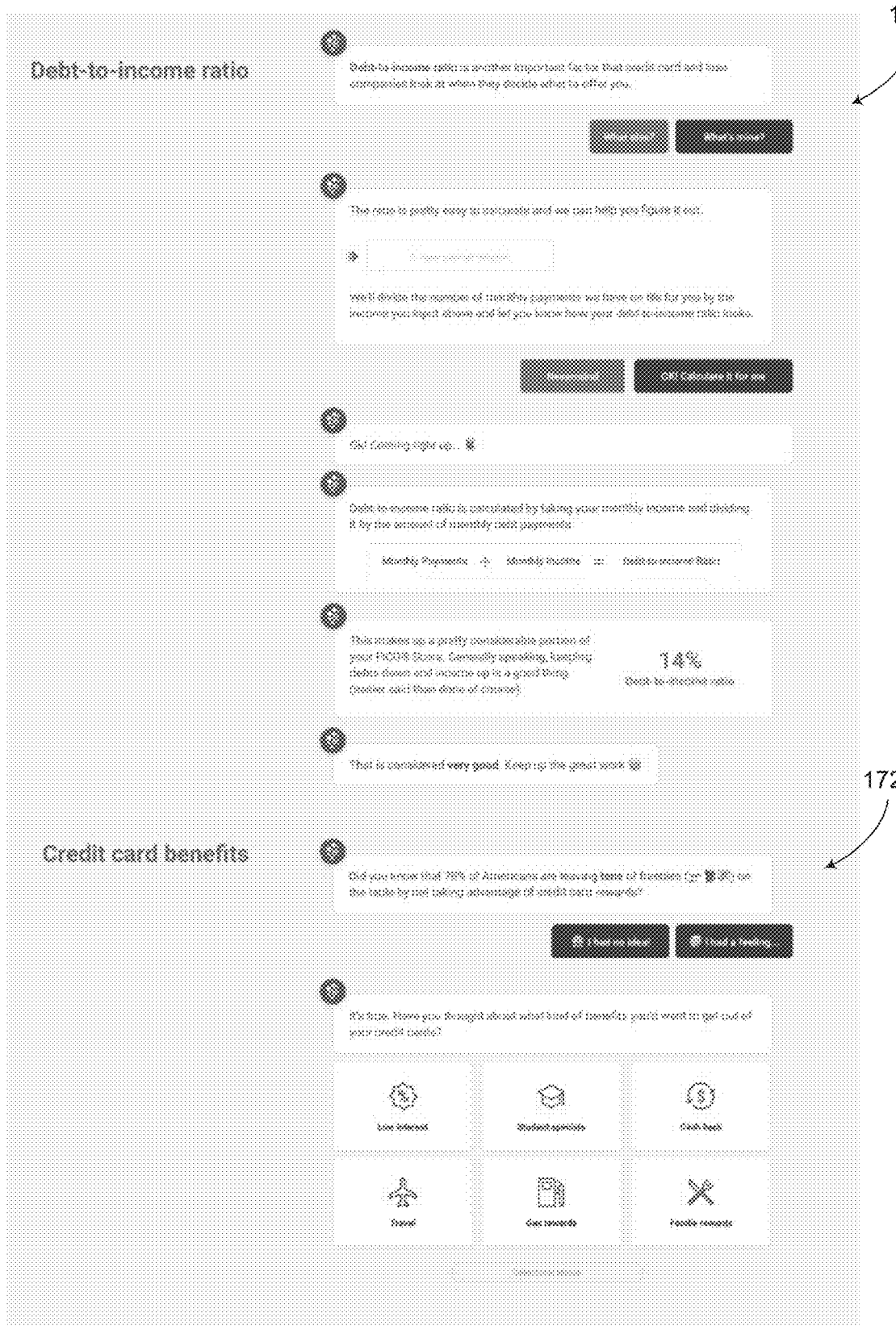
Figure 18:
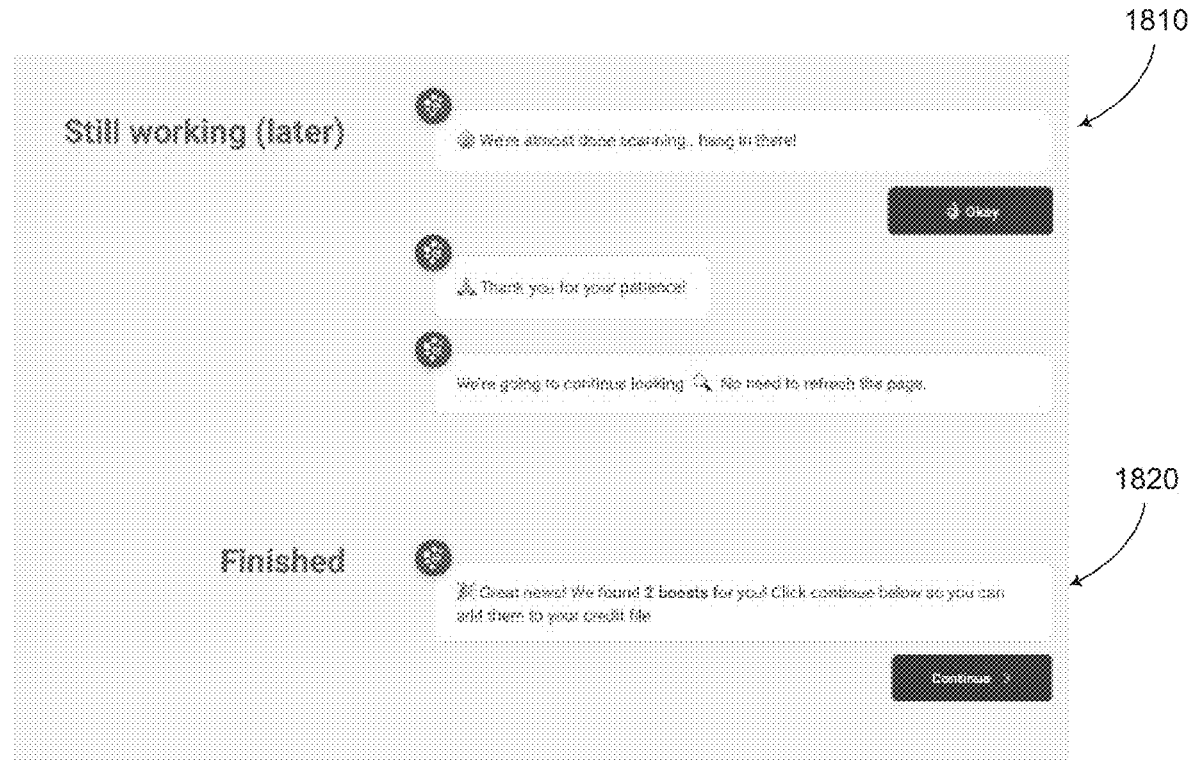

FIG. 16-18 illustrate embodiments of additional dialogue blocks 1610-1810 that may be provided to the user, such as to educate user on additional areas related to their credit data. In some embodiments, the informational dialogue blocks, such as those in FIGS. 16, 17, and/or 18, may be presented to the user only while the account identification component 114 is still processing transaction data from the one or more links financial account of the user areas for example, after the account identification component 114 has completed processing of the transaction data items, presentation of further dialogue blocks may be postponed in favor of presenting the user with an indication of identified accounts for boosting the consumer's credit score, such as the dialogue block 1820 of FIG. 18.

Figure 19:
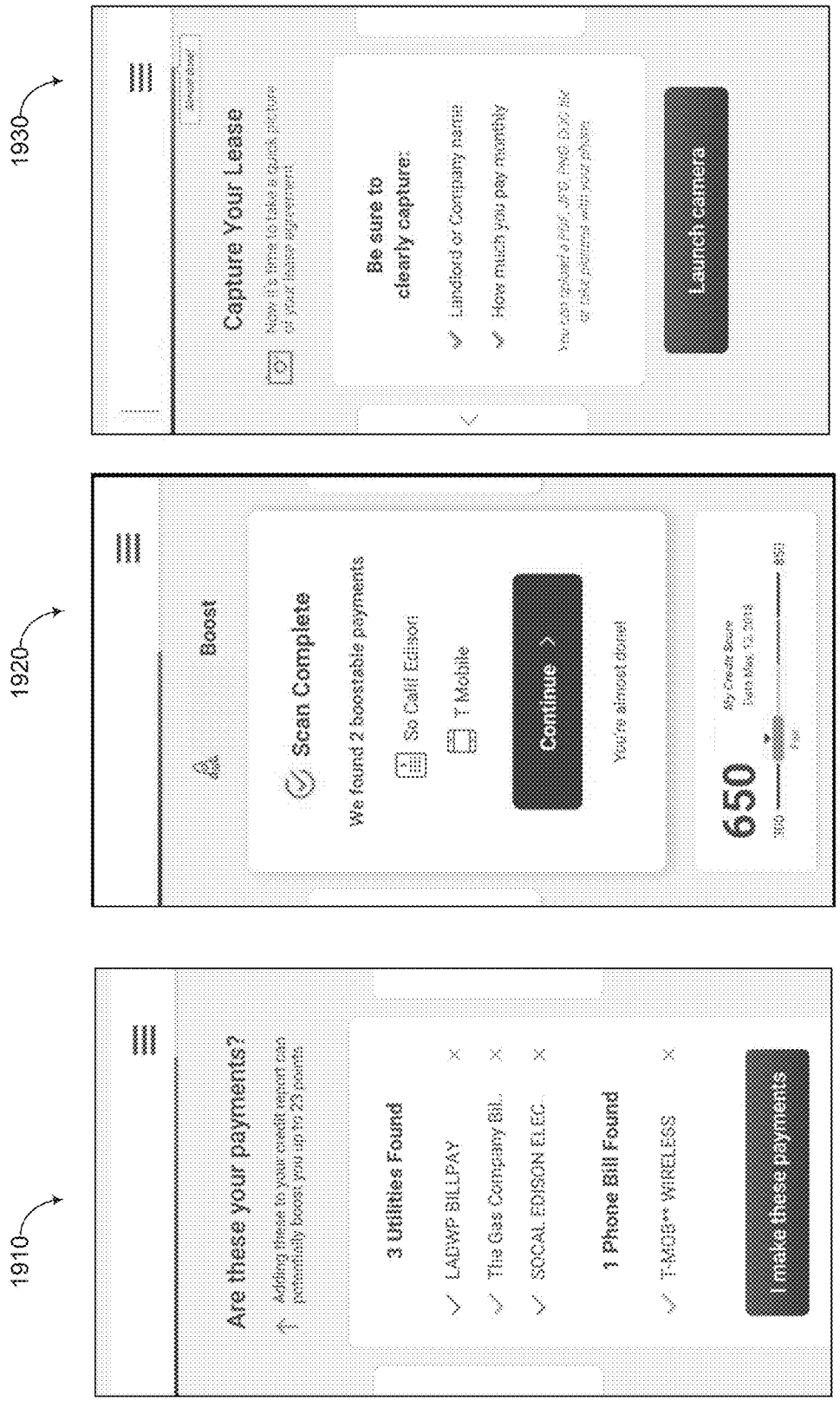
FIG. 19-20 include embodiments of example user interfaces that may be presented to a user after scan of the consumer transaction data is completed and, in this example, accounts that may be added to the user's credit data are located.
Figure 20:
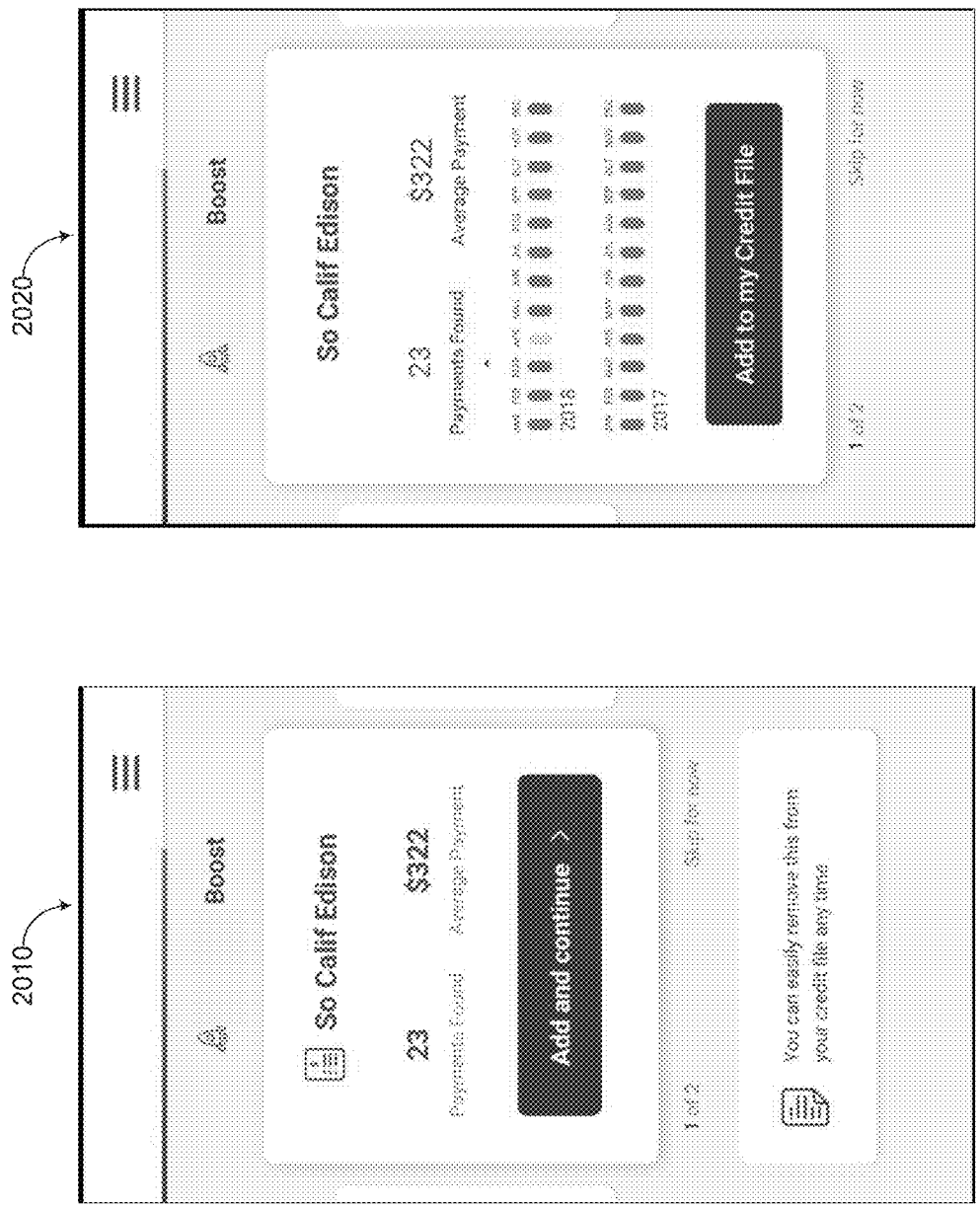

FIG. 19-20 include embodiments of example user interfaces that may be presented to a user after scan of the consumer transaction data is completed and, in this example, accounts that may be added to the user's credit data are located. In other embodiments, the user interfaces may include additional or less information and/or may be formatted and presented in different manners. The user interfaces of FIGS. 19-20, as well as the other user interfaces discussed herein, are only examples of user interfaces that may present this information.

In some embodiments, the system may interact with the user via a chat window (for example, a pop-up window) that may be operated by a chatbot to request the information needed from the user and/or provide the user with educational information regarding the process. In some embodiments, such chatbots may be entirely automated (for example, using artificial intelligence that learns how to best interact with users over time) or may be partially operated by a human operator (for example, when the chatbot is unsure of how to respond to a query from the user). Similarly, any other user interactions discussed herein may be partially or fully performed via a conversational format, with a chatbot (for example, fully or partially automated) interacting with the user via primarily textual communications. FIGS. 14-18 illustrates example embodiments of such chat-like communications.

User interface 1910 request information from the user regarding a few potential accounts that could be added to the credit data of the consumer. The user interface request that the user confirm that payments to the identified payees are actually made by the user and, accordingly, could properly be used in calculating credit worthiness of the user. In this embodiment, if the user does not recognize payees listed, those payees can be removed by clicking the acts the right of the payee data identifiers.

After the user selects payees with which the user has an account, the user may select a confirmation indicator element, such as an "I make these payments" link or button, and be presented with a user interface 1920 which indicates that the account identification process performed by account identification component 114 (referred to loosely as a "scan" in certain of the user interface features discussed herein) has completed. The user interface further indicates that two accounts, of the type that may be added to credit data of users, have been identified. In this particular example, an electrical account (associated with the payee "So Calif Edison") and a wireless account (associated with the payee "T Mobile") have been identified.

User interface 1930 illustrates an example of a request for additional information from the user, in this case related to a potential lease account for which transaction data items were identified in the user's transaction data. Advantageously, the user may launch a camera on their mobile application directly via the user interface 1930 and take one or more snapshots of the lease agreement. The lease agreement may then be processed by the account identification component 114 to validate a grouping of transaction data items associated with a lessee as indicative of a rental account of the user that may be added to credit data of the user.

FIG. 20 illustrates an embodiment of the user interface 2010 that provides detailed information regarding the transaction data items associated with a particular account, in this case the account associated with the payee "So Calif Edison" the example user interface identifies a number of payments that were found in the transaction data items, as well as an average payment amount across those located payments. In other embodiments, less or additional information regarding the individual transaction data items and/or data derived from all or some of the transaction data items, may be provided. In one embodiment, the user interface 2010 may additionally provide the account type associated with the identified payee, such as "utility account" associated with the identified payee "So Calif Edison."

User interface 2020 includes further details regarding the payments that were found in the transaction data items. In this example, two years of prior data is illustrated graphically such that the user can identify months where they transaction data item was not located. In this example, April 2018 payment was not identified in the transaction data items. In some embodiments, the user is given an opportunity to update the account information with payments may outside of the linked DDA account. For example, the user may be given the opportunity provide a copy of a cashiers check that was used to make the payment to So Calif Edison in April 2018 so that the historical payment activity for the account shows no missed payments over the last two years. Finally, after the user has reviewed information regarding the located account and related transaction data items, the user can select the "add to my credit file" button to initiate addition of the account to the user's credit file.

Figure 24A:
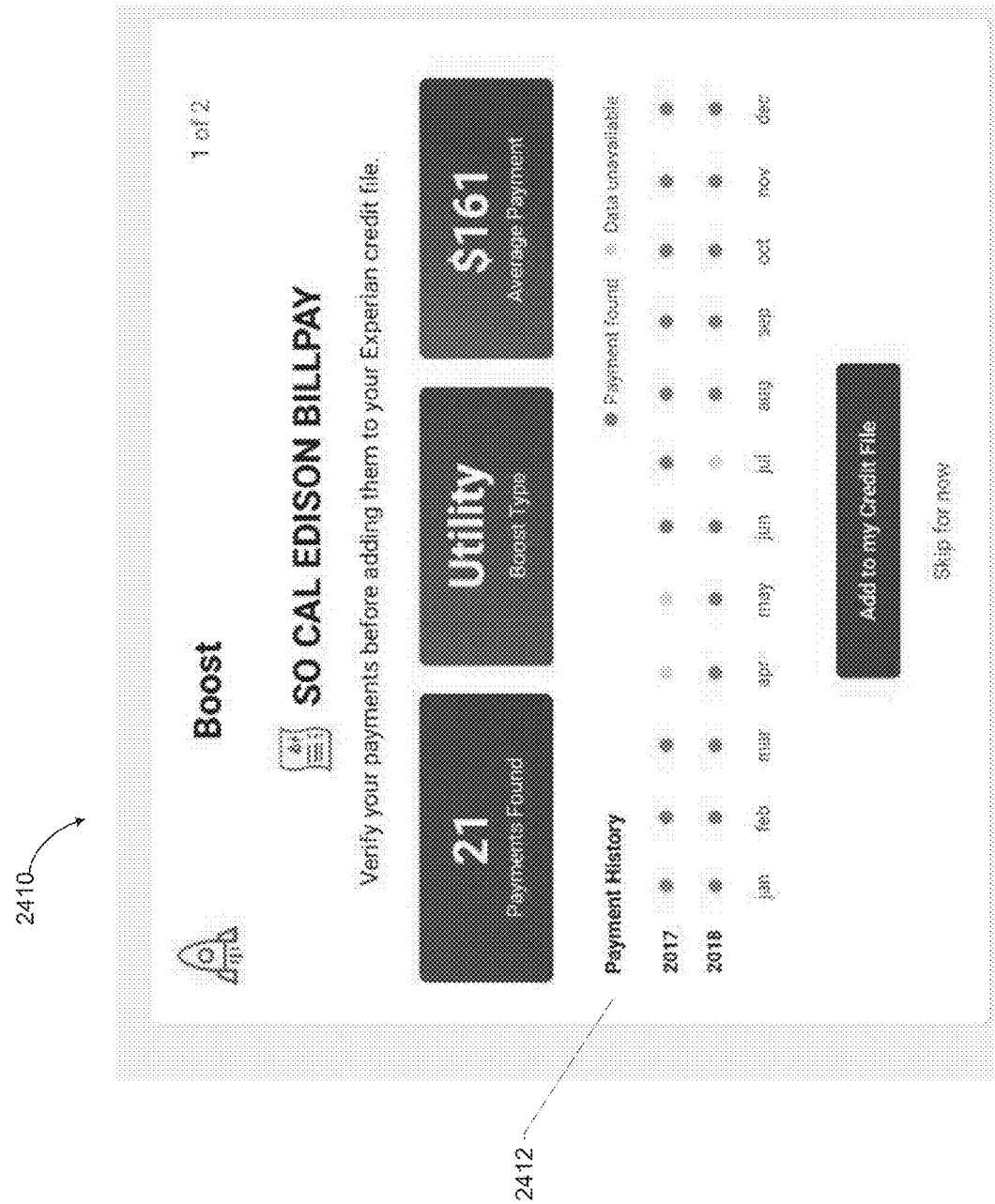
FIG. 24A is another embodiment of an example user interface that provides information regarding an identified account in transaction data items of user, with an option that is selectable by the user to add the account to credit data of the user (as a self-reported account).

FIG. 24A is another embodiment of an example user interface that provides information regarding an identified account in transaction data items of user, with an option that is selectable by the user to add the account to credit data of the user (as a self-reported account). In the example of FIG. 24A, the user interface may be displayed via a browser, such as on a desktop or laptop computer. However, the same or similar user interface may be displayed on any other display device or type. In this example, a payment account associated with So Cal Edison has been identified, and payments identified in transaction data items are indicated in the payment history graphic 2412. In this example, payments for two months in 2017 were not identified and a payment for one month in 2018 was not identified (indicated as gray circles in the payment history graphic 2412, rather than green circles). Thus, 21 of 24 payments were identified in the prior two year history for the account. Missing payments in one or more calendar months may not necessarily indicate negative activity associated with the account. For example, a user may have made two payments within a given month (for example, paid bill on 1st and 31st of the same month), causing the following calendar month to not be associated with a payment. However, the payment for that following month was actually paid early, so the account identification component 114 may be programmed to identify special circumstances such as this example (either through manually provided rules and/or rules determined by machine learning) so missed payments can be more accurately identified.

Since there are a few missing payments, the user may want to review the payment transaction items that were identified by the account identification component 114 to determine if some of those missing payments can be located (for example, in another DDA account of the user). Similarly, the user may want to provide the account identification component 114 with additional information regarding payments made to the payee, such as an alternate payee identifier that may have been used in certain transaction data items. As another example, the user may want to authorize access to another DDA account where payments to the payee may also be located. Through these processes, the user may improve the payment history associated with the account and, accordingly, may further increase a score impact by addition of the account to credit data of the user. In some implementations, a user interface such as FIG. 24B, which displays missing payments associated with a particular account, may not be displayed to the user until after the account is added as a trade line to the credit data of the user.

Figure 24B:
FIG. 24B illustrates an embodiment of an example user interface that provides an overview of self-reported accounts that have been added to the credit data of the user.

FIG. 24B illustrates an embodiment of an example user interface 2420 that provides an overview of self-reported accounts that have been added to the credit data of the user. User interface 2420 may be considered to be an electronic, interactive view of the user's credit report, and may provide the same or similar information that would be reported on a credit report delivered in other manners than a user interface. The user interface 2420, or similar user interface, may be provided to third parties with a permissible purpose for viewing the consumers credit data. For example, a lender, landlord, or other entity interested in credit of a user, may view and electronic report of trade lines in the user's credit data.

Figure 24C:
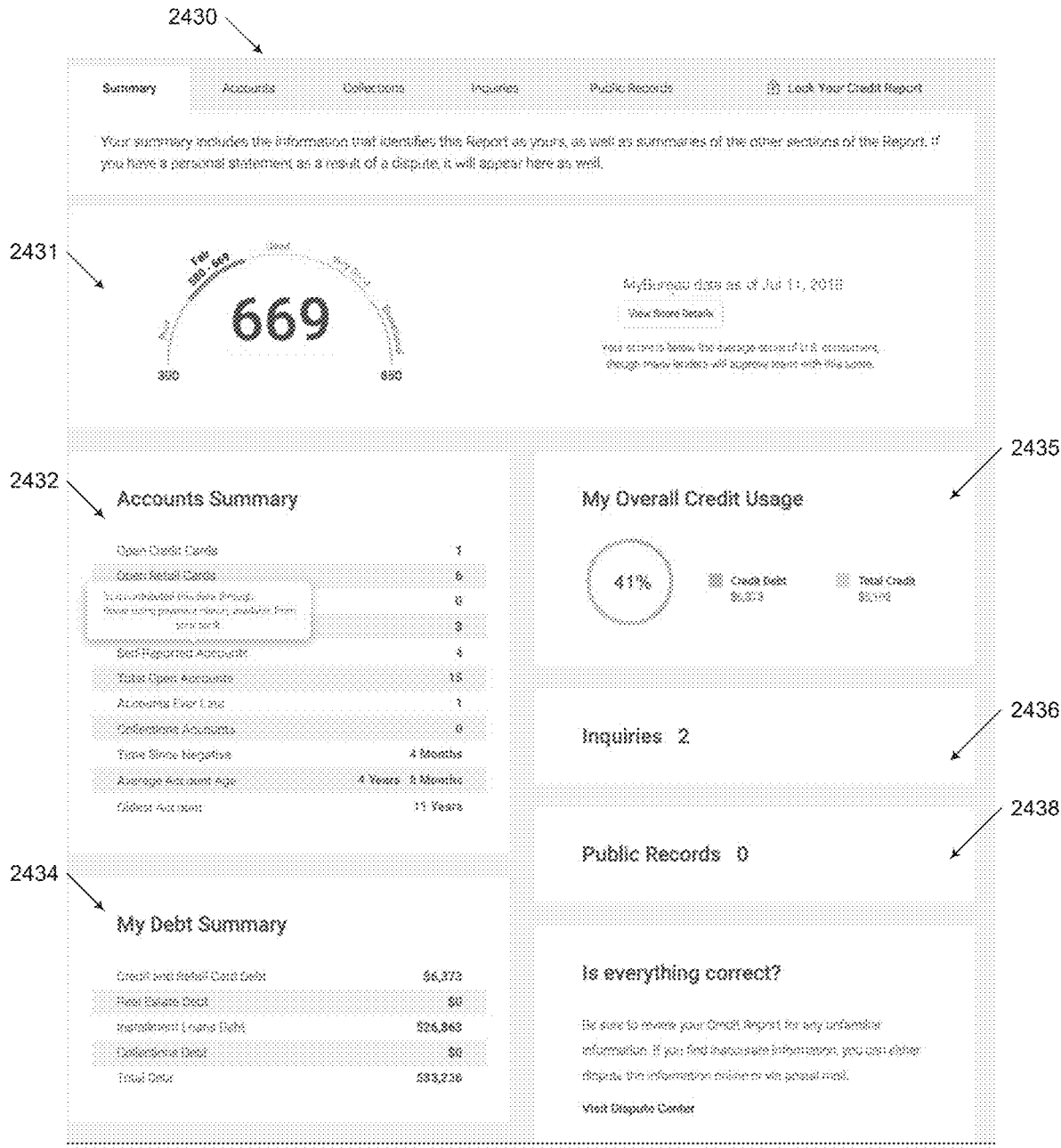
FIG. 24C illustrates an embodiment of an example user interface that summarizes the various areas of consumer credit that may impact credit worthiness of the user.

FIG. 24C illustrates an embodiment of an example user interface 2430 that summarizes the various areas of consumer credit that may impact credit worthiness of the user. In this example, a current credit score interface 2431 is displayed, showing the user a relative strength of the current credit score of the user with how lenders may interpret that current credit score (for example, fair, good, very good, exceptional). This example also includes an account summary interface 2432 providing a summary of those accounts (for example, trade lines) that are currently part of the user's credit data. In this example, self-reported accounts are identified separate from other credit accounts. In some embodiments, self-reported accounts may be combined with other credit accounts. The debt summary interface 2434 provides overall credit, retail, real estate, installment loan, and collections debt. The overall credit usage interface 2435 provides the user with an indicator of credit utilization across all of the credit account of the user. Inquiries interface 2436 indicates the number of credit inquiries currently impacting credit score of the user, such as those that were received within the prior two-year period (or other time period, depending on the credit scoring algorithm). Public records interface 2438 indicates whether any derogatory public record information was identified for the user. The information summarized in user interface 2430 provides a user with a comprehensive overview of factors that generally weigh into credit score calculations, although each credit scoring algorithm may view these factors differently, may consider additional factors, and/or may not consider some of these factors.

The user interfaces of FIG. 24, for example, may be utilized by the user as a form of financial account monitoring. Similarly, the information may be provided to the user and/or authorized third parties, in other formats, such as via periodic emails or push messages that summarize activity of the self-reported accounts of the user, as well as other credit data.

Figure 21:
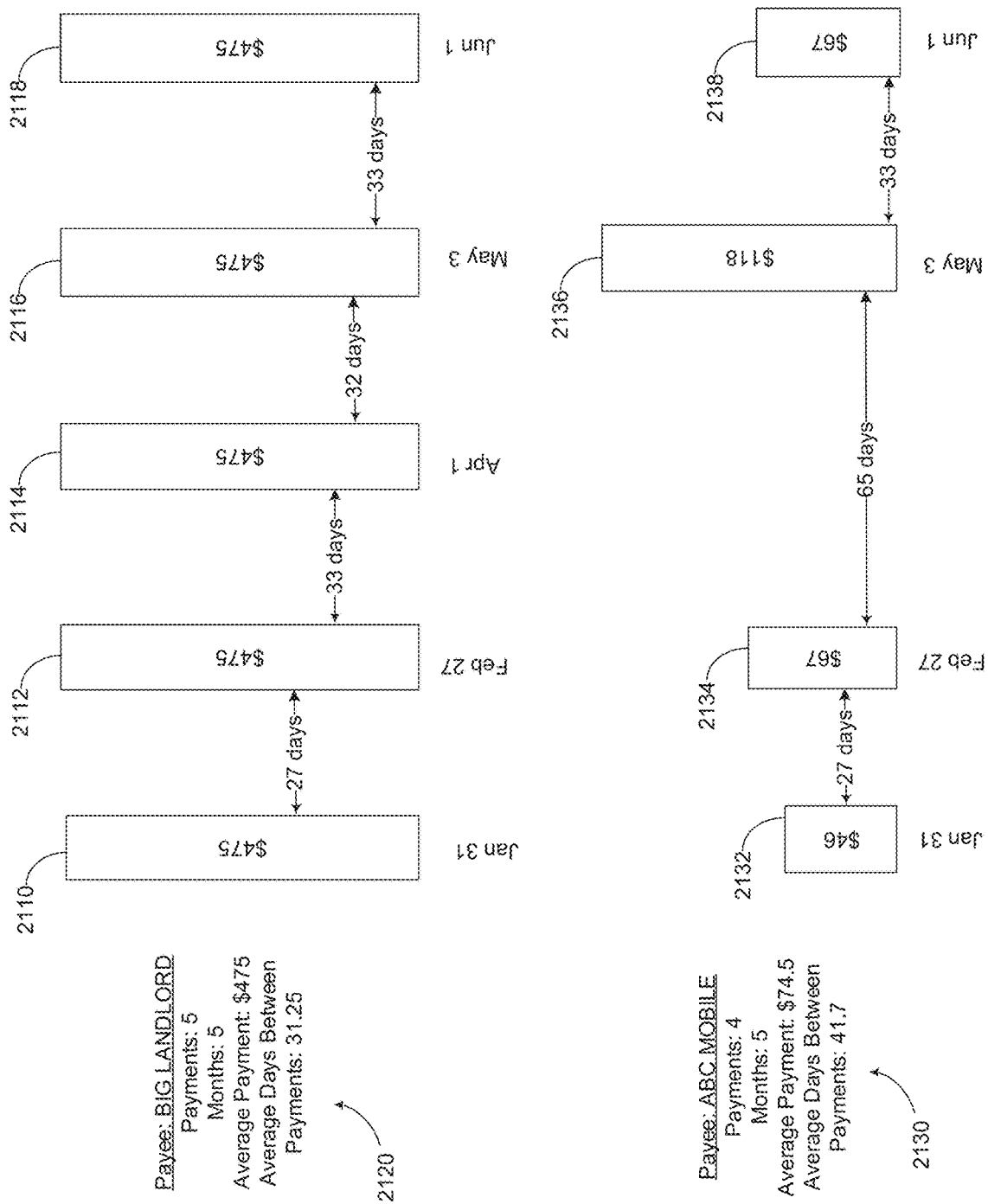
FIGS. 21-22 are conceptual diagrams illustrating example transaction data items that may be identified in transaction data of the consumer and analyzed to determine whether the groups transaction data items are indicative of an account that can be added to credit data of a consumer.
Figure 22:
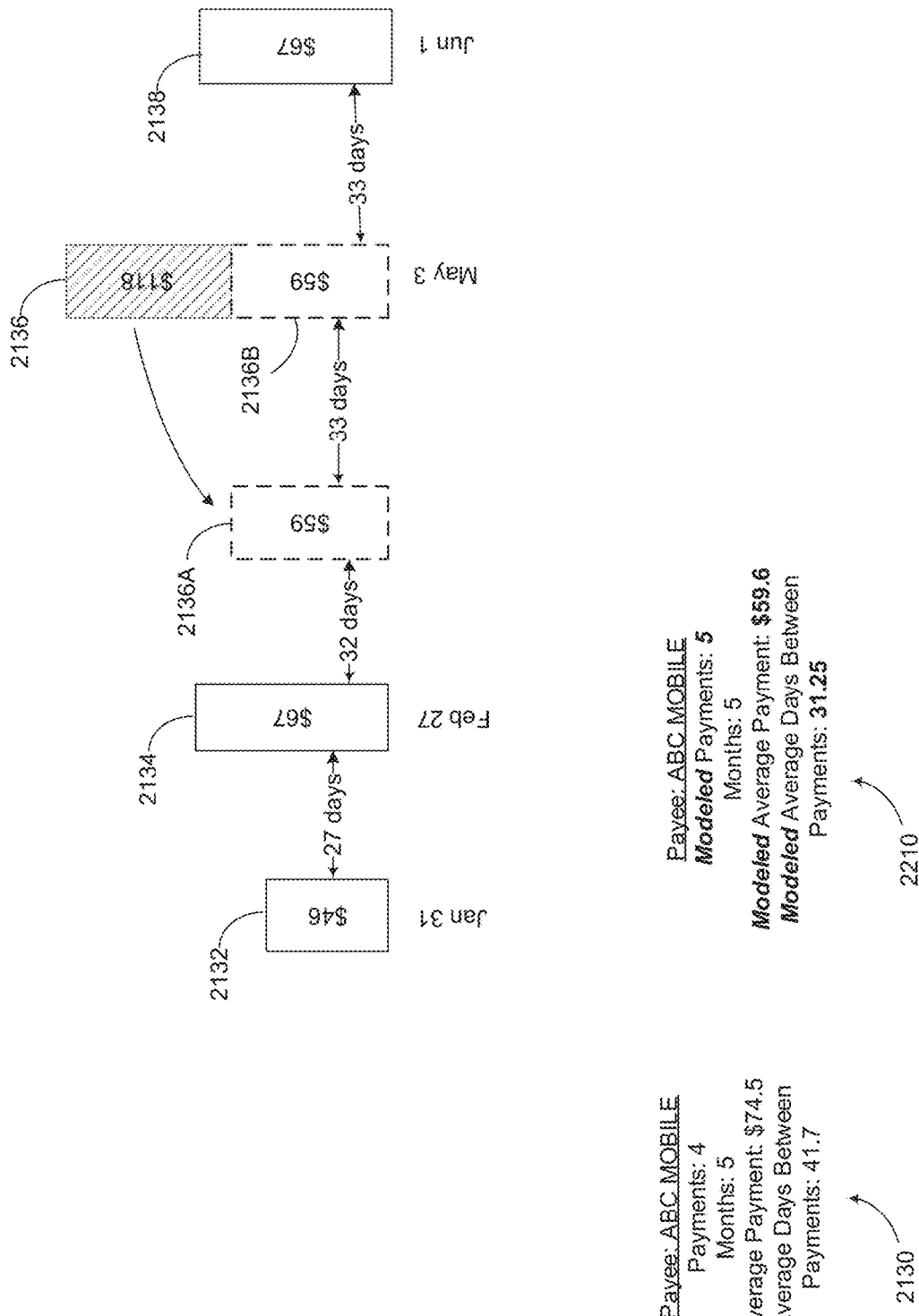

FIGS. 21-22 are conceptual diagrams illustrating example transaction data items that may be identified in transaction data of the consumer and analyzed to determine whether the groups transaction data items are indicative of an account that can be added to credit data of a consumer. In the example of FIG. 21, transaction data items 2110-2118 represent five transaction data items that were identified in transaction data of a user in a DDA account of the user, each of which was associated with a common payee, "Big Landlord" in this example. As shown, the payments were each in the amount of $475 and each occurred between 27 days and 33 days after the prior payment. Derived data 2120, which indicates aggregated, summarized, extracted, and so forth data related to the transaction data items, is also illustrated in FIG. 21. In the example transactions associated with Big Landlord, the account identification component 114 may determine, for example, that five payments were identified over a period of five months, the average payment amount was $475, and the average days between payments was 31.25 days.

Also shown in the example of FIG. 21 are four transaction data items 2132-2138 that have each been associated with the payee "ABC Mobile". As shown, these example payments vary in amount from $46 to $118 and the time between payment varies from 27 days to 65 days. Thus, the derived data 2130 for the ABC Mobile transaction data items indicates an average payment of $74.5 and average days between payments of 41.7 days. Another data point that may be derived from these transaction data items is the variance between payment amounts. In some implementations, rules for identifying a regularly recurring payment that is indicative of a wireless phone account may disqualify these transaction data items because of the large difference between the payment amounts (for example, between the $46 and the $118 payment amounts) and high average number of days between payments (for example, 41.7 days where an average of 30.4 days between payments is expected).

FIG. 22 illustrates the same transaction data items 2132, 2134, 2136, and 2138 associated with payee "ABC Mobile" as in FIG. 21, but with additional analysis logic that splits the large payment 2136 of $118 that was paid almost twice as many days from the prior payment 2134 as expected, into two simulated payments 2136A and 2136B. In this way, the account identification component 114 has interpreted the transaction data item 2136 in a way that causes the modeled number of payments to be 5, with the modeled average payment being $59.6, resulting in a much smaller variance between the low payment of $46 and high payment of $67, and the average days between payments of 31.25 days. Thus, this modeled data regarding the account may result in a much higher confidence level that the transaction data items are associated with a mobile account than application of the rules to the derived data 2130 of the original transaction data items.

Ongoing Access to Transaction Data Items

In some implementations, the account discovery system 110 periodically access transaction data items of the user, such as via the data permissioning component 112 that communicates with the financial institution of the user using the user security token. For example, the account discovery system 110 may periodically access recent transaction data items, for example, those transaction data items that are new since the financial account of the user was last accessed, to search for additional accounts of the user that could be added to the user's credit data. In some embodiments, the user is provided with a permissions dashboard that allows the user to selectively authorize uses of data associated with self-reported (and possible other) accounts of the user. For example, the user may opt into use of their credit data (including self-reported data) in calculation of other risk indicators and/or for other financial analysis or products. In one embodiment, the use can authorize use of credit data to calculate multiple risk indicators using various risk scoring algorithms. Some risk scoring algorithms may consider the self-reported accounts in the credit score calculation, while others may not directly consider the self-reported accounts in a credit score calculation, but may indirectly consider the accounts to the extent they impact the total debt, monthly payment obligations, equity, and so forth of the user.

Figure 23:
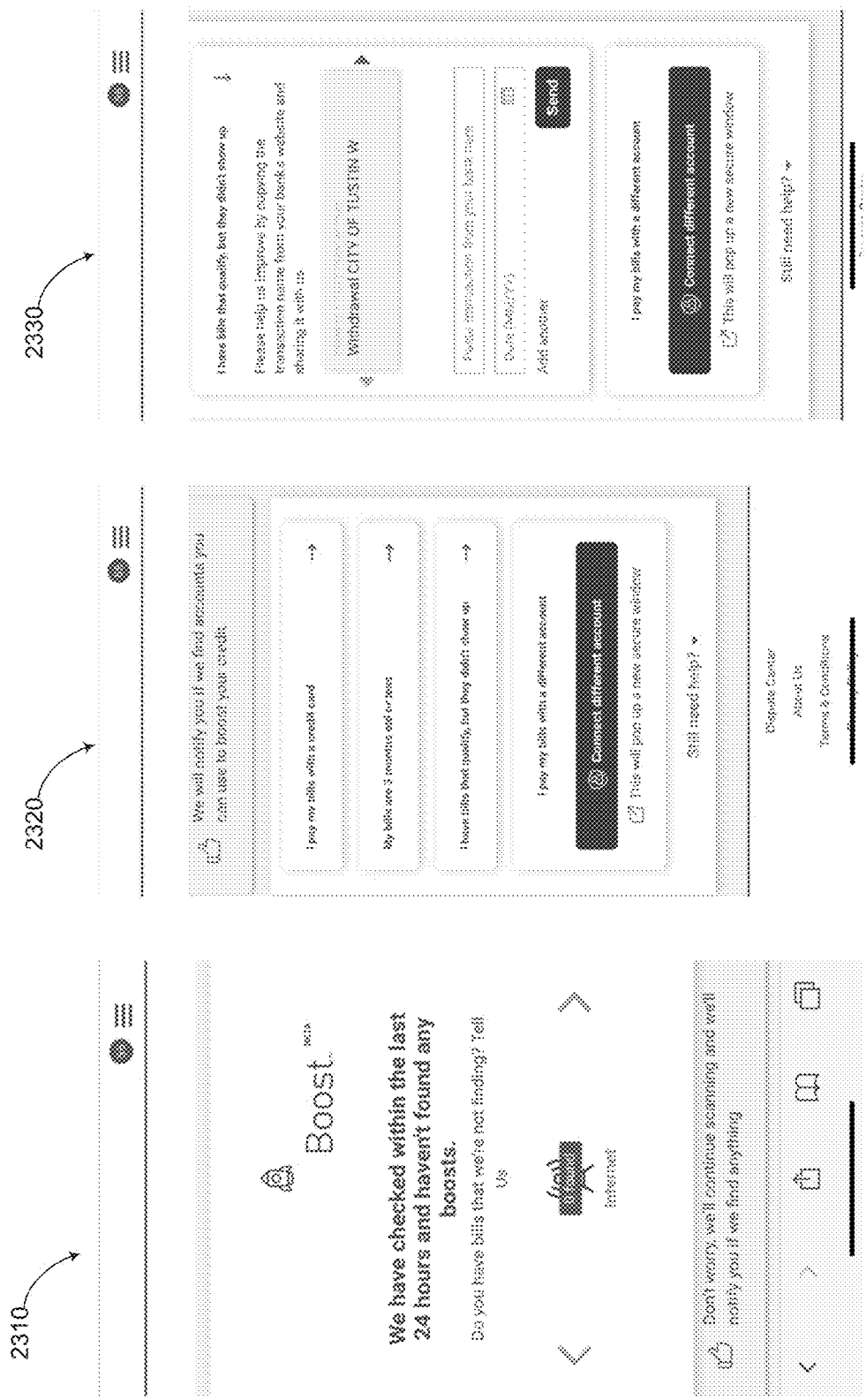
FIG. 23 illustrates an embodiment of a user interface that may be provided to a user after an initial scan of transaction data items has been performed.

FIG. 23 illustrates an embodiment of a user interface 2310 that may be provided to a user after an initial scan of transaction data items has been performed. User interface 2310 indicates that the financial information of the user is rechecked periodically to determine if additional accounts can be located for addition to credit data of the user. In some embodiments, the additional transaction data items are grouped with existing transaction data item groupings, such as those that were generated during an initial account identification process. Addition of new transaction data items to an existing grouping of transaction data items may increase a confidence level in identification of a particular account type such that the account is presented for confirmation by the user for addition to credit data the user. For example, an account with only two monthly payments in the initial transaction data item grouping may not be eligible for addition to credit data of the user, but over the next month when a third transaction data items indicating a third monthly payment associated with the payee is identified and associated with the payee, the grouping of transaction data items may meet the rules for addition of the account to credit data of the user.

Example user interface 2320 provides the user with example circumstances where further information may be available to identify accounts for addition to the user's credit data. In this example, the user is provided an opportunity to connect an additional account to the account discovery system 110, such that additional transaction data items may be included in the account discovery process. For example, if the user previously authorized access to a checking account, the user may additionally authorize access to a savings account or another checking account at different financial institution, to allow analysis of additional transaction data items that may be indicative of a utility, telecom, rental, and so forth account.

Example user interface 2330 is an example request the may be made to the user in an attempt to update payee information that may be indicated in transaction data items of the user (and/or other users). Such a request may be used to obtain data from the user that enhances the system's ability to identify transactions that the user can use to boost their credit score. In some embodiments, the user may be asked to provide examples of transactions that should qualify for the boost (for example, telecom and utility payments) and/or payee identifiers in transactions that are associated with a particular payee or type of payee. This user-provided information may then be used by the account identification component 114 to better identify transactions and accounts that could be added to credit data of the user.

In the example user interface 2330, the user is requested to provide information regarding the specific payee ID that is used in the transaction name by the user's financial institution, where the specific payee ID used by the financial institution may differ from other payee IDs for the same payee that are used by other financial institutions and/or that are included in the payee database. Thus, the payee ID information provided by the user may then be added to the payee database and used when analyzing other user transaction data items to better match transaction data items from that particular financial institution and payee with the appropriate standardized payee identifier.

In some embodiments, the account identification component 114 periodically accesses additional transaction data items of the user and searches those transaction data items for new payment information associated with accounts that have previously been added to the user's credit data. For example, if a wireless account is added after an initial processing of transaction data items from a checking and savings account of a user added financial institution, those same checking and savings accounts of the user may be accessed monthly (or other time period) to search for new payments to the wireless account. After identifying payments to the wireless account, information regarding the new payment may be provided to the credit bureau as an update to status of the trade line. In this way, self-reported accounts may be added to credit data and updated on an ongoing basis with payment information, in a similar manner as traditional credit accounts are initially reported to the credit bureaus and updated with monthly payment information.

In some embodiments, ongoing access to transaction data items and providing updated payment information on self-reported tradelines may continue indefinitely. For example, as long as the account remains connected and the credentials remain active, the account discovery system may periodically access new transaction data items which may allow identification of new payments that meet criteria for addition of an account as a trade line, and user may be notified they have new boost available for them to use to increase their credit score.

Such ongoing access to transaction data items may allow new accounts for a boost to be identified as more payments are made to the corresponding payee. For example, if the user on initial scan only had one or two months of payment history identified for a particular payee, new transaction data items may be received over the following months to obtain the required threshold payment months for adding credit data. In this example, the user may be notified via email (or other communication medium) of the qualifying account based on newly received transaction data items, and the account may be added to the user's credit data at the request of the user, or automatically upon identification (for example, if the user authorized later addition of the account when the initial scan was performed).

In some embodiments, the user provides permissions for later accesses to transaction information and/or may provide subsequent permissions to access the transaction information. In some embodiments, if a new payment for a tradeline has not been identified in transaction data items for more than a threshold time period (for example, three months, six months, and so forth), the self-reported tradeline may automatically be removed from credit data of the consumer. Additionally, as noted elsewhere, the user can remove permissions to periodically access transaction data at one or more financial institutions at any time.

In some embodiments, any disruption in monthly (or other periodic) updates to self-reported accounts, such as based on accessing transaction data items that one or more financial institutions in identifying payment information on those self-reported accounts, may trigger a notification to the user. For example, if a monthly scan of transaction data items from a DDA account (where a previous 12 months of payments on a self-reported account were identified) does not result in identification of a payment on the account, an alert may be transmitted to the user. For example, a text message, push notification, email, or other notification may be transmitted to the user device to alert the user of the missing payment. In some circumstances, the user may have inadvertently missed payment on the self-reported accounts and the notification provides the user with the ability to remedy the missed payment as quickly as possible. Alternatively, if the user purposefully missed payment, perhaps in conjunction with closing the account, the notification allows the user to indicate to the account discovery system that the self-reported accounts should be removed from credit data of the user. In some embodiments, alerts may be provided to the user based on other triggers, such as if credentials associated with a DDA account with financial institution have changed (for example, the transaction data items are no longer accessible by the account access system). Such an alert may request updated credentials (and/or new account information if the account has been canceled or transferred) from the user so that the system may be re-permissioned to access the transaction data items of the user account.

Example System, Method, and User Interfaces Associated with Trade Line Addition

Figure 25:
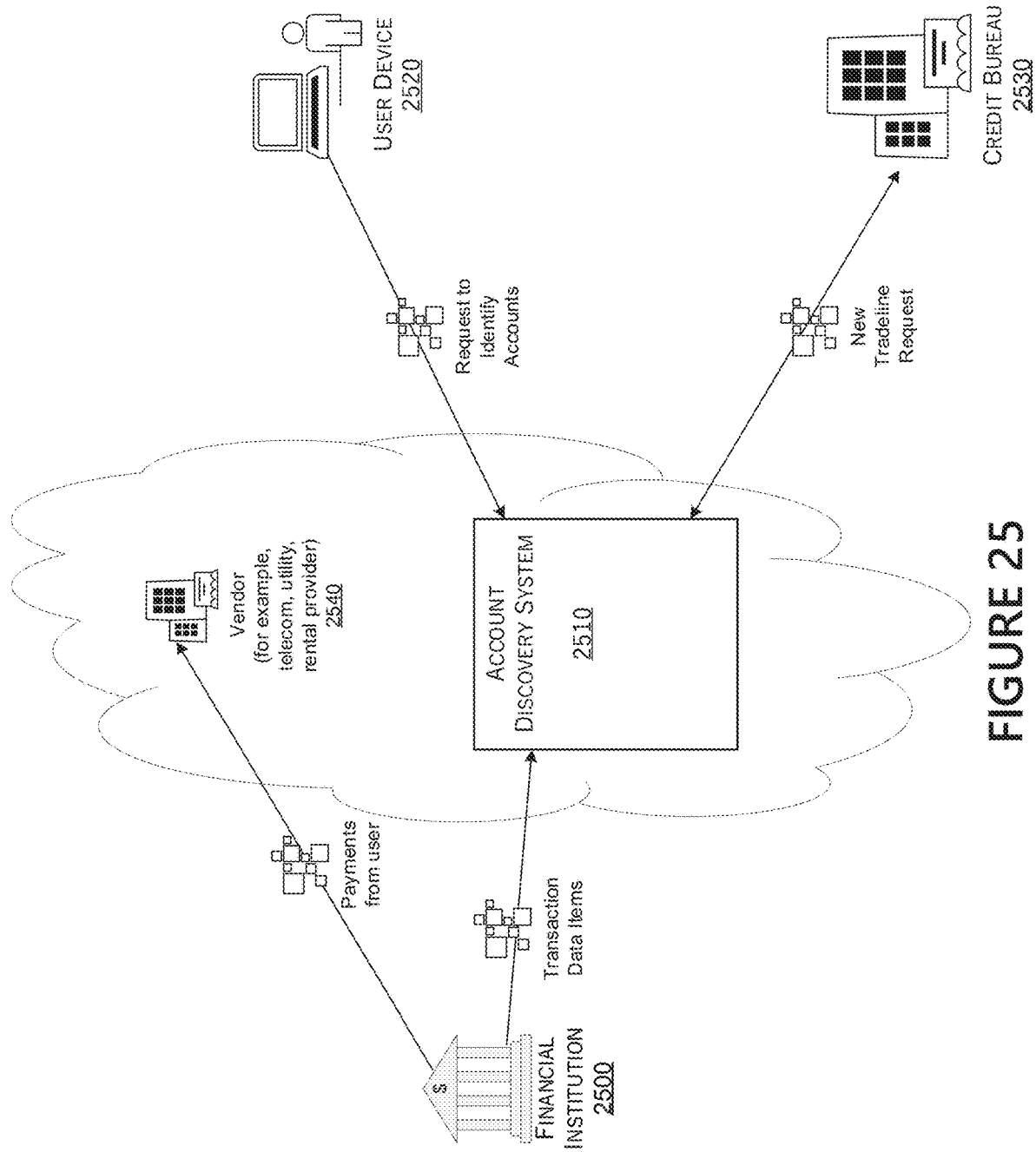
FIG. 25 is an embodiment of a block diagram illustrating an account discovery system in communication with a financial institution, a user device, and a credit bureau.

FIG. 25 is an embodiment of a block diagram illustrating an account discovery system 2510 in communication with a financial institution 2500, a user device 2520, and a credit bureau 2530. As noted above, the account discovery system 2510 may access financial account information of the user, after receiving permission from the user to access such financial account information, that may be analyzed to identify payments indicative of a self-reported account that may be added to the credit file of the user. In the embodiment of FIG. 25, a vendor 2540, such as a telecom, utility, or rental provider, receives payments from a user via a DDA account held with the financial institution 2500. For example, the vendor 2540 may receive monthly checks from the user for wireless phone service. Such payments may be transmitted electronically to the vendor 2540 or in paper form, such as by checks automatically printed and transmitted from the financial institution 2500 or checks that are handwritten by the user. In this embodiment, the account discovery system 2510 initially communicates with the user device 2520, to receive authorization from the user to access account information of the user with the financial institution 2500, such as using processes described elsewhere herein. With the appropriate authorization in place to access the financial account data of the user at the financial institution 2500, transaction data items of user are accessed via a secure communication channel with the financial institution 2500. The identified accounts within the transaction data items (for example, as defined by the account identification component 114), may be validated by the user and then added to the credit data of the consumer as a trade line that is usable by credit scoring algorithms in calculating the credit score of the user. As shown in FIG. 25, account discovery system 2510 transmits a new trade line request to the credit bureau 2530, such as in a particular format that is understandable by the credit bureau 2530. Additionally, communications from the account discovery system 2510 with the credit bureau 2530 may occur periodically, such as to provide additional new trade line requests (for example, for accounts that are identified as additional transaction data items are processed by the account discovery system 2510) and to add additional payment information to the consumer's credit data for trade line that have previously been added by the account discovery system 2510. In this way, the account discovery system 2510 provides up-to-date transaction data to the credit bureau 2530 that allows the user's credit history to grow over time as payments are made to the vendor 2540.

Figure 26:
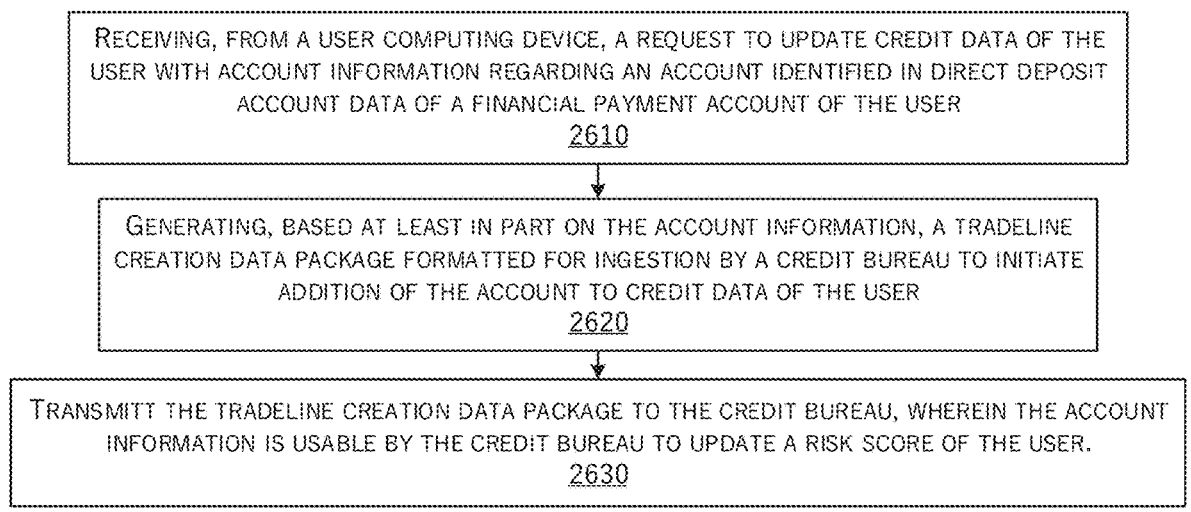
FIG. 26 is an embodiment of a flowchart illustrating one embodiment of a method of providing a new trade line request to a credit bureau to initiate addition of a self-reported account to credit data of the user.

FIG. 26 is an embodiment of a flowchart illustrating one embodiment of a method of providing a new trade line request to a credit bureau to initiate addition of a self-reported account to credit data of the user. Defendant embodiment, the method of FIG. 26 may include additional or fewer blocks and/or the blocks may be performed in order different than is illustrated. Beginning in block 2610, a request update credit data of a user is received from a user computing device. The request is particularly for self-reported accounts of the user, such as rental, utility, and telecom accounts, among others. In block 2620, after the account discovery system has identified a self-reported account to be added to the user's credit data (for example, using processes discussed herein associated with the data permissioning component 112, the account identification component 114 and/or the account verification component 116), a new trade line data package is prepared for transmission to a credit bureau. In embodiments where a new trade line request is provided to multiple credit bureaus, multiple new trade line data packages may be prepared, one for each credit bureau, formatted and including information that may be specific to the particular credit bureau for purposes of adding a new trade line to the user's credit data. Next, at block 2630, the specially prepared trade line creation data packages transmitted to the credit bureau. Advantageously, the trade line creation data package may be formatted in the same manner as a new trade line creation data package for a traditional credit account, such as a credit card or loan. Thus, the credit bureau may as the new trade line to credit data of the consumer and the credit data may be immediately usable by credit scoring algorithms.

Figure 27:
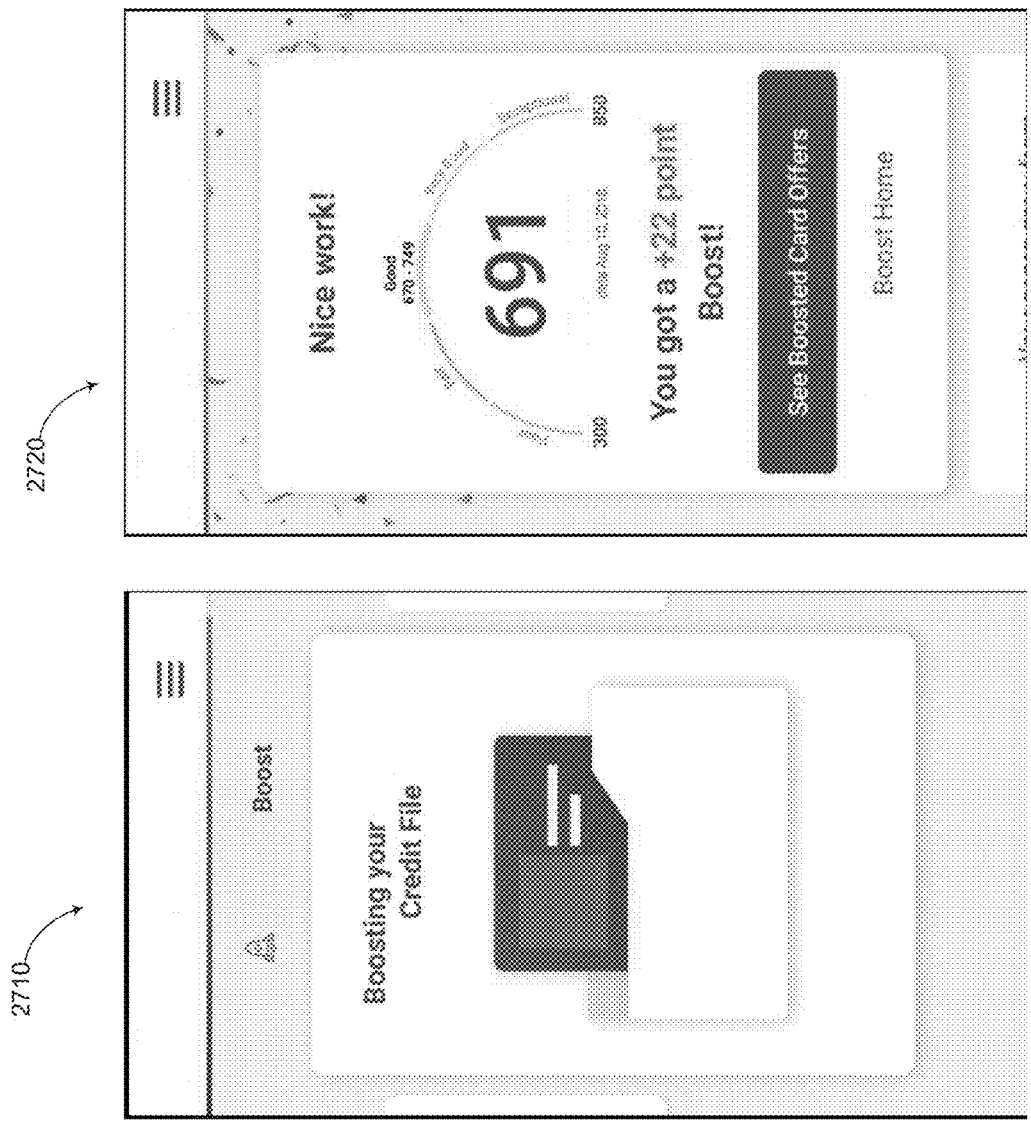
FIG. 27 illustrates an embodiment of example user interfaces associated with addition of a new account to credit data of the user.

FIG. 27 illustrates an embodiment of example user interfaces associated with addition of a new account to credit data of the user. Example user interface 2710 may be provided to a user after the user confirms that a newly identified account should be added to the user's credit data. In other embodiments, the addition of the new trade line to credit data of the consumer may be instantaneous (for example, completing in a few seconds) or may take a bit more time, such as tens of seconds or even a few minutes.

As noted above, after the new trade line has been added to the user's credit data, that new trade line is immediately usable by credit scoring algorithms. User interface 2720 illustrates a scoring interface that may be displayed to the user shortly after addition of a new trade line to the user's profile. For example, after the user selects and identified account to be added as a trade line to credit data of the user, the new trade line creation data package may be prepared and sent to the credit bureau (and a user interface such as user interface 2710 may be provided to the user), and in response to confirmation that the new trade line has been added to the credit data of the user a scoring algorithm may be executed on the updated credit data of the user to generate an updated credit score. In the example of FIG. 27, user interface 2720 indicates that, after addition of the new trade line to the user's credit data, the users credit score has increased by 22 points to a score of 691. In some embodiments, a user interface similar to user interface 2720, in addition to or instead of indicating a number of points that the credit score increased, may indicate a change in score band for the credit score, such as by indicating that the added tradeline(s) increased the user's credit score from a "fair" score band to a "good" score band. Accordingly, by optimizing communications between multiple devices, obtaining proper authorizations from the user, and for dating with credit bureaus for additions and data scoring based on new account information, the systems discussed herein provide the user with an advantage that has not previously been available.

Figure 28A:
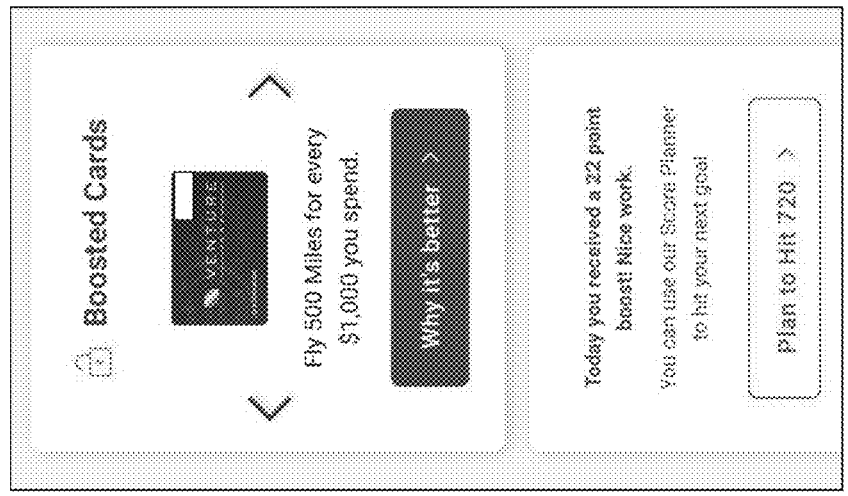
FIG. 28A illustrates embodiments of example user interfaces that may be provided to a user to indicate availability of additional product offers, such as credit offers, in view of an increase credit score, such as may be caused by the addition of a new self-reported account to credit data of the user.
Figure 28A:
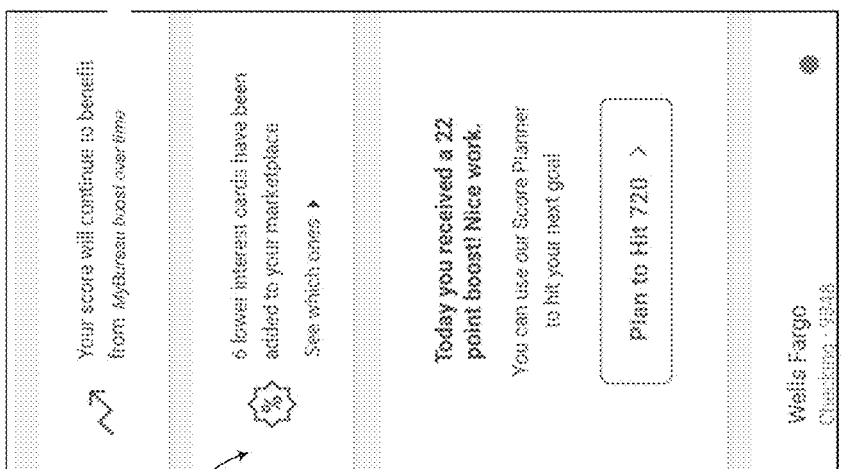

FIG. 28A illustrates embodiments of example user interfaces that may be provided to a user to indicate availability of additional product offers, such as credit offers, in view of an increase credit score, such as may be caused by the addition of a new self-reported account to credit data of the user. For example, a credit card matching service, such as Experian's CreditMatch, may interface with the Account Discovery System to obtain updated credit scores of users which may then be used to qualify the user for additional credit offers. In example user interface 2810, a message 2812 indicates that additional credit card offers have been associated with the user in view of the 22 point increase in the consumer's credit score. For example, a credit card matching system may consider a credit score of a user as an important factor in whether a user qualifies for a particular credit card. Thus, with a credit score increase, such as the example increase of 22 points illustrated in example user interface 2810, the user may qualify for multiple credit card offers for which the user did not qualify previous to the 22 point increase. User interface 2820 similarly illustrates a particular credit card offer for which the consumer qualifies after the 22 point credit score increase, which the consumer did not qualify for prior to the credit score increase.

Figure 28B:
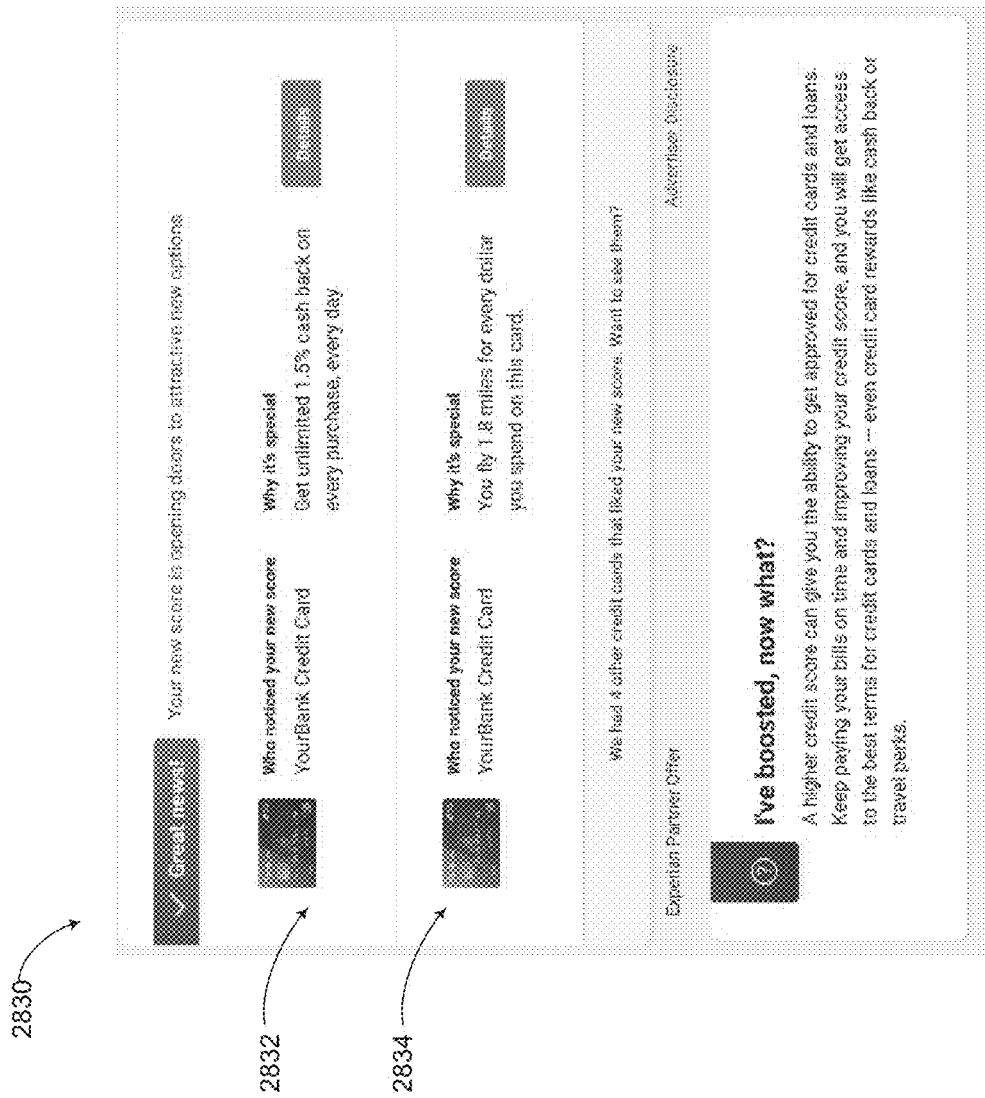
FIG. 28B illustrates an embodiment of an example user interface that may be provided after the consumer has boosted their credit file by adding one or more self-reported accounts.

FIG. 28B illustrates an embodiment of an example user interface 2830 that may be provided after the consumer has boosted their credit file by adding one or more self-reported accounts. As shown in user interface 2830, information regarding newly available credit offers 2832 and 2834 is provided to the user. In this embodiment, the user did not qualify for the credit offers 2832 and 2834 prior to addition of a self-reported account, but after a self-reported account was included in tradeline data of the user, the credit score of the user increased and moved above a threshold minimum credit score requirements for credit offers 2832 and 2834.

Figure 28C:
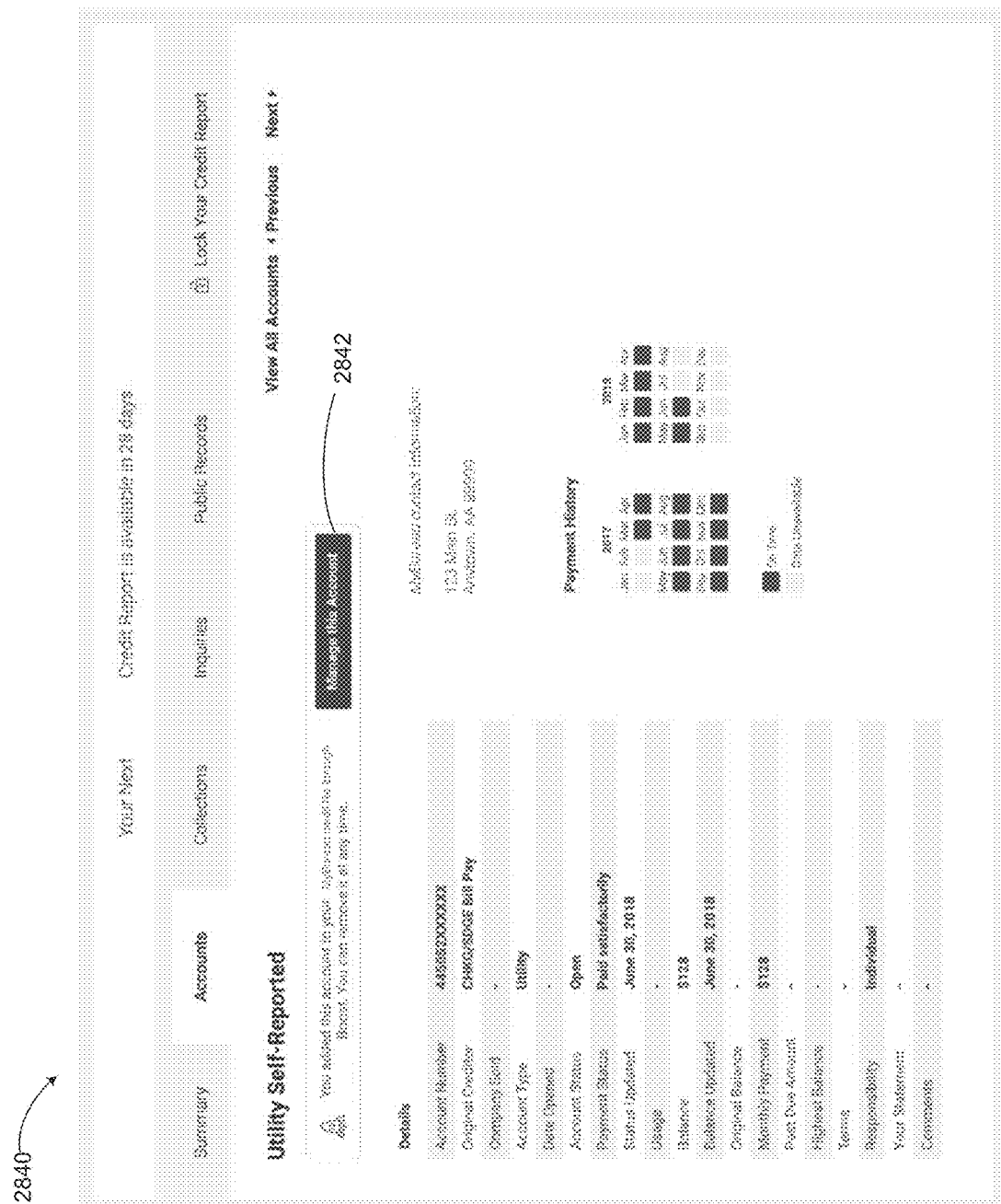
FIG. 28C is an embodiment of an example user interface that may be provided to the user as part of an online credit report that is accessible to the user, either through a free or paid account with a credit reporting agency or other authorized credit reporting entity.

FIG. 28C is an embodiment of an example user interface 2840 that may be provided to the user as part of an online credit report that is accessible to the user, either through a free or paid account with a credit reporting agency or other authorized credit reporting entity. In this example, the user has selected a newly added "utility self-reported" account and detailed information regarding that self-reported account is provided in user interface 2840. In some embodiments, and account detail page similar to user interface 2840 may be provided to a user immediately after addition of a new self-reported account. In the example user interface 2840, an account management button 2842, is provided to direct the user to an account dispute page where the user will have the option to remove the self-reported account from credit data. For example, selection of account management button 2842 may direct the user to a dispute center user interface, such as the example illustrated in FIG. 37.

Figure 28D:
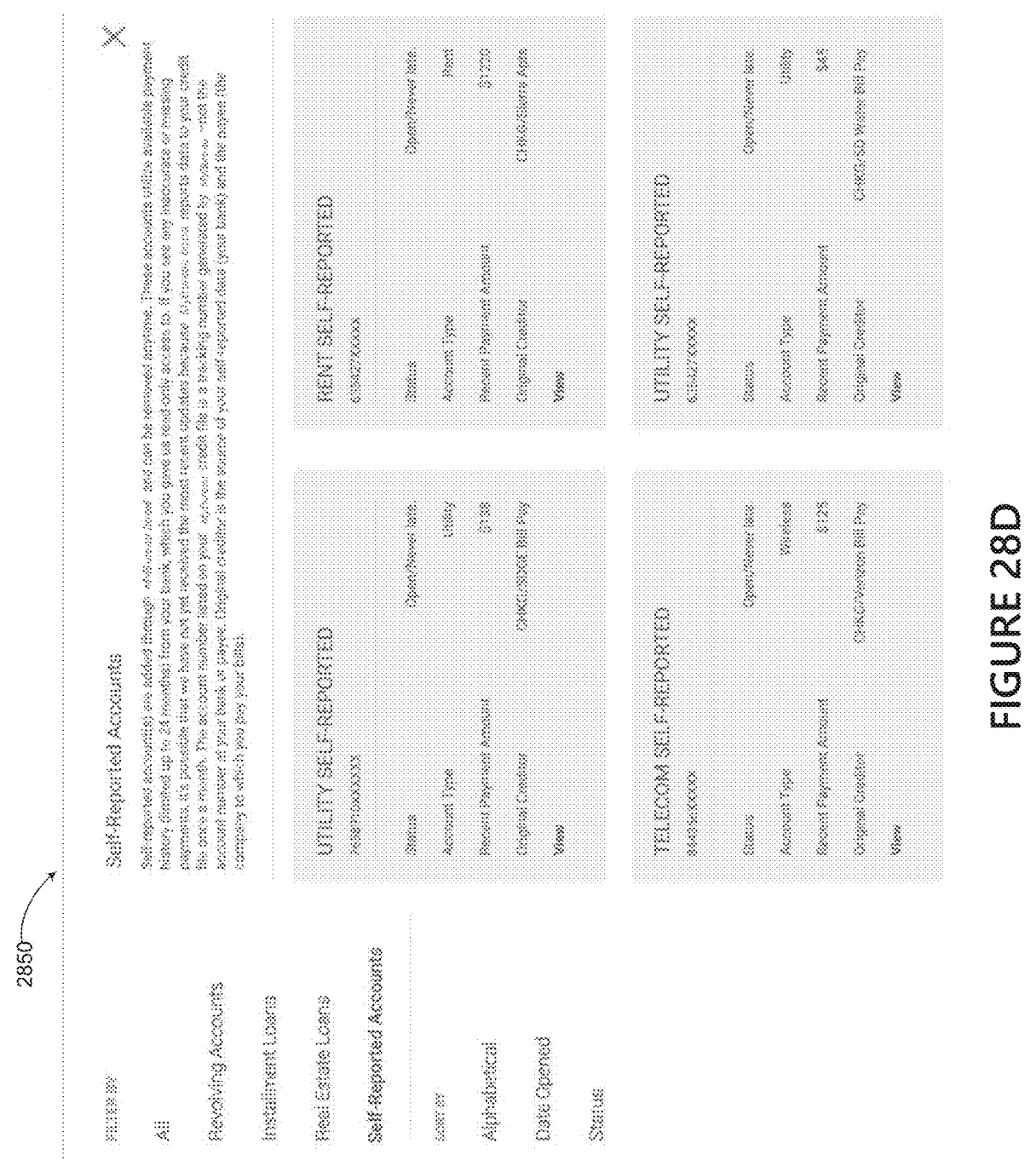

FIG. 28D is an embodiment of another example user interface 2850 that may be provided to the user as part of an online credit report. Example user interface 2850 provides summary information of the self-reported accounts currently associated with the credit data of the user. In this example, information regarding to utility self-reported accounts, rent self-reported account, and a telecom self-reported account are displayed. The "View" element associated with the self-reported accounts may be selected to direct the user to an account detail page, such as the example user interface 2840 of FIG. 28C.

Removal of Added Trade Lines

In some implementations, addition of new trade line to the user's credit data may not have the desired effect on credit score of the user. For example, in some situations, addition of a new trade line may actually cause the credit score of the user to decrease, or to not change at all. Accordingly, in some embodiments, the account discovery system 110 provides a mechanism allowing the user to remove any previously added self-reported trade line from their credit data.

In some implementations, an improvement to the credit situation of a user may be realized through addition of self-reported accounts, even if the credit score of the user decreases or stays the same. For example, a user's overall credit health could be seen as improving if addition of a self-reported account increases the total number of trade lines above a thin file threshold (for example, four or more trade lines) so that the user is seen as a thick file user. Thus, while a credit score increase is a straightforward indicator of credit health of a user, other factors associated with creditability of the user may also be considered by potential lenders, landlords, partners, and so forth. Accordingly, in some embodiments, the accounts discovery system provides educational material to the user, such as when their credit score has not increased responsive to a boost (or has actually decreased responsive to a boost), so that the user has an option to either remove the self-reported account or to maintain the self-reported account in the user's credit data because of an advantage in overall creditability of the user with the newly added self-reported account.

Figure 29:
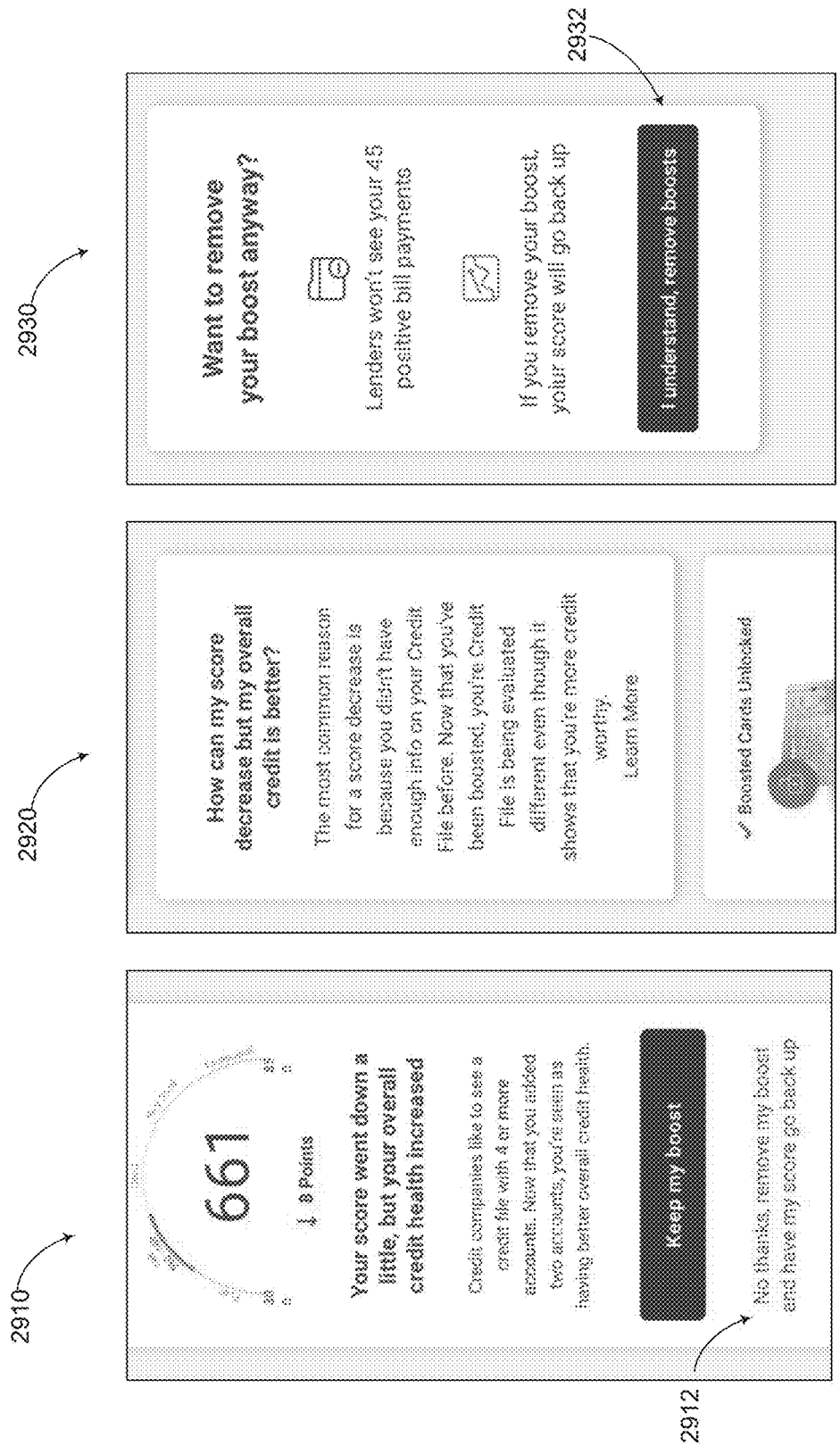
FIG. 29 provides embodiments of example user interfaces that may be used in a trade line removal process.

FIG. 29 provides embodiments of example user interfaces that may be used in a trade line removal process. The example user interface 2910 explains that the credit score of the user decreased by eight points due to addition of a new trade line (for example, that was identified by the account discovery system in transaction data items of a DDA account of the user). Furthermore, the user interface 2910 provides a brief explanation of why addition of the new trade line caused a drop in credit score of the user. For example, a credit score may decrease if a new account(s) increased debt of the user.

Example user interface 2920 provides additional information to the user regarding reasons that newly added accounts that have caused the credit score of the user to drop may still be beneficial to keep in credit data of the user. For example, user interface 2920 explains that the credit file of the user is being evaluated different now that it has additional trade line's, which may allow the user to qualify for additional offers even with a lower credit score. User interface 2930 further explains that lenders won't see newly added positive bill payments in the trade line that was added by the account discovery system, but that the user's credit score will go back up when the trade line is removed.

Figure 36:
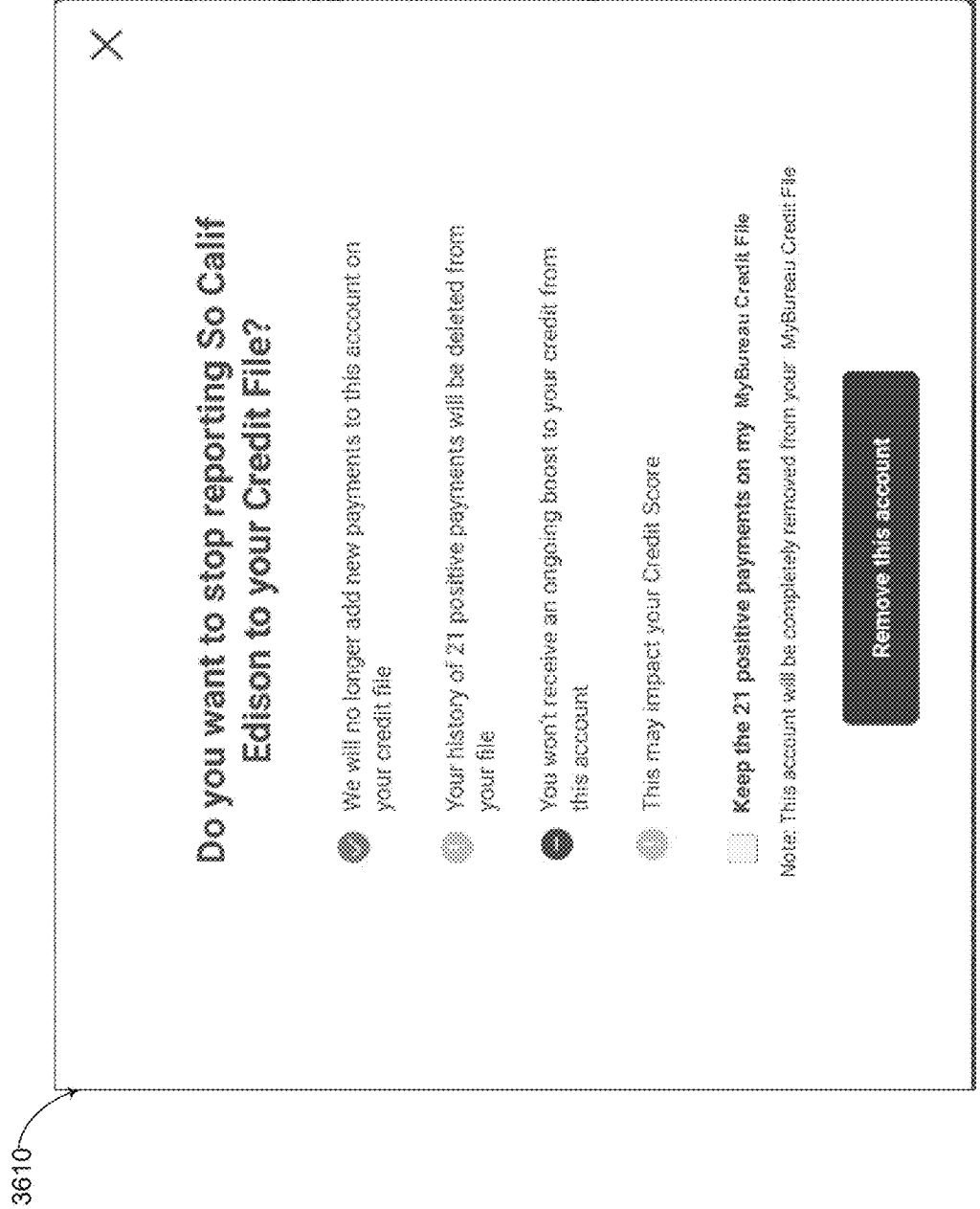
FIG. 36 illustrates an embodiment of an example user interface that may be provided to a consumer who wishes to stop periodic reporting of payment activity for one or more self-reported accounts.

Should the user decide to remove one or more self-reported accounts that have been added by the account discovery system, such as by selecting user interface element 2912 or 2932, removal of the recently added account from the credit data of the user is initiated. Thus, users can remove accounts added through the account discovery system and their credit score will revert to the same score they had prior to addition of the new trade line. If the user continues to pay their utility and telecom bills on time to build positive payment history, they may later use the credit score update features again to recalculate their (hopefully increased) score, FIG. 36 illustrates an embodiment of an example user interface 3610 that may be provided to a consumer who wishes to stop periodic reporting of payment activity for one or more self-reported accounts. Example user interface 3610 may be provided to the user in response to the user's request to stop reporting transaction data items associated with a particular pay the (for example, "So Calif Edison" an example of FIG. 36). The user interface provides information detailing how this may impact the credit file and/or the credit score of the user. The user is provided with an option to keep the trade line in the user's credit data or to remove the trade line from the user's credit data.

Figure 30:
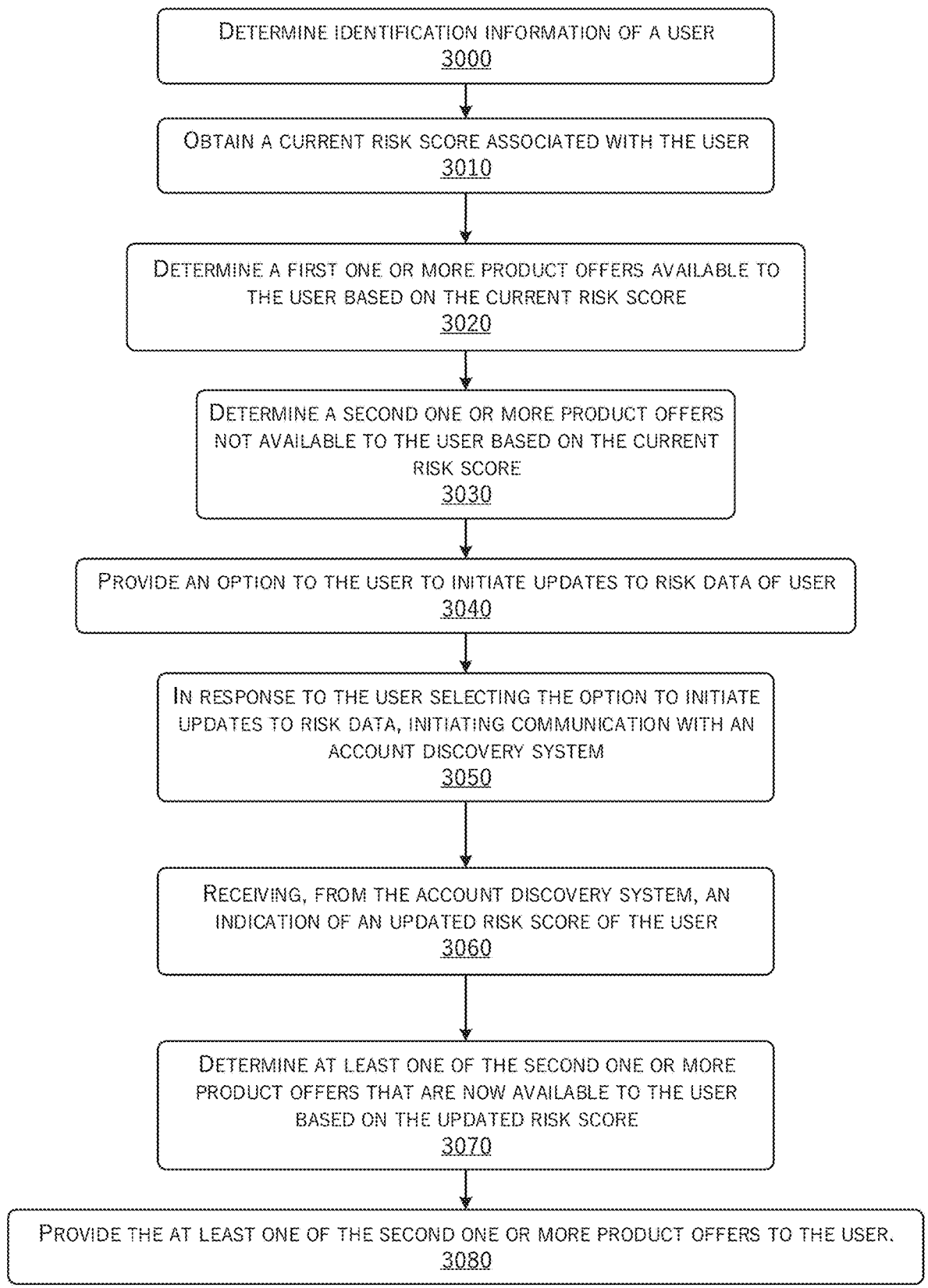
FIG. 30 is an embodiment of a flowchart illustrating one embodiment of a method that may be performed to provide updated offers to a user responsive to an increase in credit score of the user that is caused by addition of one or more self-reported accounts to credit data of the user.

Example System, Method, and User Interfaces Associated with Updating Offers to the User FIG. 30 is an embodiment of a flowchart illustrating one embodiment of a method that may be performed to provide updated offers to a user responsive to an increase in credit score of the user that is caused by addition of one or more self-reported accounts to credit data of the user. In some embodiments, the method of FIG. 30 may be performed by an offer provider, such as a credit card prescreening and/or prequalification provider, that provides credit card offers to consumers for which the consumers are likely qualified, such as based on lender criteria that may rely heavily on credit score of users. In other embodiments, the method of FIG. 30 may be performed by a credit risk agency, such as a credit bureau, that partners with credit issuers to provide prescreened credit offers as soon as possible after a consumer's credit score has changed. In other environments, the method may be performed by multiple entities and/or systems, or other entities or systems that provide other offers to consumers. Depending on the embodiment, the method of FIG. 30 may include fewer or additional blocks and/or the blocks may be performed in order different than is illustrated.

Beginning at block 3000, the offer provider determines identification information of a user, such as information that is usable to obtain a credit score of the user. In block 3010, a current risk score of the user is obtained and/or calculated. For example, identification information obtained at block 3000 (for example, first name, last name, address, Social Security number, and so forth) may be provided to a consumer reporting agency with a request for a current credit score of the user. If the offer provider has the necessary permissible purpose for obtaining credit data of the user, the consumer reporting agency will calculate and return a current credit score of the user.

Moving to block 3020, the offer provider determines a first one or more product offers available to the user based on the current risk score. For example, each of multiple credit card offers (or automobile loans, home loans, or other offers) may be associated with a minimum credit score that qualifies users for the particular credit card offer. Thus, the credit score of the user may disqualify the user from eligibility for certain credit offers. Similarly, the credit score of the user may qualify the consumer for a first one or more credit offers (for example, those credit offers having eligibility criteria including a minimum credit score that is lower than the current credit score of the user). Accordingly, the offer provider may determine a first set of offers that the user is eligible to receive (and which the user may ultimately qualify for after full application) at block 3020 and a second set of offers that the user is not ineligible to receive (and for which the user would ultimately not qualify for after full application) at block 3030.

Next, at block 3040, the offer provider provides the user with an option to initiate updates to risk data of the user, such as by allowing the user to interface with the account discovery system to potentially identify self-reported accounts that could be added to credit data of the user to increase the user's credit score. In response to the user selecting the option to initiate updates to credit data, at block 3050 the offer provider initiates communication between the user and the account discovery system. The user may then interface with the account discovery system to provide the necessary permissions to access financial data, validation of account information, and confirmation that located accounts may be added to the user's credit data.

Next, at block 3060, the account discovery system may automatically provide an updated credit score of the user to the offer provider, such as by requesting execution of a credit scoring algorithm on credit data of the user after a new trade line creation data package has been transmitted to the credit bureau. In other embodiments, after the account discovery system has interfaced with the user, a notification may be transmitted to the offer provider indicating that a new credit score of the user may be requested again. In such case, the offer provider may obtain an updated risk score of the user with a similar process as described above with reference to block 3010.

At block 3070, with the newly calculated credit score of the user, the offer provider identifies one or more of the second set of product offers (which the user was not eligible for previously) for which the user is now qualified. For example, if the user's credit score increased from 650 to 680 based on one or more added trade line's by the account discovery system, the user would not have qualified for a credit card requiring a credit score of 660 prior to the score increase, but would qualify for the credit card after the score increase (assuming the user meets any other eligibility requirements for the credit card).

At block 3080, the new credit offers for which the user now qualifies are provided to the user, so that the user can potentially apply for any of the first set of credit offers and/or any of the newly identified credit offers from the set.

Figure 31:
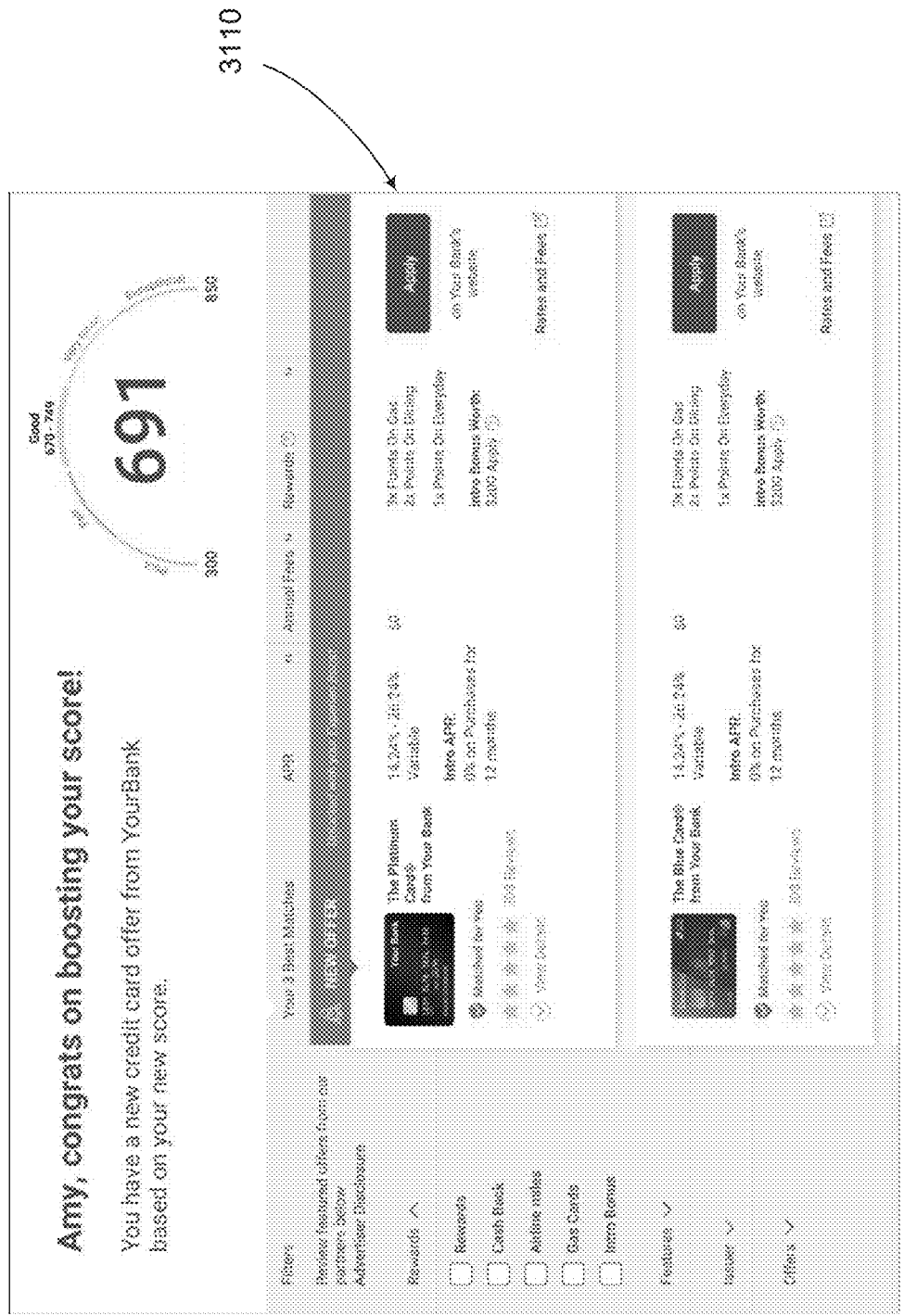
FIG. 31 is an embodiment of an example user interface that may be provided by and offer provider, such as an offer provider that prescreens users for credit card offers and provides information regarding matching credit cards to the user.

FIG. 31 is an embodiment of an example user interface that may be provided by and offer provider, such as an offer provider that prescreens users for credit card offers and provides information regarding matching credit cards to the user. In the example of FIG. 31, the user has already engaged the account discovery system and received an increase in credit score. As indicated by text box 3110, a "new offer" is displayed to the user, where that particular credit card offer was not displayed to the user prior to the credit score increase initiated by addition of a new trade line to the credit data of the user.

Figure 32:
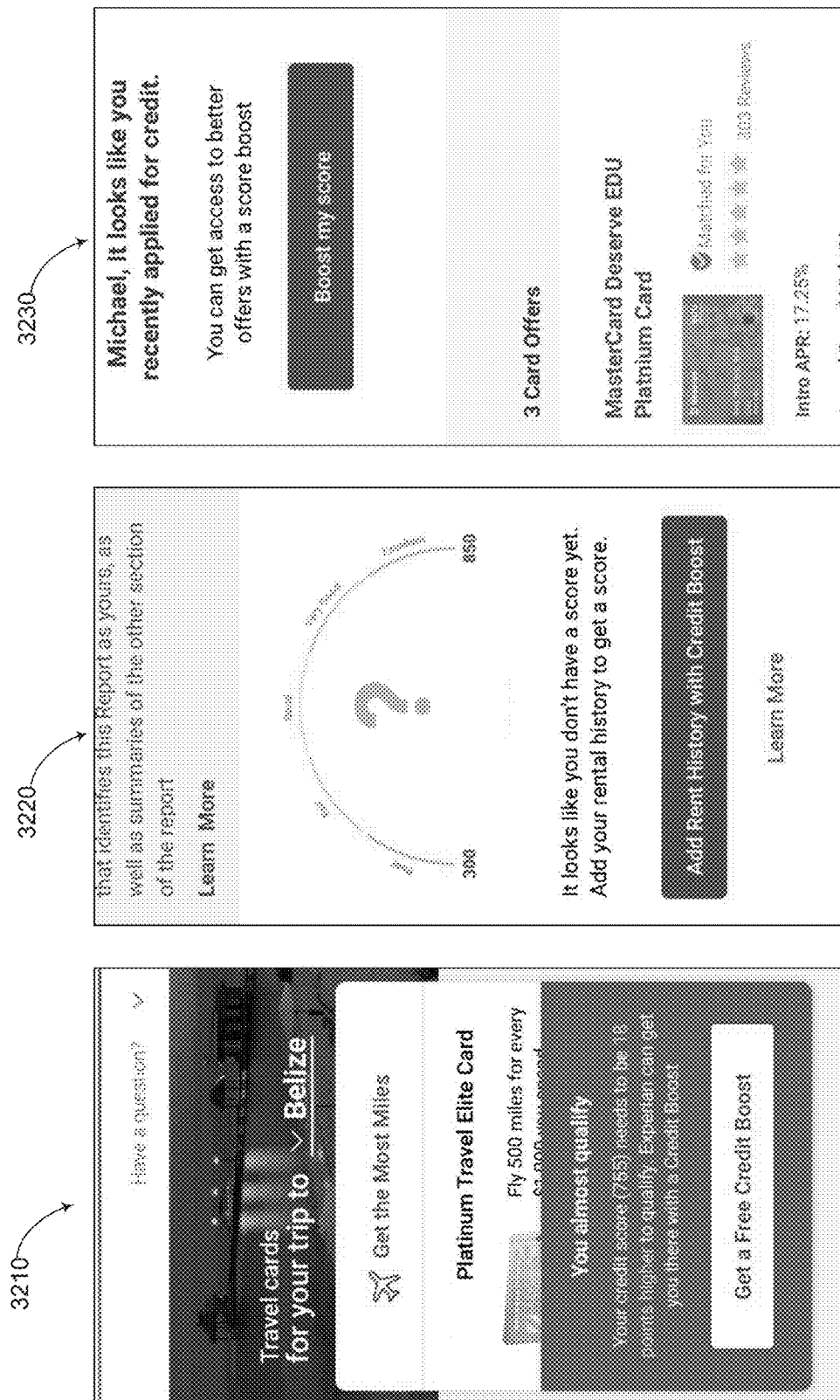
FIG. 32 includes embodiments of example user interfaces that may be displayed on a mobile device of a user to invite the user to engage the account discovery system to potentially increase the credit score of the user and potentially allow more offers to be provided to the user.

FIG. 32 includes embodiments of example user interfaces that may be displayed on a mobile device of a user to invite the user to engage the account discovery system to potentially increase the credit score of the user and potentially allow more offers to be provided to the user. Example user interface 3210 may be triggered based on upcoming travel activity associated with the user. For this example, the user is invited to explore addition of new trade line to credit data of the user in order to increase the user's credit score and potentially qualify for a credit card that provides better mileage benefits.

The example user interface 3220 is provided to a user after detecting that the user does not have a credit score yet, which could be the case for teenagers or young adults, retired persons, ex-patriots, and so forth. With the availability of self-reported accounts to credit data of users, establishment of a credit report having one or multiple trade lines, as well as a corresponding credit score, may be significantly simplified. For example, payment history for a rental property over the course of many months or years may very quickly be added to credit data of the user.

The example user interface 3230 is provided to a user in response to the user applying for credit, perhaps prior to the user finalizing and agreement for credit. In this example, the user may increase their credit score by adding self-reported accounts to their credit data and thereby become eligible for a better credit offer than the one they previously applied for. In other embodiments, other triggers for providing invitations to explore addition of nontraditional accounts to credit data of users may be used.

Figure 33:
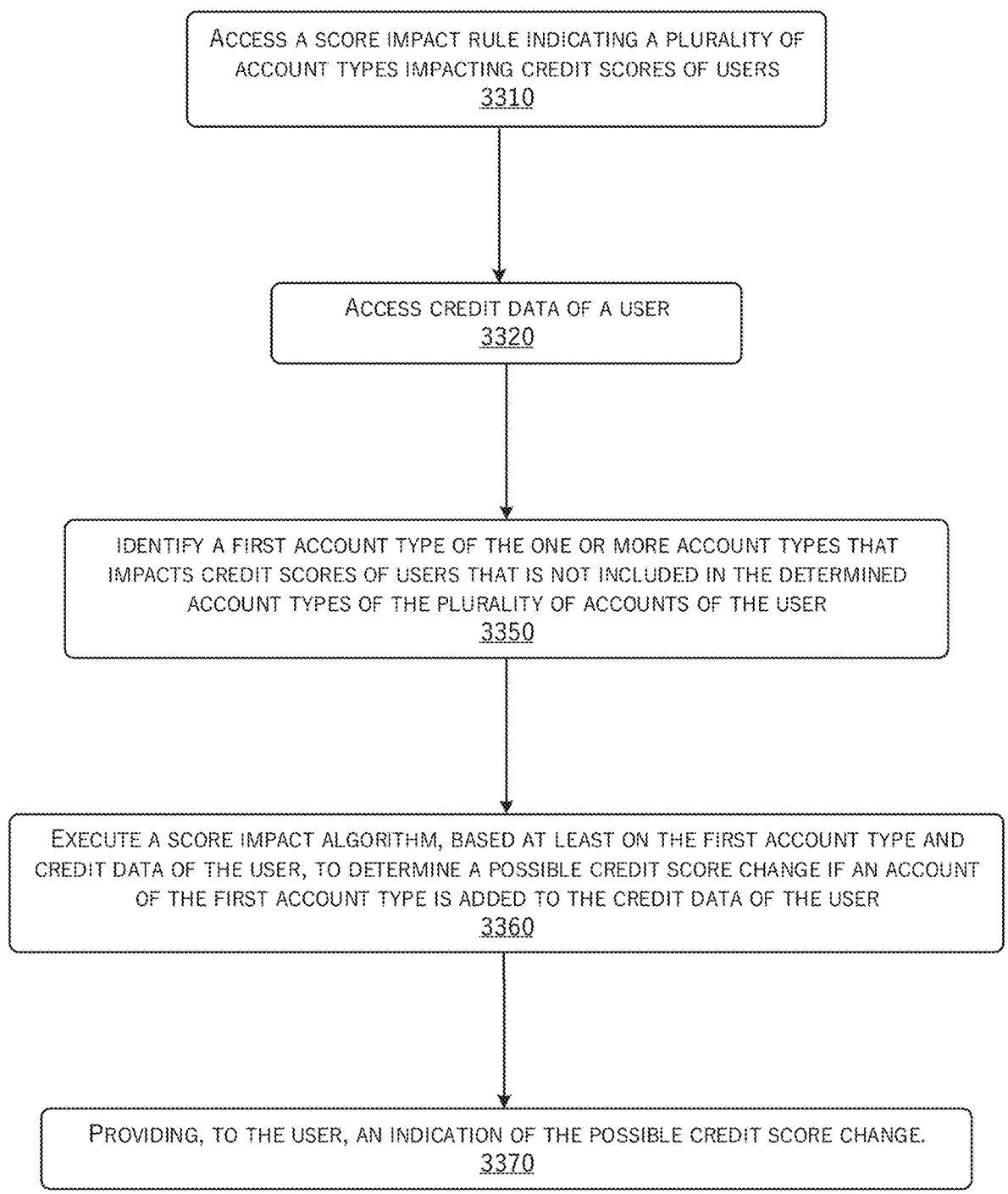
FIG. 33 is an embodiment of a flowchart illustrating one embodiment of a method that may be performed by the account discovery system to provide users with an estimated score increase that they may expect prior to adding new trade lines to their credit file.

System, Method, and Example User Interface Associated with Calculating Expected Score Increase FIG. 33 is an embodiment of a flowchart illustrating one embodiment of a method that may be performed by the account discovery system to provide users with an estimated score increase that they may expect prior to adding new trade lines to their credit file. Depending on the embodiment, the method of FIG. 33 may include few or additional blocks and/or the blocks may be performed in order different than is illustrated.

Beginning at block 3310, a score impact rule indicating a plurality of account types impacting credit scores of users may be accessed. For example, the score impact rule may indicate that rental accounts, water accounts, and electrical accounts impact credit scores of users, while country club accounts do not impact credit scores of users.

At block 3320, credit data of a user is accessed, such as information regarding current trade lines and trade line types included in credit data of the user.

Next, at block 3350, the score impact rule is applied to the determined account types already in the user's credit data to identify any account types that are not already in the user's credit data. For example, if the user's credit data does not already include an electrical account, electrical account may be identified at block 3350 as a potential new account type that could be added to credit data of the user to increase credit score of the user. In one embodiment, an expected score impact may be calculated for each multiple account types, regardless of whether the user already has an account of any of the account types.

At block 3360, a score impact algorithm may be executed to determine a possible credit score change if an account of the identified account type is added to the credit data of the user. For example, with reference to the example above, the score impact algorithm may calculate a numerical credit score change that is possible if the user adds an electrical account to the user's credit data. For example, the score impact algorithm may be based on a model developed through analysis of a plurality of users each having added electrical accounts to credit data, such as via the account discovery system or similar system for identifying and adding self-reported accounts to consumer credit data. Thus, the score impact algorithm may estimate, based on realized credit score changes by those other users that also added an electrical account to their credit data, an expected credit score change for the particular user.

In some embodiments, the score impact algorithm considers other factors, such as demographic information of the user as compared to the base set of users from which the model was generated, in calculating the potential credit score change. For example, if users in general experienced a credit score increase of 12 points by addition of a rental account to their credit data, but users in northern California experienced a credit score increase of 24 points by addition of a rental account to their credit data, the calculated credit score change may be impacted based on the location of the rental unit associated with the rental account. Similarly, the score impact algorithm may vary based on number of trade line's already in the user's credit data, outstanding balances, public record information, and so forth, where, in general, the more similar a user is to a group of users that previously added an account of the same type to their credit data, the more similar the possible credit score change for the particular user will be to that group of users.

Figure 34:
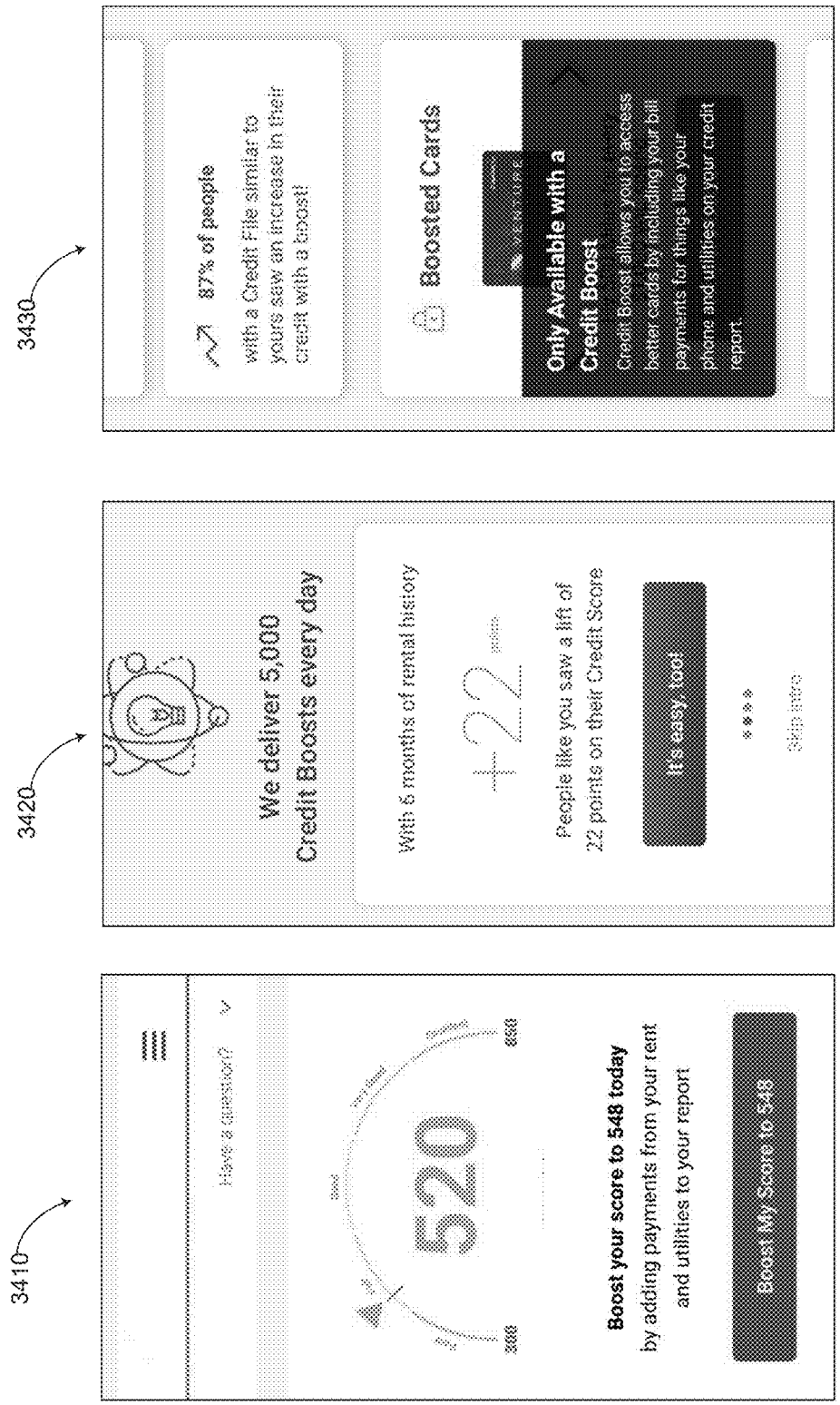
FIG. 34 illustrates embodiments of example user interfaces that may be provided to users to indicate possible credit score changes.

FIG. 34 includes embodiments of example user interfaces that may be provided to users to indicate possible credit score changes. Depending on the implementation, information already known about the user, and other factors, the level of specificity provided in the possible credit score change provided to the user may vary.

In the example user interface 3410, the user is notified that addition of a utility account to credit data of the user would potentially increase the user's credit score. In one embodiment, this message is provided to the user based on a determination that the user does not already have a utility account in credit data of the user. Additionally, in some embodiments the notification may only be provided if the user has the right quantity of other trade line, outstanding debt balances, and so forth, in their existing credit data, such that addition of the identified account type would actually increase the credit score of the user.

Example user interface 3420 indicates that an expected credit score increase of 22 points could be possible for the user with the addition of six months of consistent rental history. In one embodiment, the notification may be based on little information regarding the user, such as perhaps only a geographic location of the user, while in other embodiments the possible credit score change may be more precisely based on additional known information of the user, such as that the user has three trade lines on their credit report already, but no rental account in their credit data. As another example, a more precise estimate could be developed based on information associated with existing credit data of the user, such as payment history, how much each monthly payment affects their overall balance, if addition of a new tradeline would cause the credit file to move from a thin file to a thick file, and other attributes of the user's credit data.

Figure 35:
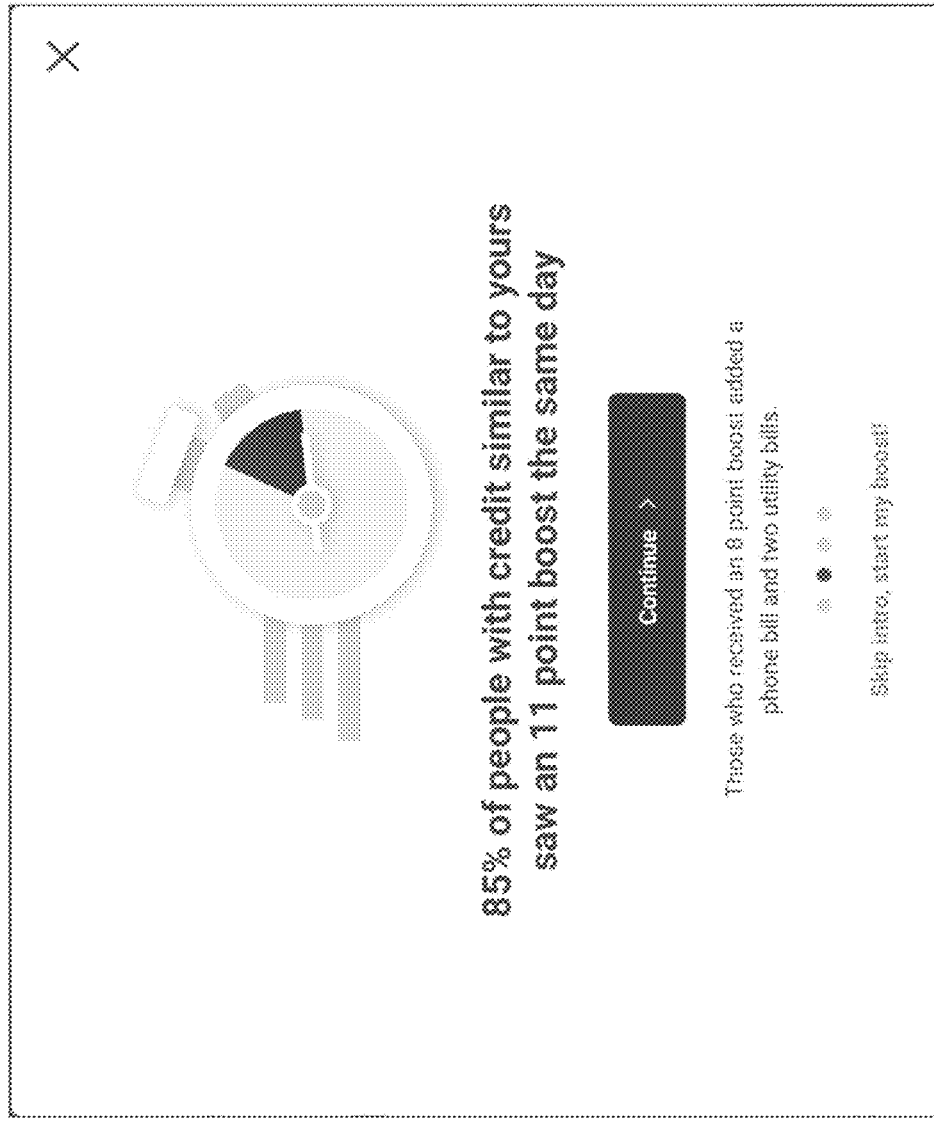
FIG. 35 illustrates an embodiment of another example user interface that displays a similar estimate of credit score increase likelihood.

Example user interface 3430 indicates that 87% of people with a credit file similar to the user saw an increase in their credit score with a boost (for example, with an addition of a new self-reported account to credit data of the user). In this example, the credit scoring algorithm may consider multiple attributes of the user in identifying a group of other users from which to calculate a likelihood of a credit score increase. For example, other users with a similar credit score (prior to boost), a similar quantity of trade lines, a similar amount of credit utilization, in a similar geographic region, and/or other factors, may be the basis for estimating how a new self-reported account might impact credit score of the user. In some embodiments, such estimations may be based on analytics of other users with similar credit files who have leverage the boost product (and/or other data indicative of changes to credit scores responsive to addition of self-reported accounts). FIG. 35 illustrates an embodiment of another example user interface that displays a similar estimate of credit score increase likelihood.

In one embodiment, the system provides an interactive score simulator interface that allows the user to be provided with real-time estimates of credit score changes in response to selection of hypothetical updates to credit data. For example, at block 3350 of FIG. 33, a user may identify a particular account type that could be added to the user's credit data and the system would determine an estimated score impact. In one example implementation, a simulator interface may allow the user to select one or more of a plurality of account types (for example, utility, rental, telecommunication, etc.) and, in response, be provided with an estimated credit score change for the selected account type(s). The estimated credit score change may be in various formats, such as an expected updated credit score, an expected credit score increase (or decrease), a direction of expected credit score change, and/or other indicators. In some embodiments, further details regarding accounts that may be added to credit data of the user may be provided to allow the system to generate a more precise estimated credit score change. For example, in addition to selection of a particular account type (for example, cell phone account), the user may provide other hypothetical information, such as number of on-time monthly payments, number of missed payments, range of monthly payments, etc. that may be used by a score impact algorithm provide more accurate estimated risk scores. Thus, a user may be provided with a first estimated risk score increase of zero for addition a first account type with 11 monthly payments, but a second estimated risk score increase of more than zero for addition of the same first account type with 12 monthly payments. Accordingly, the system provides information on account details for increasing credit scores as well as the general account types that may be added to increase credit scores.

In some embodiments, multiple estimated credit scores are provided simultaneously to the user, such as an estimated risk score associated with addition of each of multiple account types. The user may then be able to select an account type, such as one that has the highest estimated risk score increase, to initiate addition of transaction data associated with an account of the selected account type, such as using the systems and methods discussed herein.

Disputing Self-Reported Account Information

Figure 37:
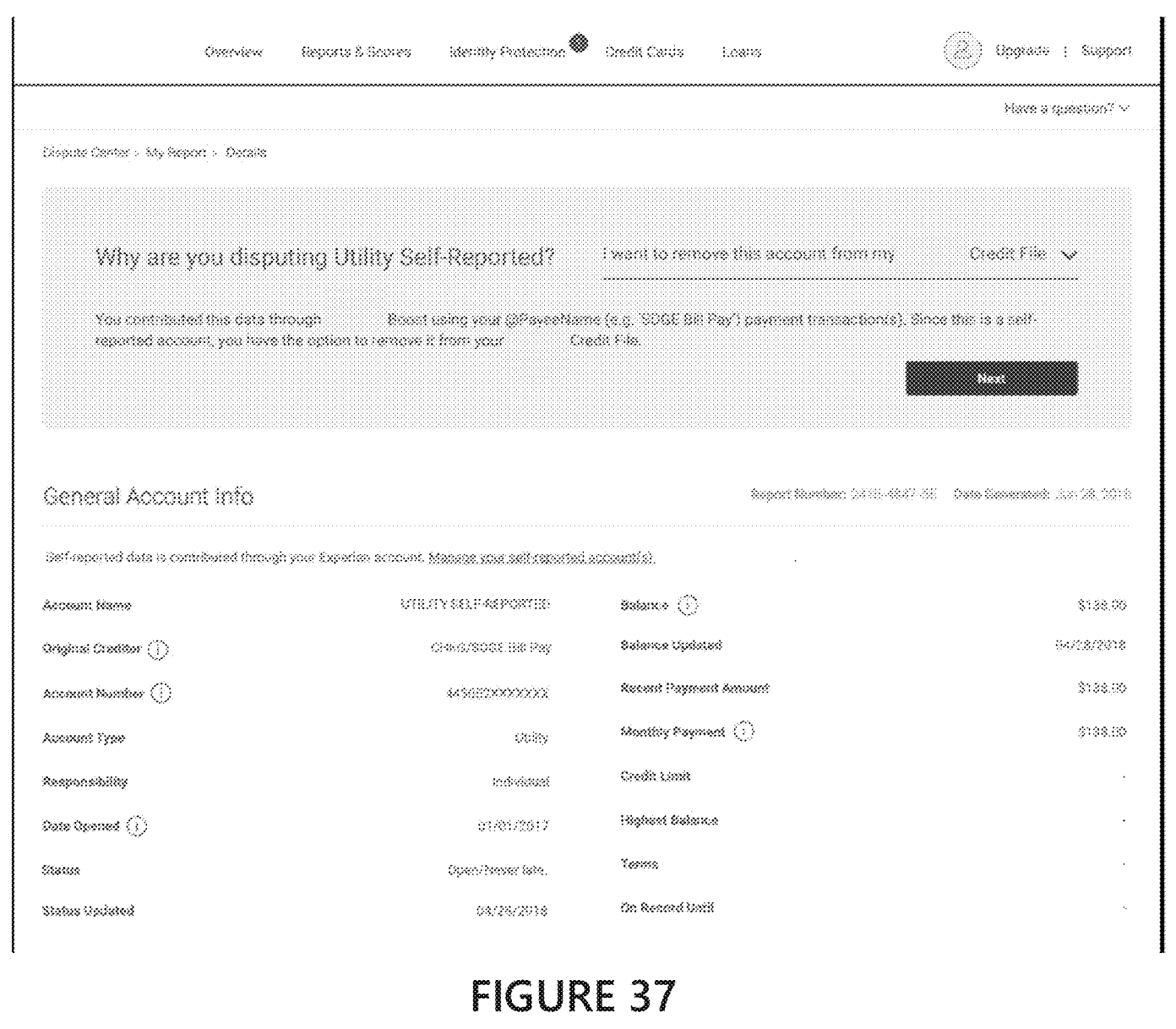

FIG. 37 is an embodiment of an example user interface that may be provided to the user that wishes to dispute information associated with a self-reported account, such as an account that is added as a trade line to credit data of the user by the account discovery system discussed herein. In one embodiment, any dispute to information in a self-reported trade line can be resolved by removal of the trade line from credit data of the user. In other embodiments, a user may be provided the ability to update the transaction data items used in developing the trade line overview or to fill in missing payments that may be negatively impacting the user's credit data.

System Block Diagram

Figure 38:
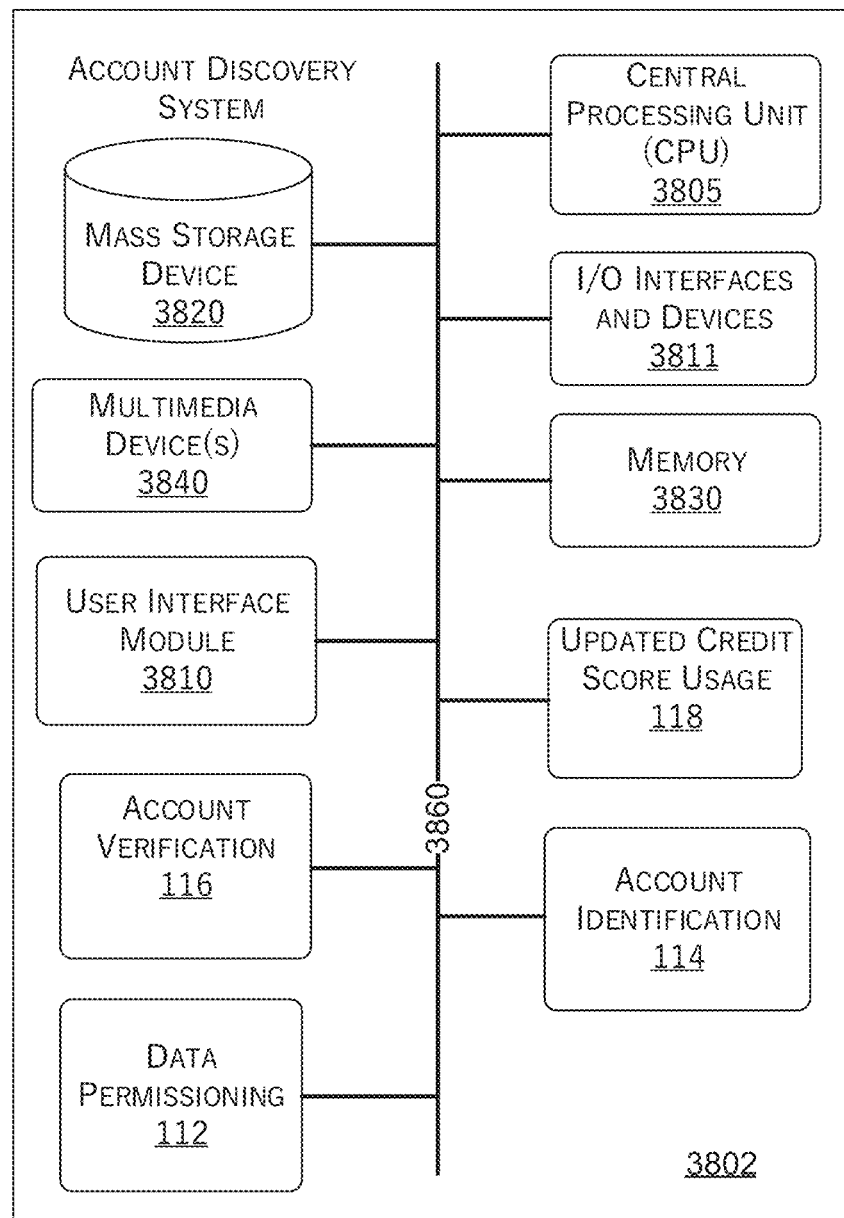
FIG. 38 is a block diagram illustrating one embodiment of an account discovery system that may be used to implement certain systems and methods discussed herein, such as providing a credit report to a user, gathering transaction data regarding non-traditional credit accounts of users, verifying account information with the user, adding the accounts as a self-reported accounts in the credit data of the user, and updating users' credit scores based on newly added self-reported accounts.

FIG. 38 is a block diagram illustrating one embodiment of an account discovery system 3802 that may be used to implement certain systems and methods discussed herein, such as providing a credit report to a user, gathering transaction data regarding non-traditional credit accounts of users, verifying account information with the user, adding the accounts as a self-reported accounts in the credit data of the user, and updating users' credit scores based on newly added self-reported accounts.

In one embodiment, the account discovery system 3802 is configured to interface with multiple devices and/or data sources. The account discovery system 3802 may be configured to implement certain systems and methods described herein. The functionality provided for in the components and modules of the account discovery system 3802 may be combined into fewer components and modules or further separated into additional components and modules. The account discovery system 110, account discovery system 110A, and/or the account access system 202 may include the same or similar components as illustrated in FIG. 38.

In general, the word component or module, as used herein, refers to logic embodied in hardware or firmware, or to a collection of software instructions, possibly having entry and exit points, written in a programming language such as, for example, C, C++, C#. A software module may be complied and linked into an executable program, installed in a dynamic link library, or may be written in an interpreted programming language such as, for example, BASIC, Java, Perl, or Python. It will be appreciated that software modules may be callable from other modules or from themselves or may be invoked in response to detected events and interrupts, or both. Software instructions may be embedded in firmware, such as an EPROM. It will be further appreciated that hardware modules may be comprised of connected logic units, such as programmable gate arrays or processors. The modules described herein are preferably implemented as software modules, but may be represented in hardware or firmware. Generally, the modules described herein refer to logical modules that may be combined with other modules or devices into sub-modules despite their physical organization or storage.

In one embodiment, the account discovery system 3802 includes, for example, one or more servers or personal computers that are IBM, Macintosh, or Linux/Unix compatible. In another embodiment, the account discovery system 3802 includes one or more laptop computers, smart phones, personal digital assistants, or other computing devices. The account discovery system 3802 may include a memory 3830, which may include a random access memory (RAM) for temporary storage of information, a read only memory (ROM) for permanent storage of information, and/or a mass storage device, such as a hard drive, diskette, optical media storage device, or USB flash drive. Typically, the modules of the monitoring system are in communication with each other via a standards based bus system. In different embodiments, the standards based bus system could be Peripheral Component Interconnect (PCI), Microchannel, SCSI, Industrial Standard Architecture (ISA), and Extended ISA (EISA) architectures, for example.

The account discovery system 3802 may be generally controlled and coordinated by operating system software, such as Windows 95, 98, NT, 4000, XP, Vista, 7, 8, SunOS, Solaris, Blackberry OS, or other compatible operating systems. In Macintosh systems, the operating system may be any available operating system, such as MAC OS X. In other embodiments, the account discovery system 3802 may be controlled by a proprietary operating system. Conventional operating systems control and schedule computer processes for execution, perform memory management, provide file systems, networking, and I/O services, and provide a user interface, such as a graphical user interface (GUI), among other functions. The example account discovery system 3802, as well as the account discovery system 110 shown in FIGS. 2A and 2B, may include one or more commonly available input/output (I/O) interfaces and devices 3811, such as a keyboard, mouse, touchpad, and printer. In one embodiment, the I/O interfaces and devices 3811 include one or more display devices, such as a monitor, that allow the visual presentation of data to a user. More particularly, a display device provides for the presentation of GUIs, application software data, and multimedia presentations, for example. The account discovery system 3802 may also include one or more multimedia devices 3840, such as speakers, video cards, graphics accelerators, and microphones, for example. In one embodiment, the I/O interfaces and devices 3811 comprise devices that are in communication with modules of the account discovery system 102 via a network, such as the network 3860, or any local area network, including secured local area networks, or any combination thereof. In the embodiment of FIGS. 2A and 2B, for example, the account discovery system 3802 also includes components that may be executed by the CPU 3805. The account discovery system 3802 is configured to gather credit data about users. The credit data, which may be stored in mass storage device 3820, may include the user's credit report as well as one or more credit scores for the user, such as a FICO score, a credit score proprietary to a particular credit bureau, and/or a multi-bureau credit score, such as a VantageScore. In some embodiments, the credit score that is used by the account discovery system 3802 advantageously considers rental payment history (for example, history of rental payments for a residence of the user) and/or utility payment history (for example, history of payments to utilities providers such as gas service, electric service, and telephone service providers) in generated credit scores. Thus, in such embodiments the credit score is weighted based on the rental payment history and/or the utility payment history of the user. Credit data, which may be stored in mass storage device 3820, may also include data not typically on credit reports such as the user's income, rental payments, utility payments, or other financial information about the user, such as may be obtained using the systems and methods described herein.

The account discovery system, client computing devices, financial institutions, service providers (for example, rental service providers, telco service providers, utility service providers, and so forth) may communicate with each other over network 3860. Network 3860 may be formed from one or more networks including any combination of wired networks, wireless networks, wide-area networks such as the Internet, and local-area networks.

ADDITIONAL EMBODIMENTS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. In some embodiments, at least some of the processes may be implemented using virtualization techniques such as, for example, cloud computing, application containerization, or Lambda architecture, and so forth, alone or in combination. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The term "remote" may include data, objects, devices, components, and/or modules not stored locally, that are not accessible via the local bus. Thus, remote devices may include a device which is physically stored in the same room and connected to the user's device via a network. In other situations, a remote device may be located in a separate geographic area, such as, for example, in a different location, country, and so forth.

Many variations and modifications may be made to the above-described embodiments, the elements of which are to be understood as being among other acceptable examples. All such modifications and variations are intended to be included herein within the scope of this disclosure.

What is claimed is:

1. A computerized method performed by a computing system having one or more hardware computer processors and one or more non-transitory computer readable storage devices storing software instructions executable by the computing system to perform the computerized method comprising:

receiving, via network communication with a user computing device:
selection of a third-party entity from a plurality of third-party entities indicated in a user interface displayed on the user computing device;
credentials for directly accessing, by proxy on behalf of the user via an application programming interface (API), a plurality of data items associated with the user stored in one or more databases associated with the selected third-party entity;
transmitting at least an API token associated with the selected third-party and the credentials to one or more databases associated with the selected third-party entity;
accessing a plurality of data items associated with the user, via an API communication channel established with the one or more databases associated with the selected third-party entity;
selecting a first data item of the plurality of data items;
determining a recipient identified in the first data item;
identifying a subset of data items each indicating the determined recipient, wherein the subset of data items includes at least the first data item and one or more other data items;
determining, based at least on the identified subset of data items, account data associated with an account of the user associated with the recipient, the account data comprising at least one or more of:
a number of data items each having time stamps within a predetermined time period;
average number of days between time stamps of sequential data items;
applying a first account identification rule, associated with a first account type, to the account data;
determine, based on said application of the first account identification rule, a first confidence level indicating likelihood that the account is the first type of account;
in response to determining that the first confidence level is above a first threshold, applying a first account scoring model to the account data, the first account scoring model configured to determine an expected change to a current risk score associated with the user;
receiving, from the user computing device, confirmation that the account of the user is the first type of account;
receiving, from the user computing device, a request to add the account with the recipient to risk data associated with the user at a secured third-party risk database;
generating, based on portions of the plurality of data items and the account data associated with the recipient, an account creation data package, the account creation data package formatted for ingestion at the secured third-party risk database to initiate addition of the account to risk data of the user;

identifying a security key associated with the secured third-party risk database;

transmitting the security key and the account creation data package to the third-party risk database via a secure communication channel established with the third-party risk database;

requesting execution of a risk scoring algorithm using risk data of the user at the secured third-party risk database, wherein the risk scoring algorithm is based at least partly on portions of the plurality of data items or the account data included in the risk data of the user; and providing risk score change information to the user computing device.

2. The computerized method of claim 1, further comprising:

prior to receiving credentials from the user computing device, transmit user interface data to the user computing device, the user interface data configured to update the user interface to depict a permissions interface element that is selectable to indicate authorization to access account information associated with the user; and receiving, from the user computing device, authorization to access account information associated with the user.

3. The computerized method of claim 1, further comprising:

transmitting user interface data to the user computing device, the user interface data configured to update the user interface to depict one or more interactive elements selectable to indicate authorized uses of the data items associated with the user by the computing system;

receiving, from the user computing device, selection of authorized uses of the data items; and selectively sharing, based on the authorized uses of the data items, the data items with one or more third parties.

4. The computerized method of claim 1, wherein said determining a recipient identified in the first data items comprises:

determining a recipient identifier in the first data item;

accessing a recipient data structure storing indications of associations between recipient identifiers and corresponding recipients, wherein the recipient is associated with a plurality of recipient identifiers used by different third-party databases to identify the recipient; and determining that the recipient identifier is associated with the recipient in the recipient data structure.

5. The method of claim 4, wherein associations between recipient identifiers and corresponding recipients are deterministic.

6. The method of claim 4, wherein associations between recipient identifiers and corresponding recipients are probabilistic.

7. The computerized method of claim 1, wherein the account creation data package includes at least:

an identifier of the recipient;

a data furnisher identifier associated with an entity that provides consumer data to the secured third-party risk database; and at least a portion of the account information formatted for ingestion by the secured third-party risk database to initiate addition of the account to risk data of the user.

8. The computerized method of claim 1, wherein the security key comprises an API token associated with the secured third-party risk database.

9. The computerized method of claim 1, further comprising:

determining a first one or more items available to the user based on the current risk score;

determining a second one or more items not available to the user based on the current risk score;

determining an estimated risk score of the user based on potential addition of a new account of the user to risk data of the user;

in response to determining that at least one of the second one or more items would be available to the user based on the estimated risk score, providing an option to the user in the user interface to initiate updates to risk data of the user;

in response to receiving an indication of selection of the option in the user interface on the user device, initiating receiving via network communication with the user computing device;

determining an updated risk score based at least on the risk score change information;

determining at least one of the second one or more items eligible to the user based on the updated risk score; and updating user interface data configured update the user interface to depict information regarding the at least one of the second one or more items.

10. The computerized method of claim 1, wherein the first account scoring model is configured to determine an estimated risk score change if the first account of the first account type is added to the risk data of the user, wherein the first account scoring model is based at least on actual risk score changes of a plurality of other users in response to addition of accounts of the first account type to their respective risk data.

11. The computerized method of claim 1, further comprising:

for each of a plurality of accounts included in the risk data of the user, determining an account type from a plurality of account types;

identifying a second account type of the plurality of account types that impacts risk scores of users that is not included in the determined account types of the plurality accounts of the user;

executing a score impact algorithm, based at least on the second account type and the risk data of the user, to determine a possible risk score change if an account of the second account type is added to the risk data of the user; and providing, to the user, an indication of the possible risk score change prior to receiving the request to add the account with the recipient to risk data of the user at the secured third-party risk database.

12. A computing system comprising a hardware computer processor is configured to perform processor-executable instructions comprising:

receiving, via network communication with a user computing device:

selection of a third-party entity from a plurality of third-party entities indicated in a user interface displayed on the user computing device;

credentials for directly accessing, by proxy on behalf of the user via an application programming interface (API), a plurality of data items associated with the user stored in one or more databases associated with the selected third-party entity;

transmitting at least an API token associated with the selected third-party and the credentials to one or more databases associated with the selected third-party;
accessing a plurality of data items associated with the user, via an API communication channel established with the one or more databases associated with the selected third-party entity;
selecting a first data item of the plurality of data items;
determining a recipient identified in the first data item;
identifying a subset of data items each indicating the determined recipient, wherein the subset of data items includes at least the first data item and one or more other data items;
determining, based at least on the identified subset of data items, account data associated with an account of the user associated with the recipient, the account data comprising at least one or more of:
a number of data items each having time stamps within a predetermined time period;
average number of days between time stamps of sequential data items;
applying a first account identification rule, associated with a first account type, to the account data;
determine, based on said application of the first account identification rule, a first confidence level indicating likelihood that the account is the first type of account;
in response to determining that the first confidence level is about a first threshold, applying a first account scoring model to the account data, the first account scoring model configured to determine an expected change to a current risk score associated with the user;
receiving, from the user computing device, confirmation that the account of the user is the first type of account;
receiving, from the user computing device, a request to add the account with the recipient to risk data associated with the user at a secured third-party risk database;
generating, based on portions of the plurality of data items and the account data associated with the recipient, an account creation data package, the account creation data package formatted for ingestion at the secured third-party risk database to initiate addition of the account to risk data of the user;
identifying a security key associated with the secured third-party risk database;
transmitting the security key and the account creation data package to the third-party risk database via a secure communication channel established with the third-party risk database;
requesting execution of a risk scoring algorithm using risk data of the user at the secured third-party risk database, wherein the risk scoring algorithm is based at least partly on portions of the plurality of data items or the account data included in the risk data of the user; and
providing risk score change information to the user computing device.

13. The computing system of claim 12, further comprising:
prior to receiving credentials from the user computing device, transmit user interface data to the user computing device, the user interface data configured to update the user interface to depict a permissions interface element that is selectable to indicate authorization to access account information associated with the user;
receiving, from the user computing device, authorization to access account information associated with the user.

14. The computing system of claim 12, further comprising:
transmitting user interface data to the user computing device, the user interface data configured to update the user interface to depict one or more interactive elements selectable to indicate authorized uses of the data items associated with the user by the computing system;
receiving, from the user computing device, selection of authorized uses of the data items; and
selectively sharing, based on the authorized uses of the data items, the data items with one or more third parties.

15. A non-transitory computer readable medium having software instructions stored thereon, the software instructions executable by a hardware computer processor to perform operations comprising:
receiving, via network communication with a user computing device:
selection of a third-party entity from a plurality of third-party entities indicated in a user interface displayed on the user computing device;
credentials for directly accessing, by proxy on behalf of the user via an application programming interface (API), a plurality of data items associated with the user stored in one or more databases associated with the selected third-party entity;
transmitting at least an API token associated with the selected third-party and the credentials to one or more databases associated with the selected third-party;
accessing a plurality of data items associated with the user, via an API communication channel established with the one or more databases associated with the selected third-party entity;
selecting a first data item of the plurality of data items;
determining a recipient identified in the first data item;
identifying a subset of data items each indicating the determined recipient, wherein the subset of data items includes at least the first data item and one or more other data items;
determining, based at least on the identified subset of data items, account data associated with an account of the user associated with the recipient, the account data comprising at least one or more of:
a number of data items each having time stamps within a predetermined time period;
average number of days between time stamps of sequential data items;
applying a first account identification rule, associated with a first account type, to the account data;
determine, based on said application of the first account identification rule, a first confidence level indicating likelihood that the account is the first type of account;
in response to determining that the first confidence level is about a first threshold, applying a first account scoring model to the account data, the first account scoring model configured to determine an expected change to a current risk score associated with the user;
receiving, from the user computing device, confirmation that the account of the user is the first type of account;
receiving, from the user computing device, a request to add the account with the recipient to risk data associated with the user at a secured third-party risk database;
generating, based on portions of the plurality of data items and the account data associated with the recipient, an account creation data package, the account creation data package formatted for ingestion at the secured third-party risk database to initiate addition of the account to risk data of the user;

identifying a security key associated with the secured third-party risk database;

transmitting the security key and the account creation data package to the third-party risk database via a secure communication channel established with the third-party risk database;

requesting execution of a risk scoring algorithm using risk data of the user at the secured third-party risk database, wherein the risk scoring algorithm is based at least partly on portions of the plurality of data items or the account data included in the risk data of the user; and providing risk score change information to the user computing device.

* * * * *